United States Patent
Kravtsov

(10) Patent No.: US 9,682,356 B2
(45) Date of Patent: Jun. 20, 2017

(54) BUBBLE IMPLOSION REACTOR CAVITATION DEVICE, SUBASSEMBLY, AND METHODS FOR UTILIZING THE SAME

(71) Applicant: KCS678 LLC, Medford, OR (US)

(72) Inventor: Alexander E. Kravtsov, Cincinnati, OH (US)

(73) Assignee: KCS678 LLC, Medford, OR (US)

( * ) Notice: Subject to any disclaimer, the term of this patent is extended or adjusted under 35 U.S.C. 154(b) by 0 days.

(21) Appl. No.: 14/844,354

(22) Filed: Sep. 3, 2015

(65) Prior Publication Data

US 2015/0375190 A1 Dec. 31, 2015

Related U.S. Application Data

(62) Division of application No. 13/835,958, filed on Mar. 15, 2013, now Pat. No. 9,126,176.
(Continued)

(51) Int. Cl.
*B01J 19/00* (2006.01)
*B01F 5/06* (2006.01)
(Continued)

(52) U.S. Cl.
CPC .......... *B01J 19/008* (2013.01); *B01F 5/0688* (2013.01); *C02F 1/34* (2013.01); *C09K 15/00* (2013.01);
(Continued)

(58) Field of Classification Search
CPC .......... B01J 19/008; B01J 19/24; B01J 19/26; C10L 10/02; C10L 2270/023;
(Continued)

(56) References Cited

U.S. PATENT DOCUMENTS 1,454,196 A 5/1923 Trood
1,626,487 A 4/1927 Warren
(Continued)

FOREIGN PATENT DOCUMENTS

CA 2266670 C 6/2006
CN 101746898 A 6/2010
(Continued)

OTHER PUBLICATIONS

Nano cavitation: a proven new concept; Processing & Technology, Aug./Sep. 2012, www.oilsandfatsinternational.com.
(Continued)

*Primary Examiner* — Lessanework Seifu
(74) *Attorney, Agent, or Firm* — Honigman Miller Schwartz and Cohn LLP

(57) ABSTRACT

An apparatus is disclosed. The apparatus includes a bubble implosion reactor cavitation device. The bubble implosion reactor cavitation device includes a tube-shaped cylindrical body including an upstream, a distal end surface and a downstream, proximal end surface. The tube-shaped cylindrical body defines an axial passage that extends through the tube-shaped cylindrical body between the upstream, distal end surface and the downstream, proximal end surface. The apparatus also includes a bubble generator subassembly connected to the tube-shaped cylindrical body. The bubble generator subassembly is at least partially disposed within the axial passage defined by the tube-shaped cylindrical body. The apparatus also includes a retaining member connected to the tube-shaped cylindrical body for retaining the bubble generator subassembly within the axial passage defined by the tube-shaped cylindrical body.

22 Claims, 58 Drawing Sheets

Related U.S. Application Data

(60) Provisional application No. 61/645,975, filed on May 11, 2012.

(51) Int. Cl.
*C02F 1/34* (2006.01)
*C09K 15/00* (2006.01)
*C10L 1/02* (2006.01)
*C10L 1/04* (2006.01)
*C10L 1/06* (2006.01)
*C10L 1/08* (2006.01)
*C10L 10/02* (2006.01)
*F02M 61/16* (2006.01)

(52) U.S. Cl.
CPC .............. *C10L 1/026* (2013.01); *C10L 1/04* (2013.01); *C10L 1/06* (2013.01); *C10L 1/08* (2013.01); *C10L 10/02* (2013.01); *F02M 61/16* (2013.01); *B01J 2219/24* (2013.01); *C10L 2200/043* (2013.01); *C10L 2200/0423* (2013.01); *C10L 2200/0446* (2013.01); *C10L 2200/0476* (2013.01); *C10L 2230/22* (2013.01); *C10L 2270/023* (2013.01); *C10L 2270/026* (2013.01); *C10L 2270/04* (2013.01); *Y10T 137/0396* (2015.04)

(58) Field of Classification Search
CPC ....... C10L 2200/043; C10L 2200/0446; C10L 2200/0476; C10L 2230/22; C10L 2270/026; C10L 2270/04; C10L 220/0423; B01F 5/0688; C02F 1/34; Y10T 137/0396
See application file for complete search history.

(56) References Cited

U.S. PATENT DOCUMENTS

| | | |
|---|---|---|
| 2,584,827 A | 2/1952 | Bailey |
| 3,167,305 A | 1/1965 | Backx et al. |
| 3,467,072 A | 9/1969 | Toesca |
| 3,778,038 A | 12/1973 | Eversole et al. |
| 4,213,712 A | 7/1980 | Aanonsen et al. |
| 5,092,305 A | 3/1992 | King |
| 5,150,685 A | 9/1992 | Porter et al. |
| 5,203,305 A | 4/1993 | Porter et al. |
| 5,302,325 A | 4/1994 | Cheng |
| 5,450,832 A | 9/1995 | Graf |
| 5,492,654 A | 2/1996 | Kozjuk et al. |
| 5,535,620 A | 7/1996 | Nichols |
| 5,810,052 A | 9/1998 | Kozyuk |
| 5,820,850 A | 10/1998 | Hashimoto et al. |
| 5,860,942 A | 1/1999 | Cox |
| 5,914,027 A | 6/1999 | Ellingsen |
| 5,931,771 A | 8/1999 | Kozyuk |
| 5,937,906 A | 8/1999 | Kozyuk |
| 5,969,207 A | 10/1999 | Kozyuk |
| 5,971,601 A | 10/1999 | Kozyuk |
| 6,012,492 A | 1/2000 | Kozyuk |
| 6,035,897 A | 3/2000 | Kozyuk |
| 6,200,486 B1 | 3/2001 | Chahine et al. |
| D445,046 S | 7/2001 | Kravtsov |
| 6,276,823 B1 | 8/2001 | King |
| 6,365,555 B1 | 4/2002 | Moser et al. |
| 6,379,035 B1 | 4/2002 | Kubo et al. |
| 6,502,979 B1 | 1/2003 | Kozyuk |
| 6,589,501 B2 | 7/2003 | Moser et al. |
| 6,802,639 B2 | 10/2004 | Kozyuk |
| 6,857,774 B2 | 2/2005 | Kozyuk |
| 6,869,586 B1 | 3/2005 | Moser et al. |
| 6,926,032 B2 | 8/2005 | Nawaz |
| 6,935,770 B2 | 8/2005 | Schueler |
| 7,041,144 B2 | 5/2006 | Kozyuk |
| 7,086,777 B2 | 8/2006 | Kozyuk |
| 7,178,975 B2 | 2/2007 | Kozyuk |
| 7,207,712 B2 | 4/2007 | Kozyuk |
| 7,247,244 B2 | 7/2007 | Kozyuk |
| 7,305,939 B2 | 12/2007 | Carlson |
| 7,314,306 B2 | 1/2008 | Kozyuk |
| 7,314,516 B2 | 1/2008 | Kozyuk et al. |
| 7,338,551 B2 | 3/2008 | Kozyuk |
| 7,357,566 B2 | 4/2008 | Kozyuk |
| 7,422,360 B2 | 9/2008 | Kozyuk |
| 7,607,422 B2 | 10/2009 | Carlson et al. |
| 7,667,082 B2 | 2/2010 | Kozyuk |
| 7,708,453 B2 | 5/2010 | Kozyuk |
| 7,754,905 B2 | 7/2010 | Kozyuk |
| 7,762,715 B2 | 7/2010 | Gordon et al. |
| 7,776,243 B2 | 8/2010 | Braun, Jr. et al. |
| 7,897,121 B1 | 3/2011 | Hughes et al. |
| 7,935,157 B2 | 5/2011 | Kozyuk et al. |
| 7,946,299 B2 | 5/2011 | Franklin et al. |
| 8,002,971 B2 | 8/2011 | Kozyuk |
| 8,042,989 B2 | 10/2011 | Gordon et al. |
| 8,143,460 B2 | 3/2012 | Kozyuk |
| 2002/0009414 A1 | 1/2002 | Moser et al. |
| 2002/0193254 A1 | 12/2002 | Moser et al. |
| 2003/0147303 A1 | 8/2003 | Schueler |
| 2003/0199595 A1 | 10/2003 | Kozyuk |
| 2004/0022122 A1 | 2/2004 | Kozyuk |
| 2004/0042336 A1 | 3/2004 | Kozyuk |
| 2004/0050433 A1 | 3/2004 | Nawaz |
| 2004/0071044 A1 | 4/2004 | Kozyuk |
| 2004/0173139 A1 | 9/2004 | Kozyuk |
| 2004/0246815 A1 | 12/2004 | Kozyuk |
| 2004/0251566 A1 | 12/2004 | Kozyuk |
| 2005/0047271 A1 | 3/2005 | Kozyuk |
| 2005/0047993 A1 | 3/2005 | Moser et al. |
| 2005/0123759 A1 | 6/2005 | Weinberg et al. |
| 2005/0136123 A1 | 6/2005 | Kozyuk |
| 2005/0237855 A1 | 10/2005 | Kozyuk |
| 2006/0027100 A1 | 2/2006 | Kozyuk |
| 2006/0050608 A1 | 3/2006 | Kozyuk |
| 2006/0081501 A1 | 4/2006 | Kozyuk |
| 2006/0081541 A1 | 4/2006 | Kozyuk |
| 2006/0118034 A1 | 6/2006 | Kozyuk |
| 2006/0137598 A1 | 6/2006 | Kozyuk et al. |
| 2006/0187748 A1 | 8/2006 | Kozyuk |
| 2006/0193199 A1 | 8/2006 | Kozyuk |
| 2006/0236976 A1 | 10/2006 | Carlson |
| 2006/0251829 A1 | 11/2006 | Braun et al. |
| 2007/0041266 A1 | 2/2007 | Huymann |
| 2007/0066480 A1 | 3/2007 | Moser et al. |
| 2007/0102371 A1* | 5/2007 | Bhalchandra ............ B63J 4/004 210/748.01 |
| 2007/0140052 A1 | 6/2007 | Kozyuk |
| 2007/0189114 A1 | 8/2007 | Reiner et al. |
| 2007/0205307 A1 | 9/2007 | Kozyuk |
| 2008/0194868 A1 | 8/2008 | Kozyuk |
| 2008/0281131 A1 | 11/2008 | Kozyuk |
| 2009/0008295 A1 | 1/2009 | Kozyuk |
| 2009/0010097 A1 | 1/2009 | Kozyuk |
| 2009/0038210 A1 | 2/2009 | Kozyuk et al. |
| 2009/0043118 A1 | 2/2009 | Kozyuk |
| 2009/0141585 A1 | 6/2009 | Al-Otaibi |
| 2009/0182159 A1 | 7/2009 | Gordon et al. |
| 2009/0251989 A1 | 10/2009 | Pfefferle et al. |
| 2009/0314688 A1 | 12/2009 | Gordon et al. |
| 2010/0101978 A1 | 4/2010 | Gordon et al. |
| 2010/0103768 A1 | 4/2010 | Gordon et al. |
| 2010/0104705 A1 | 4/2010 | Gordon et al. |
| 2010/0112125 A1 | 5/2010 | Kozyuk |
| 2010/0122933 A1 | 5/2010 | Khan |
| 2010/0151540 A1 | 6/2010 | Gordon et al. |
| 2010/0175309 A1 | 7/2010 | Kozyuk et al. |
| 2010/0236134 A1* | 9/2010 | Mogami ............ F23K 5/12 44/301 |
| 2010/0252660 A1 | 10/2010 | Kozyuk |
| 2010/0255759 A1* | 10/2010 | Ohashi ............ B24C 3/325 451/38 |
| 2010/0290307 A1 | 11/2010 | Gordon et al. |
| 2010/0326925 A1 | 12/2010 | Andersen |

(56) References Cited

U.S. PATENT DOCUMENTS

| | | |
|---|---|---|
| 2011/0003370 A1 | 1/2011 | Gordon et al. |
| 2011/0023352 A1* | 2/2011 | Knuth .................. C10L 1/026 44/385 |
| 2011/0136194 A1 | 6/2011 | Kozyuk |
| 2011/0147231 A1 | 6/2011 | Gordon et al. |
| 2011/0151524 A1 | 6/2011 | Gordon et al. |
| 2011/0202256 A1 | 8/2011 | Sauve et al. |
| 2011/0300568 A1 | 12/2011 | Parsheh et al. |
| 2011/0305104 A1 | 12/2011 | McGuire et al. |
| 2012/0124894 A1* | 5/2012 | Donnelly ............ B01F 3/04531 44/300 |
| 2012/0236678 A1 | 9/2012 | Gordon et al. |

FOREIGN PATENT DOCUMENTS

| | | |
|---|---|---|
| DE | 69629059 T2 | 4/2004 |
| DE | 10310442 A1 | 9/2004 |
| EP | 322022 A1 | 6/1989 |
| EP | 04/08956 A2 | 1/1991 |
| EP | 499110 A2 | 8/1992 |
| EP | 0667386 A1 | 8/1995 |
| EP | 0667386 A4 | 4/1996 |
| EP | 1173387 B1 | 1/2003 |
| EP | 948400 B1 | 7/2003 |
| EP | 1754529 A1 | 2/2007 |
| ES | 2202479 T3 | 4/2004 |
| GB | 2253674 A | 9/1992 |
| JP | 2007014924 A | 1/2007 |
| JP | 2009082841 A | 4/2009 |
| JP | 2010234242 A | 10/2010 |
| JP | 2010274243 A | 12/2010 |
| RU | 633576 A1 | 11/1978 |
| RU | 1790438 A3 | 1/1993 |
| RU | 2078116 C1 | 4/1997 |
| RU | 2265478 C1 | 12/2005 |
| WO | WO-9409894 A1 | 5/1994 |
| WO | WO-9410261 A1 | 5/1994 |
| WO | WO-96/09112 A1 | 3/1996 |
| WO | WO-97/30956 A1 | 8/1997 |
| WO | WO-9811983 A1 | 3/1998 |
| WO | WO-03 093398 A1 | 11/2003 |

OTHER PUBLICATIONS

Investigation of hydrodynamic cavitation as a means of natural crude oil and synthetic biofuel upgrading; 2012 Quantum Potential Corporation, Max Fomitchev-Zamilov and Sergei Godin; pp. 1-24.
Applying magnetic fileds to magnetic materials; Cavitation Treatment; S.I. Fishgal 1977; cavitation1.wordpress.com Apr. 2, 2013, pp. 1-43.
International Search Report and Written Opinion for Application No. PCT/US2013/035093 dated Oct. 30, 2013.
Office Action for U.S. Appl. No. 13/835,958 dated Dec. 22, 2014.
Office Action for U.S. Appl. No. 13/835,958 dated Mar. 26, 2015.

* cited by examiner

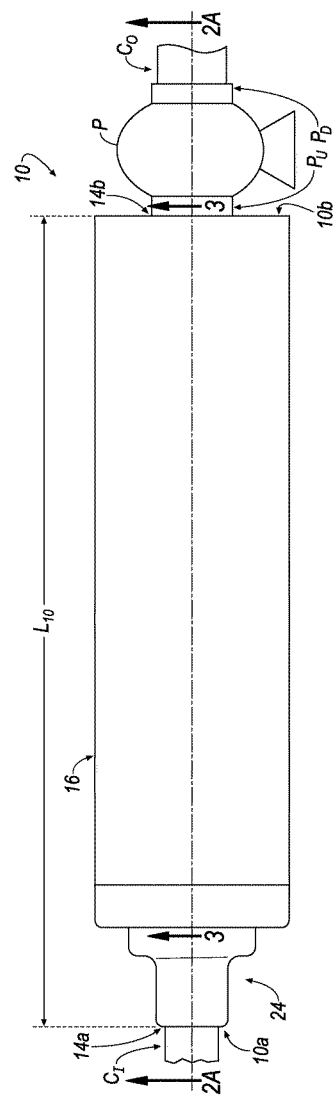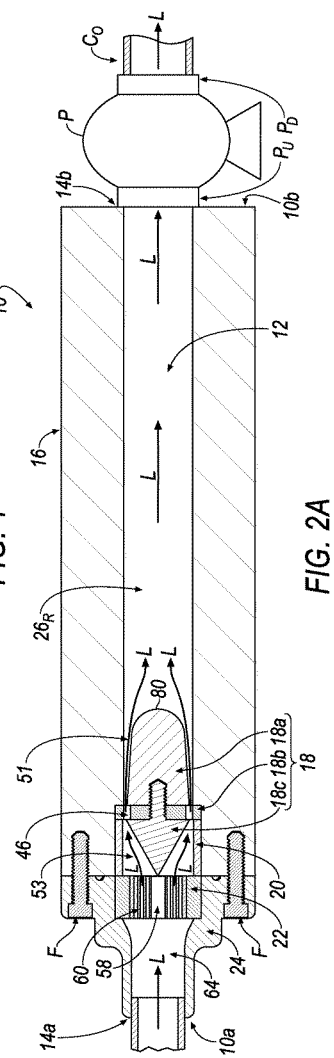
FIG. 1
FIG. 2A

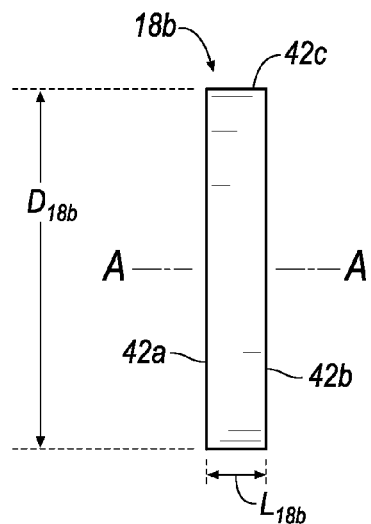
FIG. 5A
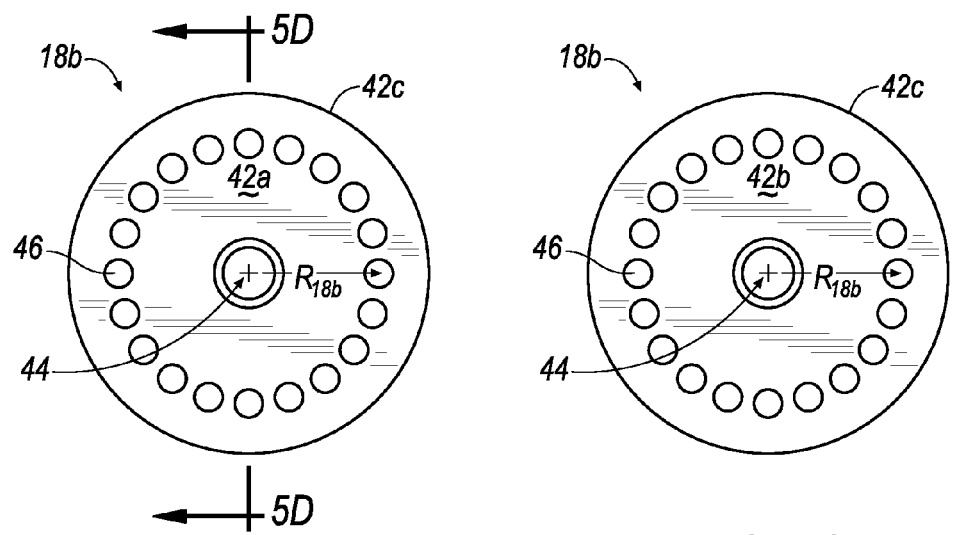
FIG. 5B
FIG. 5C
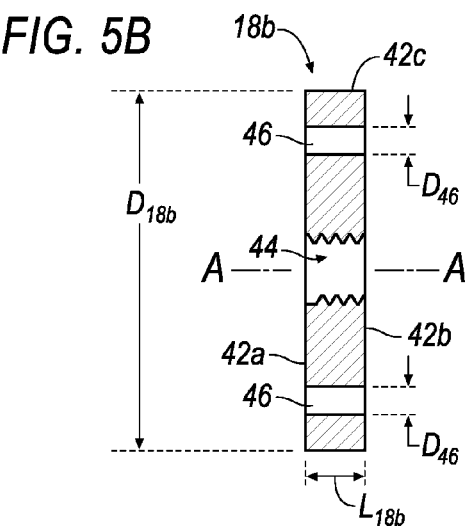
FIG. 5D

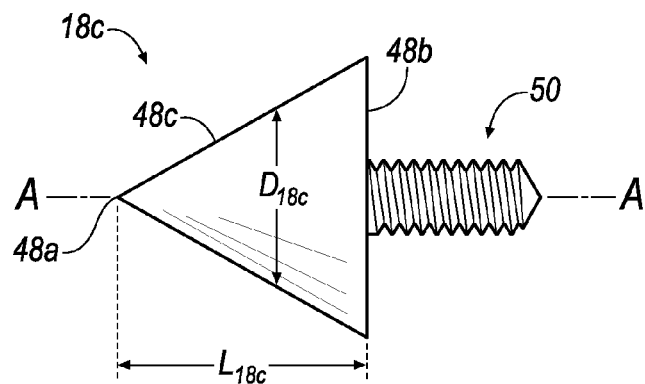
FIG. 6A
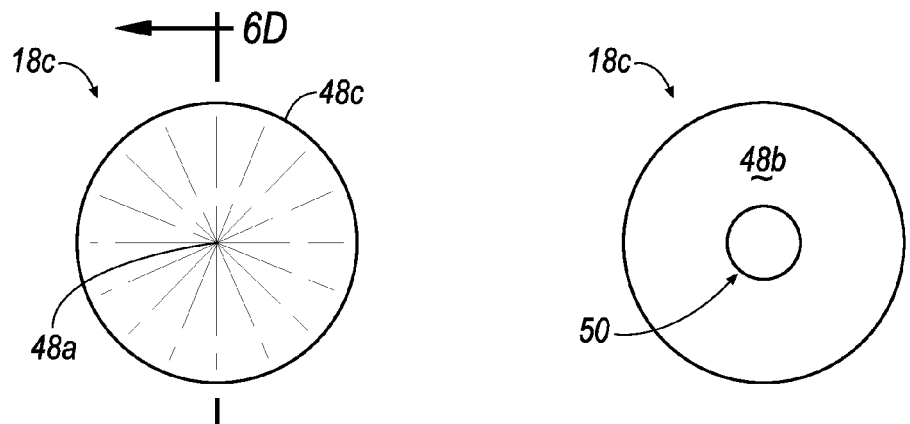
FIG. 6B
FIG. 6C
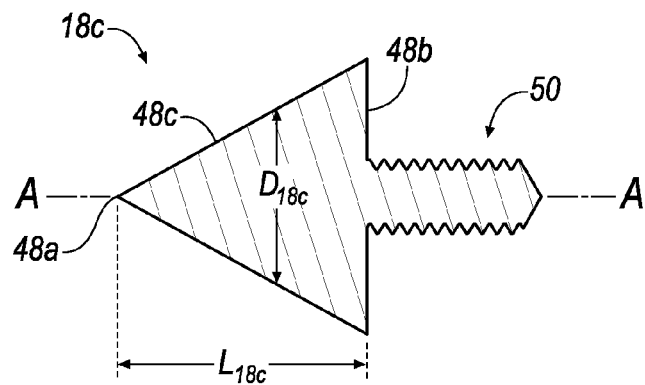
FIG. 6D

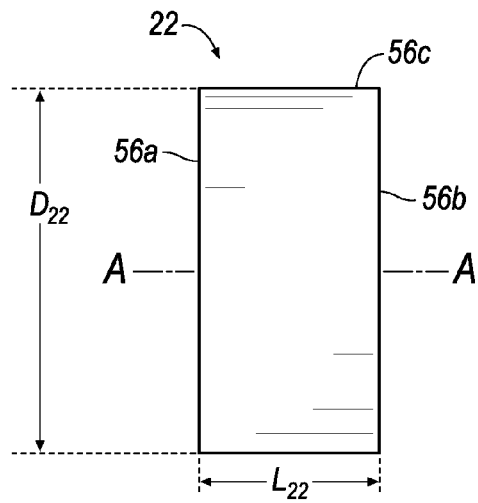
FIG. 8A
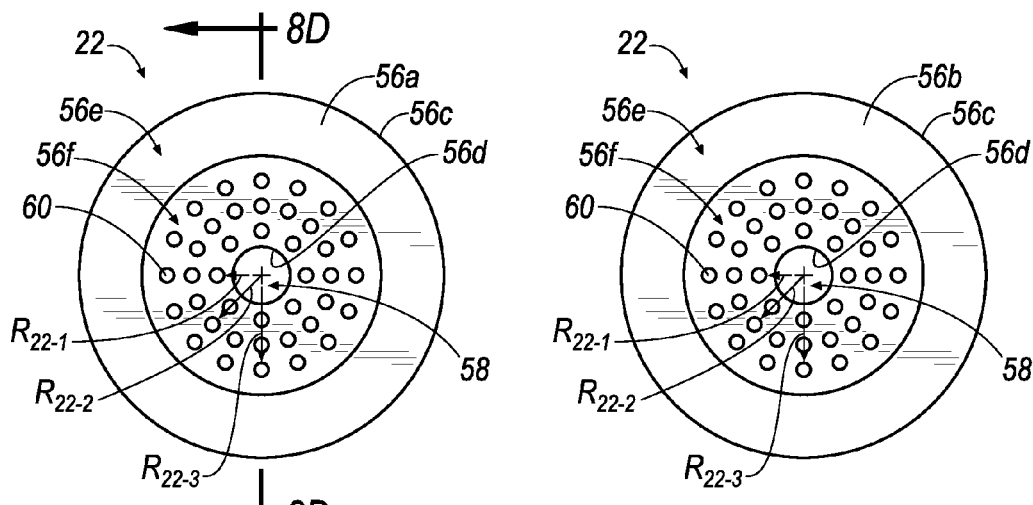
FIG. 8B
FIG. 8C
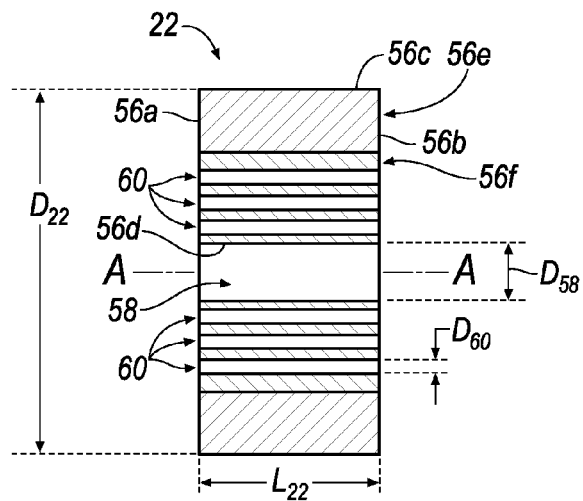
FIG. 8D

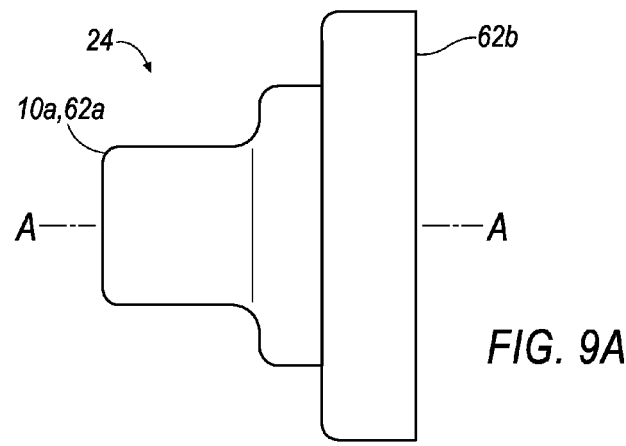
FIG. 9A
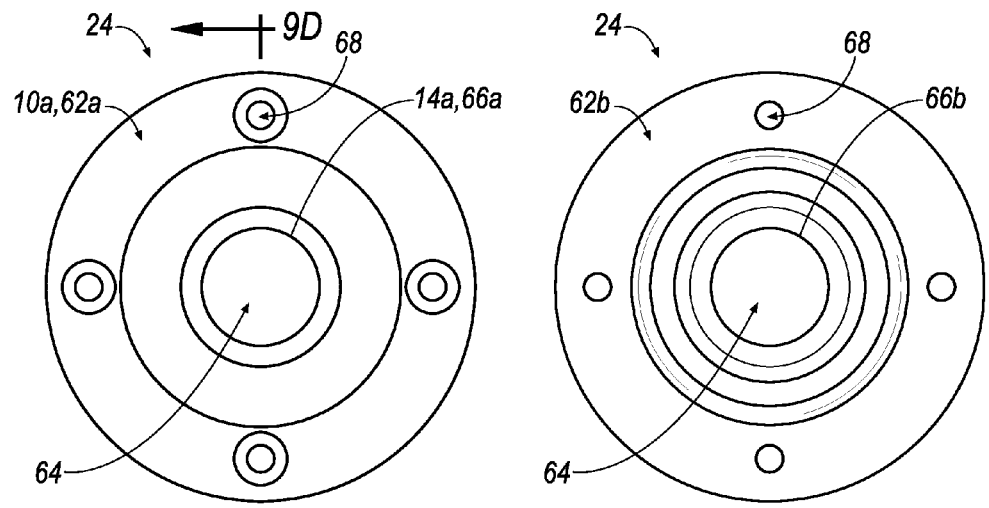
FIG. 9B
FIG. 9C
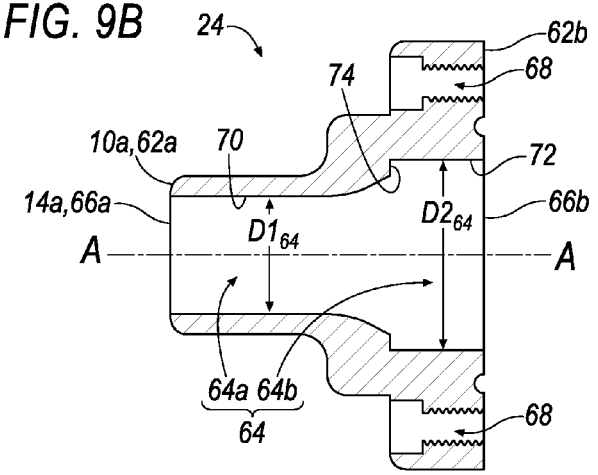
FIG. 9D

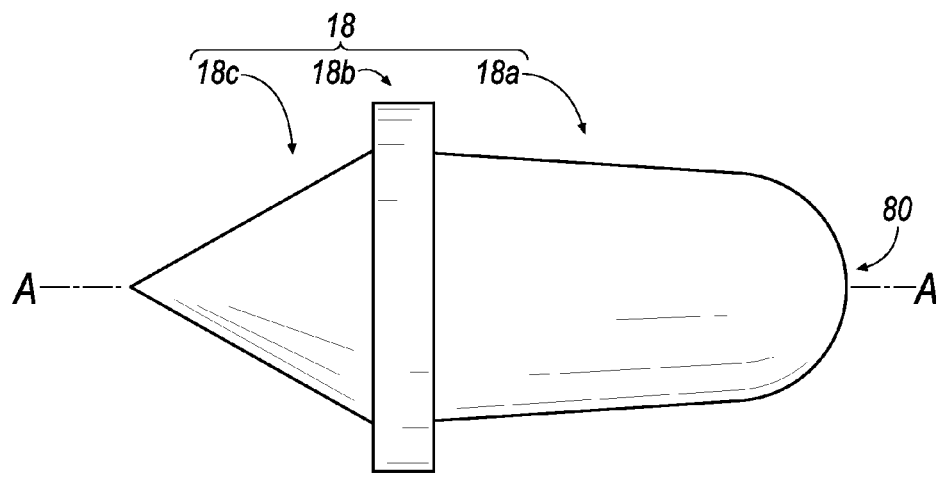
FIG. 10D
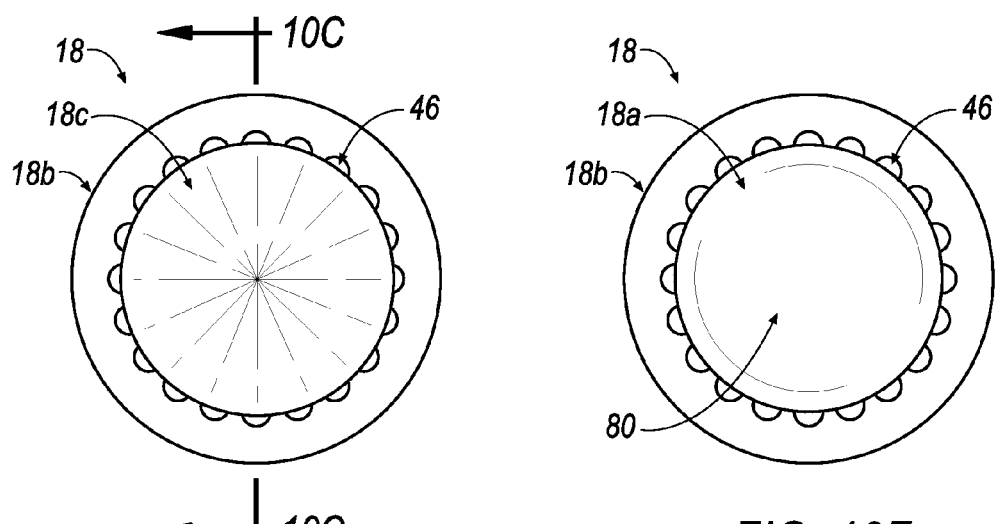
FIG. 10E
FIG. 10F

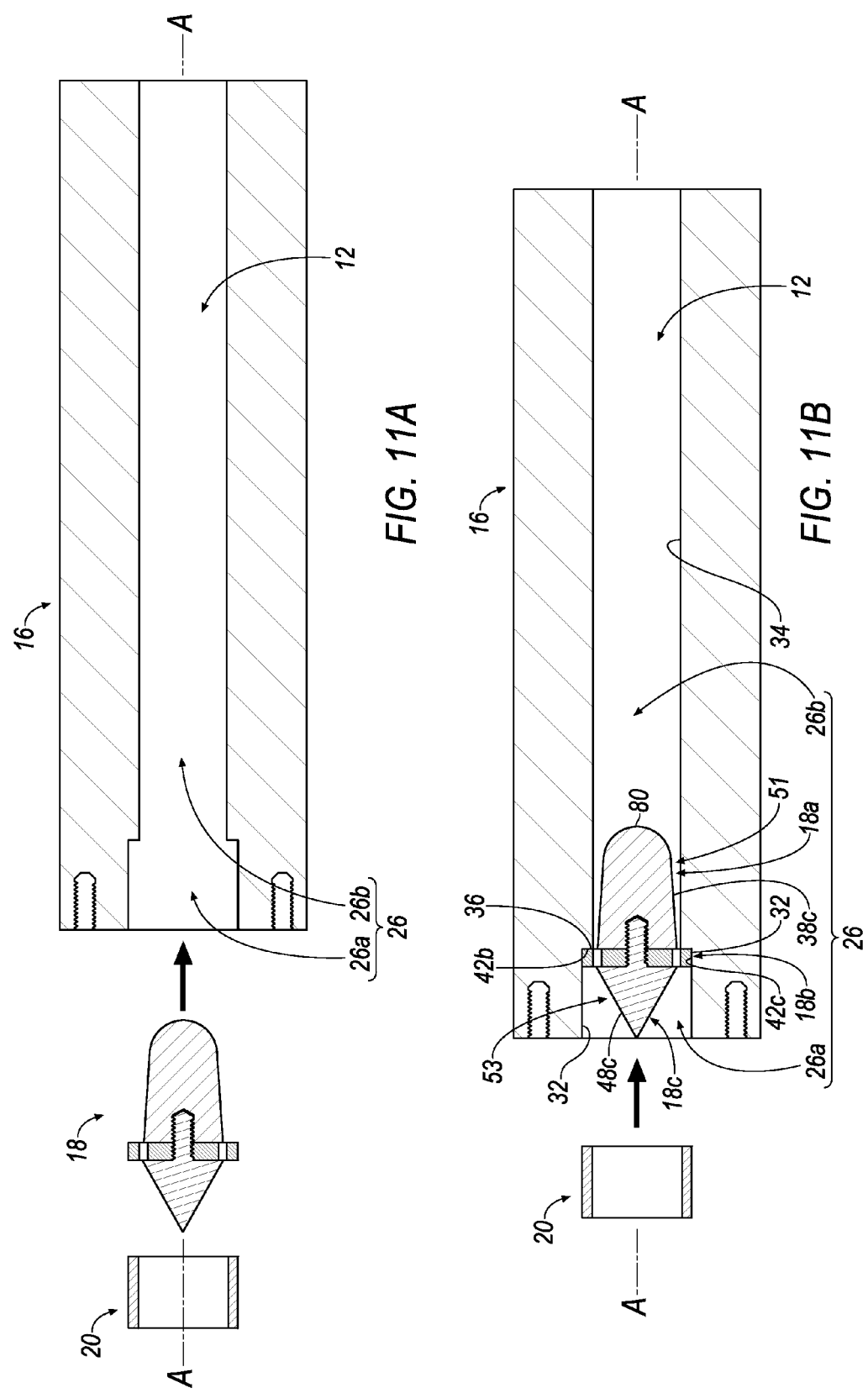

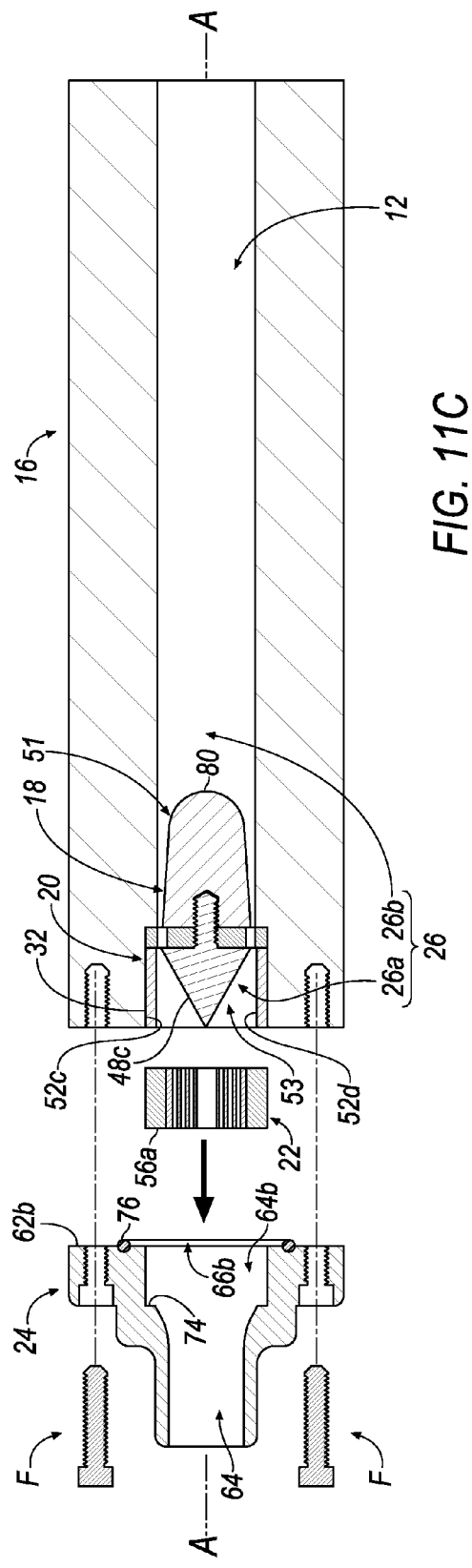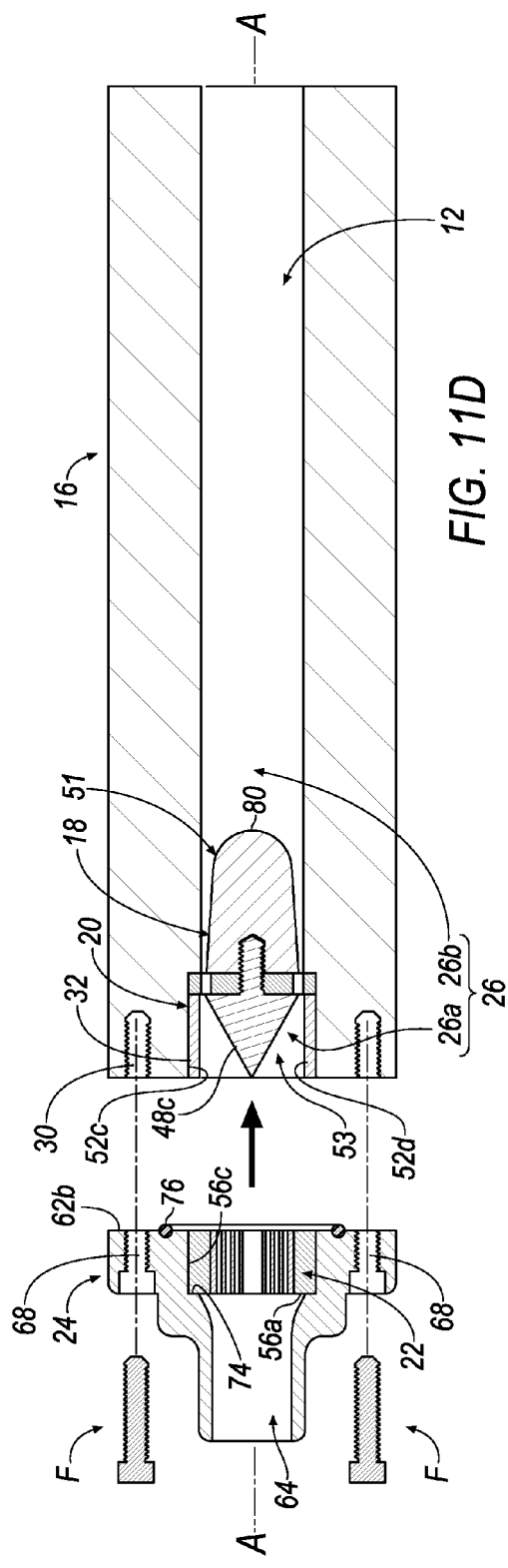

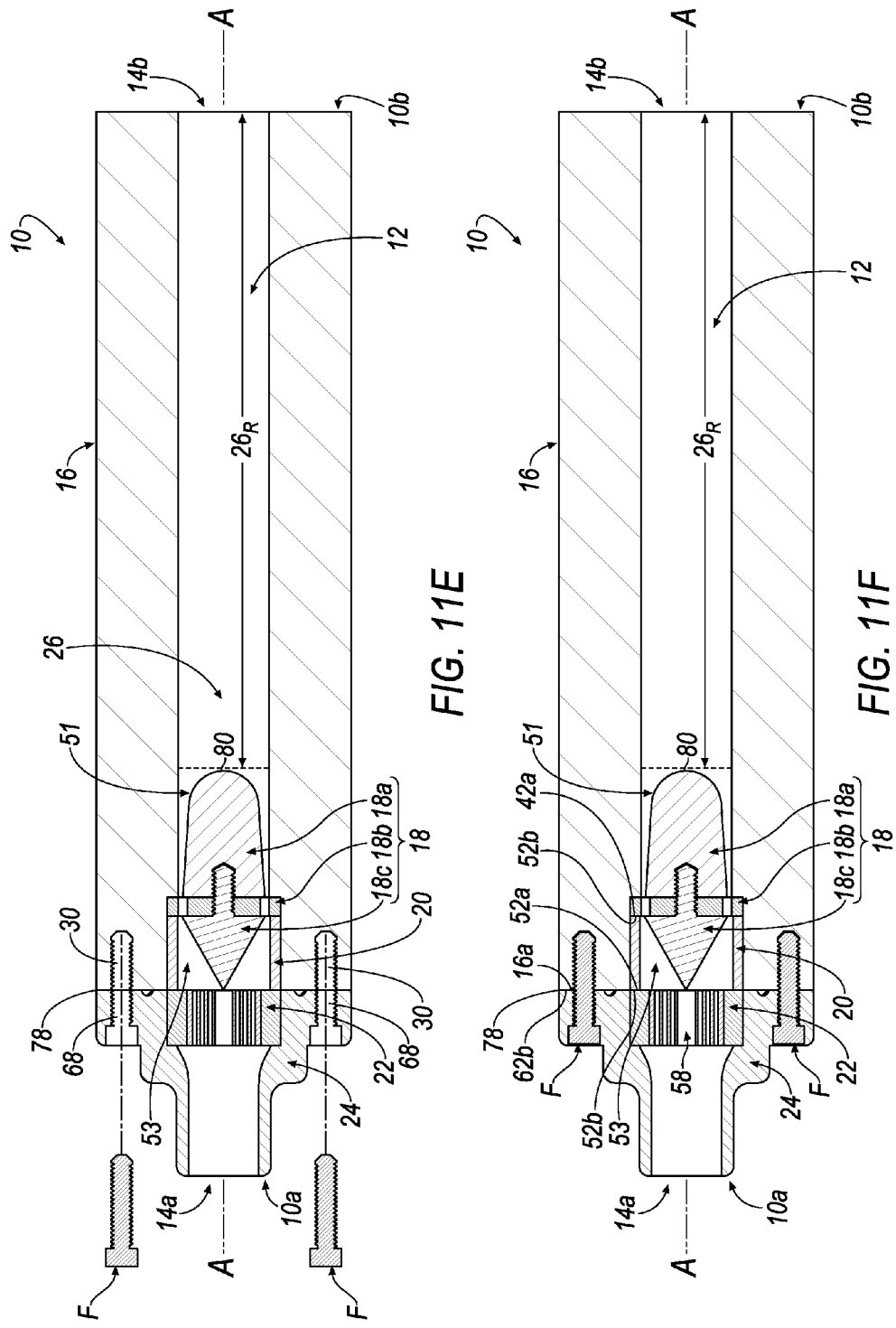

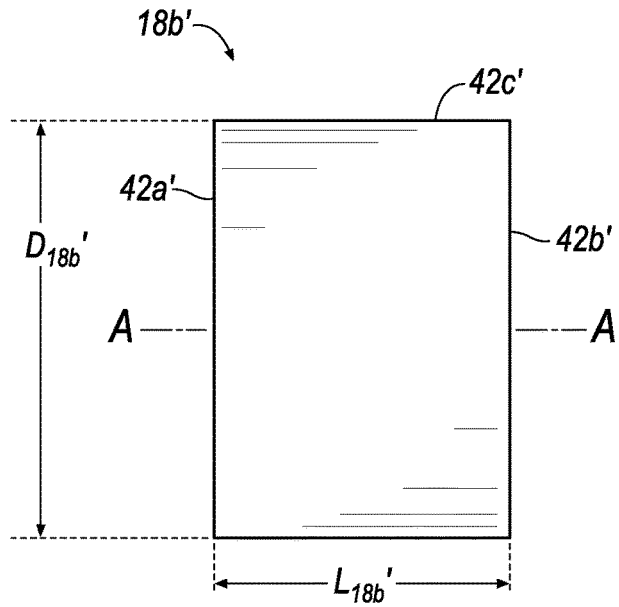
FIG. 16A
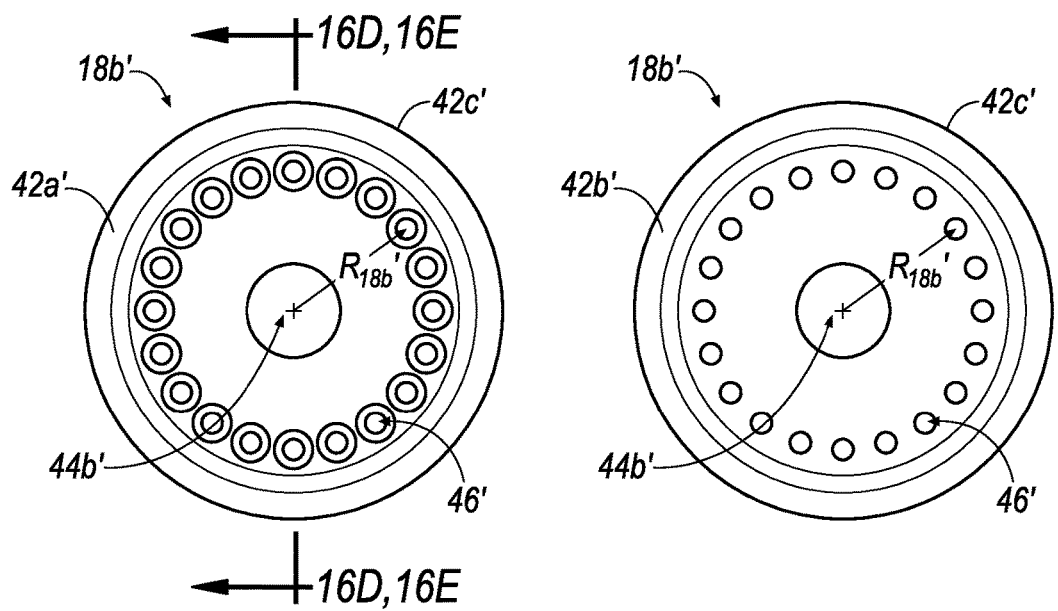
FIG. 16B
FIG. 16C

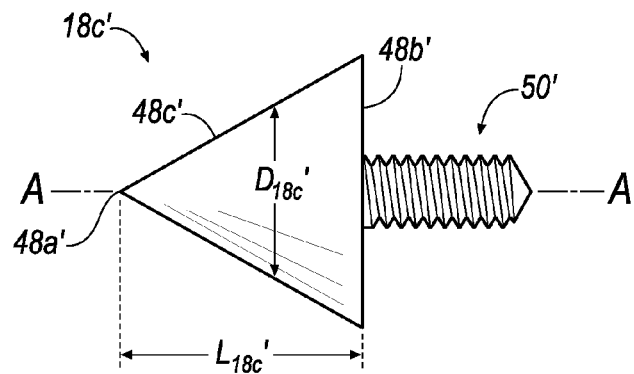
FIG. 17A
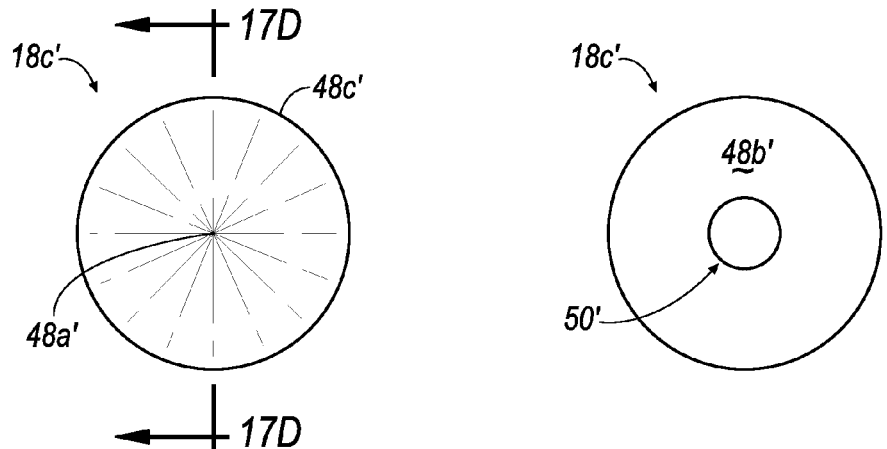
FIG. 17B
FIG. 17C
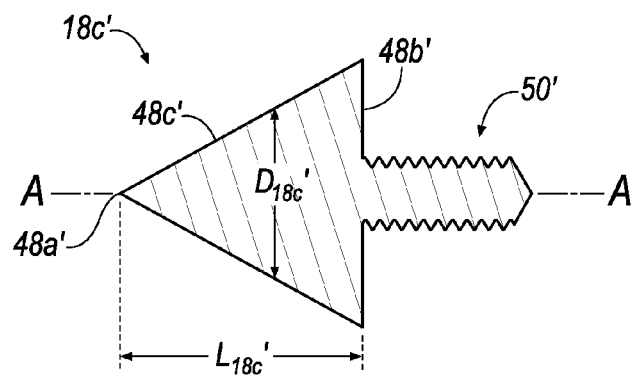
FIG. 17D

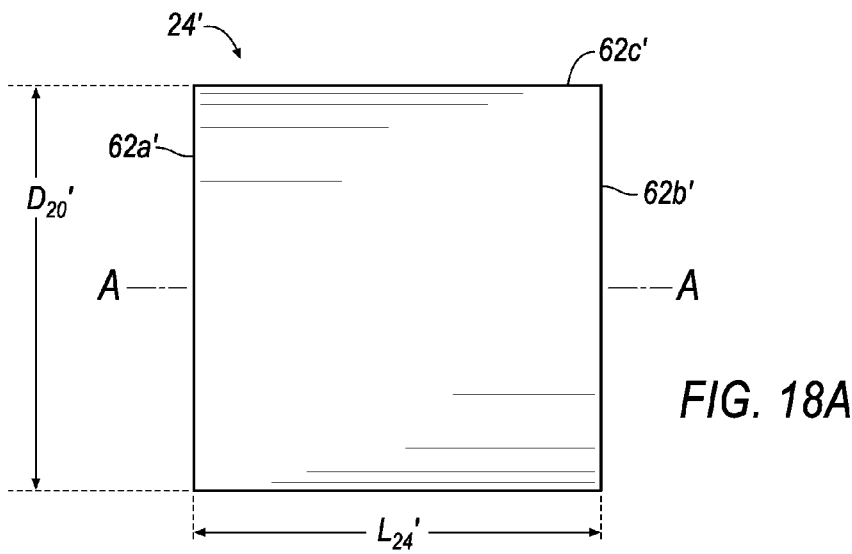
FIG. 18A
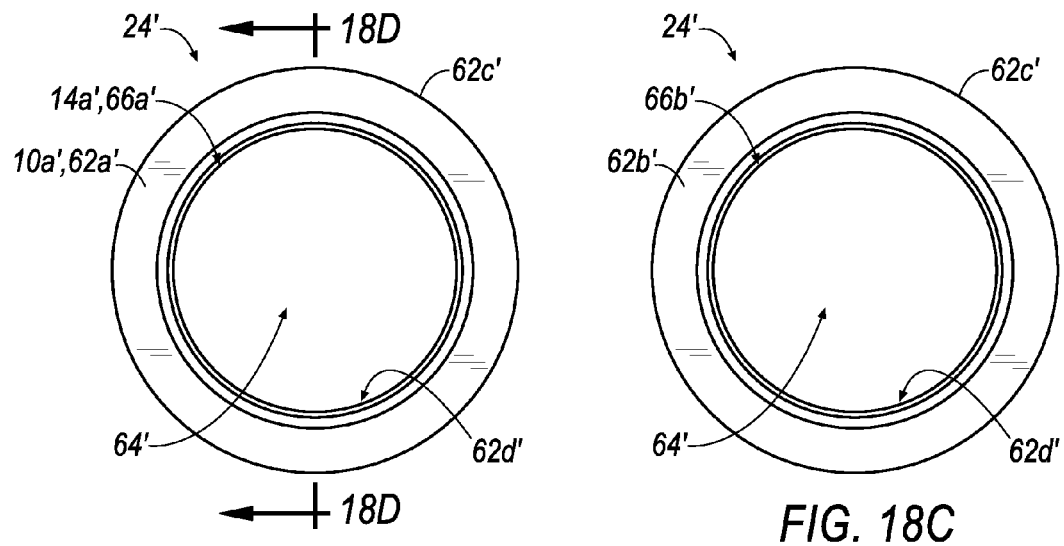
FIG. 18B
FIG. 18C
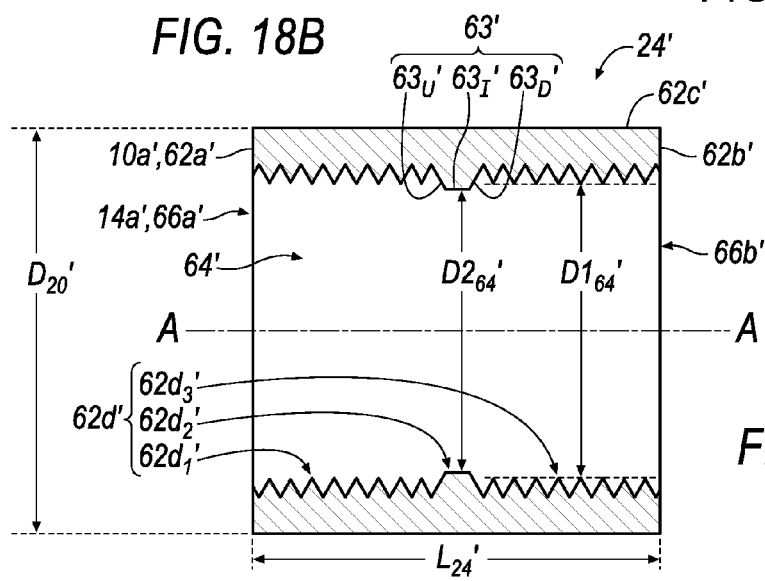
FIG. 18D

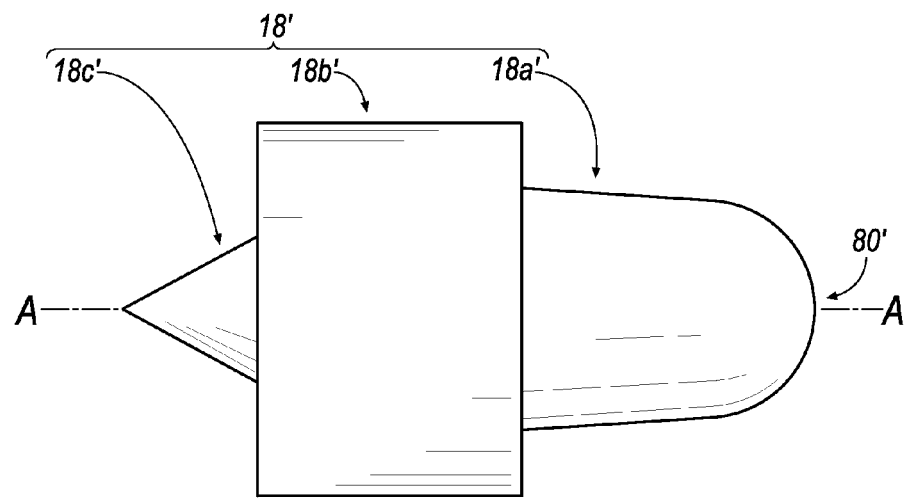
FIG. 19D
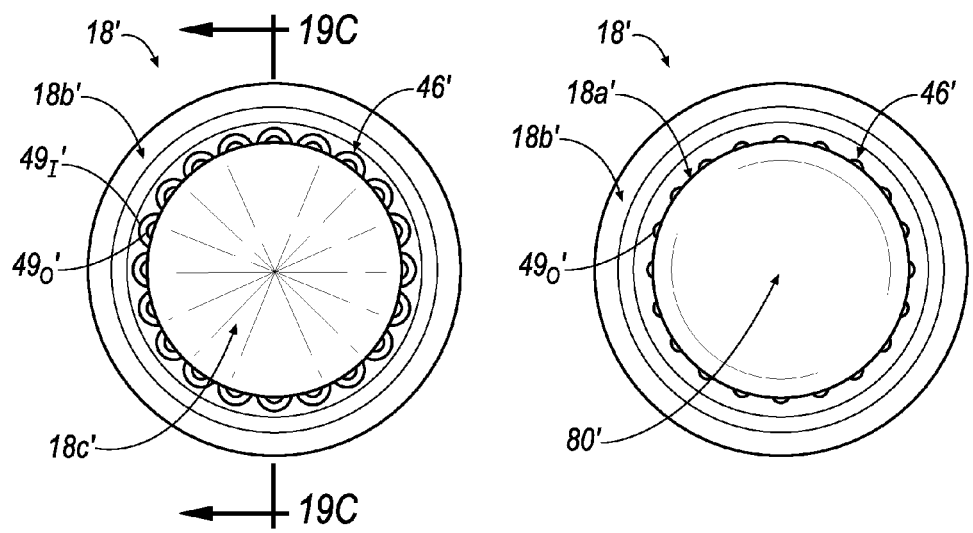
FIG. 19E
FIG. 19F

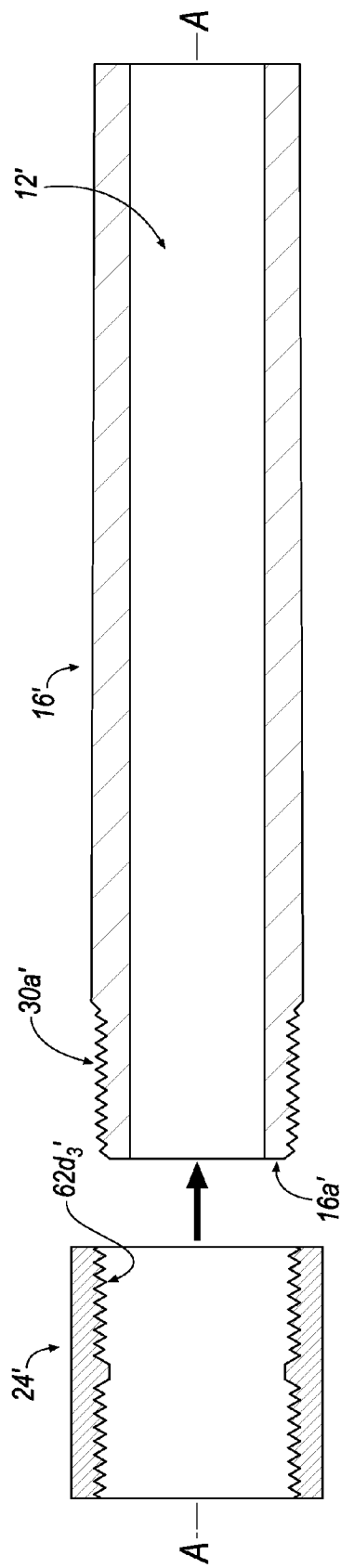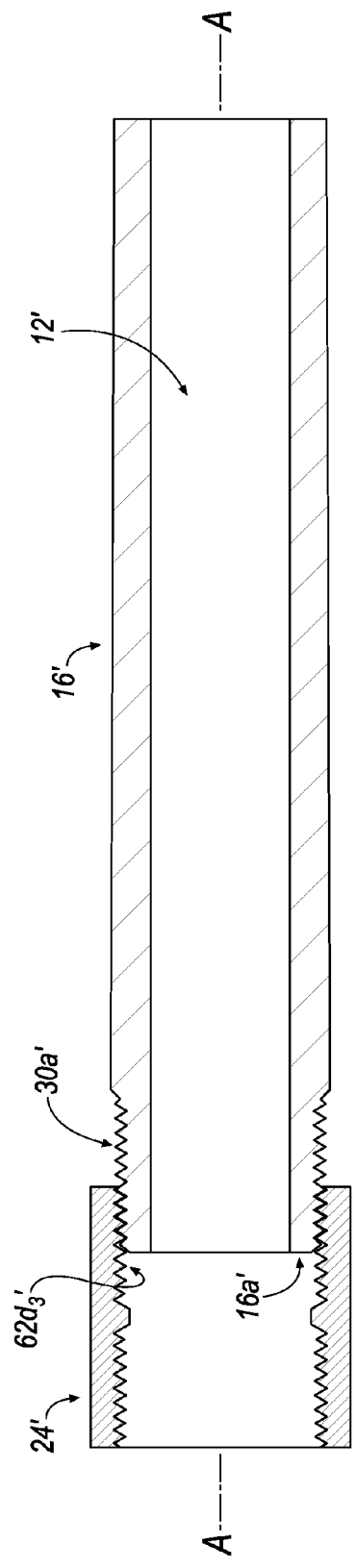
FIG. 20A
FIG. 20B

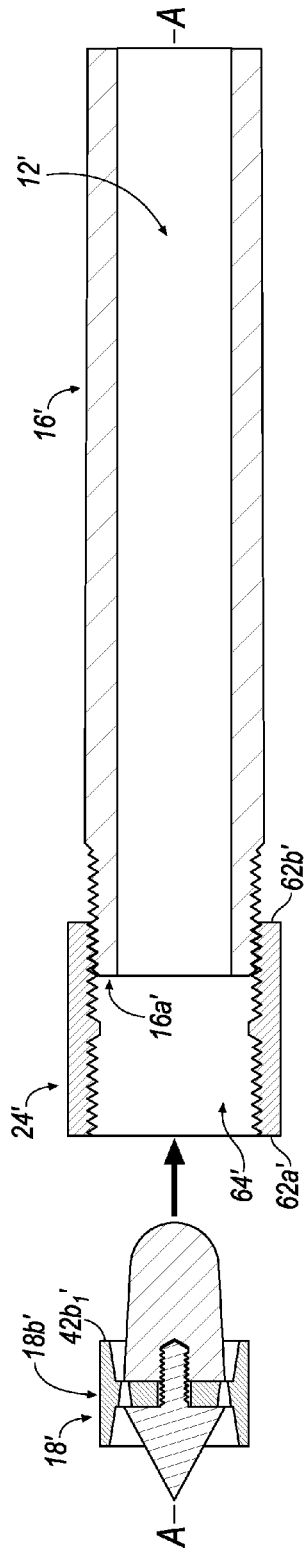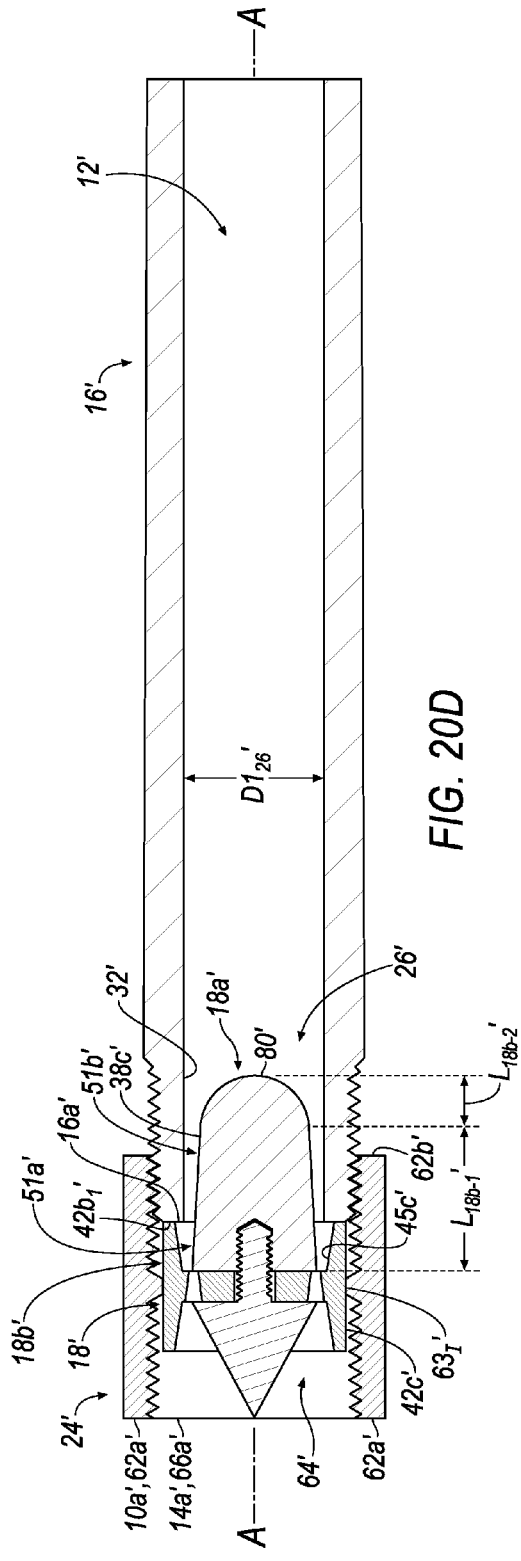

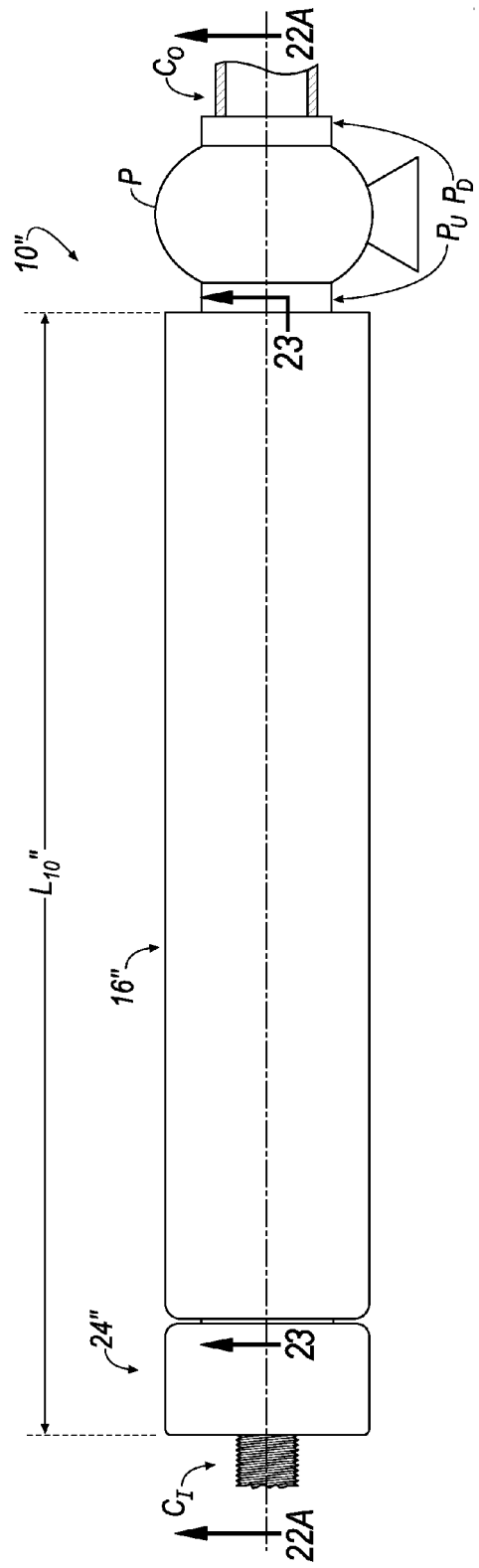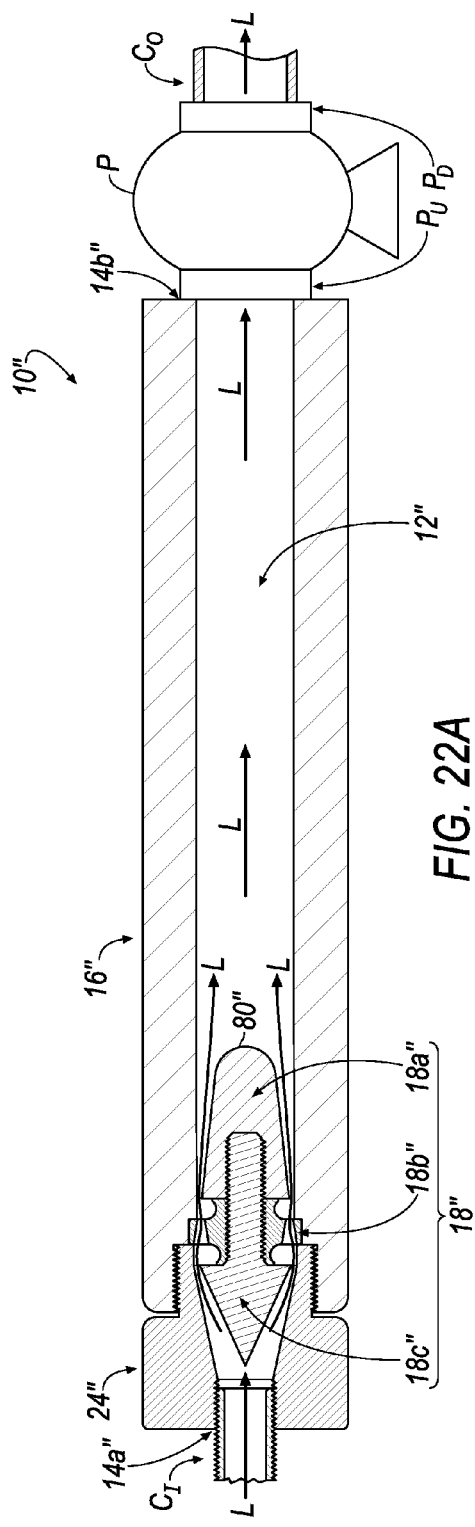
FIG. 21
FIG. 22A

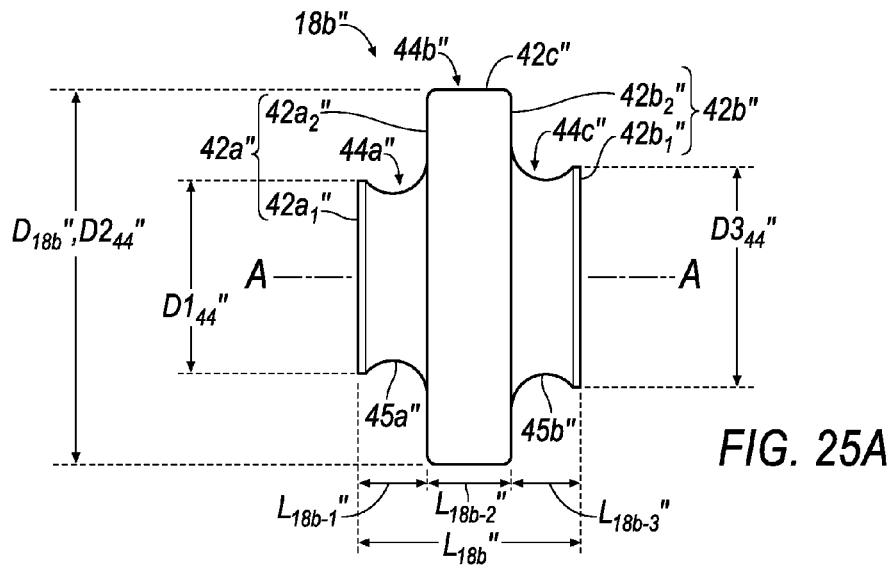
FIG. 25A
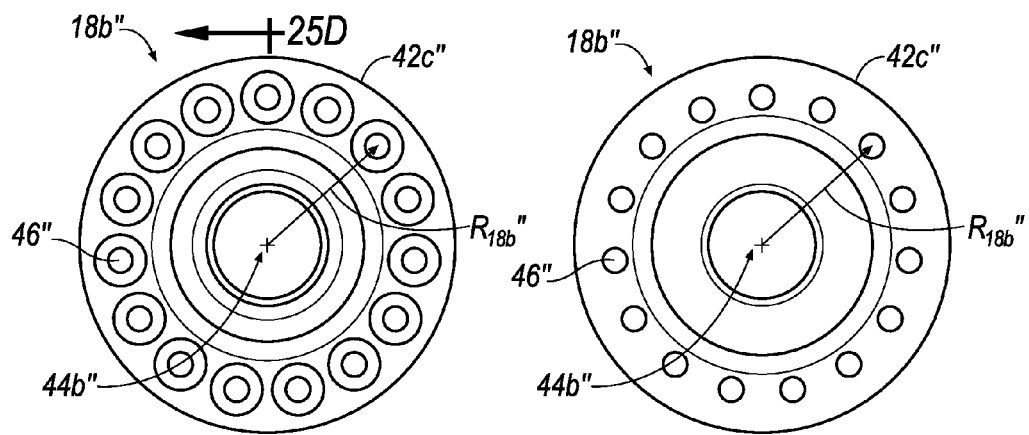
FIG. 25B
FIG. 25C
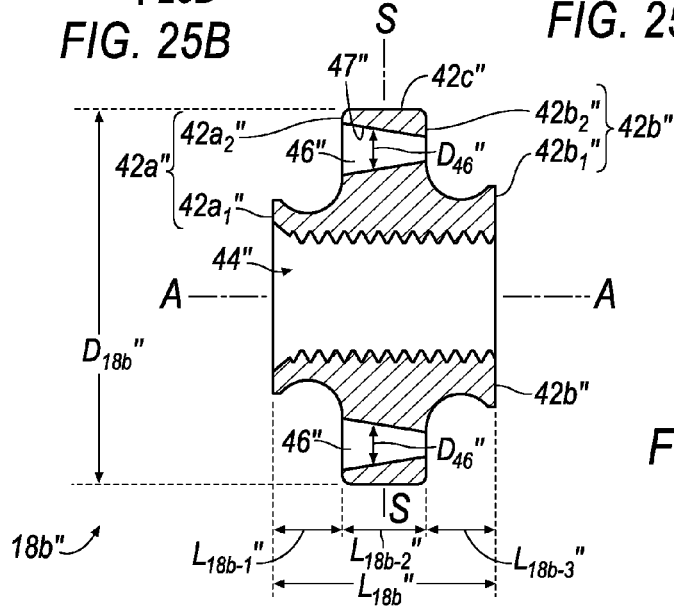
FIG. 25D

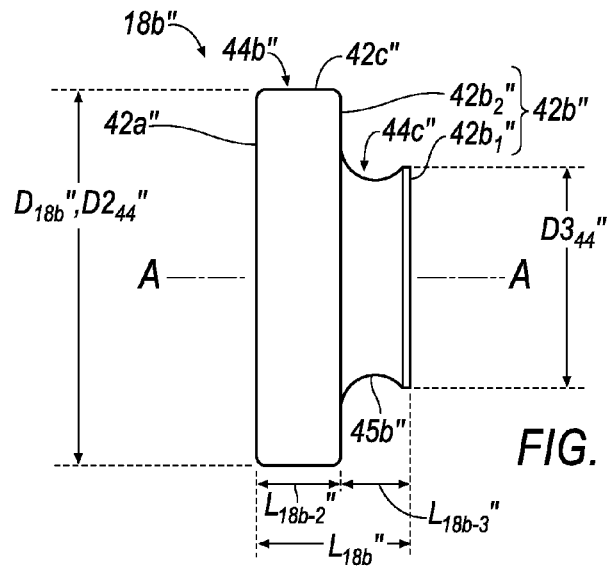
FIG. 25A"
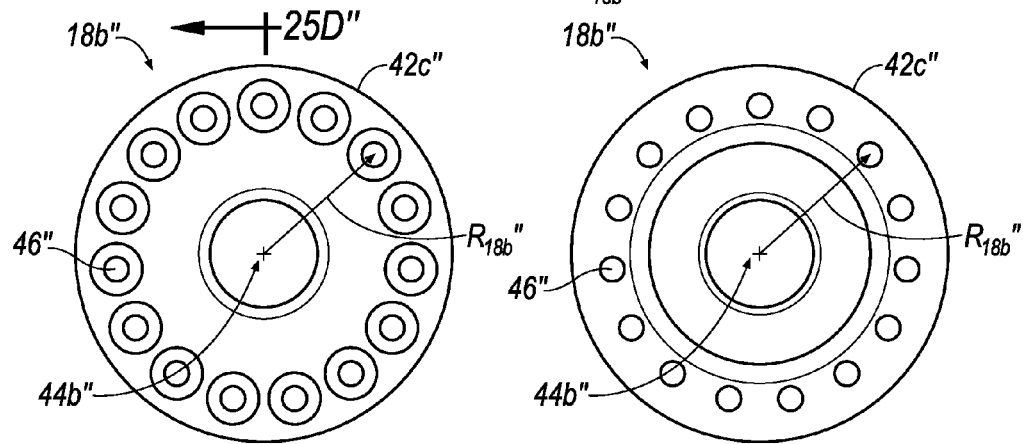
FIG. 25B"
FIG. 25C"
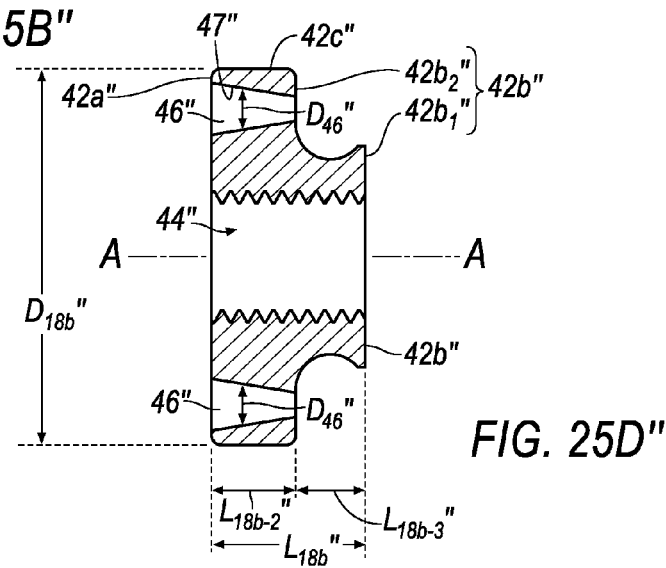
FIG. 25D"

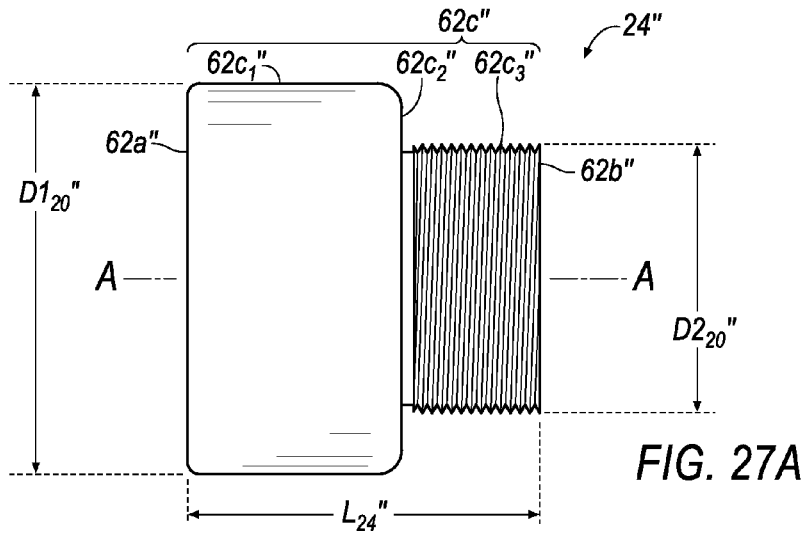
FIG. 27A
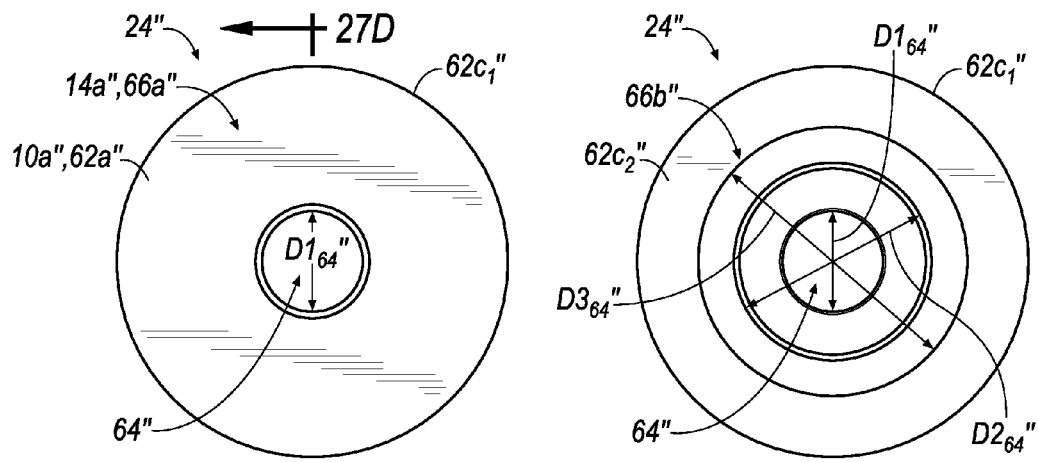
FIG. 27B
FIG. 27C
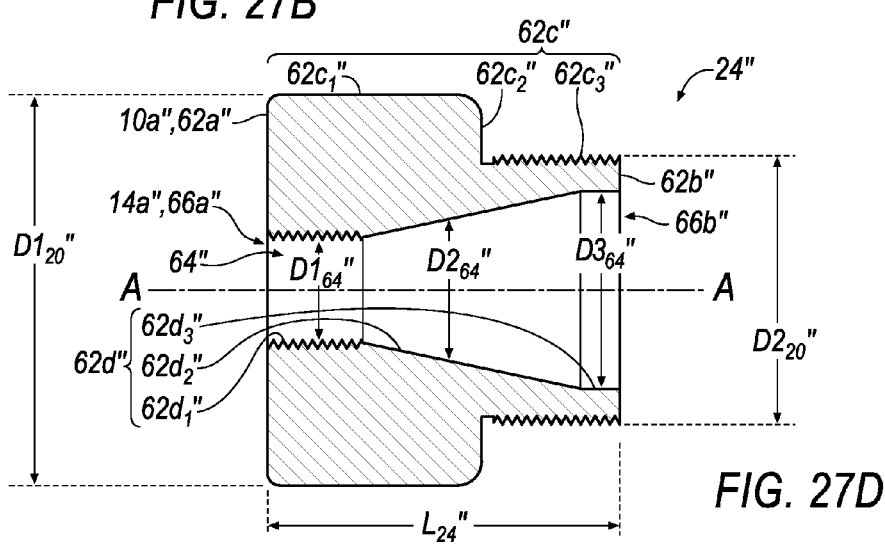
FIG. 27D

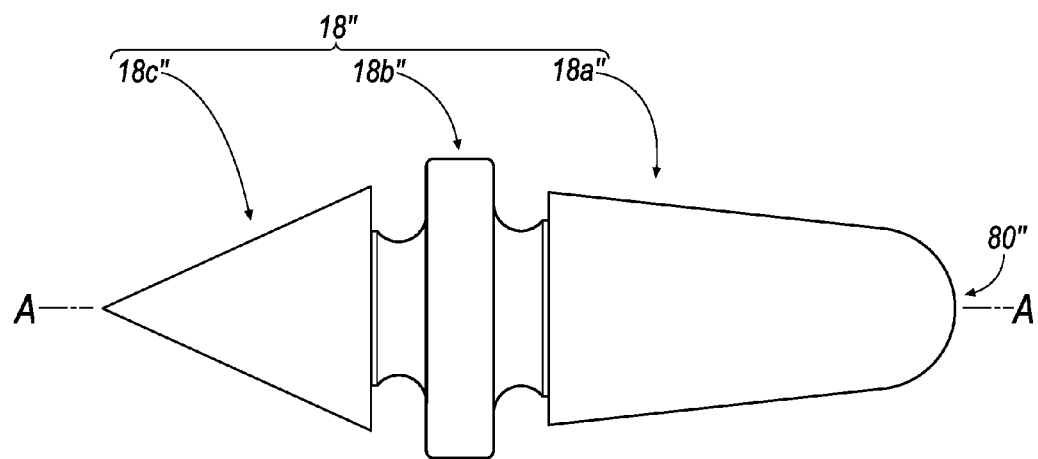
FIG. 28D
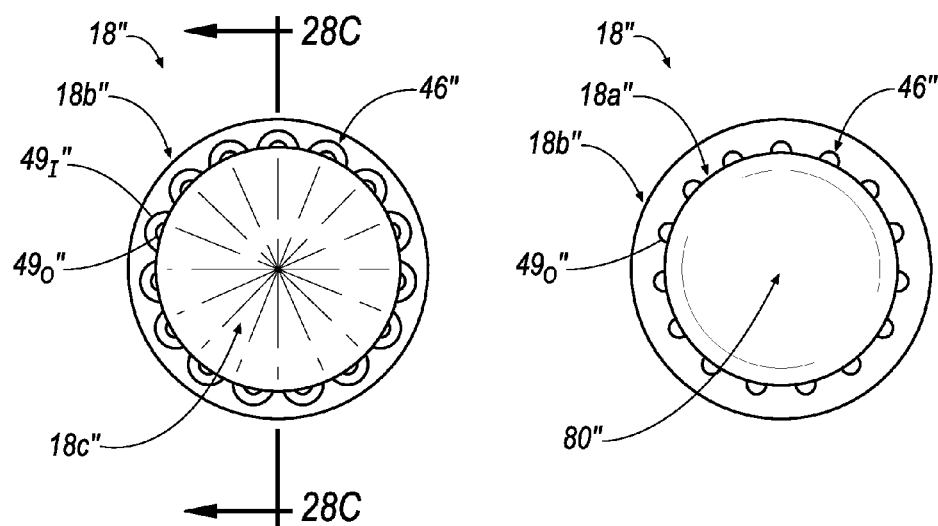
FIG. 28E
FIG. 28F

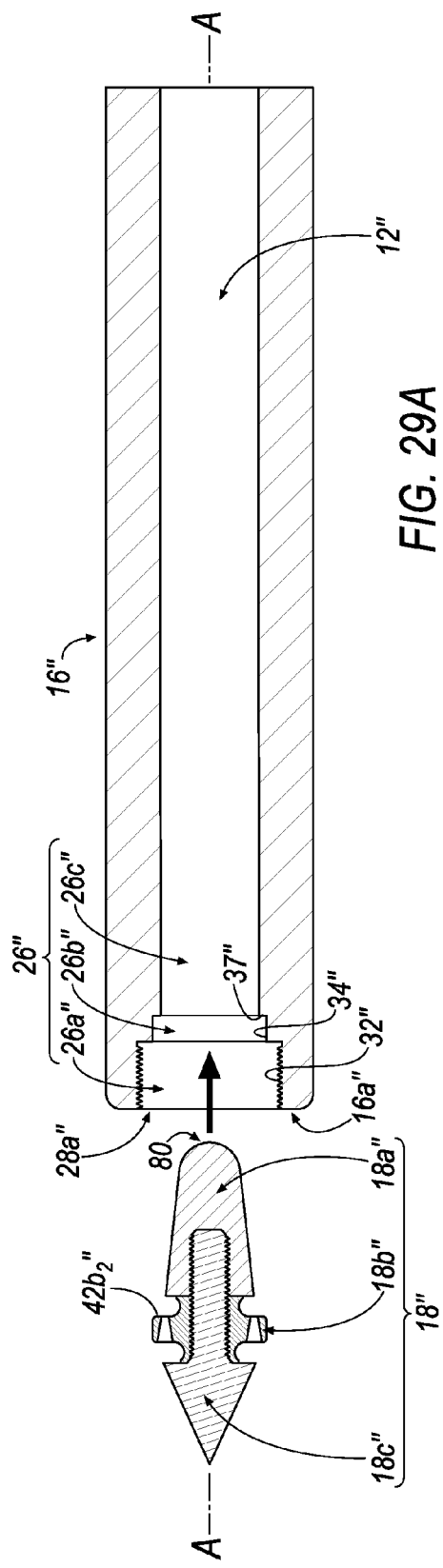
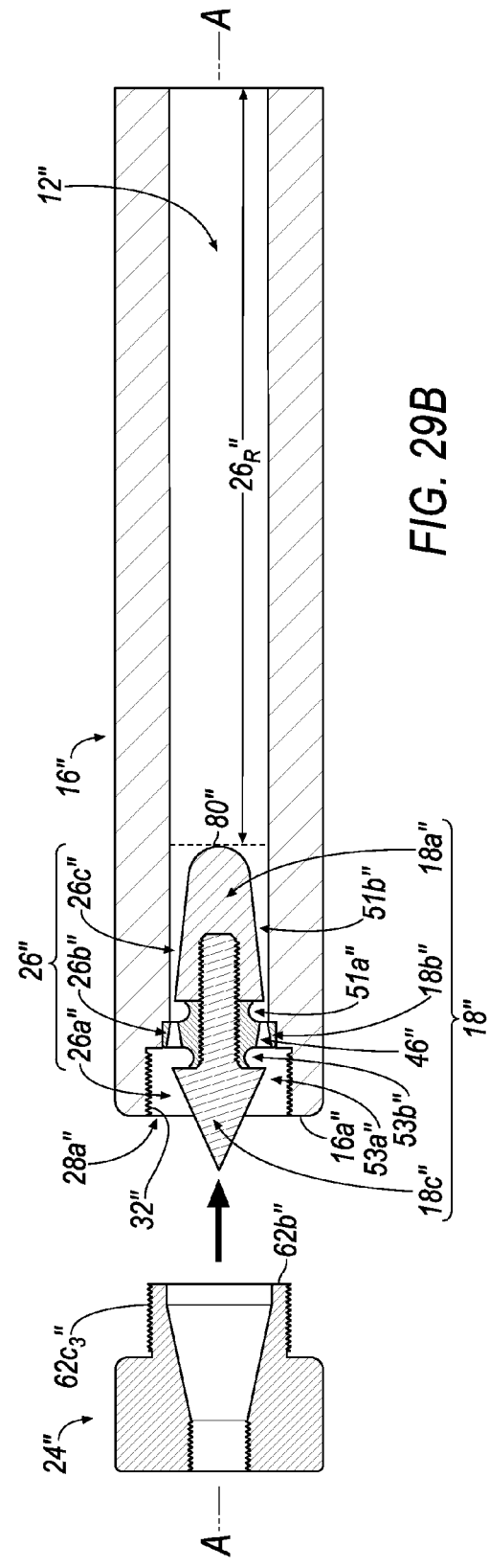

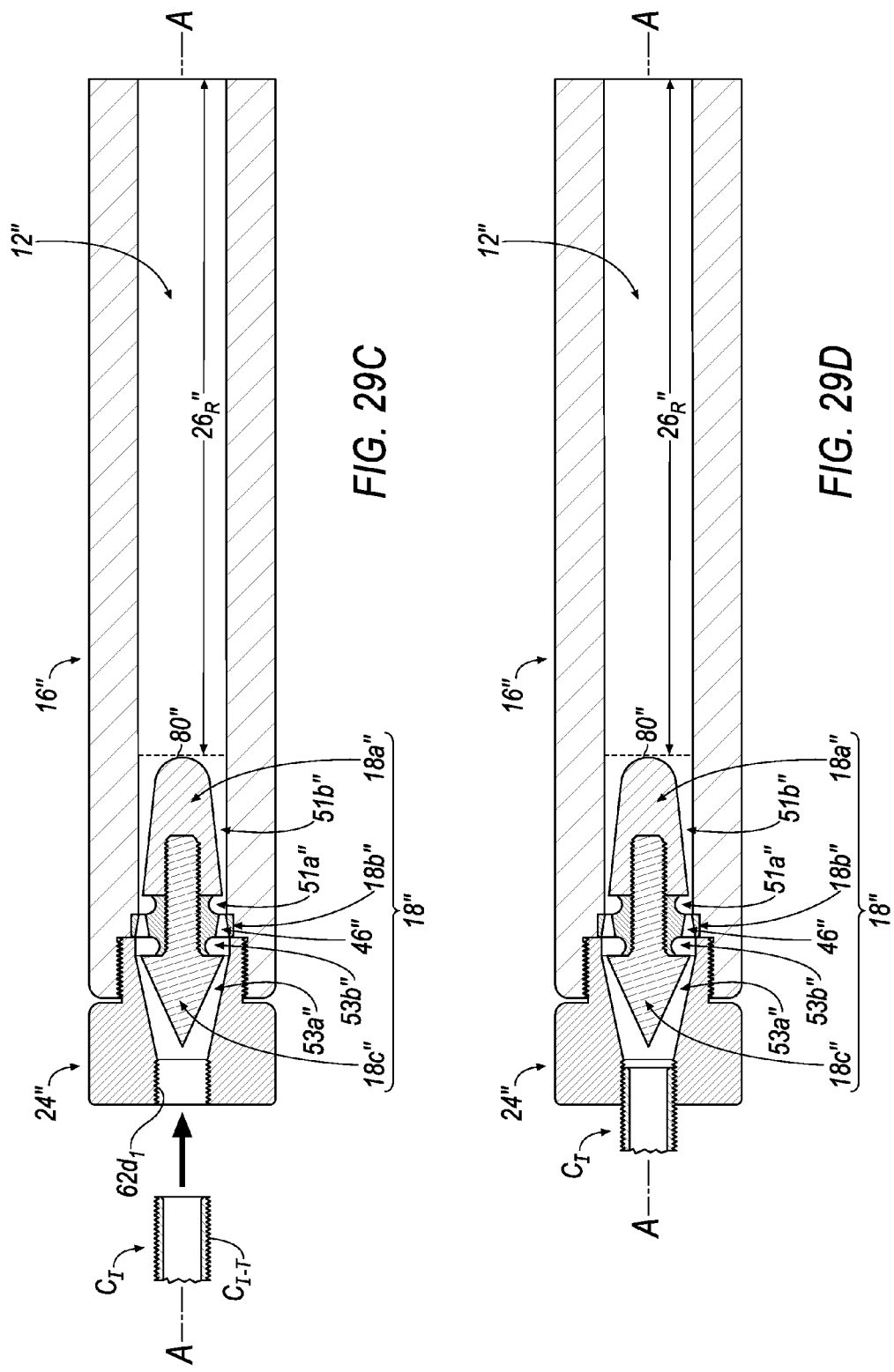

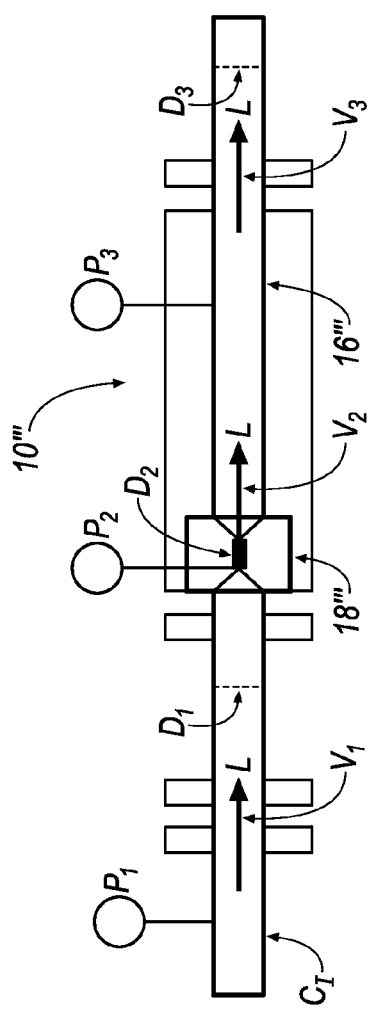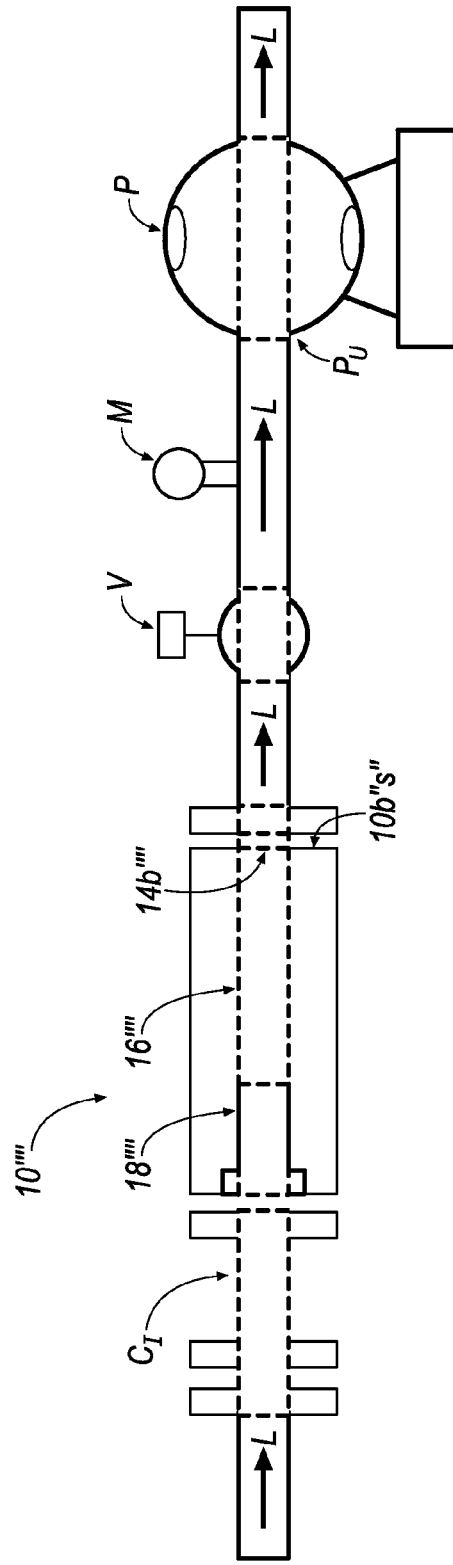
FIG. 32
FIG. 33

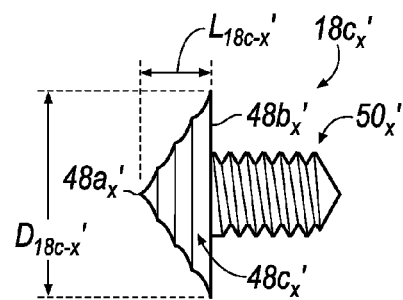
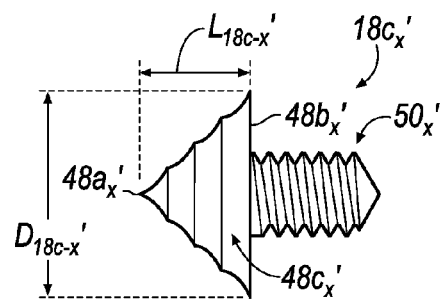
FIG. 38a          FIG. 38b
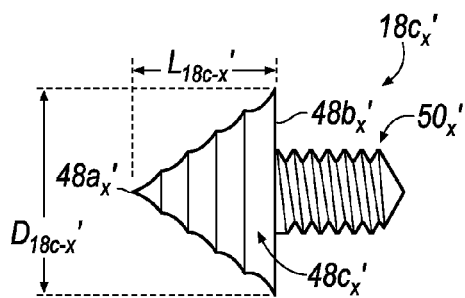
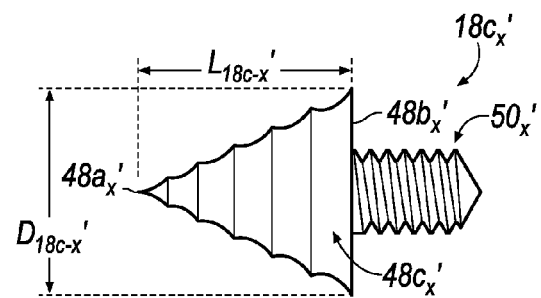
FIG. 38c          FIG. 38d
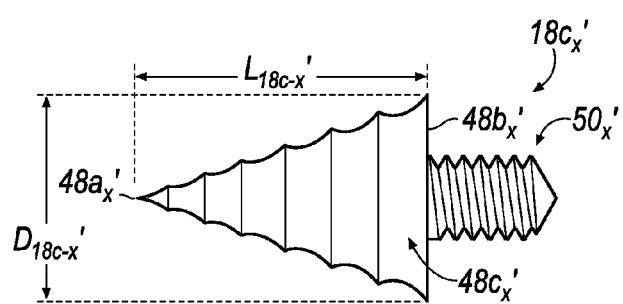
FIG. 38e

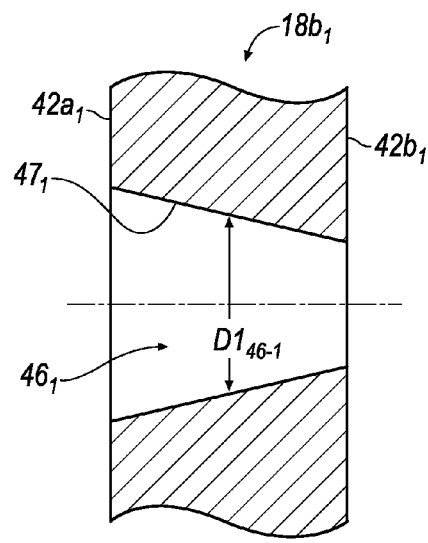
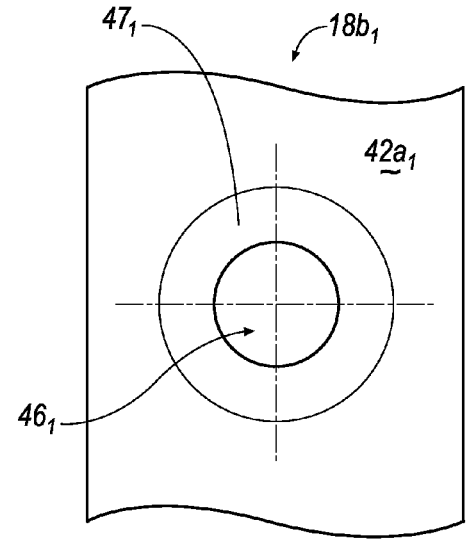
FIG. 40A  FIG. 40B
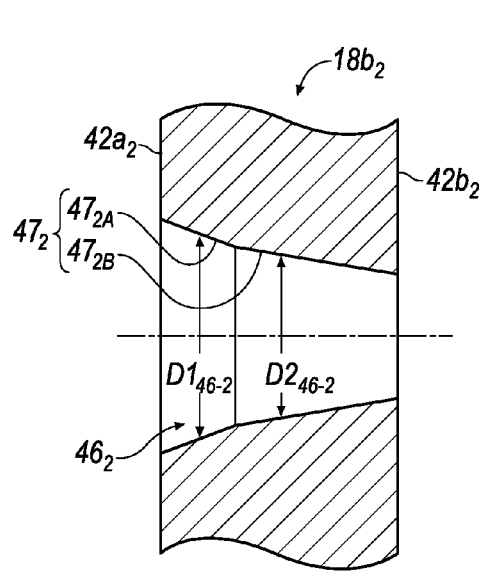
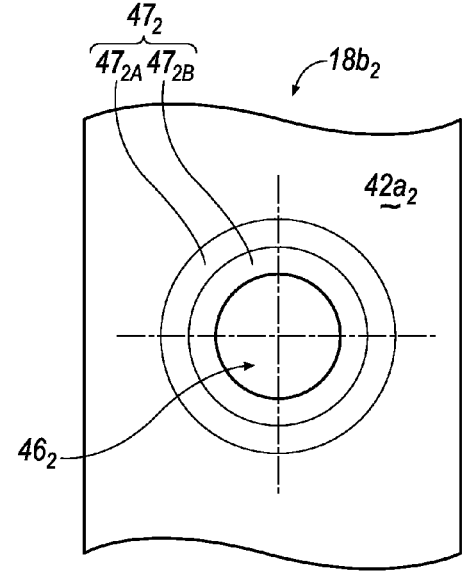
FIG. 41A  FIG. 41B

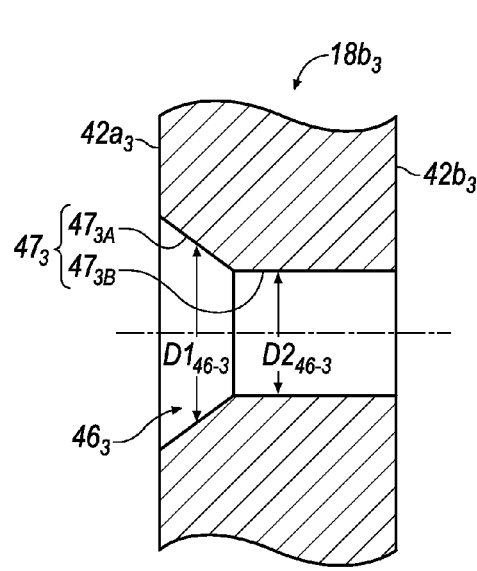
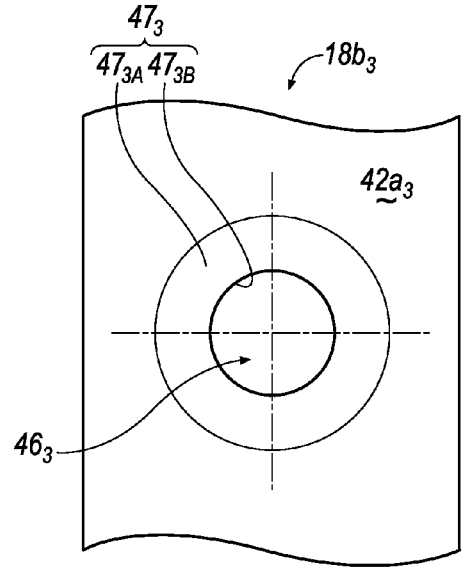
FIG. 42A  FIG. 42B
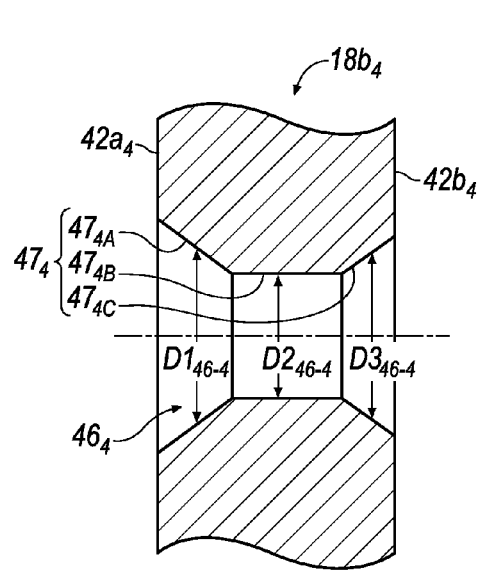
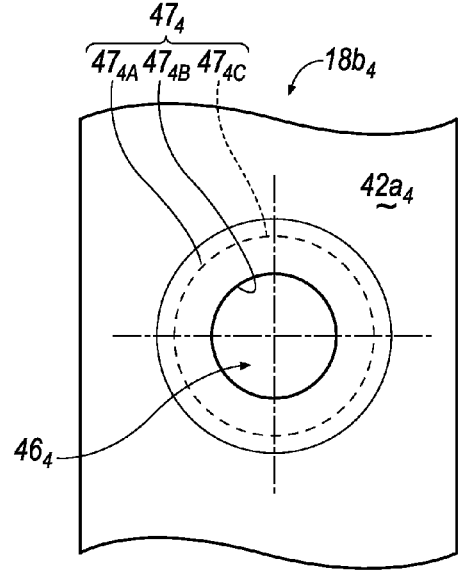
FIG. 43A  FIG. 43B

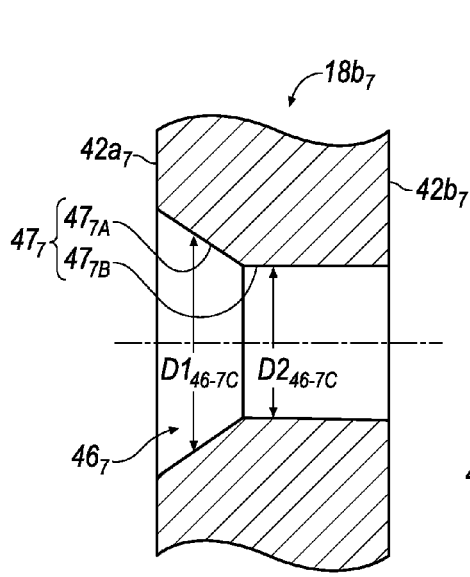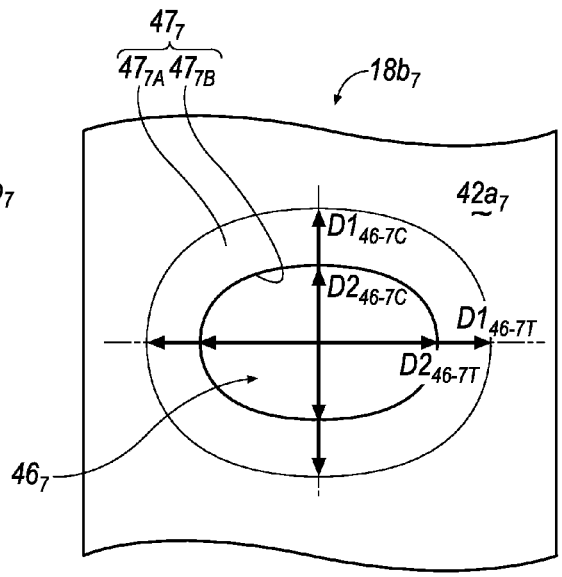
FIG. 46A  FIG. 46B
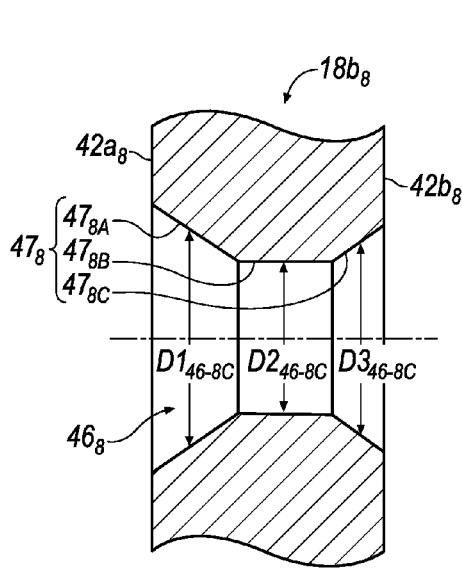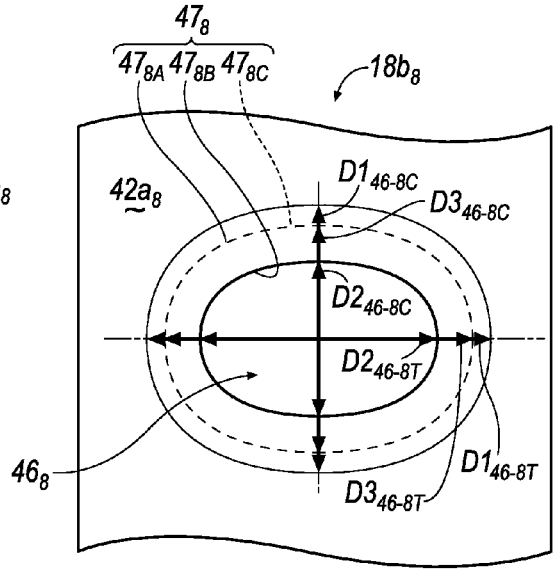
FIG. 47A  FIG. 47B

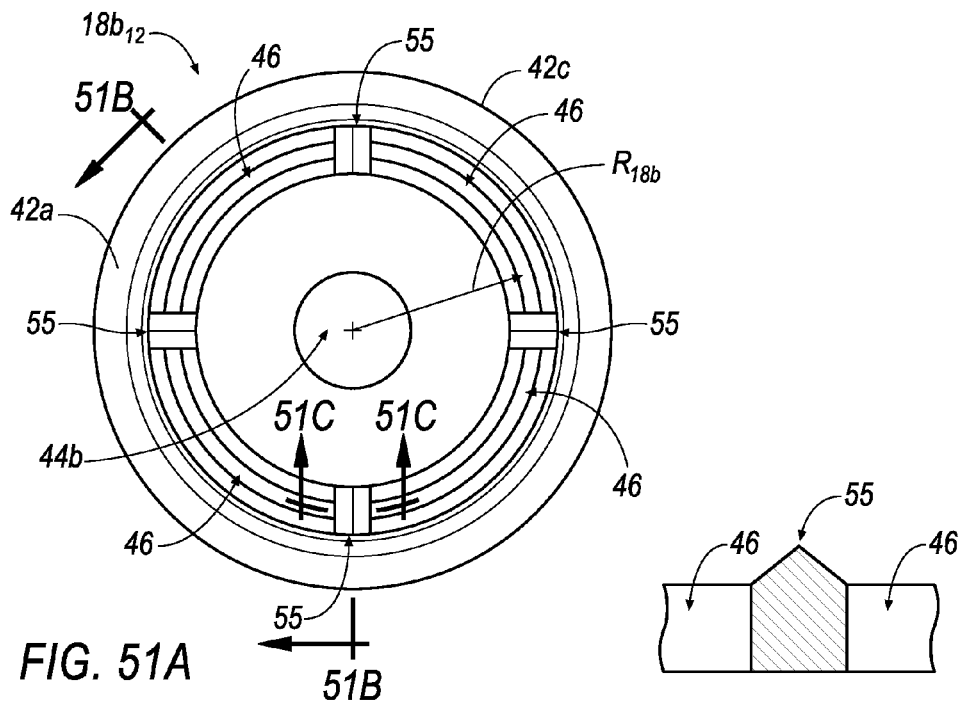
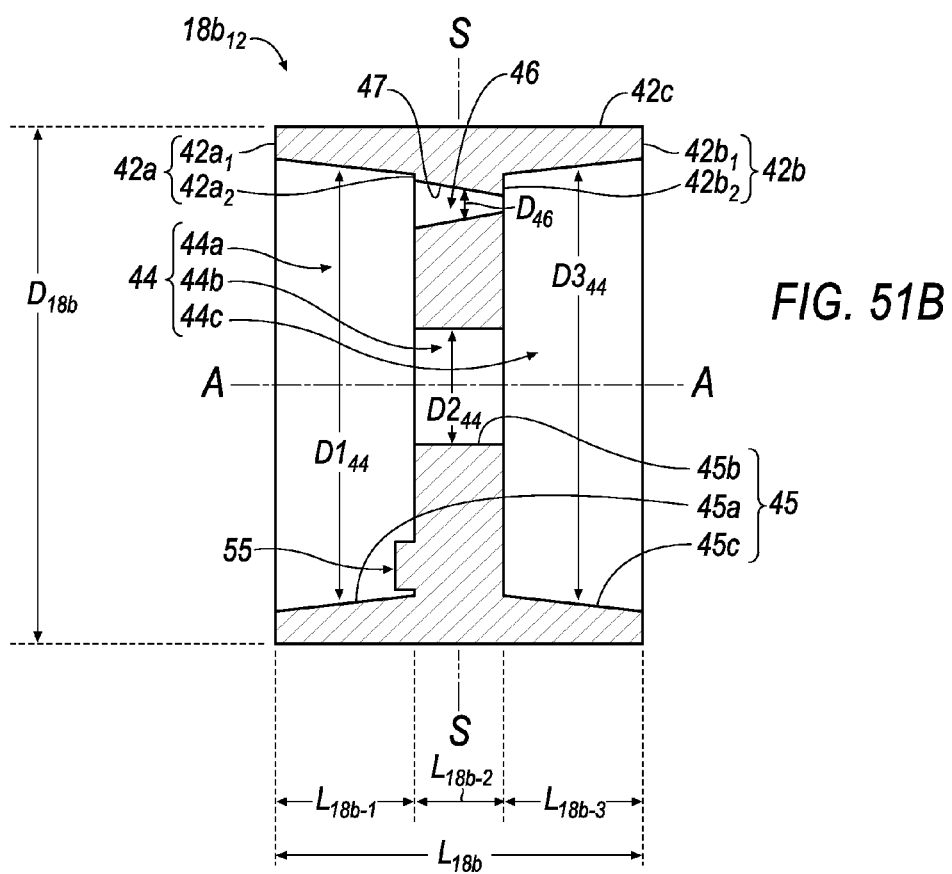
FIG. 51A
FIG. 51C
FIG. 51B

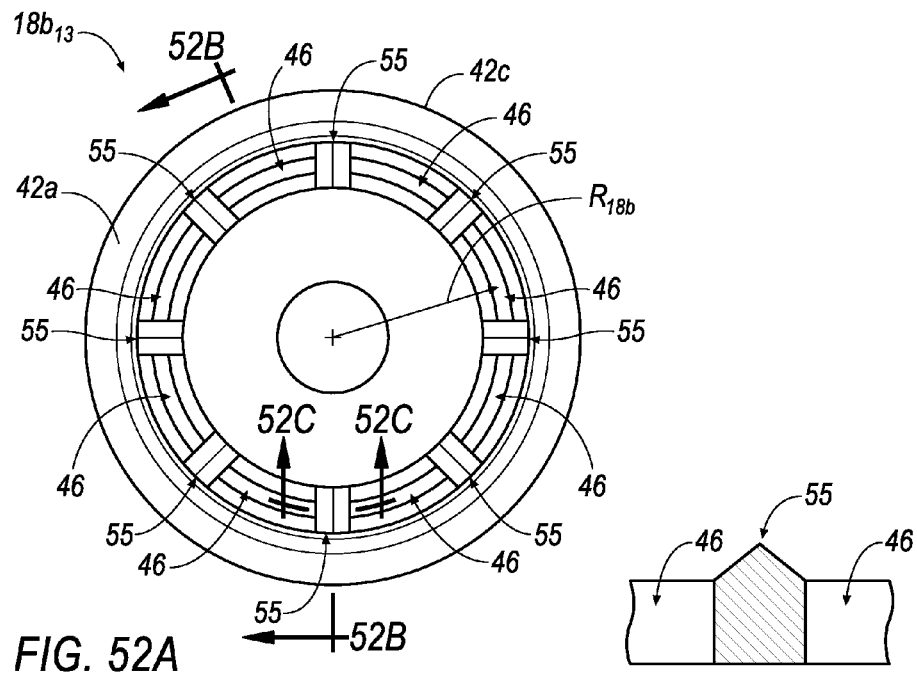
FIG. 52A
FIG. 52C
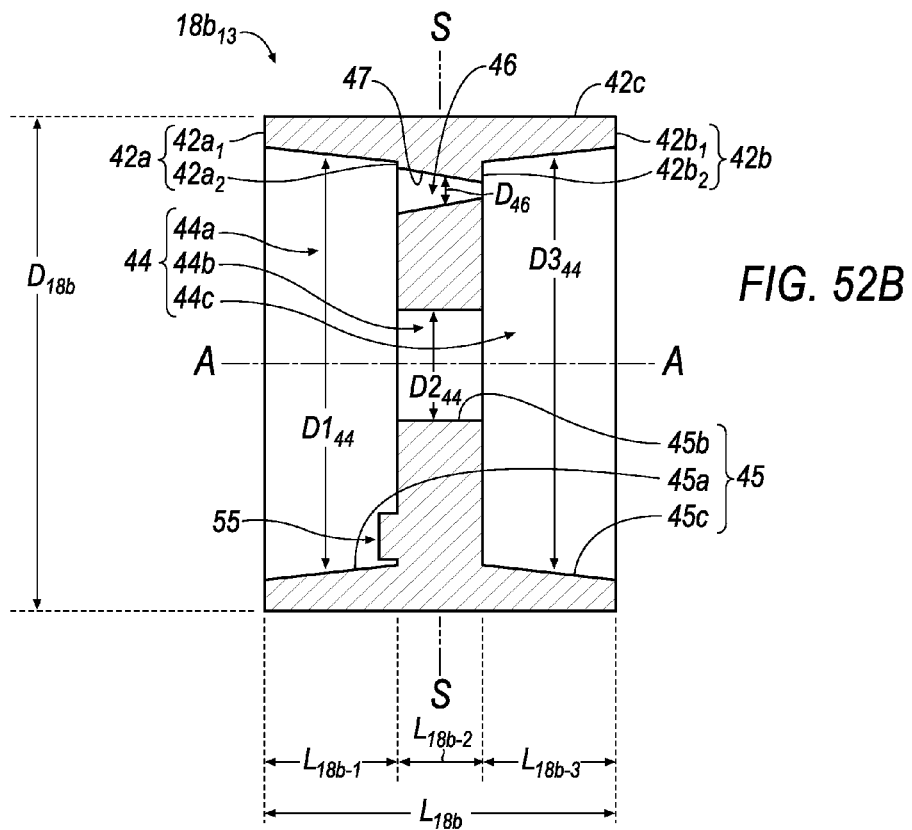
FIG. 52B

BUBBLE IMPLOSION REACTOR CAVITATION DEVICE, SUBASSEMBLY, AND METHODS FOR UTILIZING THE SAME

CROSS-REFERENCE TO RELATED APPLICATIONS

This U.S. patent application is a divisional application of U.S. Ser. No. 13/835,958 filed Mar. 15, 2013, now U.S. Pat. No. 9,126,176 issued Sep. 8, 2015 which claims priority to U.S. Provisional Application 61/645,975 filed on May 11, 2012, the disclosure of which is considered part of the disclosure of this application and is hereby incorporated by reference in its entirety.

TECHNICAL FIELD

The disclosure relates to a bubble implosion reactor cavitation device, subassembly, and methods for utilizing the same.

BACKGROUND

Cavitation methods and devices are known in the art. While known cavitation methods and devices have proven to be acceptable for various applications, such conventional cavitation methods and devices are nevertheless susceptible to improvements that may enhance their overall performance and cost. Therefore, a need exists to develop improved cavitation devices and methodologies that advance the art.

DESCRIPTION OF THE DRAWINGS

The disclosure will now be described, by way of example, with reference to the accompanying drawings, in which:

FIG. 1 is a side view of an exemplary bubble implosion reactor cavitation device connected to a fluid handling system.

FIG. 2A is a cross-sectional view of the bubble implosion reactor cavitation device and fluid handling system according to line 2A-2A of FIG. 1.

FIG. 5A is a side view of an exemplary nozzle array disk of a bubble generator subassembly of the bubble implosion reactor cavitation device of FIG. 1.

FIG. 5B is a front view of the nozzle array disk of the bubble generator subassembly of FIG. 5A.

FIG. 5C is a rear view of the nozzle array disk of the bubble generator subassembly of FIG. 5A.

FIG. 5D is a cross-sectional view of the nozzle array disk of the bubble generator subassembly according to line 5D-5D of FIG. 5B.

FIG. 6A is a side view of an exemplary upstream-facing member of a bubble generator subassembly of the bubble implosion reactor cavitation device of FIG. 1.

FIG. 6B is a front view of the upstream-facing member of the bubble generator subassembly of FIG. 6A.

FIG. 6C is a rear view of the upstream-facing member of the bubble generator subassembly of FIG. 6A.

FIG. 6D is a cross-sectional view of the upstream-facing member of the bubble generator subassembly according to line 6D-6D of FIG. 6B.

FIG. 8A is a side view of an exemplary laminar flow bubble generator disk of the bubble implosion reactor cavitation device of FIG. 1.

FIG. 8B is a front view of the laminar flow bubble generator disk of FIG. 8A.

FIG. 8C is a rear view of the laminar flow bubble generator disk of FIG. 8A.

FIG. 8D is a cross-sectional view of the laminar flow bubble generator disk according to line 8D-8D of FIG. 8B.

FIG. 9A is a side view of an exemplary retaining member of the bubble implosion reactor cavitation device of FIG. 1.

FIG. 9B is a front view of the retaining member of FIG. 9A.

FIG. 9C is a rear view of the retaining member of FIG. 9A.

FIG. 9D is a cross-sectional view of the retaining member according to line 9D-9D of FIG. 9B.

FIGS. 10A-10F illustrate an exemplary process for assembling an exemplary bubble generator subassembly utilizing the downstream-facing member of FIGS. 4A-4D, the nozzle array disk of FIGS. 5A-5D and the upstream-facing member of FIGS. 6A-6D.

FIGS. 11A-11F illustrate an exemplary process for assembling the bubble implosion reactor cavitation device of FIG. 1 utilizing: the tube-shaped cylindrical body of FIG. 3, the tube-shaped, cylindrical spacer sleeve of FIGS. 7A-7D, the laminar flow bubble generator disk of FIGS. 8A-8D, the retaining member of FIGS. 9A-9D and the bubble generator subassembly of FIGS. 10A-10F.

FIG. 16A is a side view of an exemplary nozzle array disk of a bubble generator subassembly of the bubble implosion reactor cavitation device of FIG. 12.

FIG. 16B is a front view of the nozzle array disk of the bubble generator subassembly of FIG. 16A.

FIG. 16C is a rear view of the nozzle array disk of the bubble generator subassembly of FIG. 16A.

FIG. 17A is a side view of an exemplary upstream-facing member of a bubble generator subassembly of the bubble implosion reactor cavitation device of FIG. 12.

FIG. 17B is a front view of the upstream-facing member of the bubble generator subassembly of FIG. 17A.

FIG. 17C is a rear view of the upstream-facing member of the bubble generator subassembly of FIG. 17A.

FIG. 17D is a cross-sectional view of the upstream-facing member of the bubble generator subassembly according to line 17D-17D of FIG. 17B.

FIG. 18A is a side view of an exemplary retaining member of the bubble implosion reactor cavitation device of FIG. 12.

FIG. 18B is a front view of the retaining member of FIG. 18A.

FIG. 18C is a rear view of the retaining member of FIG. 18A.

FIG. 18D is a cross-sectional view of the retaining member according to line 18D-18D of FIG. 18B.

FIGS. 19A-19F illustrate an exemplary process for assembling an exemplary bubble generator subassembly utilizing the downstream-facing member of FIGS. 15A-15D, the nozzle array disk of FIGS. 16A-16D and the upstream-facing member of FIGS. 17A-17D.

FIGS. 20A-20F illustrate an exemplary process for assembling the bubble implosion reactor cavitation device of FIG. 12 utilizing: the tube-shaped cylindrical body of FIG. 14, the retaining member of FIGS. 18A-18D and the bubble generator subassembly of FIGS. 19A-19F.

FIG. 21 is a side view of an exemplary bubble implosion reactor cavitation device connected to a fluid handling system.

FIG. 22A is a cross-sectional view of the bubble implosion reactor cavitation device and fluid handling system according to line 22A-22A of FIG. 21.

FIG. 27A is a side view of an exemplary retaining member of the bubble implosion reactor cavitation device of FIG. 21.

FIG. 27B is a front view of the retaining member of FIG. 27A.

FIG. 27C is a rear view of the retaining member of FIG. 27A.

FIG. 27D is a cross-sectional view of the retaining member according to line 27D-27D of FIG. 27B.

FIGS. 28A-28F illustrate an exemplary process for assembling an exemplary bubble generator subassembly utilizing the downstream-facing member of FIGS. 24A-24D, the nozzle array disk of FIGS. 25A-25D and the upstream-facing member of FIGS. 26A-26D.

FIGS. 29A-29D illustrate an exemplary process for assembling the bubble implosion reactor cavitation device of FIG. 21 utilizing: the tube-shaped cylindrical body of FIG. 23, the retaining member of FIGS. 27A-27D and the bubble generator subassembly of FIGS. 28A-28F.

FIG. 32 is a view of an exemplary bubble implosion reactor cavitation device connected to a fluid handling system.

FIG. 33 is a view of an exemplary bubble implosion reactor cavitation device connected to a fluid handling system.

FIGS. 38a-38e illustrate side views of exemplary upstream-facing members of a bubble generator subassembly of a bubble implosion reactor cavitation device.

FIG. 40A illustrates a front view of an exemplary fluid-flow passage of a nozzle array disk.

FIG. 40B illustrates a cross-sectional view of the fluid-flow passage of the nozzle array disk of FIG. 40A.

FIG. 41A illustrates a front view of an exemplary fluid-flow passage of a nozzle array disk.

FIG. 41B illustrates a cross-sectional view of the fluid-flow passage of the nozzle array disk of FIG. 41A.

FIG. 42A illustrates a front view of an exemplary fluid-flow passage of a nozzle array disk.

FIG. 42B illustrates a cross-sectional view of the fluid-flow passage of the nozzle array disk of FIG. 42A.

FIG. 43A illustrates a front view of an exemplary fluid-flow passage of a nozzle array disk.

FIG. 43B illustrates a cross-sectional view of the fluid-flow passage of the nozzle array disk of FIG. 43A.

FIG. 46A illustrates a front view of an exemplary fluid-flow passage of a nozzle array disk.

FIG. 46B illustrates a cross-sectional view of the fluid-flow passage of the nozzle array disk of FIG. 46A.

FIG. 47A illustrates a front view of an exemplary fluid-flow passage of a nozzle array disk.

FIG. 47B illustrates a cross-sectional view of the fluid-flow passage of the nozzle array disk of FIG. 47A.

FIG. 51A is a front view of an exemplary nozzle array disk.

FIG. 51B is a cross-sectional view of the nozzle array disk according to line 51B-51B of FIG. 51A.

FIG. 51C is a cross-sectional view of the nozzle array disk according to line 51C-51C of FIG. 51A.

FIG. 52A is a front view of an exemplary nozzle array disk.

FIG. 52B is a cross-sectional view of the nozzle array disk according to line 52B-52B of FIG. 51A.

FIG. 52C is a cross-sectional view of the nozzle array disk according to line 52C-52C of FIG. 52A.

FIG. 53A is a front view of an exemplary nozzle array disk.

FIG. 53B is a cross-sectional view of the nozzle array disk according to line 53B-53B of FIG. 53A.

SUMMARY

Figure 2B:
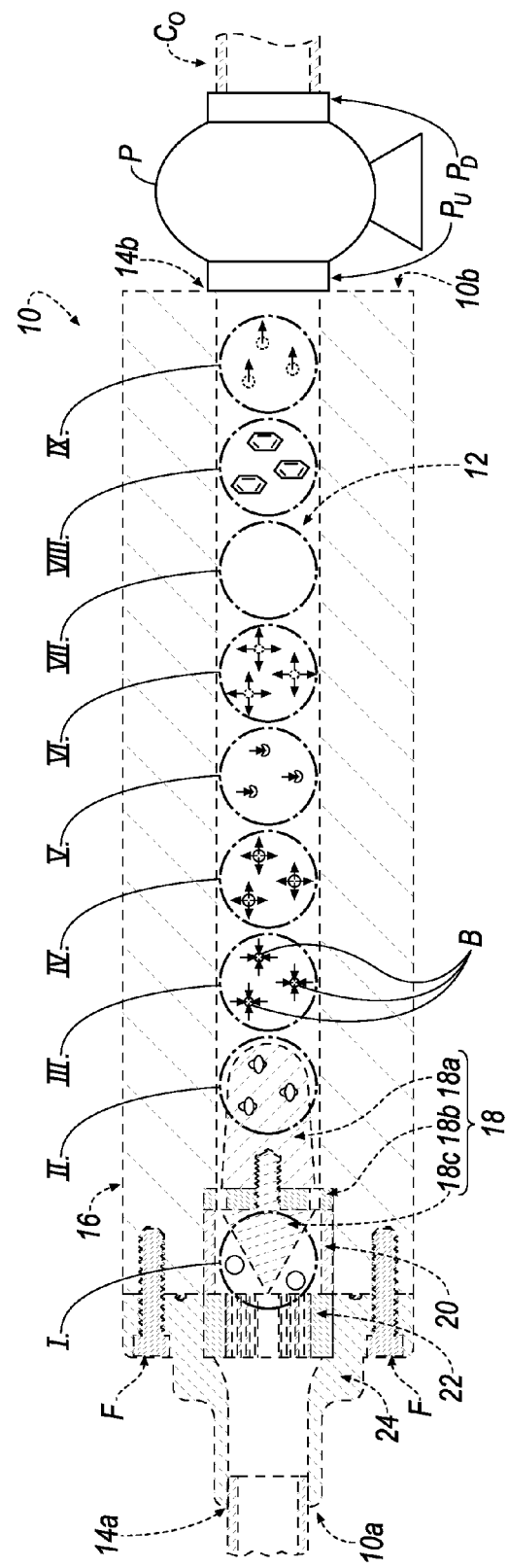
FIG. 2B is a phantom cross-sectional view of FIG. 2A showing plurality of fluid processing zones.

One aspect of the disclosure provides an apparatus including a bubble implosion reactor cavitation device. The bubble implosion reactor cavitation device includes a tube-shaped cylindrical body, a bubble generator subassembly and a retaining member. The tube-shaped cylindrical body includes an upstream, a distal end surface and a downstream, proximal end surface. The tube-shaped cylindrical body defines an axial passage that extends through the tube-shaped cylindrical body between the upstream, distal end surface and the downstream, proximal end surface. The bubble generator subassembly is connected to the tube-shaped cylindrical body. The bubble generator subassembly is at least partially disposed within the axial passage defined by the tube-shaped cylindrical body. The retaining member is connected to the tube-shaped cylindrical body for retaining the bubble generator subassembly within the axial passage defined by the tube-shaped cylindrical body.

In some examples, the bubble generator subassembly includes an upstream-facing member, a downstream-facing member connected to the upstream-facing member, and a nozzle array disk arranged between and connected to both of the upstream-facing member and the downstream-facing member.

In some implementations, the nozzle array disk includes an upstream, distal end surface and the downstream, proximal end surface. The nozzle array disk defines a plurality of fluid-flow passages that extend through the nozzle array disk between the upstream, distal end surface and the downstream, proximal end surface.

In some instances, the nozzle array disk defines an axial passage that extends through the nozzle array disk between the upstream, distal end surface and the downstream, proximal end surface of the nozzle array disk. A stem extends away from a downstream, proximal end surface of the upstream-facing member and extends through the axial passage that extends through the nozzle array disk and into a stem-receiving passage formed in an upstream, distal end surface of the downstream-facing member for connecting the upstream-facing member to the downstream-facing member while retaining the nozzle array disk therebetween.

In some examples, each fluid flow passage of the plurality of fluid-flow passages are equally spaced from an axial center of the nozzle array disk at a radius to form a circular array of fluid-flow passages.

In some implementations, each fluid flow passage of the plurality of fluid-flow passages is defined by a constant diameter that remains constant in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some instances, the axial passage extending through the tube-shaped cylindrical body includes a first axial passage portion defined by a first diameter and a second axial passage portion defined by a second diameter. The first diameter is slightly greater than the second diameter. The downstream-facing member of the bubble generator subassembly is arranged within the second axial passage portion of the axial passage extending through the tube-shaped cylindrical body. The upstream-facing member and the nozzle array disk of the bubble generator subassembly are arranged within the first axial passage portion of the axial passage extending through the tube-shaped cylindrical body.

In some examples, the axial passage is defined by a first cylindrical surface and a second cylindrical surface. The first cylindrical surface defines the first axial passage portion. The second cylindrical surface defines the second axial passage portion. The axial passage is further defined by a shoulder surface that connects the first cylindrical surface to the second cylindrical surface.

In some implementations, an outer side surface of the nozzle array disk is disposed adjacent the first cylindrical surface of the axial passage. The downstream, proximal end surface of the nozzle array disk is disposed adjacent the shoulder surface of the axial passage.

In some instances, a tube-shaped, cylindrical spacer sleeve is arranged within the second axial passage portion. A downstream, proximal end surface of the tube-shaped, cylindrical spacer sleeve is disposed adjacent an upstream, distal end surface of the nozzle array disk.

In some examples, the outer side surface of the upstream-facing member is arranged in a spaced-apart relationship with respect to an inner passage surface of the tube-shaped, cylindrical spacer sleeve creating an upstream fluid-flow spacing. An outer side surface of the downstream-facing member is arranged in a spaced-apart relationship with respect to the second cylindrical surface creating a downstream fluid-flow spacing. The plurality of fluid-flow passages that extend through the nozzle array disk fluidly connects the upstream fluid-flow spacing to the downstream fluid-flow spacing.

In some implementations, a laminar flow bubble generator disk is disposed within an axial passage extending through the retaining member. The laminar flow bubble generator disk includes plurality of fluid-flow passages grouped in a plurality of circular, concentrically-arranged patterns. A downstream, proximal end surface of the laminar flow bubble generator disk is disposed adjacent the upstream, distal end surface of the nozzle array disk.

In some instances, each fluid flow passage of the plurality of fluid-flow passages is defined by a non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some examples, the nozzle array disk of the bubble generator subassembly includes an inner surface that defines an axial passage that extends through the nozzle array disk between the upstream, distal end surface and the downstream, proximal end surface of the nozzle array disk. The axial passage extending through the nozzle array disk includes a first axial passage portion, a second axial passage portion and a third axial passage portion defined, respectively, by a first inner surface portion of the inner surface, a second inner surface portion of the inner surface and a third inner surface portion of the inner surface.

In some implementations, a stem extending away from a downstream, proximal end surface of the upstream-facing member extends through the second axial passage portion and into a stem-receiving passage formed in an upstream, distal end surface of the downstream-facing member for connecting the upstream-facing member to the downstream-facing member while retaining the nozzle array disk therebetween.

In some instances, the first inner surface portion defines the first axial passage portion to include a first non-constant diameter that decreases in cross-section as the first axial passage portion extends through the nozzle array disk in a direction referenced from the upstream, distal end surface of the nozzle array disk toward the downstream, proximal end surface of the nozzle array disk. The third inner surface portion defines the third axial passage portion to include a second non-constant diameter that increases in cross-section as the first axial passage portion extends through the nozzle array disk in a direction referenced from the upstream, distal end surface of the nozzle array disk toward the downstream, proximal end surface of the nozzle array disk.

In some examples, the plurality of fluid-flow passages of the nozzle array disk fluidly connects the first axial passage portion of the nozzle array disk to the third axial passage portion of the nozzle array disk.

In some implementations, the non-constant diameter defined by the first axial passage portion is symmetrical to the non-constant diameter defined by the third axial passage portion.

In some instances, the retaining member includes an inner passage surface defining an axial passage extending through the retaining member. The inner passage surface includes: a first inner passage surface portion, a second inner passage surface portion, and a third inner passage surface portion. The second inner passage surface portion is arranged between the first inner passage surface portion and the third inner passage surface portion. The first inner passage surface portion and the third inner passage surface portion each form a threaded surface. The second inner passage surface portion forms a substantially flat, non-threaded surface.

In some examples, the downstream, proximal end surface of the nozzle array disk is disposed adjacent the upstream, distal end surface of the tube-shaped cylindrical body. An outer side surface of the nozzle array disk is disposed adjacent the second inner passage surface portion of the retaining member.

In some implementations, an outer surface portion extending away from the upstream, distal end surface of the tube-shaped cylindrical body forms a threaded surface. The threaded surface of the outer surface portion extending away from the upstream, distal end surface of the tube-shaped cylindrical body is threadingly-coupled to the threaded surface of the third inner passage surface portion for threadingly-connecting the retaining member to the tube-shaped cylindrical body.

In some instances, the outer side surface of the upstream-facing member is arranged in a spaced-apart relationship with respect to the first inner surface portion of the nozzle array disk creating an upstream fluid-flow spacing. An outer side surface of the downstream-facing member is arranged in a spaced-apart relationship with respect to both of the third inner surface portion of the nozzle array disk and an inner cylindrical surface of the tube-shaped cylindrical body creating a downstream fluid-flow spacing. The plurality of fluid-flow passages that extend through the nozzle array disk fluidly connects the upstream fluid-flow spacing to the downstream fluid-flow spacing.

In some examples, the nozzle array disk of the bubble generator subassembly includes an axial passage that extends through the nozzle array disk between the upstream, distal end surface and the downstream, proximal end surface of the nozzle array disk. A stem extending away from a downstream, proximal end surface of the upstream-facing member extends through the axial passage and into a stem-receiving passage formed in an upstream, distal end surface of the downstream-facing member for connecting the upstream-facing member to the downstream-facing member while retaining the nozzle array disk therebetween.

In some implementations, the nozzle array disk includes an upstream-facing projection, an annular central portion connected to the upstream-facing projection, and a downstream-facing projection connected to the annular central portion.

In some instances, the upstream, distal end surface of the nozzle array disk includes a first upstream, distal end surface portion and a second upstream, distal end surface portion. The second upstream, distal end surface portion is axially offset from the first upstream, distal end surface portion. The upstream-facing projection defines a circumferentially arcuate outer surface portion that connects the first upstream, distal end surface portion to the second upstream, distal end surface portion.

In some examples, the downstream, proximal end surface of the nozzle array disk includes a first downstream, proximal end surface portion and a second downstream, proximal end surface portion. The second downstream, proximal end surface portion is axially offset from the first downstream, proximal end surface portion. The downstream-facing projection defines a circumferentially arcuate outer surface portion that connects the first downstream, proximal end surface portion to the second downstream, proximal end surface portion.

In some implementations, the upstream-facing projection is defined by a first diameter. The annular central portion is defined by a second diameter. The downstream-facing projection is defined by a third diameter. The third diameter is less than the second diameter. The first diameter is approximately equal to but slightly less than the third diameter.

In some instances, the first diameter is a non-constant diameter defined by the circumferentially arcuate outer surface portion of the upstream-facing projection. The second diameter is a constant diameter. The third diameter is a non-constant diameter defined by the circumferentially arcuate outer surface portion of the downstream-facing projection.

In some examples, each fluid flow passage of the plurality of fluid-flow passages is defined by a first non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. Each fluid flow passage of the plurality of fluid-flow passages is also defined by a second non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some implementations, each fluid flow passage of the plurality of fluid-flow passages is defined by a non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. Each fluid flow passage of the plurality of fluid-flow passages is also defined by a constant diameter that remains the same in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some instances, each fluid flow passage of the plurality of fluid-flow passages is defined by a first non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. Each fluid flow passage of the plurality of fluid-flow passages is also defined by a constant diameter that remains the same in cross-section as each fluid flow passage of the plurality of fluid-flow passages extends through the nozzle array disk in a direction referenced from the upstream, distal end surface of the nozzle array disk toward the downstream, proximal end surface of the nozzle array disk. Each fluid flow passage of the plurality of fluid-flow passages is also defined by a second non-constant diameter that increases in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some examples, each fluid flow passage of the plurality of fluid-flow passages is defined by a non-constant dimension that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The non-constant dimension is an elliptical dimension defined by a conjugate nozzle diameter and a transverse nozzle diameter.

In some implementations, each fluid flow passage of the plurality of fluid-flow passages is defined by a first non-constant dimension that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The first non-constant dimension is an elliptical dimension defined by a conjugate nozzle diameter and a transverse nozzle diameter. Each fluid flow passage of the plurality of fluid-flow passages is also defined by a second non-constant dimension that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The second non-constant dimension is an elliptical dimension defined by a conjugate nozzle diameter and a transverse nozzle diameter.

In some instances, each fluid flow passage of the plurality of fluid-flow passages is defined by a first non-constant dimension that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The first non-constant dimension is an elliptical dimension defined by a conjugate nozzle diameter and a transverse nozzle diameter. Each fluid flow passage of the plurality of fluid-flow passages is defined by a constant dimension that remains the same in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The constant dimension is an elliptical dimension defined by a conjugate nozzle diameter and a transverse nozzle diameter.

In some examples, each fluid flow passage of the plurality of fluid-flow passages is defined by a first non-constant dimension that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The first non-constant dimension is an elliptical dimension defined by a conjugate nozzle diameter and a transverse nozzle diameter. Each fluid flow passage of the plurality of fluid-flow passages is also defined by a constant dimension that remains the same in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The constant dimension is an elliptical dimension defined by a conjugate nozzle diameter and a transverse nozzle diameter. Each fluid flow passage of the plurality of fluid-flow passages is also defined by a second non-constant dimension that increases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The second non-constant dimension is an elliptical dimension defined by a conjugate nozzle diameter and a transverse nozzle diameter.

In some implementations, an outer side surface of the upstream-facing member is defined by an interrupted surface, wherein the interrupted surface includes a fluted, spiral surface.

In some instances, an outer side surface of the upstream-facing member is defined by an interrupted surface. The interrupted surface includes a stepped surface. Each step of the stepped surface is defined by a circumferentially arcuate outer surface portion.

In some examples, an outer side surface of the upstream-facing member is defined by a smooth, uninterrupted surface.

In some implementations, an outer side surface of the downstream-facing member is defined by an interrupted surface. The interrupted surface includes a fluted, spiral surface.

In some instances, an outer side surface of the downstream-facing member is defined by an interrupted surface. The interrupted surface includes a stepped surface. Each step of the stepped surface is defined by a circumferentially arcuate outer surface portion.

In some examples, an outer side surface of the downstream-facing member is defined by a smooth, uninterrupted surface. A downstream, proximal end surface of the downstream-facing member is defined by a hemispherical depression.

In some implementations, the plurality of fluid-flow passages defines a circular array of fluid-flow passages. Each fluid flow passage of the first circular array of fluid-flow passages are equally spaced from an axial center of the nozzle array disk at a radius.

In some instances, each fluid flow passage of the plurality of fluid-flow passages of the first circular array of fluid-flow passages is defined by a non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some examples, the plurality of fluid-flow passages defines a first circular array of fluid-flow passages and a second circular array of fluid-flow passages. Each fluid flow passage of the first circular array of fluid-flow passages are equally spaced from an axial center of the nozzle array disk at a first radius. Each fluid flow passage of the second circular array of fluid-flow passages are equally spaced from an axial center of the nozzle array disk at a second radius. The second radius is less than the first radius.

In some implementations, each fluid flow passage of the plurality of fluid-flow passages of the first circular array of fluid-flow passages and the second circular array of fluid-flow passages is defined by a non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some instances, the plurality of fluid-flow passages defines a first circular array of fluid-flow passages, a second circular array of fluid-flow passages, and a third circular array of fluid-flow passages. Each fluid flow passage of the first circular array of fluid-flow passages are equally spaced from an axial center of the nozzle array disk at a first radius. Each fluid flow passage of the second circular array of fluid-flow passages are equally spaced from an axial center of the nozzle array disk at a second radius. Each fluid flow passage of the third circular array of fluid-flow passages are equally spaced from an axial center of the nozzle array disk at a third radius. The third radius is less than the second radius. The second radius is less than the first radius.

In some examples, each fluid flow passage of the plurality of fluid-flow passages of the first circular array of fluid-flow passages, the second circular array of fluid-flow passages and the third circular array of fluid-flow passages is defined by a non-constant diameter that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk.

In some implementations, the plurality of fluid-flow passages defines a circular array of fluid-flow passages. Each fluid flow passage of the first circular array of fluid-flow passages are equally spaced from an axial center of the nozzle array disk at a radius.

In some instances, each fluid flow passage of the plurality of fluid-flow passages of the first circular array of fluid-flow passages is defined by a non-constant dimension that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The dimension is an arcuate dimension. Neighboring fluid-flow passages are separated by a watershed web of material. Each watershed web of material extends away from the upstream, distal end surface for assisting in directing the fluid into the neighboring arcuate fluid-flow passages.

In some examples, the plurality of fluid-flow passages defines a circular array of fluid-flow passages. Each fluid flow passage of the first circular array of fluid-flow passages are equally spaced from an axial center of the nozzle array disk at a radius.

In some implementations, each fluid flow passage of the plurality of fluid-flow passages is defined by a non-constant dimension that decreases in cross-section as each fluid flow passage of the plurality of fluid-flow passages extends through the nozzle array disk in a direction referenced from the upstream, distal end surface of the nozzle array disk toward the downstream, proximal end surface of the nozzle array disk. The non-constant dimension is an elliptical dimension defined by a conjugate nozzle diameter and a transverse nozzle diameter.

Another aspect of the disclosure provides a fluid handling system that handles a fluid. The fluid handling system includes a bubble implosion reactor cavitation device and a cavitation-inducing pump. The bubble implosion reactor cavitation device forms a fluid-flow passage. The bubble implosion reactor cavitation device includes: an inlet opening formed by an upstream, distal end of the bubble implosion reactor cavitation device that permits the fluid to enter the fluid-flow passage and an outlet opening formed by a downstream, proximal end of the bubble implosion reactor cavitation device that permits the fluid to exit the fluid-flow passage. The cavitation-inducing pump is connected to the outlet opening formed by a downstream, proximal end of the bubble implosion reactor cavitation device for pulling the fluid through the fluid-flow passage such that very little if any positive pressure with respect to atmospheric pressure is placed on the fluid as the fluid enters the fluid-flow passage.

In some examples, a fluid inlet conduit is connected to the inlet opening formed by the upstream, distal end of the bubble implosion reactor cavitation device. A fluid outlet conduit is connected to a downstream, proximal end of the cavitation-inducing pump.

In some implementations, a fuel tank is connected to the fluid inlet conduit for supplying the fluid from the fuel tank to the bubble implosion reactor cavitation device. The fluid is fuel.

In some instances, a fuel injection system of an engine connected to the fluid outlet conduit for supplying the fuel from the bubble implosion reactor cavitation device to the fuel injection system of the engine.

In yet another aspect of the disclosure provides a method for operating a fluid handling system that handles a fluid. The method includes: providing a bubble implosion reactor cavitation device forming a fluid-flow passage. The bubble implosion reactor cavitation device includes: an inlet opening formed by an upstream, distal end of the bubble implosion reactor cavitation device that permits the fluid to enter the fluid-flow passage and an outlet opening formed by a downstream, proximal end of the bubble implosion reactor cavitation device that permits the fluid to exit the fluid-flow passage; and connecting a cavitation-inducing pump to the outlet opening formed by a downstream, proximal end of the bubble implosion reactor cavitation device for pulling the fluid through the fluid-flow passage such that very little if any positive pressure with respect to atmospheric pressure is placed on the fluid as the fluid enters the fluid-flow passage.

In some examples, the method includes connecting a fluid inlet conduit to the inlet opening formed by the upstream, distal end of the bubble implosion reactor cavitation device; and connecting a fluid outlet conduit to a downstream, proximal end of the cavitation-inducing pump.

In some implementations, the method includes connecting a fuel tank to the fluid inlet conduit for supplying the fluid from the fuel tank to the bubble implosion reactor cavitation device. The fluid is fuel.

In some instances, the method includes connecting a fuel injection system of an engine to the fluid outlet conduit for supplying the fuel from the bubble implosion reactor cavitation device to the fuel injection system of the engine.

In some examples, the method includes connecting an additive tank to the fluid inlet conduit for supplying an additive from the additive tank to the bubble implosion reactor cavitation device for permitting emulsification of the liquid.

In some implementations, a controller is communicatively coupled with the fuel injection system of the engine.

In some instances, the method includes processing the fuel for increasing an amount of cracked hydrocarbons of the fuel prior to combustion of the fuel by the engine to thereby increase one or more of fuel quality, fuel efficiency and engine horsepower.

In some examples, the fuel includes crude petroleum and derivatives of crude petroleum. The method includes processing the crude petroleum and derivatives of crude petroleum in a refinery for increasing an amount of cracked hydrocarbons of the crude petroleum and derivatives of crude petroleum prior to production of an end product including: gasoline, jet fuel, diesel fuel or heating fuel.

In some implementations, the fuel includes one of: diesel fuel, jet fuel, gasoline, heating fuel and heavy bottom fuel.

In some instances, the fuel includes one of a blended fuel. The blended fuel includes one or more of blended biodiesel, blended jet fuel, blended gasoline, blended heating fuel, and blended heavy bottom fuel.

In some examples, the blended jet fuel includes approximately 50% kerosene and approximately 50% biofuel.

In some implementations, the blended gasoline includes up to approximately 75% gasoline and up to approximately 15% water, methanol or water-and-methanol.

In some instances, the blended heating fuel includes approximately 75% fuel and approximately 25% water, methanol or water-and-methanol.

In some examples, the blended heavy bottom fuel includes up to approximately 85% heavy fuel and up to approximately 15% water.

In some implementations, the fluid includes water. The method includes processing the water for destroying chemical compounds and pollutants in the water for purifying the water to increase quality of the water.

In some instances, the water includes one of natural water, drinking water, grey water, storm water, ballast water, agricultural water, waste water and industrial waste water.

In some examples, the fluid includes a chemical solution contained by an industrial reaction vessel. The method includes processing the chemical solution for activation of main chemical reactions in a chemical vessel.

In some implementations, the fluid is a multi-blend fluid that includes one of a liquid-liquid multi-blend fluid, a liquid-gas multi-blend fluid, and a liquid-solid particle solution. The liquid-solid particle solution includes one of water with oils, water with ozone, and distilled water with nano-scale drug particles.

In some instances, the method includes processing the multi-blend fluid for formulating normally insoluble liquid-liquid, liquid-gas-liquid, liquid-gas solutions or gas-liquid-gas solutions in chemistry or bio-medicine.

In some examples, the method includes processing the multi-blend fluid for formulating normally non-emulsified liquid-solid particle solutions or liquid-gas-solid particle solutions in chemistry or bio-medicine and cosmetology.

In some implementations, the method includes processing the multi-blend fluid for formulating normally non-emulsified liquid-solid particle solutions in nano-pharmacy for formulating nano-scale drugs.

In some instances, the method includes processing the multi-blend fluid for formulating normally non-emulsified liquid-solid particle solutions or liquid-gas-solid particle solutions for homogenization and preservation of food.

DETAILED DESCRIPTION

The figures illustrate an exemplary implementation of a bubble implosion reactor cavitation device. Based on the foregoing, it is to be generally understood that the nomenclature used herein is simply for convenience and the terms used to describe the invention should be given the broadest meaning by one of ordinary skill in the art.

FIGS. 1-2B illustrate an exemplary implementation of a bubble implosion reactor cavitation device, which is shown generally at 10. A fluid is permitted to flow through a passage 12 (see, e.g., FIGS. 2A-2B) formed by the bubble implosion reactor cavitation device 10 such that the bubble implosion reactor cavitation device 10 may process the fluid. The bubble implosion reactor cavitation device 10 (and alternative embodiments thereof shown generally at, for example, 10', 10", 10''' and 10'''' in the present disclosure) may belong to a family of sono-chemical device called "liquid driven transducers" that processes the fluid by forcing the fluid through a plurality of fluid-flow orifices and then into a reaction and mixing chamber.

In some implementations, the fluid may be a gas or a liquid, L (see, e.g., FIG. 2A). Any desirable liquid, L, may be processed by the bubble implosion reactor cavitation device 10, such as, for example: water, waste-water, a chemical solution, a bio-medical solution, crude petroleum, a petroleum product, bio-fuel, bio-diesel, jet fuel (kerosene), blend jet fuel or the like. Although a liquid, L, is described being processed by the bubble implosion reactor cavitation device 10 in the following disclosure, the bubble implosion reactor cavitation device 10 is not limited to processing a liquid, L, and, as such, the bubble implosion reactor cavitation device 10 may be utilized to process any desirable fluid such as, for example, a gas or blend media such as gas-liquid solutions, liquid-liquid solutions and liquid-solid particle solutions.

The liquid, L, enters the bubble implosion reactor cavitation device 10 at an inlet opening 14a formed by an upstream, distal end 10a of the bubble implosion reactor cavitation device 10. The liquid, L, exits the bubble implosion reactor cavitation device 10 at an outlet opening 14b formed by a downstream, proximal end 10b of the bubble implosion reactor cavitation device 10.

Figure 30:
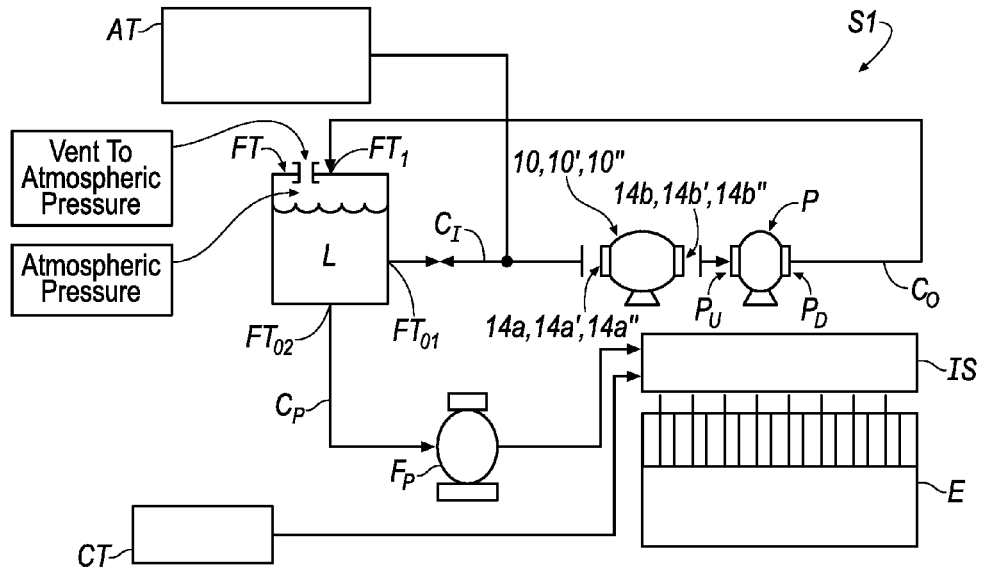
FIG. 30 illustrates an exemplary fluid handling system including the exemplary bubble implosion reactor cavitation device of FIG. 1, 12 or 21.
Figure 31:
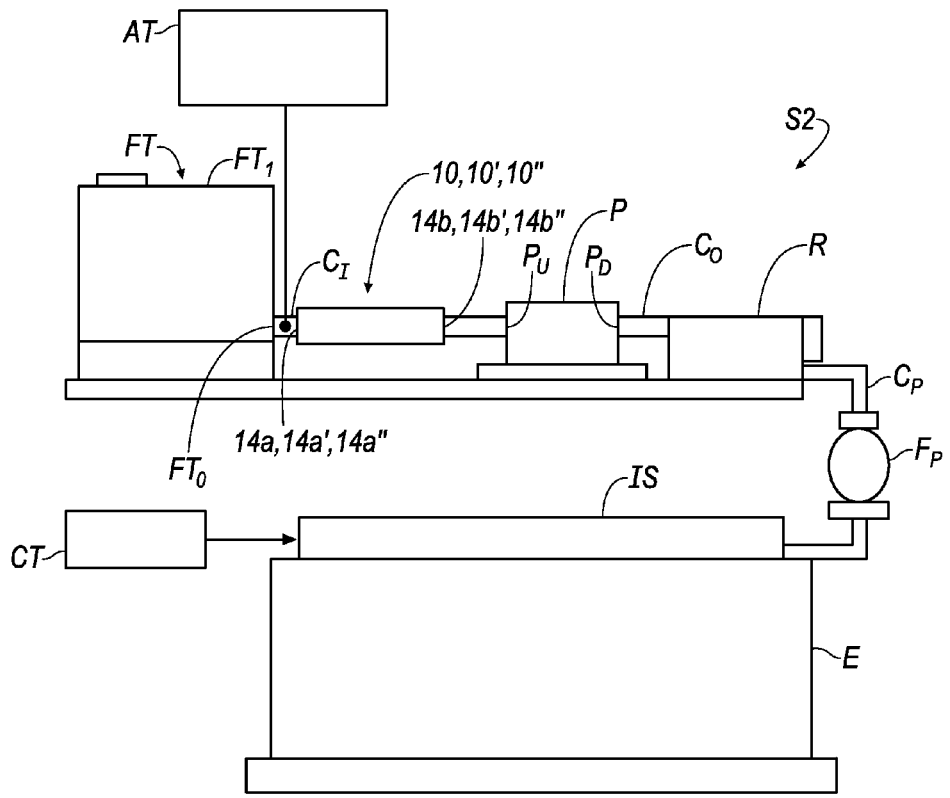
FIG. 31 illustrates an exemplary fluid handling system including the exemplary bubble implosion reactor cavitation device of FIG. 1, 12 or 21.

In an implementation, bubble implosion reactor cavitation device 10 is a component of a fluid handling system, an embodiment of which is shown generally at S1 in FIG. 30 or S2 in FIG. 31. The fluid handling system, S1/S2, includes a fluid-moving device, P (see also, e.g., FIGS. 1-2B), that "pulls" the liquid, L, through the fluid-flow passage 12 of the bubble implosion reactor cavitation device 10; as a result, in an embodiment, there is very little if any positive pressure (with respect to atmospheric pressure) placed on the liquid, L, as the liquid, L, enters the fluid-flow passage 12 at the upstream, distal end 10a of the bubble implosion reactor cavitation device 10. In some implementations, the fluid-moving device, P, may be, for example, an electrically operated pump. In some instances, the pump, P, may be referred to as a "cavitation-inducing pump."

As seen in FIGS. 1-2B and 30-31, the "pulling" of the liquid, L, through the bubble implosion reactor cavitation device 10 may be achieved by arranging the suction side of the cavitation-inducing pump, P, downstream of the outlet opening 14b of the bubble implosion reactor cavitation device 10 such that the pump, P, is fluidly-connected to the fluid-flow passage 12. Therefore, in such an implementation, as the liquid, L, is drawn into the bubble implosion reactor cavitation device 10 at the inlet opening 14a, the liquid, L, is not moved through the bubble implosion reactor cavitation device 10 by being "pushed" through the inlet opening 14a, but, rather, the liquid, L, is "pulled" (or drawn) through the inlet opening 14a as a result of the suction present at the distal end, $P_U$, of the cavitation-inducing pump, P, being arranged downstream of the outlet opening 14b. Although the top portion of the fuel tank, FT, is shown vented to atmosphere, it is contemplated that efficiencies in the operation of the bubble implosion reactor cavitation device 10 may be gained by maintaining the pressure within the fuel tank, FT, at less than atmospheric pressure.

Although the cavitation-inducing pump, P, is said to be arranged downstream of the outlet opening 14b, such an implementation is exemplary and is related to an embodiment of the invention shown at FIGS. 1-2B. Accordingly, the cavitation-inducing pump, P, may be alternatively arranged within, for example, the fluid-flow passage 12 but slightly upstream of the outlet opening 14b, or, alternatively, the cavitation-inducing pump, P, may be arranged within, for example, the outlet opening 14b.

As seen in FIGS. 2A-2B, a plurality of components 16-24 forms the bubble implosion reactor cavitation device 10. In an implementation, the components 16-24 forming the bubble implosion reactor cavitation device 10 may include, for example: a tube-shaped cylindrical body 16, a bubble generator subassembly 18, a tube-shaped, cylindrical spacer sleeve 20, a laminar flow bubble generator disk 22 and a retaining member 24. The bubble generator subassembly 18 may include a downstream-facing member 18a, a nozzle array disk 18b and an upstream-facing member 18c.

One aspect of the structural arrangement and dimensions of components 16-24 provides a method for processing the liquid, L, that is pulled through the fluid handling system, S1/S2, by the cavitation-inducing pump, P, for the purpose of destroying macro-clusters and contamination within the liquid, L. Another aspect of the structural arrangement and dimensions of the components 16-24 provides a method for processing the liquid, L, that is pulled through the fluid handling system, S1/S2, by the cavitation-inducing pump, P, for the purpose of activating physical processes and chemical reactions within the liquid, L.

The exemplary liquid processing methodologies described above are a result of a geometry fluid-flow passage 12 that is formed by the structural arrangement and dimensions of components 16-24 of the bubble implosion reactor cavitation device 10. As seen in FIGS. 2A-2B, the geometry of the fluid-flow passage 12 changes along a length, $L_{10}$ (see, e.g., FIG. 1), of the bubble implosion reactor cavitation device 10.

Referring to FIG. 2B, because the geometry of the fluid-flow passage 12 changes along the length, $L_{10}$, of the bubble implosion reactor cavitation device 10, the fluid-flow passage 12 forms a plurality of fluid processing zones I.-IX. along the length, $L_{10}$, of the bubble implosion reactor cavitation device 10. The plurality of fluid processing zones I.-IX. may include a fluid flow restriction zone, I., that is followed by a fluid vacuum zone, II., and then followed by a fluid micro-bubble generation zone, III. When the liquid, L, is advanced to the micro-bubble generation zone, III., the bubble implosion reactor cavitation device 10 generates a plurality of near-vacuum micro-bubbles, B, within the liquid, L. As the liquid, L, is pulled through the bubble implosion reactor cavitation device 10, the liquid, L, then enters an expansion zone, IV., then a compression zone, V., then an implosion zone, VI., where the plurality of near-vacuum micro-bubbles, B, are: expanded, compressed and collapsed under pressure. After the plurality of near-vacuum micro-bubbles, B, are collapsed thereby generating a plurality of spherical implosions within the liquid, L, the plurality of spherical implosions result in a gas at the center of each micro-bubble of the plurality of micro-bubbles, B, being heated to an extremely high temperature, which generates a cascade of sono-luminescence light pulses within the liquid, L. The liquid, L, then enters a destruction zone, VII., then a reaction zone, VIII., then a mixing zone, IX.

In an embodiment shown in FIG. 30, the fluid handling system, S1, may be generally referred to as a "closed-loop" fluid handling system including: a fluid inlet conduit, $C_I$ (see also, e.g., FIGS. 1-2B), the bubble implosion reactor cavitation device 10, the cavitation-inducing pump, P, a fluid outlet conduit, $C_O$ (see also, e.g., FIGS. 1-2B), and a fuel tank, FT. As seen in FIG. 30, the fluid inlet conduit, $C_I$, fluidly connects a first fluid outlet, $FT_{O1}$, of the fuel tank, FT, to the upstream, distal end 10a of the bubble implosion reactor cavitation device 10 such that the inlet opening 14a of the bubble implosion reactor cavitation device 10 receives liquid, L, from the first fluid outlet, $FT_{O1}$, of the fuel tank, FT. An upstream, distal end, $P_U$ (see also, e.g., FIGS. 1-2B), of the cavitation-inducing pump, P, is arranged downstream of and is fluidly-connected to the outlet opening 14b of the bubble implosion reactor cavitation device 10 for pulling the liquid, L, through the bubble implosion reactor cavitation device 10 as described above. The fluid outlet conduit, $C_O$, fluidly connects a downstream, proximal end, $P_D$ (see also, e.g., FIGS. 1-2B), of the cavitation-inducing pump, P, to a fluid inlet, $FT_I$, of the fuel tank, FT, for depositing the liquid, L, processed by the bubble implosion reactor cavitation device 10 back into the fuel tank, FT.

As seen in FIG. 30, the fuel tank, FT, may include a second fluid outlet, $FT_{O2}$. The second fluid outlet, $FT_{O2}$, of the fuel tank, FT, is connected to a processed liquid conduit, $C_P$, for supplying liquid, L, processed by the bubble implosion reactor cavitation device 10 to a fuel injection system, IS, of an engine, E, such as, for example, a diesel engine. A fuel pump, FP, may be arranged within the processed liquid conduit, $C_P$, for metering the processed liquid, L, from the fuel tank, FT, to the fuel injection system, IS.

In an embodiment shown in FIG. 31, the fluid handling system, S2, may be generally referred to as a "linear" fluid handling system including: a fuel tank, FT, a fluid inlet conduit, $C_I$ (see also, e.g., FIGS. 1-2B), the bubble implosion reactor cavitation device 10, the cavitation-inducing pump, P, a fluid outlet conduit, $C_O$ (see also, e.g., FIGS. 1-2B), and a zero backpressure device/liquid holding reservoir, R. As seen in FIG. 31, the fluid inlet conduit, $C_I$, fluidly connects a fluid outlet, $FT_O$, of the fuel tank, FT, to the upstream, distal end 10a of the bubble implosion reactor cavitation device 10 such that the inlet opening 14a of the cavitation device 10 receives liquid, L, from the fluid outlet, $FT_O$, of the fuel tank, FT. An upstream, distal end, $P_U$ (see also, e.g., FIGS. 1-2B), of the cavitation-inducing pump, P, is arranged downstream of and is fluidly-connected to the outlet opening 14b of the bubble implosion reactor cavitation device 10 for pulling the liquid, L, through the bubble implosion reactor cavitation device 10 as described above. The fluid outlet conduit, $C_O$, fluidly connects a downstream, proximal end, $P_D$ (see also, e.g., FIGS. 1-2B), of the cavitation-inducing pump, P, to the zero backpressure device/processed liquid holding reservoir, R, for retaining the processed liquid, L, therein (i.e., unlike the "closed loop" fluid handling system, S1, the processed liquid, L, is not returned to the fuel tank, FT, but, rather, is deposited into the processed liquid holding reservoir, R).

As seen in FIG. 31, the processed liquid holding reservoir, R, is connected to a processed liquid conduit, $C_P$, for supplying liquid, L, processed by the bubble implosion reactor cavitation device 10 to a fuel injection system, IS, of an engine, E, such as, for example, a diesel engine. A fuel pump, FP, may be arranged within the processed liquid conduit, $C_P$, for metering the processed liquid, L, from the processed liquid holding reservoir, R, to the fuel injection system, IS.

In an implementation, the liquid, L, may be diesel fuel. The processed diesel fuel, L, therefore, may result in an increase in the number of destructed/cracked hydrocarbons during the combustion process to thereby increase one or more of fuel quality, fuel efficiency, engine horsepower and torque. The processed diesel fuel, L, therefore, may result in an increase in the fuel mileage of a vehicle and reduce vehicle maintenance costs and wear-and-tear on engine components. In some implementations, the processed diesel fuel, L, may increase the fuel mileage of a vehicle by approximately about 25%-45%. Further, in some implementations, the processed diesel fuel, L, may also result in reduced emission elements (e.g., $CO_x$, HC, $NO_x$, $SO_x$ Pb and PM (particulate matter)) from, for example, motor vehicles. Accordingly, in some implementations, the processed diesel fuel, L, may reduce emission elements by approximately 25%-35%.

In an implementation, the liquid, L, may be any blend biodiesel (e.g., biodiesel ranging between approximately 5% to 50% and petroleum diesel fuel ranging between approximately 50% to 95%). The bubble implosion reactor cavitation device 10, therefore, may be utilized for processing the blend biodiesel, L, in a storage tank of a depot/fueling station and/or in-line on board of vehicle. The processed blend biodiesel, L, therefore, may result in an increase in the number of destructed/cracked hydrocarbons during the combustion process to thereby increase one or more of fuel quality, fuel efficiency, engine horsepower and maintenance costs and wear-and-tear on engine components. Further, in some implementations, the processed blend biodiesel, L, may also result in reduced emission elements (e.g., $CO_x$, HC, $NO_x$, $SO_x$, Pb and PM (particle matter)) which causes pollution coming from diesel engines.

In an implementation, the liquid, L, may be gasoline. The bubble implosion reactor cavitation device 10', therefore, may be utilized for processing the gasoline, L, in a storage tank of a depot/fueling station and/or in-line between a fuel tank and an engine. In a refinery industry application, the bubble implosion reactor cavitation device 10', therefore, may be utilized for processing the strain-run fraction of the gasoline, L. The processed gasoline, L, therefore, may result in an increase in the number of destructed/cracked hydrocarbons during the combustion process to thereby increase one or more of fuel quality, fuel efficiency, engine horsepower and octane, which may result in reduced vehicle maintenance costs and wear-and-tear on engine components. Further, in some implementations, the processed gasoline, L, may also result in reduced emission elements (e.g., $CO_x$, HC, $NO_x$, $SO_x$, Pb and PM (particle matter)), which causes pollution coming from motor vehicles. In some implementations, the bubble implosion reactor cavitation device 10' may increase the octane number of the strain-run fraction gasoline by approximately about 12%.

In an implementation, the liquid, L, may be jet fuel (kerosene). The bubble implosion reactor cavitation device 10', therefore, may be utilized for processing the jet fuel (kerosene), L, in a storage tank and/or in-line between a jet fuel tank and a jet engine. The processed jet fuel (kerosene), L, therefore, may result in an increase in the number of destructed/cracked hydrocarbons during the combustion process to thereby increase one or more of fuel quality, fuel efficiency, engine horsepower in order to reduce maintenance costs and wear-and-tear on engine components. Further, in some implementations, the processed blend jet fuel (kerosene), L, may also result in reduced emission elements (e.g., $CO_x$, HC, $NO_x$, $SO_x$, Pb and PM (particle matter)), which causes pollution coming from jet engines.

In an implementation, the liquid, L, may be blend jet fuel (e.g., approximately about 50% kerosene and approximately about 50% bio-fuel). The bubble implosion reactor cavitation device 10', therefore, may be utilized for processing the blend jet fuel, L, in a storage tank and/or in-line between a jet fuel tank and a jet engine. The processed blend jet fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. Further, in some implementations, the processed blend jet fuel, L, may also result in reduced emission elements (e.g., $CO_x$, HC, $NO_x$, $SO_x$, Pb and PM (particle matter)), which causes pollution coming from jet engines.

In an implementation, the liquid, L, may be any blend multi-fuel. A blend multi-fuel may include several components such as, for example: diesel fuel, gasoline, kerosene, alcohol, water or the like. The bubble implosion reactor cavitation device 10', therefore, may be utilized for processing the blend multi-fuel, L, in a storage tank and/or in-line on board of a vehicle. The processed blend multi-fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. Further, in some implementations, the processed blend multi-fuel, L, may also result in reduced emission elements (e.g., $CO_x$, HC, $NO_x$, $SO_x$, Pb and PM (particle matter)), which causes pollution coming from diesel engines.

In an implementation, the liquid, L, may be any blend emulsified fuel. A blend emulsified fuel may include several components such as, for example: 75%-95% diesel fuel and 5%-25% water. The bubble implosion reactor cavitation device 10', therefore, may be utilized for processing the blend emulsified fuel, L, in a storage tank and/or in-line on board of a vehicle. The processed blend emulsified fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. In some implementations, a processed blend emulsified fuel, L, may include approximately about 85% petroleum fuel and approximately about 15% water in order to increase the fuel mileage of a vehicle, locomotive and ship in excess of 15%. Further, in some implementations, the processed blend emulsified fuel, L, may also result in reduced emission elements (e.g., $CO_x$, HC, $NO_x$, $SO_x$, Pb and PM (particle matter)), which causes pollution coming from diesel engines. In some implementations, the processed blend emulsified fuel, L, including approximately about 85% petroleum fuel and approximately about 15% water may reduce emissions in excess of 15%.

In some implementations, the fluid handling systems S1 or S2 may include an additive tank, AT, in fluid communication with the fluid inlet conduit, $C_I$. The additive tank, AT, may be connected to the fluid inlet conduit, $C_I$, in any desirable manner, such as, for example, by way of an injector nozzle, port or the like. The additive tank, AT, may contain an additive (e.g., water, methanol or the like) that permits emulsification of gas-to-liquid, liquid-to-liquid, or liquid-to solids based on application requirements. In a diesel application, for example, the additive tank, AT, may provide water and/or methanol upstream of the cavitation device 10, 10', 10" at the fluid inlet conduit, $C_I$, which may result in increased vehicle fuel mileage and/or reduced emissions. Other commercial applications may include, for example, permanent emulsions of fuel to water or other commercial applications in the water treatment industry, the pharmaceutical industry, the chemical industry and the food industry.

In some implementations, the fluid handling systems S1 or S2 may include a controller, CT, communicatively coupled with the injection system, IS, of the engine, E. The controller, CT, may adapt existing signals from a variety of outputs and optimize injection system, IS, of the engine, E, through either: signal conditioning, signal modulation or digital modification in order to change the frequency or quantity of injected material to the engine, E, within a prescribed formula resulting in a permanent emulsion or blend of, for example: gas-to-gas, gas-to-liquid or gas-to-solid combinations thereby generating improved efficiencies of settling in medications, fuels, water reclamation and food products. The controller, CT, may read inputs, and, through a control module, can monitor various system characteristics and deliver the prescribed formulation to read a desired result.

Figure 3:
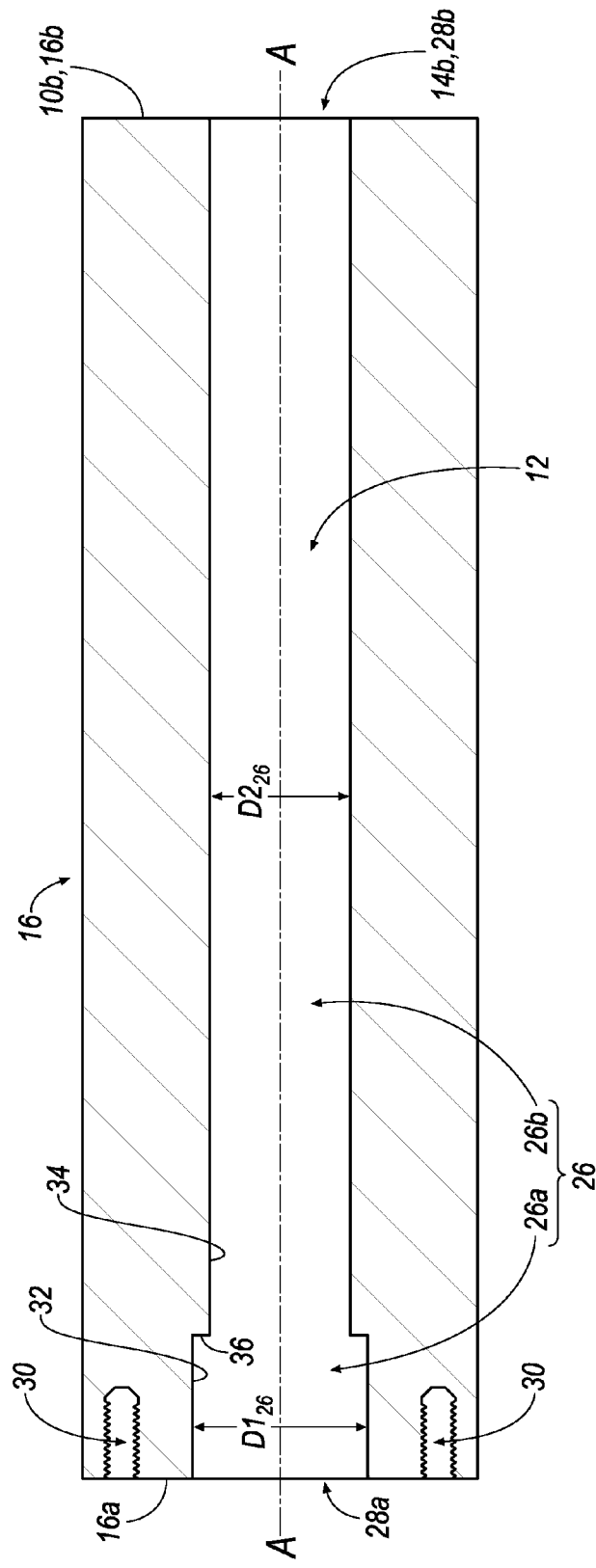
FIG. 3 is a cross-sectional view of an exemplary tube-shaped cylindrical body of the bubble implosion reactor cavitation device of FIG. 2A.

Referring to FIG. 3, an implementation of the tube-shaped cylindrical body 16 is described. The tube-shaped cylindrical body 16 includes an upstream, distal end surface 16a and a downstream, proximal end surface 16b. An axial passage 26 extends through the tube-shaped cylindrical body 16 between the upstream, distal end surface 16a and the downstream, proximal end surface 16b along an axis, A-A, that extends through the tube-shaped cylindrical body 16.

Access to the axial passage 26 is permitted by an inlet opening 28a formed in the upstream, distal end surface 16a of the tube-shaped cylindrical body 16 and an outlet opening 28b formed in the downstream, proximal end surface 16b of the tube-shaped cylindrical body 16. The outlet opening 28b formed by downstream, proximal end surface 16b of the tube-shaped cylindrical body 16 may also define the outlet opening 14b of the bubble implosion reactor cavitation device 10, and, the downstream, proximal end surface 16b of the tube-shaped cylindrical body 16 may also define the downstream, proximal end 10b of the bubble implosion reactor cavitation device 10.

The upstream, distal end surface 16a of the tube-shaped cylindrical body 16 may define one or more threaded passages 30. The one or more threaded passages 30 may receive one or more threaded fasteners, F (see, e.g., FIGS. 2A-2B), that may be utilized to secure the retaining member 24 to the upstream, distal end surface 16a of the tube-shaped cylindrical body 16.

The axial passage 26 that extends through the tube-shaped cylindrical body 16 may include a first axial passage portion 26a be defined by a first diameter, $D1_{26}$, and a second axial passage portion 26b defined by a second diameter, $D2_{26}$. The first diameter, $D1_{26}$, is slightly greater than the second diameter, $D2_{26}$. The first axial passage portion 26a is defined by a first cylindrical surface 32, and, the second axial passage portion 26b is defined by a second cylindrical surface 34. A shoulder surface 36 connects the first cylindrical surface 32 to the second cylindrical surface 34 and demarcates the first axial passage portion 26a from the second axial passage portion 26b.

Referring to FIGS. 4A-4D, an implementation of the downstream-facing member 18a of the bubble generator subassembly 18 is described. The downstream-facing member 18a of the bubble generator subassembly 18 may be defined by a length, $L_{18a}$ (see, e.g., FIGS. 4A and 4D), extending between an upstream, distal end surface 38a and a downstream, proximal end surface 38b. An outer side surface 38c connects the upstream, distal end surface 38a to the downstream, proximal end surface 38b.

The outer side surface 38c defines a first portion, $L_{18a-1}$, of the length, $L_{18a}$, of the downstream-facing member 18a. The outer side surface 38c defines the downstream-facing member 18a to include a substantially cylindrical shape defined by a non-constant diameter, $D_{18a}$ (see, e.g., FIG. 4A). In an implementation the non-constant diameter, $D_{18a}$, slightly reduces along the first portion, $L_{18a-1}$, of the length, $L_{18a}$, of the downstream-facing member 18a as the outer side surface 38c extends from the upstream, distal end surface 38a toward the downstream, proximal end surface 38b.

The downstream, proximal end surface 38b defines a second portion, $L_{18a-2}$, of the length, $L_{18a}$, of the downstream-facing member 18a. The downstream, proximal end surface 38b generally defines the downstream-facing member 18a to include a hemispherical shape.

Unlike the hemispherical shape of the downstream, proximal end surface 38b, the upstream, distal end surface 38a is generally defined by a planar shape. The planar shape of the upstream, distal end surface 38a may be defined by a diameter that is equal to the largest diameter of the non-constant diameter, $D_{18a}$, defined by the outer side surface 38c of the downstream-facing member 18a.

Figure 4A:
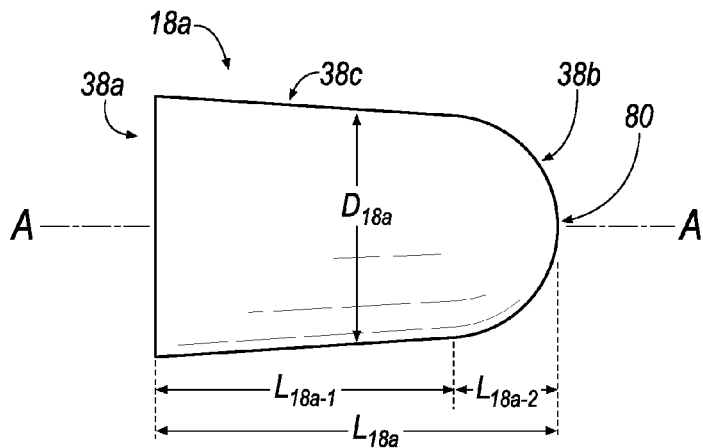
FIG. 4A is a side view of an exemplary downstream-facing member of a bubble generator subassembly of the bubble implosion reactor cavitation device of FIG. 1.
Figure 4B:
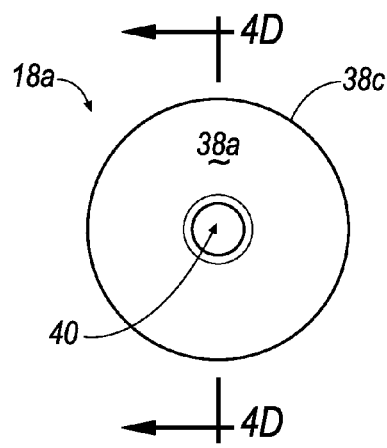
FIG. 4B is a front view of the downstream-facing member of the bubble generator subassembly of FIG. 4A.
Figure 4C:
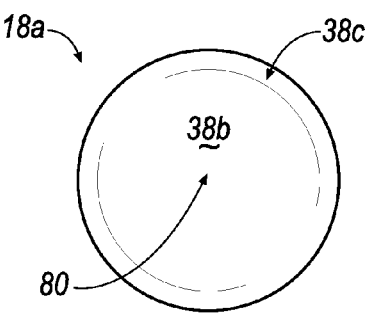
FIG. 4C is a rear view of the downstream-facing member of the bubble generator subassembly of FIG. 4A.
Figure 4D:
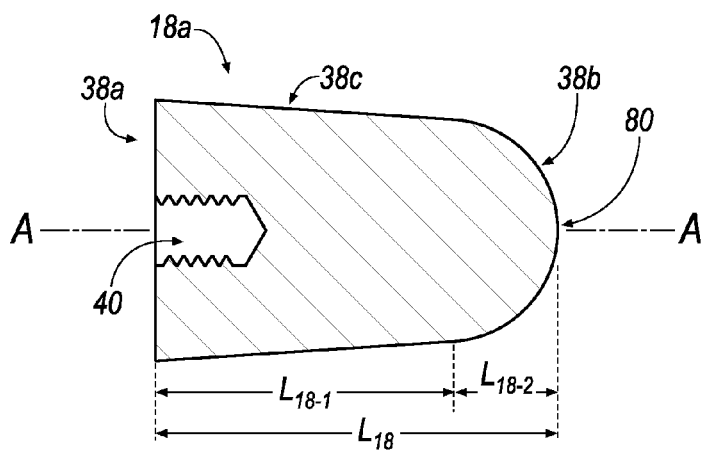
FIG. 4D is a cross-sectional view of the downstream-facing member of the bubble generator subassembly according to line 4D-4D of FIG. 4B.
Figure 7A:
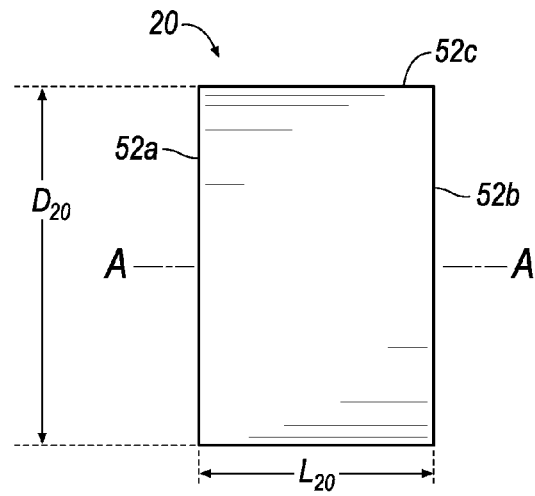
FIG. 7A is a side view of an exemplary tube-shaped, cylindrical spacer sleeve of the bubble implosion reactor cavitation device of FIG. 1.
Figure 7B:
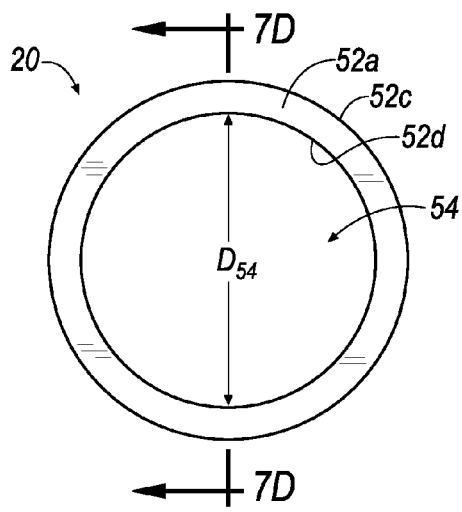
FIG. 7B is a front view of the tube-shaped, cylindrical spacer sleeve of FIG. 7A.
Figure 7C:
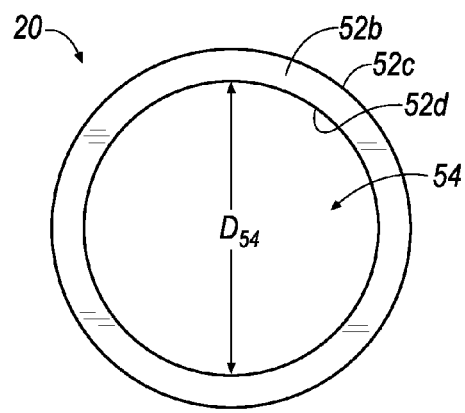
FIG. 7C is a rear view of the tube-shaped, cylindrical spacer sleeve of FIG. 7A.
Figure 7D:
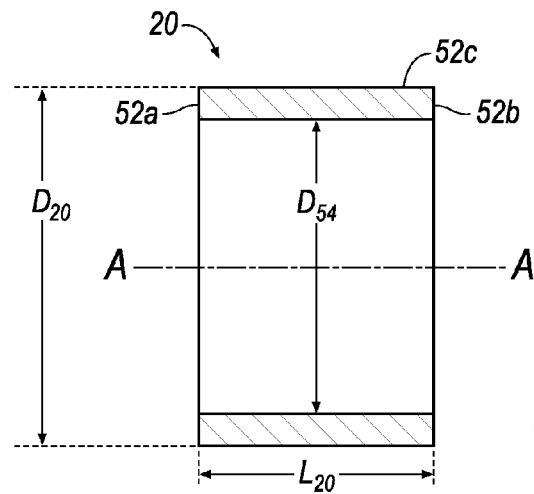
FIG. 7D is a cross-sectional view of the tube-shaped, cylindrical spacer sleeve according to line 7D-7D of FIG. 7B.

Referring to FIGS. 4B and 4D, a threaded passage 40 extends partially into the first portion, $L_{18a-1}$, of the length, $L_{18a}$, of the downstream-facing member 18a from the upstream, distal end surface 38a. The threaded passage 40 may be arranged along an axis, A-A, extending through an axial center of the downstream-facing member 18a.

Shown below is a table including four exemplary embodiments of the downstream-facing member 18a including a variety of lengths, $L_{18a}$, and diameters, $D_{18a}$, described in inches.

TABLE 1

|  | Embodiment 1 | Embodiment 2 | Embodiment 3 | Embodiment 4 |
| --- | --- | --- | --- | --- |
| $L_{18a}$ | 0.75" | 1.00" | 1.25" | 1.50" |
| $D_{18a}$ | 0.50" | 0.70" | 0.80" | 0.90" |

Referring to FIGS. 5A-5D, an implementation of the nozzle array disk 18b of the bubble generator subassembly 18 is described. The nozzle array disk 18b of the bubble generator subassembly 18 is defined by a length, $L_{18b}$ (see, e.g., FIGS. 5A and 5D), extending between an upstream, distal end surface 42a and a downstream, proximal end surface 42b. An outer side surface 42c connects the upstream, distal end surface 42a to the downstream, proximal end surface 42b. The outer side surface 42c defines the nozzle array disk 18b to include a diameter, $D_{18b}$ (see, e.g., FIGS. 5A and 5D).

Referring to FIGS. 5B-5D, a threaded axial passage 44 that extends through the nozzle array disk 18b between the upstream, distal end surface 42a and the downstream, proximal end surface 42b. The threaded axial passage 44 is arranged along an axis, A-A, extending through an axial center of the nozzle array disk 18b.

Referring to FIGS. 5B-5D, the nozzle array disk 18b includes a plurality of fluid-flow passages 46 that extend through the nozzle array disk 18b between the upstream, distal end surface 42a and the downstream, proximal end surface 42b. Each fluid flow passage 46 of the plurality of fluid-flow passages 46 may be equally spaced from the axial center of the nozzle array disk 18b at a radius, $R_{18b}$ (see, e.g., FIGS. 5B-5C), to form a circular array/arrangement of fluid-flow passages 46. Each fluid flow passage 46 of the plurality of fluid-flow passages 46 may include a constant diameter, $D_{46}$ (see, e.g., FIG. 5D).

Shown below is a table including four exemplary embodiments of the nozzle array disk 18b including a variety of lengths, $L_{18b}$, radius, $R_{18b}$, and diameters, $D_{18b}$, $D_{46}$, described in inches.

TABLE 2

|  | Embodiment 1 | Embodiment 2 | Embodiment 3 | Embodiment 4 |
| --- | --- | --- | --- | --- |
| $L_{18b}$ | 0.20" | 0.25" | 0.45" | 0.65" |
| $D_{18b}$ | 0.75" | 1.00" | 1.25" | 1.50" |
| $D_{46}$ | 0.06" | 0.07" | 0.08" | 0.09" |
| $R_{18b}$ | 0.25" | 0.30" | 0.43" | 0.50" |

Referring to FIGS. 6A-6D, an implementation of the upstream-facing member 18c of the bubble generator subassembly 18 is described. The upstream-facing member 18c of the bubble generator subassembly 18 is defined by a length, $L_{18c}$ (see, e.g., FIGS. 6A and 6D), extending between an upstream, distal end surface 48a and a downstream, proximal end surface 48b. An outer side surface 48c connects the upstream, distal end surface 48a to the downstream, proximal end surface 48b.

The outer side surface 48c defines the upstream-facing member 18c to include a substantially conical shape defined by a non-constant diameter, $D_{18c}$ (see, e.g., FIG. 6A). In an implementation the non-constant diameter, $D_{18c}$, increases along the length, $L_{18c}$, of the upstream-facing member 18c as the outer side surface 48c extends from the upstream, distal end surface 48a toward the downstream, proximal end surface 48b.

The upstream, distal end surface 48a generally defined by a point. The downstream, proximal end surface 48b is generally defined by a planar shape having a diameter, which is equal to the largest diameter of the non-constant diameter, $D_{18c}$, defined by the outer side surface 48c.

Referring to FIGS. 6A and 6C-6D, a threaded stem 50 extends away from the downstream, proximal end surface 48b. The threaded stem 50 is arranged along an axis, A-A, extending through an axial center of the upstream-facing member 18c.

Shown below is a table including four exemplary embodiments of the upstream-facing member 18c including a variety of lengths, $L_{18c}$, and diameters, $D_{18c}$, described in inches.

TABLE 3

|  | Embodiment 1 | Embodiment 2 | Embodiment 3 | Embodiment 4 |
| --- | --- | --- | --- | --- |
| $L_{18c}$ | 0.75" | 1.00" | 1.25" | 1.50" |
| $D_{18c}$ | 0.60" | 0.85" | 0.93" | 1.00" |

Referring to FIGS. 7A-7D, an implementation of the tube-shaped, cylindrical spacer sleeve 20 is described. The tube-shaped, cylindrical spacer sleeve 20 is defined by a length, $L_{20}$ (see, e.g., FIGS. 7A and 7D), extending between an upstream, distal end surface 52a and a downstream, proximal end surface 52b. Each of an outer side surface 52c and an inner passage surface 52d connect the upstream, distal end surface 52a to the downstream, proximal end surface 52b. The outer side surface 52c defines the tube-shaped, cylindrical spacer sleeve 20 to include a diameter, $D_{20}$ (see, e.g., FIGS. 7A and 7D).

The passage surface 52d defines an axial passage 54 that extends through the tube-shaped, cylindrical spacer sleeve 20 between the upstream, distal end surface 52a and the downstream, proximal end surface 52b along an axis, A-A, that extends through the tube-shaped, cylindrical spacer sleeve 20. The axial passage 54 defines the tube-shaped, cylindrical spacer sleeve 20 to include a passage diameter, $D_{54}$ (see, e.g., FIGS. 7B-7D).

Shown below is a table including four exemplary embodiments of the tube-shaped, cylindrical spacer sleeve 20 including a variety of lengths, $L_{20}$, and diameters $D_{20}$, $D_{54}$, described in inches.

TABLE 4

|  | Embodiment 1 | Embodiment 2 | Embodiment 3 | Embodiment 4 |
| --- | --- | --- | --- | --- |
| $L_{20}$ | 0.30" | 0.55" | 0.55" | 0.55" |
| $D_{20}$ | 0.60" | 0.90" | 1.15" | 1.40" |
| $D_{54}$ | 0.35" | 0.70" | 0.95" | 1.20" |

Referring to FIGS. 8A-8D, an implementation of the laminar flow bubble generator disk 22 is described. The laminar flow bubble generator disk 22 is defined by a length, $L_{22}$ (see, e.g., FIGS. 8A and 8D), extending between an upstream, distal end surface 56a and a downstream, proximal end surface 56b. Each of an outer side surface 56c and an inner passage surface 56d connect the upstream, distal end surface 56a to the downstream, proximal end surface 56b. The outer side surface 56c defines the laminar flow bubble generator disk 22 to include a diameter, $D_{22}$ (see, e.g., FIGS. 8A and 8D).

The passage surface 56d defines an axial passage 58 (see, e.g., FIGS. 8B-8D) that extends through the laminar flow bubble generator disk 22 between the upstream, distal end surface 56a and the downstream, proximal end surface 56b along an axis, A-A, that extends through the laminar flow bubble generator disk 22. The axial passage 58 defines the laminar flow bubble generator disk 22 to include a passage diameter, $D_{58}$ (see, e.g., FIG. 8D).

Referring to FIGS. 8B-8D, the laminar flow bubble generator disk 22 includes a plurality of fluid-flow passages 60 that extend through the laminar flow bubble generator disk 22 between the upstream, distal end surface 56a and the downstream, proximal end surface 56b. The plurality of fluid-flow passages 60 may be grouped in a plurality of circular, concentrically-arranged patterns with each circular pattern spaced from the axial center of the laminar flow bubble generator disk 22 at a unique radius (see, e.g., $R_{22-1}$, $R_{22-2}$, $R_{22-3}$, in FIGS. 8B-8C). Each fluid flow passage 60 of the plurality of fluid-flow passages 60 may include a similar diameter, $D_{60}$ (see, e.g., FIG. 8D).

Functionally, the laminar flow bubble generator disk 22 reduces turbulence of the liquid, L, entering the bubble implosion reactor cavitation device 10 from the fluid inlet conduit, $C_I$. Turbulence of the liquid, L, is reduced by directing the liquid, L, in a streamlined, generally linear direction defined by the axial passage 58 and the plurality of fluid-flow passages 60.

Shown below is a table including four exemplary embodiments of the laminar flow bubble generator disk 22 including a variety of lengths, $L_{22}$, and diameters $D_{22}$, $D_{58}$, $D_{60}$, described in inches.

TABLE 5

|  | Embodiment 1 | Embodiment 2 | Embodiment 3 | Embodiment 4 |
| --- | --- | --- | --- | --- |
| $L_{22}$ | 0.20" | 0.25" | 0.45" | 0.65" |
| $D_{22}$ | 0.60" | 0.90" | 1.15" | 1.45" |
| $D_{58}$ | 0.10" | 0.12" | 0.14" | 0.16" |
| $D_{60}$ | 0.03" | 0.04" | 0.05" | 0.06" |

Referring to FIGS. 8B-8D, in some implementations, the laminar flow bubble generator disk 22 may be formed from two materials such that the laminar flow bubble generator disk 22 may be formed by a ring member 56e and a plug member 56f that is inserted into the ring member 56e. The plug member 56f may form the axial passage 58 and the plurality of fluid-flow passages 60. Although an embodiment of the laminar flow bubble generator disk 22 may be formed from two material as shown and described above at FIGS. 8B-8D, the laminar flow bubble generator disk 22 is not limited to such an embodiment, and, as such, the laminar flow bubble generator disk 22 may be formed from one material thereby eliminating a manufacturing step of inserting the plug member 56f into the ring member 56e.

Referring to FIGS. 9A-9D, an implementation of the retaining member 24 is described. The retaining member 24 includes an upstream, distal end surface 62a and a downstream, proximal end surface 62b. An axial passage 64 extends through the retaining member 24 between the upstream, distal end surface 62a and the downstream, proximal end surface 62b along an axis, A-A, that extends through the retaining member 24. Access to the axial passage 64 is permitted by an inlet opening 66a (see, e.g., FIGS. 9B, 9D) formed in the upstream, distal end surface 62a of the retaining member 24 and an outlet opening 66b (see, e.g., FIGS. 9C-9D) formed in the downstream, proximal end surface 62b of the retaining member 24.

Referring to FIGS. 9B-9D, one or more threaded passages 68 may extend through the retaining member 24 from the upstream, distal end surface 62a to the downstream, proximal end surface 62b. The one or more threaded passages 68 may receive the one or more threaded fasteners, F, that may be utilized to secure the retaining member 24 to the upstream, distal end surface 16a of the tube-shaped cylindrical body 16.

The inlet opening 66a of the retaining member 24 may also define the inlet opening 14a of the bubble implosion reactor cavitation device 10. The upstream, distal end surface 62a of the retaining member 24 may also define the upstream, distal end 10a of the bubble implosion reactor cavitation device 10.

Referring to FIG. 9D, the axial passage 64 that extends through the retaining member 24 may include a first axial passage portion 64a defined by a first diameter, $D1_{64}$, and a second axial passage portion 64b defined by a second diameter, $D2_{64}$. The first diameter, $D1_{64}$, is slightly less than the second diameter, $D2_{64}$. The first axial passage portion 64a is defined by a first cylindrical surface 70, and, the second axial passage portion 64b is defined by a second cylindrical surface 72. A shoulder surface 74 connects the first cylindrical surface 70 to the second cylindrical surface 72 and demarcates the first axial passage portion 64a from the second axial passage portion 64b.

An embodiment for assembling the bubble implosion reactor cavitation device 10 is described as follows. A first step in the process for assembling the bubble implosion reactor cavitation device 10 is assembling the bubble generator subassembly 18, which is shown at FIGS. 10A-10F.

Figure 10A:
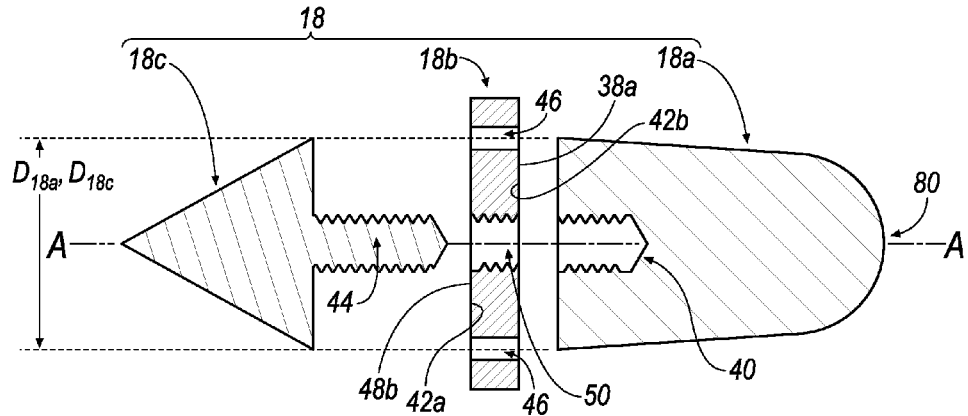
Figure 10B:
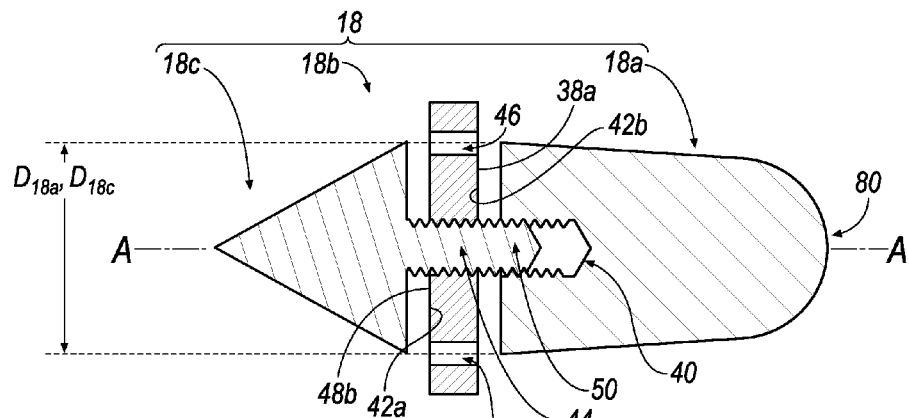

Referring to FIG. 10A, the bubble generator subassembly 18 is assembled by firstly arranging the nozzle array disk 18b between the downstream-facing member 18a and the upstream-facing member 18c such that the threaded stem 50 of the upstream-facing member 18c is axially aligned along the axis, A-A, with the threaded axial passage 44 of the nozzle array disk 18b and the threaded passage 40 of the downstream-facing member 18a. Then, as seen in FIG. 10B, the threaded stem 50 is extended through the threaded axial passage 44 of the nozzle array disk 18b and into the threaded passage 40 of the downstream-facing member 18a.

Figure 10C:
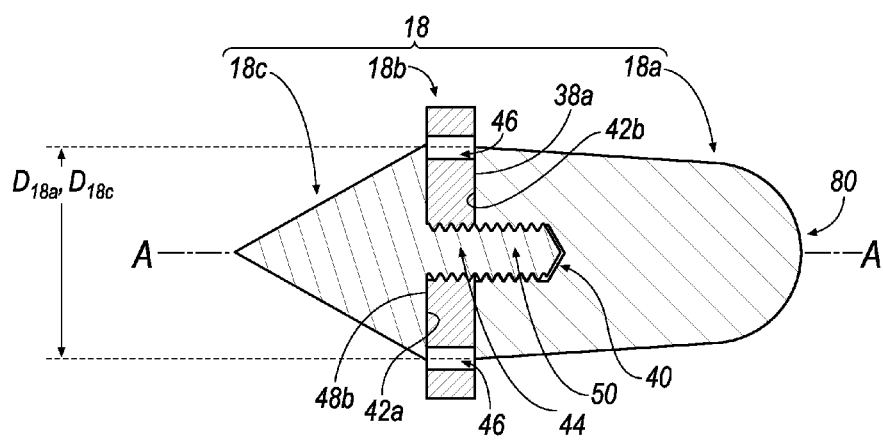

Referring to FIG. 10C, upon fully inserting the threaded stem 50 into the threaded passage 40 of the downstream-facing member 18a: (1) the downstream, proximal end surface 48b of the upstream-facing member 18c is disposed adjacent the upstream, distal end surface 42a of the nozzle array disk 18b, and (2) the upstream, distal end surface 38a of the downstream-facing member 18a is disposed adjacent the downstream, proximal end surface 42b of the nozzle array disk 18b. Referring to FIGS. 10C and 10E-10F, when the bubble generator subassembly 18 is assembled as described above, the approximately equal diameters, $D_{18a}$, $D_{18c}$ (see, e.g., FIG. 10C), defined by the downstream, proximal end surface 48b of the upstream-facing member 18c and the upstream, distal end surface 38a of the downstream-facing member 18a obstructs/obscures approximately half of the each passage 46 of the circularly-arranged plurality of fluid-flow passages 46 of the nozzle array disk 18b.

Referring to FIG. 11A, once the bubble generator subassembly 18 is assembled as described above, the bubble generator subassembly 18 is inserted into the axial passage 26 of the tube-shaped cylindrical body 16 such that, as seen in FIG. 11B: (1) the upstream-facing member 18c and the nozzle array disk 18b are arranged within the first axial passage portion 26a of the axial passage 26, and (2) the downstream-facing member 18a is arranged within the second axial passage portion 26b of the axial passage 26. As seen in FIG. 11B, the bubble generator subassembly 18 may be said to be fully inserted into the axial passage 26 when the downstream, proximal end surface 42b of the nozzle array disk 18b is disposed adjacent the shoulder surface 36 of the tube-shaped cylindrical body 16.

As seen in FIG. 11B, when the bubble generator subassembly 18 is fully inserted into the axial passage 26 as described above, the outer side surface 42c of the nozzle array disk 18b is disposed adjacent the first cylindrical surface 32 defined by the first axial passage portion 26a of the axial passage 26. By disposing the outer side surface 42c of the nozzle array disk 18b adjacent the first cylindrical surface 32 of the first axial passage portion 26a of the axial passage 26, the bubble generator subassembly 18 may be friction-fit or wedged in place with respect to the tube-shaped cylindrical body 16 such that the bubble generator subassembly 18 is axially centered about the central axis, A-A, extending through the tube-shaped cylindrical body 16.

Further, as seen in FIG. 11B, when the bubble generator subassembly 18 is fully inserted into the axial passage 26 as described above, the outer side surface 38c of the downstream-facing member 18a is arranged in a non-adjacent/spaced-apart relationship with respect to the second cylindrical surface 34 of the second axial passage portion 26b of the axial passage 26 due to the non-constant diameter, $D_{18a}$, of the outer side surface 38c being less than the second diameter, $D2_{26}$, of the second axial passage portion 26b. The non-adjacent/spaced-apart relationship described above thereby creates a downstream fluid-flow spacing 51 between the outer side surface 38c of the downstream-facing member 18a and the second cylindrical surface 34 of the second axial passage portion 26b of the axial passage 26. Further, because the non-constant diameter, $D_{18a}$, of the downstream-facing member 18a slightly reduces along the length, $L_{18a}$, of the downstream-facing member 18a, the downstream fluid-flow spacing 51 increases in a direction referenced from the upstream, distal end surface 38a of the downstream-facing member 18a toward the downstream, proximal end surface 38b of the downstream-facing member 18a.

Yet even further, as seen in FIG. 11B, when the bubble generator subassembly 18 is fully inserted into the axial passage 26 as described above, the outer side surface 48c of the upstream-facing member 18c is arranged in a non-adjacent/spaced-apart relationship with respect to the first cylindrical surface 32 of the first axial passage portion 26a of the axial passage 26 due to the non-constant diameter, $D_{18c}$, of the outer side surface 48c being less than the second diameter, $D1_{26}$, of the first axial passage portion 26a. The non-adjacent/spaced-apart relationship described above thereby creates an upstream fluid-flow spacing 53 between the outer side surface 48c of the upstream-facing member 18c and the first cylindrical surface 32 of the first axial passage portion 26a of the axial passage 26. Further, because the non-constant diameter, $D_{18c}$, of the upstream-facing member 18c slightly increases along the length, $L_{18a}$, of the upstream-facing member 18c, the upstream fluid-flow spacing 53 decrease in a direction referenced from the upstream, distal end surface 48a of the upstream-facing member 18c toward the downstream, proximal end surface 48b of the downstream-facing member 18a.

Referring to FIG. 11C, once the bubble generator subassembly 18 is fully inserted into the axial passage 26 of the tube-shaped cylindrical body 16 as described above, the tube-shaped, cylindrical spacer sleeve 20 is inserted into the first axial passage portion 26a of the axial passage 26. When the tube-shaped, cylindrical spacer sleeve 20 is inserted into the first axial passage portion 26a of the axial passage 26, the outer side surface 52c of the tube-shaped, cylindrical spacer sleeve 20 is disposed adjacent the first cylindrical surface 32 defined by the first axial passage portion 26a of the axial passage 26. When the tube-shaped, cylindrical spacer sleeve 20 is inserted into the first axial passage portion 26a of the axial passage 26 as described above, the outer side surface 48c of the upstream-facing member 18c is arranged in a non-adjacent/spaced-apart relationship with respect to the inner passage surface 52d of the tube-shaped, cylindrical spacer sleeve 20 due to the non-constant diameter, $D_{18c}$, of the outer side surface 48c being less than the passage diameter, $D_{54}$, defined by the inner passage surface 52d of the tube-shaped, cylindrical spacer sleeve 20; as a result, the upstream fluid-flow spacing 53 between the outer side surface 48c of the upstream-facing member 18c and the first cylindrical surface 32 of the first axial passage portion 26a of the axial passage 26 is slightly reduced according to the circumferential thickness of the tube-shaped, cylindrical spacer sleeve 20.

With continued reference to FIG. 11C, prior to attaching the retaining member 24 to the tube-shaped cylindrical body 16 with the one or more threaded fasteners, F, the laminar flow bubble generator disk 22 is inserted through the outlet opening 66b formed in the downstream, proximal end surface 62b of the retaining member 24 such that (as seen in FIG. 11D) the laminar flow bubble generator disk 22 is arranged within the second axial passage portion 64b of the axial passage 64 of the retaining member 24. The laminar flow bubble generator disk 22 may be said to be fully inserted into the axial passage 64 when the upstream, distal end surface 56a of the laminar flow bubble generator disk 22 is disposed adjacent the shoulder surface 74 of the retaining member 24.

Referring to FIG. 11D, when the laminar flow bubble generator disk 22 is fully inserted into the axial passage 64 as described above, the outer side surface 56c of the laminar flow bubble generator disk 22 is disposed adjacent the second cylindrical surface 74 defined by the second axial passage portion 64b of the axial passage 64. By disposing the outer side surface 56c of the laminar flow bubble generator disk 22 adjacent the second cylindrical surface 74 of the second axial passage portion 64b of the axial passage 64, the laminar flow bubble generator disk 22 may be friction-fit or wedged in place with respect to the retaining member 24 such that the laminar flow bubble generator disk 22 is axially centered about the central axis, A-A, extending through the retaining member 24.

Referring to FIGS. 11D-11E, the bubble generator subassembly 18 and the tube-shaped, cylindrical spacer sleeve 20 are secured within the axial passage 26 by attaching the retaining member 24 (including the laminar flow bubble generator disk 22 arranged within the second axial passage portion 64b of the axial passage 64 of the retaining member 24) to the tube-shaped cylindrical body 16 with the one or more threaded fasteners, F, by inserting the one or more threaded fasteners, F, through the one or more threaded passages 30, 68 of the tube-shaped cylindrical body 16 and the retaining member 24. Referring to FIG. 11F, once the retaining member 24 is joined to the tube-shaped cylindrical body 16 with the one or more threaded fasteners, F, the downstream, proximal end surface 62b of the retaining member 24 is disposed directly adjacent the upstream, distal end surface 16a of the tube-shaped cylindrical body 16.

Referring to FIG. 11F, once the bubble generator subassembly 18 and the tube-shaped, cylindrical spacer sleeve 20 are secured within the axial passage 26 by attaching the retaining member 24, the upstream, distal end surface 52a of the tube-shaped, cylindrical spacer sleeve 20 is disposed adjacent the downstream, proximal end surface 56b of the laminar flow bubble generator disk 22. As described above, the downstream, proximal end surface 52b of the tube-shaped, cylindrical spacer sleeve 20 is disposed adjacent the upstream, distal end surface 42a of the nozzle array disk 18b. As a result of the tube-shaped, cylindrical spacer sleeve 20 arranged between and directly contacting both of the laminar flow bubble generator disk 22 and the nozzle array disk 18b, the tube-shaped, cylindrical spacer sleeve 20 prevents upstream axial movement of the bubble generator subassembly 18 relative to the tube-shaped cylindrical body 16. For example, the tube-shaped, cylindrical spacer sleeve 20 prevents a portion of the upstream-facing member 18c of the bubble generator subassembly 18 from axially migrating upstream relative to the tube-shaped cylindrical body 16 and into the axial passage 58 of the laminar flow bubble generator disk 22.

In some implementations, as seen in, for example, FIGS. 11C-11D, the downstream, proximal end surface 62b of the retaining member 24 may include a seal member 76 that fluidly seals a seam 78 (see, e.g., FIGS. 11E-11F) created by arrangement of the downstream, proximal end surface 62b of the retaining member 24 adjacent the upstream, distal end surface 16a of the tube-shaped cylindrical body 16. Although an embodiment of the invention described above utilizes one or more threaded fasteners, F, for attaching the retaining member 24 to the tube-shaped cylindrical body 16, other attachment means other than one or more fasteners may be utilized, such as, for example, a welded connection of the retaining member 24 to the tube-shaped cylindrical body 16.

Referring to FIG. 2A, once the bubble implosion reactor cavitation device 10 is assembled as described above (and seen at FIG. 11F), the bubble implosion reactor cavitation device 10 may be connected to a fluid handling system, such as, for example the fluid handling system, S1/S2, described above. Once the bubble implosion reactor cavitation device 10 is connected to the fluid handling system, S1/S2, liquid, L, may enter the fluid-flow passage 12 of the bubble implosion reactor cavitation device 10 at the inlet opening 14a of the bubble implosion reactor cavitation device 10, and, the liquid, L, may exit fluid-flow passage 12 of the bubble implosion reactor cavitation device 10 at the outlet opening 14b of the bubble implosion reactor cavitation device 10.

With continued reference to FIG. 2A, the structural arrangement and dimensions of components 16-24 defines the geometry fluid-flow passage 12, which forms a plurality of processing zones I-IX (see FIG. 2B) along the length, $L_{10}$, of the bubble implosion reactor cavitation device 10. From the upstream, distal end 10a of the bubble implosion reactor cavitation device 10 to the downstream, proximal end 10b of the bubble implosion reactor cavitation device 10, the fluid-flow passage 12 is defined by: (1) the axial passage 64 extending through the retaining member 24, (2) the axial passage 58 and the plurality of fluid-flow passages 60 of the laminar flow bubble generator disk 22, (3) the upstream fluid-flow spacing 53 formed by the non-adjacent/spaced-apart relationship of the outer side surface 48c of the upstream-facing member 18c of the bubble generator subassembly 18 with respect to the inner passage surface 52d of the tube-shaped, cylindrical spacer sleeve 20, (4) the plurality of fluid-flow passages 46 of the nozzle array disk 18b, (5) the downstream fluid-flow spacing 51 formed by the non-adjacent/spaced-apart relationship of the outer side surface 38c of the downstream-facing member 18a of the bubble generator subassembly 18 with respect to the second cylindrical surface 34 of the second axial passage portion 26b of the axial passage 26 of the tube-shaped cylindrical body 16, and (6) a remainder $26_R$ of the axial passage 26 of the tube-shaped cylindrical body 16 extending between a peak 80 defined by the hemispherical shape of the downstream, proximal end surface 38b of the downstream-facing member 18a of the bubble generator subassembly 18 and the outlet opening 28b formed in the downstream, proximal end surface 16b of the tube-shaped cylindrical body 16.

Figure 12:
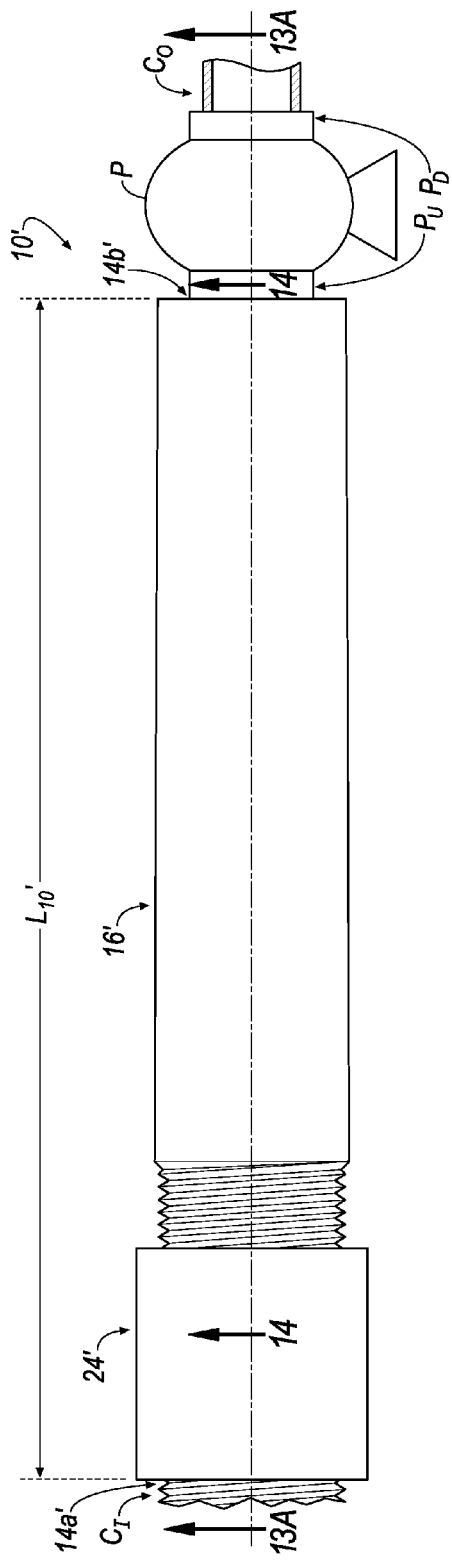
FIG. 12 is a side view of an exemplary bubble implosion reactor cavitation device connected to a fluid handling system.
Figure 13A:
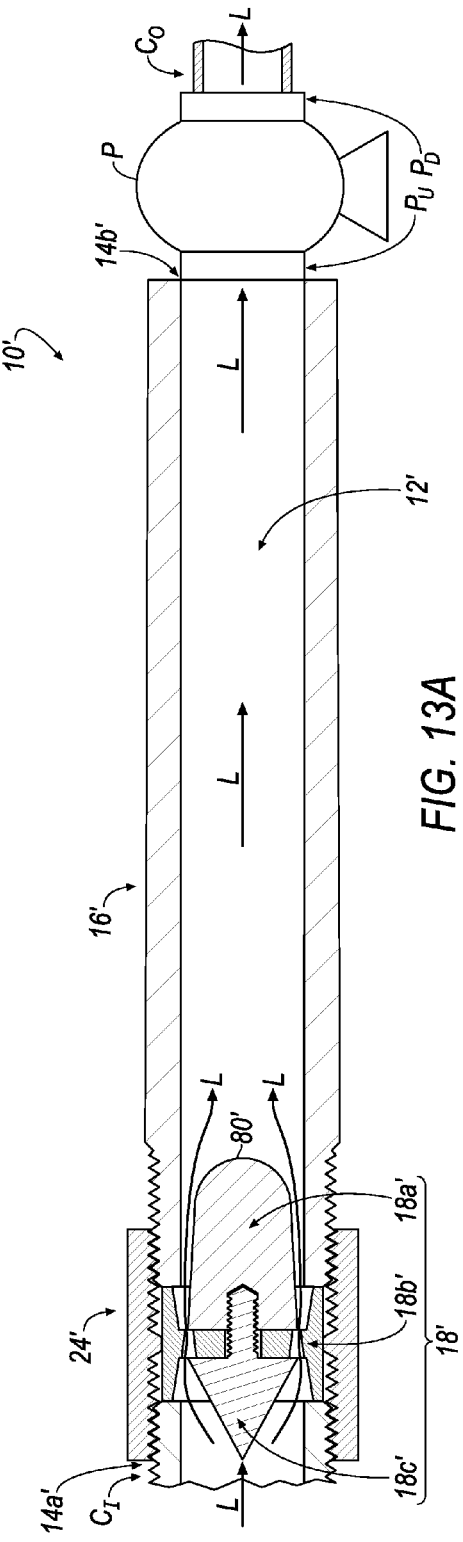
FIG. 13A is a cross-sectional view of the bubble implosion reactor cavitation device and fluid handling system according to line 13A-13A of FIG. 12.
Figure 13B:
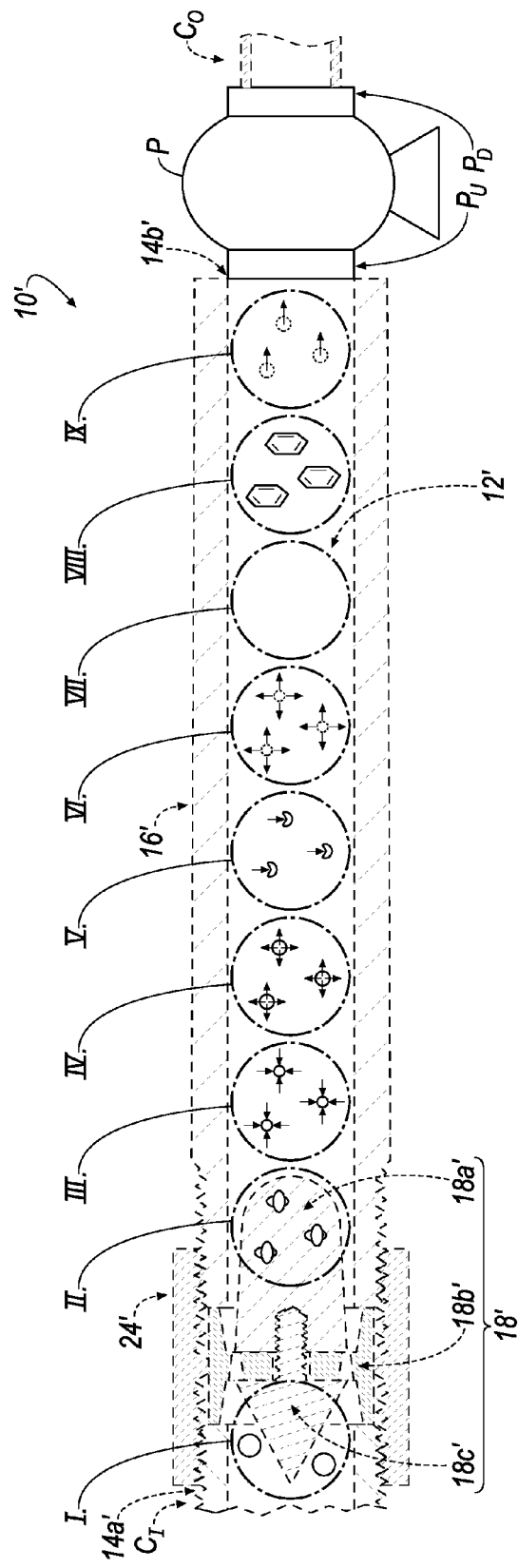
FIG. 13B is a phantom cross-sectional view of FIG. 13A showing plurality of fluid processing zones.

FIGS. 12-13B illustrate an exemplary implementation of a bubble implosion reactor cavitation device, which is shown generally at 10'. A fluid is permitted to flow through a passage 12' (see, e.g., FIGS. 13A-13B) formed by the bubble implosion reactor cavitation device 10' such that the bubble implosion reactor cavitation device 10' may process the fluid. In some implementations, the fluid may be a gas or a liquid, L (see, e.g., FIG. 13A). Any desirable liquid, L, may be processed by the bubble implosion reactor cavitation device 10', such as, for example: water, waste-water, a chemical solution, a bio-medical solution, crude petroleum, a petroleum product, bio-fuel, bio-diesel, jet fuel (kerosene), blend jet fuel or the like. Although a liquid, L, is described being processed by the bubble implosion reactor cavitation device 10' in the following disclosure, the bubble implosion reactor cavitation device 10' is not limited to processing a liquid, L, and, as such, the bubble implosion reactor cavitation device 10' may be utilized to process any desirable fluid such as, for example, a gas or a blend media such as, for example, gas-liquid solutions, liquid-liquid solutions and liquid-solid particle solutions.

The liquid, L, enters the bubble implosion reactor cavitation device 10' at an inlet opening 14a' formed by an upstream, distal end 10a' of the bubble implosion reactor cavitation device 10'. The liquid, L, exits the bubble implosion reactor cavitation device 10' at an outlet opening 14b' formed by a downstream, proximal end 10b' of the bubble implosion reactor cavitation device 10'.

In an implementation, bubble implosion reactor cavitation device 10' is a component of a fluid handling system, an embodiment of which is shown generally at S1 in FIG. 30 or S2 in FIG. 31. The fluid handling system, S1/S2, includes a fluid-moving device, P (see also, e.g., FIGS. 12-13B), that "pulls" the liquid, L, through the fluid-flow passage 12' of the bubble implosion reactor cavitation device 10'; as a result, in an embodiment, there is very little if any positive pressure (with respect to atmospheric pressure) placed on the liquid, L, as the liquid, L, enters the fluid-flow passage 12' at the upstream, distal end 10a' of the bubble implosion reactor cavitation device 10'. In some implementations, the fluid-moving device, P, may be, for example, an electrically operated pump. In some instances, the pump, P, may be referred to as a "cavitation-inducing pump."

As seen in FIGS. 12-13B and 30-31, the "pulling" of the liquid, L, through the bubble implosion reactor cavitation device 10' may be achieved by arranging the suction side of the cavitation-inducing pump, P, downstream of the outlet opening 14b' of the bubble implosion reactor cavitation device 10' such that the pump, P, is fluidly-connected to the fluid-flow passage 12'. Therefore, in such an implementation, as the liquid, L, is drawn into the bubble implosion reactor cavitation device 10' at the inlet opening 14a', the liquid, L, is not moved through the bubble implosion reactor cavitation device 10' by being "pushed" through the inlet opening 14a', but, rather, the liquid, L, is "pulled" (or drawn) through the inlet opening 14a' as a result of the suction present at the distal end, $P_U$, of the cavitation-inducing pump, P, being arranged downstream of the outlet opening 14b'. Although the top portion of the fuel tank, FT, is shown vented to atmosphere, it is contemplated that efficiencies in the operation of the bubble implosion reactor cavitation device 10 may be gained by maintaining the pressure within the fuel tank, FT, at less than atmospheric pressure.

Although the cavitation-inducing pump, P, is said to be arranged downstream of the outlet opening 14b', such an implementation is exemplary and is related to an embodiment of the invention shown at FIGS. 12-13B. Accordingly, the cavitation-inducing pump, P, may be alternatively arranged within, for example, the fluid-flow passage 12' but slightly upstream of the outlet opening 14b', or, alternatively, the cavitation-inducing pump, P, may be arranged within, for example, the outlet opening 14b'.

As seen in FIGS. 13A-13B, a plurality of components 16'-24' forms the bubble implosion reactor cavitation device 10'. In an implementation, the components 16'-24' forming the bubble implosion reactor cavitation device 10' may include, for example: a tube-shaped cylindrical body 16', a bubble generator subassembly 18' and a retaining member 24'. The bubble generator subassembly 18' may include a downstream-facing member 18a', a nozzle array disk 18b' and an upstream-facing member 18c'.

One aspect of the structural arrangement and dimensions of components 16'-24' provides a method for processing the liquid, L, that is pulled through the fluid handling system, S1/S2, by the cavitation-inducing pump, P, for the purpose of destroying macro-clusters and contamination within the liquid, L. Another aspect of the structural arrangement and dimensions of the components 16'-24' provides a method for processing the liquid, L, that is pulled through the fluid handling system, S1/S2, by the cavitation-inducing pump, P, for the purpose of activating physical processes and chemical reactions within the liquid, L.

The exemplary liquid processing methodologies described above are a result of a geometry fluid-flow passage 12' that is formed by the structural arrangement and dimensions of components 16'-24' of the bubble implosion reactor cavitation device 10'. As seen in FIGS. 13A-13B, the geometry of the fluid-flow passage 12' changes along a length, $L_{10}$' (see, e.g., FIG. 12), of the bubble implosion reactor cavitation device 10'.

Referring to FIG. 13B, because the geometry of the fluid-flow passage 12' changes along the length, $L_{10}$', of the bubble implosion reactor cavitation device 10', the fluid-flow passage 12' forms a plurality of fluid processing zones I.-IX. along the length, $L_{10}$', of the bubble implosion reactor cavitation device 10'. The plurality of fluid processing zones I.-IX. may include a fluid flow restriction zone, I., that is followed by a fluid vacuum zone, II., and then followed by a fluid micro-bubble generation zone, III. When the liquid, L, is advanced to the micro-bubble generation zone, III., the bubble implosion reactor cavitation device 10' generates a plurality of near-vacuum micro-bubbles, B, within the liquid, L. As the liquid, L, is pulled through the bubble implosion reactor cavitation device 10', the liquid, L, then enters an expansion zone, IV., then a compression zone, V., then an implosion zone, VI., where the plurality of near-vacuum micro-bubbles, B, are: expanded, compressed and collapsed under pressure. After the plurality of near-vacuum micro-bubbles, B, are collapsed thereby generating a plurality of spherical implosions within the liquid, L, the plurality of spherical implosions result in a gas at the center of each micro-bubble of the plurality of micro-bubbles, B, being heated to an extremely high temperature, which generates a cascade of sono-luminescence light pulses within the liquid, L. The liquid, L, then enters a destruction zone, VII., then a reaction zone, VIII., then a mixing zone, IX.

In an embodiment shown in FIG. 30, the fluid handling system, S1, may be generally referred to as a "closed-loop" fluid handling system including: a fluid inlet conduit, $C_I$ (see also, e.g., FIGS. 12-13B), the bubble implosion reactor cavitation device 10', the cavitation-inducing pump, P, a fluid outlet conduit, $C_O$ (see also, e.g., FIGS. 12-13B), and a fuel tank, FT. As seen in FIG. 30, the fluid inlet conduit, $C_I$, fluidly connects a first fluid outlet, $FT_{O1}$, of the fuel tank, FT, to the upstream, distal end 10a' of the bubble implosion reactor cavitation device 10' such that the inlet opening 14a' of the bubble implosion reactor cavitation device 10' receives liquid, L, from the first fluid outlet, $FT_{O1}$, of the fuel tank, FT. An upstream, distal end, $P_U$ (see also, e.g., FIGS. 12-13B), of the cavitation-inducing pump, P, is arranged downstream of and is fluidly-connected to the outlet opening 14b' of the bubble implosion reactor cavitation device 10' for pulling the liquid, L, through the bubble implosion reactor cavitation device 10' as described above. The fluid outlet conduit, $C_O$, fluidly connects a downstream, proximal end, $P_D$ (see also, e.g., FIGS. 12-13B), of the cavitation-inducing pump, P, to a fluid inlet, $FT_I$, of the fuel tank, FT, for depositing the liquid, L, processed by the bubble implosion reactor cavitation device 10' back into the fuel tank, FT.

As seen in FIG. 30, the fuel tank, FT, may include a second fluid outlet, $FT_{O2}$. The second fluid outlet, $FT_{O2}$, of the fuel tank, FT, is connected to a processed liquid conduit, $C_P$, for supplying liquid, L, processed by the bubble implosion reactor cavitation device 10' to a fuel injection system, IS, of an engine, E, such as, for example, a diesel engine. A fuel pump, FP, may be arranged within the processed liquid conduit, $C_P$, for metering the processed liquid, L, from the fuel tank, FT, to the fuel injection system, IS.

In an embodiment shown in FIG. 31, the fluid handling system, S2, may be generally referred to as a "linear" fluid handling system including: a fuel tank, FT, a fluid inlet conduit, $C_I$ (see also, e.g., FIGS. 12-13B), the bubble implosion reactor cavitation device 10', the cavitation-inducing pump, P, a fluid outlet conduit, $C_O$ (see also, e.g., FIGS. 12-13B), and a zero backpressure device/liquid holding reservoir, R. As seen in FIG. 31, the fluid inlet conduit, $C_I$, fluidly connects a fluid outlet, $FT_O$, of the fuel tank, FT, to the upstream, distal end 10a' of the bubble implosion reactor cavitation device 10' such that the inlet opening 14a' of the bubble implosion reactor cavitation device 10' receives liquid, L, from the fluid outlet, $FT_O$, of the fuel tank, FT. An upstream, distal end, $P_U$ (see also, e.g., FIGS. 12-13B), of the cavitation-inducing pump, P, is arranged downstream of and is fluidly-connected to the outlet opening 14b' of the bubble implosion reactor cavitation device 10' for pulling the liquid, L, through the bubble implosion reactor cavitation device 10' as described above. The fluid outlet conduit, $C_O$, fluidly connects a downstream, proximal end, $P_D$ (see also, e.g., FIGS. 12-13B), of the cavitation-inducing pump, P, to the zero backpressure device/processed liquid holding reservoir, R, for retaining the processed liquid, L, therein (i.e., unlike the "closed loop" fluid handling system, S1, the processed liquid, L, is not returned to the fuel tank, FT, but, rather, is deposited into the processed liquid holding reservoir, R).

As seen in FIG. 31, the processed liquid holding reservoir, R, is connected to a processed liquid conduit, $C_P$, for supplying liquid, L, processed by the bubble implosion reactor cavitation device 10' to a fuel injection system, IS, of an engine, E, such as, for example, a diesel engine. A fuel pump, FP, may be arranged within the processed liquid conduit, $C_P$, for metering the processed liquid, L, from the processed liquid holding reservoir, R, to the fuel injection system, IS.

In an implementation, the liquid, L, may be diesel fuel. The processed diesel fuel, L, therefore, may result in an increase in the number of destructed/cracked hydrocarbons during the combustion process to thereby increase one or more of fuel quality, fuel efficiency, engine horsepower and torque. The processed diesel fuel, L, therefore, may result in an increase in the fuel mileage of a vehicle and reduce vehicle maintenance costs and wear-and-tear on engine components. In some implementations, the processed diesel fuel, L, may increase the fuel mileage of a vehicle by approximately about 25%-45%. Further, in some implementations, the processed diesel fuel, L, may also result in reduced emission elements (e.g., $CO_R$, HC, $NO_R$, $SO_x$, Pb and PM (particulate matter)) from, for example, motor vehicles. Accordingly, in some implementations, the processed diesel fuel, L, may reduce emission elements by approximately 25-35%.

In an implementation, the liquid, L, may be any blend biodiesel (e.g., biodiesel ranging between approximately 5% to 50% and petroleum diesel fuel ranging between approximately 50% to 95%). The bubble implosion reactor cavitation device 10', therefore, may be utilized for processing the blend biodiesel, L, in a storage tank of a depot/fueling station and/or in-line on board of vehicle. The processed blend biodiesel, L, therefore, may result in an increase in the number of destructed/cracked hydrocarbons during the combustion process to thereby increase one or more of fuel quality, fuel efficiency, engine horsepower and maintenance costs and wear-and-tear on engine components. Further, in some implementations, the processed blend biodiesel, L, may also result in reduced emission elements (e.g., $CO_x$, HC, $NO_R$, $SO_x$, Pb and PM (particle matter)) which causes pollution coming from diesel engines.

In an implementation, the liquid, L, may be gasoline. The bubble implosion reactor cavitation device 10, therefore, may be utilized for processing the gasoline, L, in a storage tank of a depot/fueling station and/or in-line between a fuel tank and an engine. In a refinery industry application, the bubble implosion reactor cavitation device 10, therefore, may be utilized for processing the strain-run fraction of the gasoline, L. The processed gasoline, L, therefore, may result in an increase in the number of destructed/cracked hydrocarbons during the combustion process to thereby increase one or more of fuel quality, fuel efficiency, engine horsepower and octane, which may result in reduced vehicle maintenance costs and wear-and-tear on engine components. Further, in some implementations, the processed gasoline, L, may also result in reduced emission elements (e.g., $CO_x$, HC, $NO_x$, $SO_x$, Pb and PM (particle matter)), which causes pollution coming from motor vehicles. In some implementations, the bubble implosion reactor cavitation device 10 may increase the octane number of the strain-run fraction gasoline by approximately about 12%.

In an implementation, the liquid, L, may be jet fuel (kerosene). The bubble implosion reactor cavitation device 10, therefore, may be utilized for processing the jet fuel (kerosene), L, in a storage tank and/or in-line between a jet fuel tank and a jet engine. The processed jet fuel (kerosene), L, therefore, may result in an increase in the number of destructed/cracked hydrocarbons during the combustion process to thereby increase one or more of fuel quality, fuel efficiency, engine horsepower in order to reduce maintenance costs and wear-and-tear on engine components. Further, in some implementations, the processed blend jet fuel (kerosene), L, may also result in reduced emission elements (e.g., $CO_x$, HC, $NO_x$, $SO_x$, Pb and PM (particle matter)), which causes pollution coming from jet engines.

In an implementation, the liquid, L, may be blend jet fuel (e.g., approximately about 50% kerosene and approximately about 50% bio-fuel). The bubble implosion reactor cavitation device 10, therefore, may be utilized for processing the blend jet fuel, L, in a storage tank and/or in-line between a jet fuel tank and a jet engine. The processed blend jet fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. Further, in some implementations, the processed blend jet fuel, L, may also result in reduced emission elements (e.g., $CO_x$, HC, $NO_x$, $SO_x$, Pb and PM (particle matter)), which causes pollution coming from jet engines.

In an implementation, the liquid, L, may be any blend multi-fuel. A blend multi-fuel may include several components such as, for example: diesel fuel, gasoline, kerosene, alcohol, water or the like. The bubble implosion reactor cavitation device 10, therefore, may be utilized for processing the blend multi-fuel, L, in a storage tank and/or in-line on board of a vehicle. The processed blend multi-fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. Further, in some implementations, the processed blend multi-fuel, L, may also result in reduced emission elements (e.g., $CO_x$, HC, $NO_x$, $SO_x$, Pb and PM (particle matter)), which causes pollution coming from diesel engines.

In an implementation, the liquid, L, may be any blend emulsified fuel. A blend emulsified fuel may include several components such as, for example: 75%-95% diesel fuel and 5%-25% water. The bubble implosion reactor cavitation device 10, therefore, may be utilized for processing the blend emulsified fuel, L, in a storage tank and/or in-line on board of a vehicle. The processed blend emulsified fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. In some implementations, a processed blend emulsified fuel, L, may include approximately about 85% petroleum fuel and approximately about 15% water in order to increase the fuel mileage of a vehicle, locomotive and ship in excess of 15%. Further, in some implementations, the processed blend emulsified fuel, L, may also result in reduced emission elements (e.g., $CO_x$, HC, $NO_x$, $SO_x$, Pb and PM (particle matter)), which causes pollution coming from diesel engines. In some implementations, the processed blend emulsified fuel, L, including approximately about 85% petroleum fuel and approximately about 15% water may reduce emissions in excess of 15%.

In some implementations, the fluid handling systems S1 or S2 may include an additive tank, AT, in fluid communication with the fluid inlet conduit, $C_I$. The additive tank, AT, may be connected to the fluid inlet conduit, $C_I$, in any desirable manner, such as, for example, by way of an injector nozzle, port or the like. The additive tank, AT, may contain an additive (e.g., water, methanol or the like) that permits emulsification of gas-to-liquid, liquid-to-liquid, or liquid-to solids based on application requirements. In a diesel application, for example, the additive tank, AT, may provide water and/or methanol upstream of the cavitation device 10, 10', 10'' at the fluid inlet conduit, $C_I$, which may result in increased vehicle fuel mileage and/or reduced emissions. Other commercial applications may include, for example, permanent emulsions of fuel to water or other commercial applications in the water treatment industry, the pharmaceutical industry, the chemical industry and the food industry.

In some implementations, the fluid handling systems S1 or S2 may include a controller, CT, communicatively coupled with the injection system, IS, of the engine, E. The controller, CT, may adapt existing signals from a variety of outputs and optimize injection system, IS, of the engine, E, through either: signal conditioning, signal modulation or digital modification in order to change the frequency or quantity of injected material to the engine, E, within a prescribed formula resulting in a permanent emulsion or blend of, for example: gas-to-gas, gas-to-liquid or gas-to-solid combinations thereby generating improved efficiencies of settling in medications, fuels, water reclamation and food products. The controller, CT, may read inputs, and, through a control module, can monitor various system characteristics and deliver the prescribed formulation to read a desired result.

Figure 14:
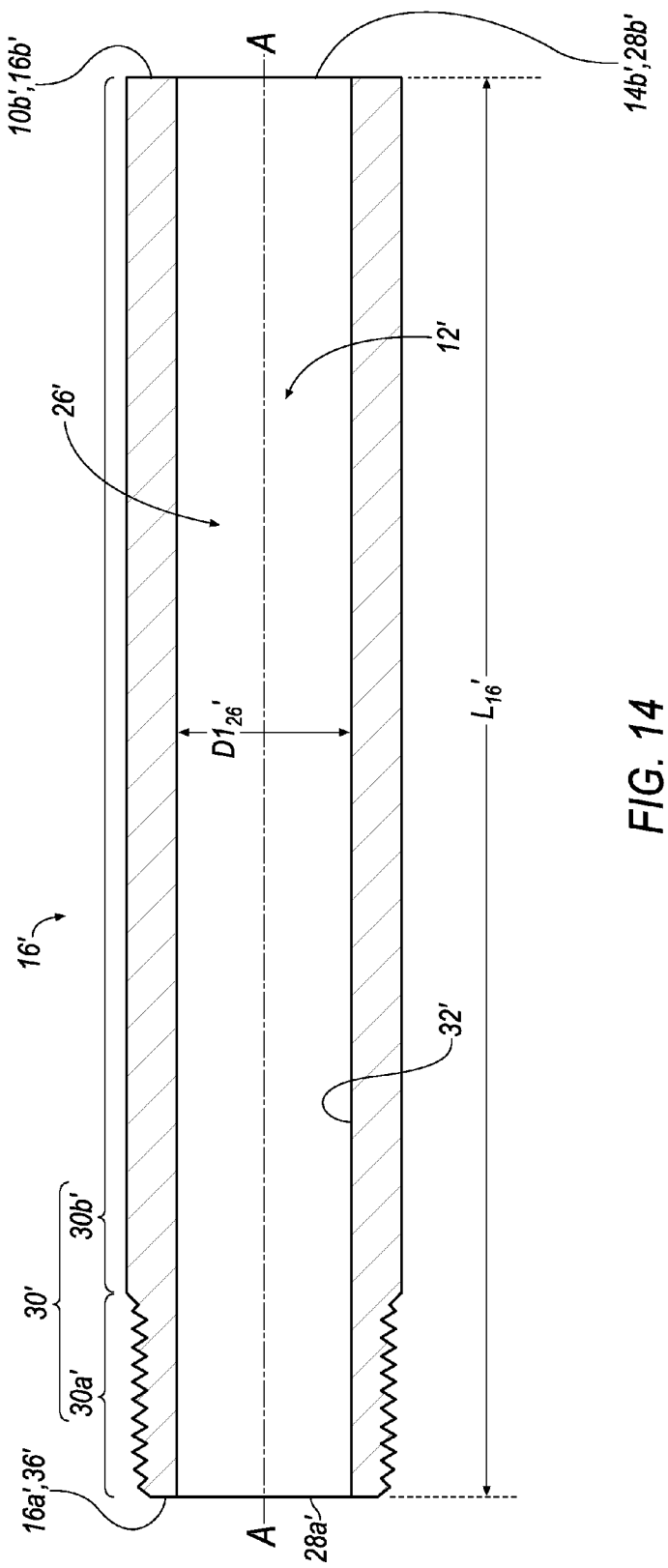
FIG. 14 is a cross-sectional view of an exemplary tube-shaped cylindrical body of the bubble implosion reactor cavitation device of FIG. 13A.

Referring to FIG. 14, an implementation of the tube-shaped cylindrical body 16' is described. The tube-shaped cylindrical body 16' includes an upstream, distal end surface 16a' and a downstream, proximal end surface 16b'. An axial passage 26' extends through the tube-shaped cylindrical body 16' between the upstream, distal end surface 16a' and the downstream, proximal end surface 16b' along an axis, A-A, that extends through the tube-shaped cylindrical body 16'.

Access to the axial passage 26' is permitted by an inlet opening 28a' formed in the upstream, distal end surface 16a' of the tube-shaped cylindrical body 16' and an outlet opening 28b' formed in the downstream, proximal end surface 16b' of the tube-shaped cylindrical body 16'. The outlet opening 28b' formed by downstream, proximal end surface 16b' of the tube-shaped cylindrical body 16' may also define the outlet opening 14b' of the bubble implosion reactor cavitation device 10', and, the downstream, proximal end surface 16b' of the tube-shaped cylindrical body 16' may also define the downstream, proximal end 10b' of the bubble implosion reactor cavitation device 10'.

An outer surface 30' of the tube-shaped cylindrical body 16' may extend along a length, $L_{16}'$, of the tube-shaped cylindrical body 16' between the upstream, distal end surface 16a' and the downstream, proximal end surface 16b' of the tube-shaped cylindrical body 16'. The outer surface 30' may include a first outer surface portion 30a' extending from the upstream, distal end surface 16a' of the tube-shaped cylindrical body 16' and a second outer surface portion 30b' extending from the downstream, proximal end surface 16b' of the tube-shaped cylindrical body 16'. The first outer surface portion 30a' forms a threaded surface portion.

The axial passage 26' that extends through the tube-shaped cylindrical body 16' may be defined by a cylindrical surface 32' thereby forming the axial passage 26' to include diameter, $D1_{26}'$. The upstream, distal end surface 16a' of the tube-shaped cylindrical body 16' may also be referred to as a shoulder surface 36'; as will be described in the following disclosure, a first downstream, proximal end surface portion $42b_1'$ (see, e.g., FIG. 16D) of a downstream, proximal end surface $42b'$ of the nozzle array disk $18b'$ is disposed adjacent the shoulder surface $36'$ (see, e.g., FIG. 20D) of the tube-shaped cylindrical body $16'$ when the bubble generator subassembly $18'$ is fully inserted into the axial passage $26'$ of the tube-shaped cylindrical body $16'$.

Referring to FIGS. 15A-15D, an implementation of the downstream-facing member $18a'$ of the bubble generator subassembly $18'$ is described. The downstream-facing member $18a'$ of the bubble generator subassembly $18'$ may be defined by a length, $L_{18a}'$ (see, e.g., FIGS. 15A and 15D), extending between an upstream, distal end surface $38a'$ and a downstream, proximal end surface $38b'$. An outer side surface $38c'$ connects the upstream, distal end surface $38a'$ to the downstream, proximal end surface $38b'$.

The outer side surface $38c'$ defines a first portion, $L_{18a-1}'$, of the length, $L_{18a}'$, of the downstream-facing member $18a'$. The outer side surface $38c'$ defines the downstream-facing member $18a'$ to include a substantially cylindrical shape defined by a non-constant diameter, $D_{18a}'$ (see, e.g., FIG. 15A). In an implementation the non-constant diameter, $D_{18a}'$, slightly reduces along the first portion, $L_{18a-1}'$, of the length, $L_{18a}'$, of the downstream-facing member $18a'$ as the outer side surface $38c'$ extends from the upstream, distal end surface $38a'$ toward the downstream, proximal end surface $38b'$.

The downstream, proximal end surface $38b'$ defines a second portion, $L_{18a-2}'$, of the length, $L_{18a}'$, of the downstream-facing member $18a'$. The downstream, proximal end surface $38b'$ generally defines the downstream-facing member $18a'$ to include a hemispherical shape.

Unlike the hemispherical shape of the downstream, proximal end surface $38b'$, the upstream, distal end surface $38a'$ is generally defined by a planar shape. The planar shape of the upstream, distal end surface $38a'$ may be defined by a diameter that is equal to the largest diameter of the non-constant diameter, $D_{18a}'$, defined by the outer side surface $38c'$ of the downstream-facing member $18a'$.

Figure 15A:
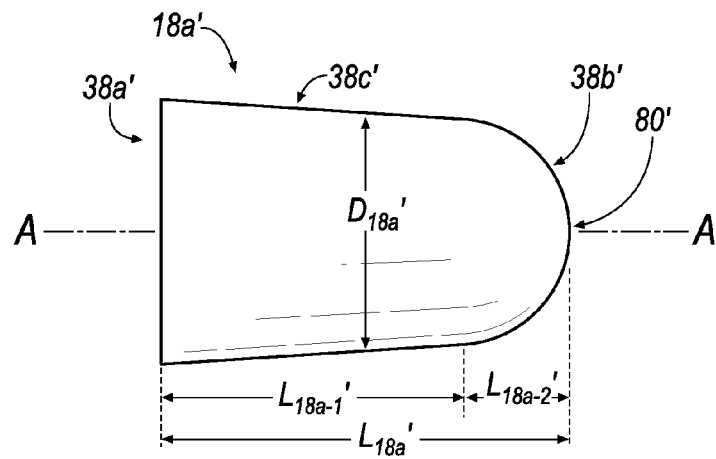
FIG. 15A is a side view of an exemplary downstream-facing member of a bubble generator subassembly of the bubble implosion reactor cavitation device of FIG. 12.
Figure 15B:
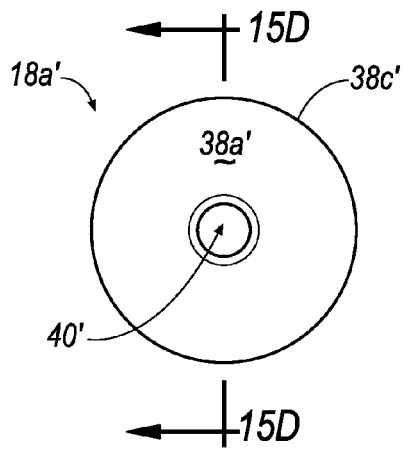
FIG. 15B is a front view of the downstream-facing member of the bubble generator subassembly of FIG. 15A.
Figure 15C:
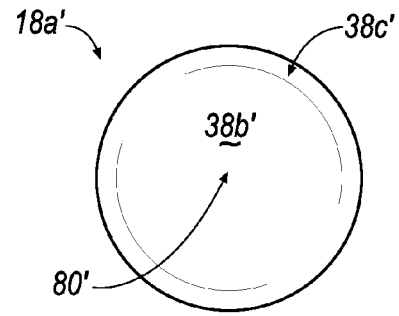
FIG. 15C is a rear view of the downstream-facing member of the bubble generator subassembly of FIG. 15A.
Figure 15D:
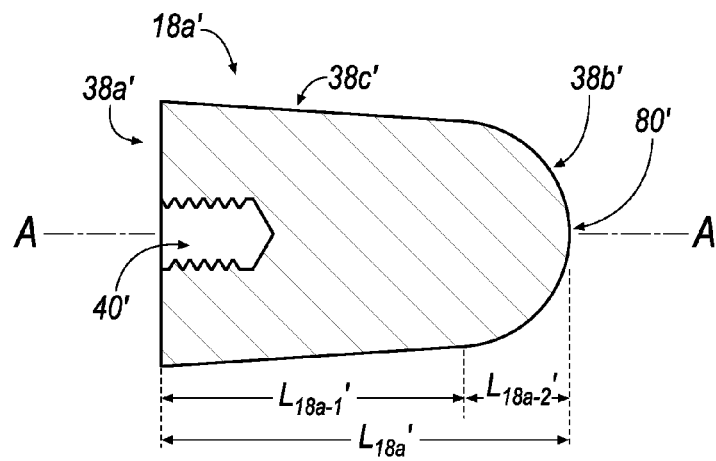
FIG. 15D is a cross-sectional view of the downstream-facing member of the bubble generator subassembly according to line 15D-15D of FIG. 15B.

Referring to FIGS. 15B and 15D, a threaded passage $40'$ extends partially into the first portion, $L_{18a-1}'$, of the length, $L_{18a}'$, of the downstream-facing member $18a'$ from the upstream, distal end surface $38a'$. The threaded passage $40'$ may be arranged along an axis, A-A, extending through an axial center of the downstream-facing member $18a'$.

Shown below is a table including four exemplary embodiments of the downstream-facing member $18a'$ including a variety of lengths, $L_{18a}'$, and diameters, $D_{18a}'$, described in inches.

TABLE 6

|  | Embodiment 1 | Embodiment 2 | Embodiment 3 | Embodiment 4 |
| --- | --- | --- | --- | --- |
| $L_{18a}'$ | 0.75" | 1.00" | 1.25" | 1.50" |
| $D_{18a}'$ | 0.60" | 0.85" | 0.93" | 1.00" |

Referring to FIGS. 16A-16E, an implementation of the nozzle array disk $18b'$ of the bubble generator subassembly $18'$ is described. The nozzle array disk $18b'$ of the bubble generator subassembly $18'$ is defined by a length, $L_{18b}'$ (see, e.g., FIGS. 16A and 16D), extending between an upstream, distal end surface $42a'$ and a downstream, proximal end surface $42b'$. An outer side surface $42c'$ connects the upstream, distal end surface $42a'$ to the downstream, proximal end surface $42b'$. The outer side surface $42c'$ defines the nozzle array disk $18b'$ to include a diameter, $D_{18b}'$ (see, e.g., FIGS. 16A and 16D).

Figure 16D:
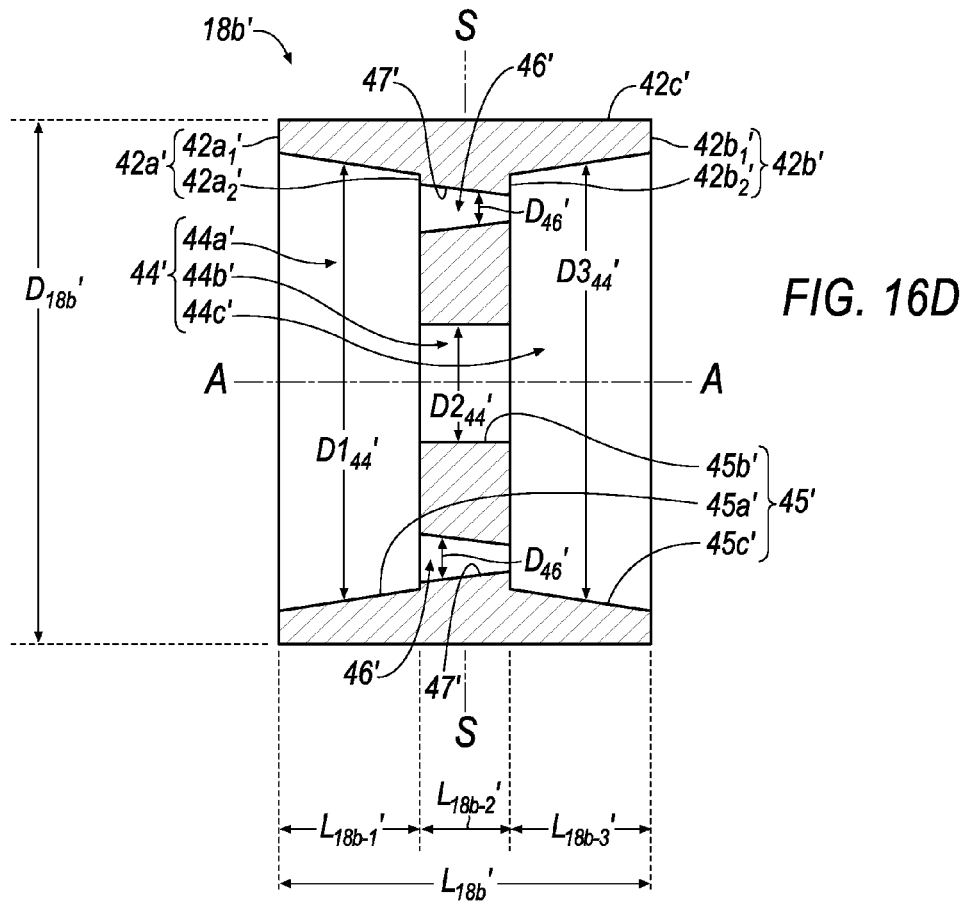
FIG. 16D is a cross-sectional view of the nozzle array disk of the bubble generator subassembly according to line 16D-16D of FIG. 16B.

Referring to FIG. 16D, an axial passage $44'$ extends through the nozzle array disk $18b'$ between the upstream, distal end surface $42a'$ and the downstream, proximal end surface $42b'$. The axial passage $44'$ is arranged along an axis, A-A, extending through an axial center of the nozzle array disk $18b'$. The axial passage $44'$ is defined by an inner surface $45'$ of the of nozzle array disk $18b'$.

In an implementation, the axial passage $44'$ is defined by a first axial passage portion $44a'$, a second axial passage portion $44b'$ and a third axial passage portion $44c'$. The inner surface $45'$ of the nozzle array disk $18b'$ includes a first inner surface portion $45a'$, a second inner surface portion $45b'$ and a third inner surface portion $45c'$.

As seen in FIG. 16D, the first inner surface portion $45a'$ defines the first axial passage portion $44a'$ and extends along a first length portion, $L_{18b-1}'$, of the length, $L_{18b}'$, of the nozzle array disk $18b'$. The second inner surface portion $45b'$ defines the second axial passage portion $44b'$ and extends along a second length portion, $L_{18b-2}'$, of the length, $L_{18b}'$, of the nozzle array disk $18b'$. The third inner surface portion $45c'$ defines the third axial passage portion $44c'$ and extends along a third length portion, $L_{18b-3}'$, of the length, $L_{18b}'$, of the nozzle array disk $18b'$. The sum of the first, second and third length portions, $L_{18b-1}'$, $L_{18b-2}'$ $L_{18b-3}'$, equals the length, $L_{18b}'$, of the nozzle array disk $18b'$.

With continued reference to FIG. 16D, the upstream, distal end surface $42a'$ of the nozzle array disk $18b'$ may include a first upstream, distal end surface portion $42a_1'$ and a second upstream, distal end surface portion $42a_2'$. The second upstream, distal end surface portion $42a_2'$ is axially offset from the first upstream, distal end surface portion $42a_1'$ at a distance equal to the first length portion, $L_{18b-1}'$, of the length, $L_{18b}'$, of the nozzle array disk $18b'$. The first inner surface portion $45a'$ defining the first axial passage portion $44a'$ connects the first upstream, distal end surface portion $42a_1'$ to the second upstream, distal end surface portion $42a_2'$.

The downstream, proximal end surface $42b'$ of the nozzle array disk $18b'$ may include a first downstream, proximal end surface portion $42b_1'$ and a second downstream, proximal end surface portion $42b_2'$. The second downstream, proximal end surface portion $42b_2'$ is axially offset from the first downstream, proximal end surface portion $42b_1'$ at a distance equal to the third length portion, $L_{18b-3}'$, of the length, $L_{18b}'$, of the nozzle array disk $18b'$. The third inner surface portion $45c'$ defining the third axial passage portion $44c'$ connects the first downstream, proximal end surface portion $42b_1'$ to the second downstream, proximal end surface portion $42b_2'$.

As described above, the second inner surface portion $45b'$ extends along the second length portion, $L_{18b-2}'$, of the length, $L_{18b}'$, of the nozzle array disk $18b'$. The second length portion, $L_{18b-2}'$, of the length, $L_{18b}'$, of the nozzle array disk $18b'$ is arranged between the first length portion, $L_{18b-1}'$, and the third length portion, $L_{18b-3}'$, of the length, $L_{18b}'$, of the nozzle array disk $18b'$; as a result, the second inner surface portion $45b'$ connects the second upstream, distal end surface portion $42a_2'$ of the upstream, distal end surface $42a'$ to the second downstream, proximal end surface portion $42b_2'$ of the downstream, proximal end surface $42b'$.

The first inner surface portion $45a'$ defines the first axial passage portion $44a'$ to include a first diameter, $D1_{44}'$. The second inner surface portion $45b'$ defines the second axial passage portion 44b' to include a second diameter, D2$_{44}$'. The third inner surface portion 45c' defines the third axial passage portion 44c' to include a third diameter, D3$_{44}$'.

In an implementation, the first diameter, D1$_{44}$', is a non-constant diameter. The non-constant diameter, D1$_{44}$', defined by the first axial passage portion 44a' decreases along the first length portion, L$_{18b-1}$', of the length, L$_{18b}$', of the nozzle array disk 18b' as the first axial passage portion 44a' extends through the nozzle array disk 18b' in a direction referenced from the upstream, distal end surface 42a' toward the downstream, proximal end surface 42b'; as a result, the first axial passage portion 44a' generally defines a conical passage that decreases in cross-section as the first axial passage portion 44a' extends through the nozzle array disk 18b' in a direction referenced from the upstream, distal end surface 42a' toward the downstream, proximal end surface 42b'.

In an implementation, the second diameter, D2$_{44}$', is a constant diameter. Accordingly, the constant diameter, D2$_{44}$', defined by the second axial passage portion 44b' is substantially the same along the second length portion, L$_{18b-2}$', of the length, L$_{18b}$', of the nozzle array disk 18b' as the second axial passage portion 44b' extends through the nozzle array disk 18b' in a direction referenced from the upstream, distal end surface 42a' toward the downstream, proximal end surface 42b'.

In an implementation, the third diameter, D3$_{44}$', is a non-constant diameter. The non-constant diameter, D3$_{44}$', defined by the third axial passage portion 44c' increases along the third length portion, L$_{18b-3}$', of the length, L$_{18b}$', of the nozzle array disk 18b' as the third axial passage portion 44c' extends through the nozzle array disk 18b' in a direction referenced from the upstream, distal end surface 42a' toward the downstream, proximal end surface 42b'; as a result, the third axial passage portion 44c' generally defines a conical passage that increases in cross-section as the third axial passage portion 44c' extends through the nozzle array disk 18b' in a direction referenced from the upstream, distal end surface 42a' toward the downstream, proximal end surface 42b'.

Referring to FIGS. 16B-16D, the nozzle array disk 18b' includes a plurality of fluid-flow passages 46'. An axial center of each fluid flow passage 46' of the plurality of fluid-flow passages 46' may be equally spaced from the axial center of the nozzle array disk 18b' at a radius, R$_{18b}$' (see, e.g., FIGS. 16B-16C), to form a circular array/arrangement of fluid-flow passages 46'.

Referring to FIG. 16D, each fluid flow passage 46' of the plurality of fluid-flow passages 46' is defined by a nozzle surface 47'. The nozzle surface 47' defining each fluid flow passage 46' of the plurality of fluid-flow passages 46' extends along the second length portion, L$_{18b-2}$', of the length, L$_{18b}$', of the nozzle array disk 18b'. Because the second length portion, L$_{18b-2}$', of the length, L$_{18b}$', of the nozzle array disk 18b' is arranged between the first length portion, L$_{18b-1}$', and the third length portion, L$_{18b-3}$', of the length, L$_{18b}$', of the nozzle array disk 18b' as described above, the nozzle surface 47' defining each fluid flow passage 46' of the plurality of fluid-flow passages 46' connects the second upstream, distal end surface portion 42a$_2$' of the upstream, distal end surface 42a' to the second downstream, proximal end surface portion 42b$_2$' of the downstream, proximal end surface 42b'.

As seen in FIG. 16D, the nozzle surface 47' defines each fluid flow passage 46' of the plurality of fluid-flow passages 46' to include a nozzle diameter, D$_{46}$'. In an implementation, the nozzle diameter, D$_{46}$', of each fluid flow passage 46' of the plurality of fluid-flow passages 46' is a non-constant diameter. The non-constant nozzle diameter, D$_{46}$', decreases along the second length portion, L$_{18b-2}$', of the length, L$_{18b}$', of the nozzle array disk 18b' as each fluid flow passage 46' of the plurality of fluid-flow passages 46' extends through the nozzle array disk 18b' in a direction referenced from the upstream, distal end surface 42a' toward the downstream, proximal end surface 42b'; as a result, each fluid flow passage 46' of the plurality of fluid-flow passages 46' generally defines a conical passage that decreases in cross-section as each fluid flow passage 46' of the plurality of fluid-flow passages 46' extends through the nozzle array disk 18b' in a direction referenced from the upstream, distal end surface 42a' toward the downstream, proximal end surface 42b'.

With continued reference to FIG. 16D, in an implementation, the non-constant diameter, D1$_{44}$', defined by the conical first axial passage portion 44a' may be symmetrical to the non-constant diameter, D3$_{44}$', defined by the conical third axial passage portion 44c' (in reference to a line of symmetry, S-S, passing through the nozzle array disk 18b'); therefore, the non-constant diameter, D1$_{44}$', defined by the conical first axial passage portion 44a' may be said to be symmetrically equal to the non-constant diameter, D3$_{44}$', defined by the conical third axial passage portion 44c'. The largest diameter of the non-constant nozzle diameter, D$_{46}$', of each conical fluid flow passage 46' is less than a smallest diameter of each of: (1) the non-constant diameter, D1$_{44}$', defined by the conical first axial passage portion 44a' and (2) the non-constant diameter, D3$_{44}$', defined by the conical third axial passage portion 44c'. In an implementation, the non-constant nozzle diameter, D$_{46}$', may be proportional to the non-constant diameter, D1$_{44}$'; therefore, proportionally, the non-constant nozzle diameter, D$_{46}$', of each conical fluid flow passage 46' of the plurality of conical fluid-flow passages 46' may range be approximately about one-sixteenth (1/16) to one-tenth (1/10) of non-constant diameter, D1$_{44}$', defined by the conical first axial passage portion 44a'.

Figure 16E:
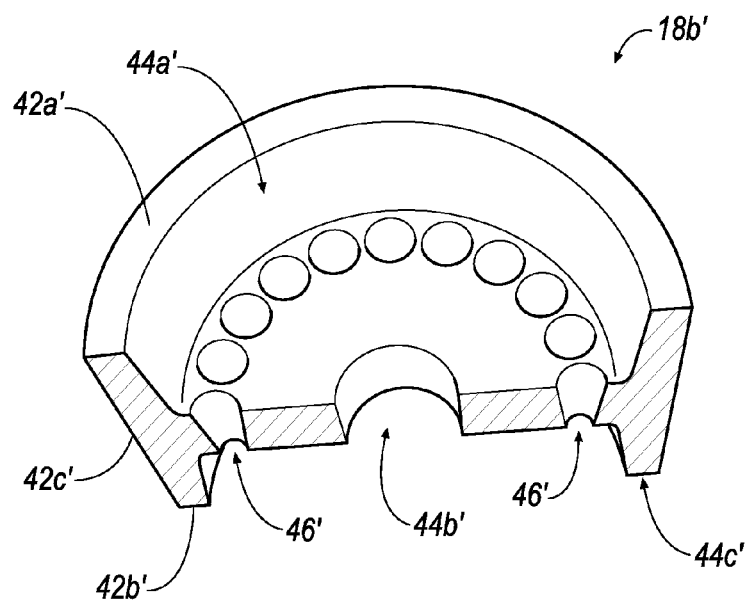
FIG. 16E is a perspective cross-sectional view of the nozzle array disk of the bubble generator subassembly according to line 16D-16D of FIG. 16B.

As seen in FIGS. 16D-16E, the plurality of conical fluid flow passages 46' fluidly connects the conical first axial passage portion 44a' to the conical third axial passage portion 44c'. Therefore, as the liquid, L, flows through the nozzle array disk 18b' in a direction referenced from the upstream, distal end surface 42a' toward the downstream, proximal end surface 42b', the liquid, L, is permitted to travel: (1) firstly through a first conical passage (i.e., the conical first axial passage portion 44a' that decreases in cross-section in a direction referenced from the upstream, distal end surface 42a' toward the downstream, proximal end surface 42b', then (2) secondly through a circular array of conical nozzle passages (i.e., the plurality of conical fluid flow passages 46') that decreases in cross-section in a direction referenced from the upstream, distal end surface 42a' toward the downstream, proximal end surface 42b', and then (3) thirdly through a second conical passage (i.e., the conical third axial passage portion 44c') that increases in cross-section in a direction referenced from the upstream, distal end surface 42a' toward the downstream, proximal end surface 42b'. As will be described in the following disclosure, the liquid, L, does not flow through the second axial passage portion 44b' due to the second axial passage portion 44b' being utilized for permitting a threaded stem 50' (see, e.g., FIG. 17D) of the upstream-facing member 18c' to pass therethrough for connecting the threaded stem 50' of the upstream-facing member 18c' to the threaded passage 40' of the downstream-facing member 18a'.

Shown below is a table including an exemplary embodiment of dimensions of the conical nozzle array disk 18b' described in inches.

TABLE 7

| | Embodiment 1 |
|---|---|
| $L_{18b}'$ | 0.80" |
| $L_{18b-1}'$ | 0.30" |
| $L_{18b-2}'$ | 0.20" |
| $L_{18b-3}'$ | 0.30" |
| $D_{18b}'$ | 1.14" |
| $D1_{44}'$ | Between 0.96" and 1.04" |
| $D2_{44}'$ | 0.15" |
| $D3_{44}'$ | Between 0.96" and 1.04" |
| $D_{46}'$ | Between 0.08" and 0.15" |
| $R_{18b}'$ | 0.43" |

Referring to FIGS. 17A-17D, an implementation of the upstream-facing member 18c' of the bubble generator subassembly 18' is described. The upstream-facing member 18c' of the bubble generator subassembly 18' is defined by a length, $L_{18c}'$ (see, e.g., FIGS. 17A and 17D), extending between an upstream, distal end surface 48a' and a downstream, proximal end surface 48b'. An outer side surface 48c' connects the upstream, distal end surface 48a' to the downstream, proximal end surface 48b'.

The outer side surface 48c' defines the upstream-facing member 18c' to include a substantially conical shape defined by a non-constant diameter, $D_{18c}'$ (see, e.g., FIG. 17A). In an implementation the non-constant diameter, $D_{18c}'$, increases along the length, $L_{18c}'$, of the upstream-facing member 18c' as the outer side surface 48c' extends from the upstream, distal end surface 48a' toward the downstream, proximal end surface 48b'.

The upstream, distal end surface 48a' generally defined by a point. The downstream, proximal end surface 48b' is generally defined by a planar shape having a diameter, which is equal to the largest diameter of the non-constant diameter, $D_{18c}'$, defined by the outer side surface 48c'.

Referring to FIGS. 17A and 17C-17D, a threaded stem 50' extends away from the downstream, proximal end surface 48b'. The threaded stem 50' is arranged along an axis, A-A, extending through an axial center of the upstream-facing member 18c'.

Shown below is a table including four exemplary embodiments of the upstream-facing member 18c' including a variety of lengths, $L_{18c}'$, and diameters, $D_{18c}'$, described in inches.

TABLE 8

| | Embodiment 1 | Embodiment 2 | Embodiment 3 | Embodiment 4 |
|---|---|---|---|---|
| $L_{18c}'$ | 0.50" | 0.75" | 1.00" | 1.25" |
| $D_{18c}'$ | 0.60" | 0.85" | 0.93" | 1.00" |

Referring to FIGS. 18A-18D, an implementation of the retaining member 24' is described. The retaining member 24' is generally defined by a tube-shaped, cylindrical sleeve. The retaining member 24' may include a length, $L_{24}'$ (see, e.g., FIGS. 18A and 18D), extending between an upstream, distal end surface 62a' and a downstream, proximal end surface 62b'. Each of an outer side surface 62c' and an inner passage surface 62d' (see, e.g., FIG. 18D) connect the upstream, distal end surface 62a' to the downstream, proximal end surface 62b'. The outer side surface 62c' defines the retaining member 24' to include a diameter, $D_{20}'$ (see, e.g., FIGS. 18A and 18D).

The inner passage surface 62d' defines an axial passage 64' that extends through the retaining member 24' between the upstream, distal end surface 62a' and the downstream, proximal end surface 62b' along an axis, A-A, that extends through the retaining member 24'. The inner passage surface 62d' is further defined to include a first inner passage surface portion $62d_1'$, a second inner passage surface portion $62d_2'$ and a third inner passage surface portion $62d_3'$. The second inner passage surface portion $62d_2'$ is arranged between the first inner passage surface portion $62d_1'$ and the third inner passage surface portion $62d_3'$.

Each of the first inner passage surface portion $62d_1'$ and the third inner passage surface portion $62d_3'$ define a threaded surface. As will be described in the following disclosure, the threaded surface formed by first inner passage surface portion $62d_1'$ corresponds to and is threadingly attachable to an outer threaded surface portion, $C_{I-T}$ (see, e.g., FIGS. 20E-20F) of the fluid inlet conduit, $C_I$, for securing the retaining member 24' to the outer threaded surface portion, $C_{I-T}$, of the fluid inlet conduit, $C_I$. Similarly (as seen in, e.g., FIGS. 20E-20F), the threaded surface formed by the third inner passage surface portion $62d_3'$ corresponds to and is threadingly-attachable to the threaded first outer surface portion 30a' of the tube-shaped cylindrical body 16' for securing the retaining member 24' to the upstream, distal end surface 16a' of the tube-shaped cylindrical body 16'.

Referring to FIG. 18D, the second inner passage surface portion $62d_2'$ defines a radially-inwardly projecting, non-threaded portion 63' that interrupts the threaded surface defined by the first inner passage surface portion $62d_1'$ and the third inner passage surface portion $62d_3'$ of the inner passage surface 62d'. The radially-inwardly projecting, non-threaded portion 63' of the second inner passage surface portion $62d_2'$ includes an upstream-facing shoulder surface portion $63_U'$ and a downstream-facing shoulder surface portion $63_D'$ connected by a radially-inwardly facing surface portion $63_I'$.

The threaded surface formed by each of the first inner passage surface portion $62d_1'$ and the third inner passage surface portion $62d_3'$ defines the axial passage 64' to include a first passage diameter, $D1_{64}'$ (see, e.g., FIGS. 18B-18D). The radially-inwardly facing surface portion $63_I'$ of the second inner passage surface portion $62d_2'$ defines the axial passage 64' to include a second passage diameter, $D2_{64}'$ (see, e.g., FIGS. 18B-18D). The second passage diameter, $D2_{64}'$, is approximately equal to but slightly less than the first passage diameter, $D1_{64}'$.

Access to the axial passage 64' is permitted by an inlet opening 66a' (see, e.g., FIGS. 18B, 18D) formed in the upstream, distal end surface 62a' of the retaining member 24' and an outlet opening 66b' (see, e.g., FIGS. 18C-18D) formed in the downstream, proximal end surface 62b' of the retaining member 24'. Referring to FIGS. 18B, 18D and 20D, the inlet opening 66a' of the retaining member 24' may also define the inlet opening 14a' of the bubble implosion reactor cavitation device 10', and, the upstream, distal end surface 62a' of the retaining member 24' may also define the upstream, distal end 10a' of the bubble implosion reactor cavitation device 10'.

An embodiment for assembling the bubble implosion reactor cavitation device 10' is described as follows. A first step in the process for assembling the bubble implosion reactor cavitation device 10' is assembling the bubble generator subassembly 18', which is shown at FIGS. 19A-19F.

Figure 19A:
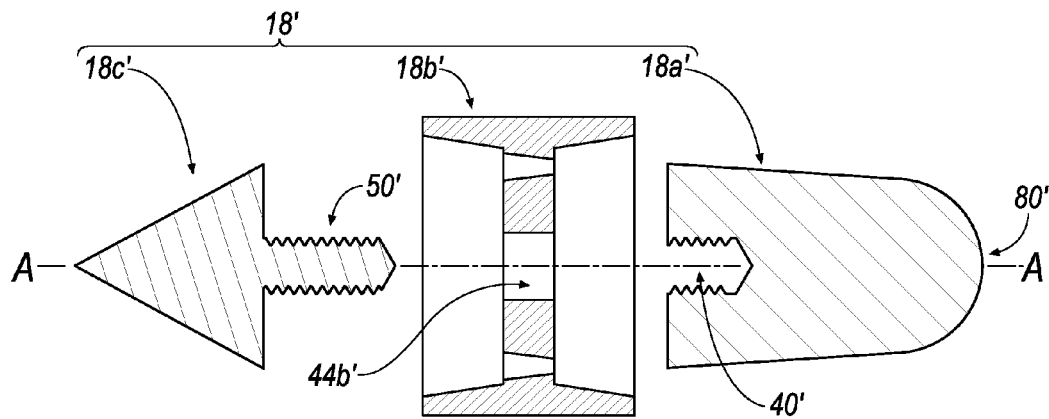
Figure 19B:
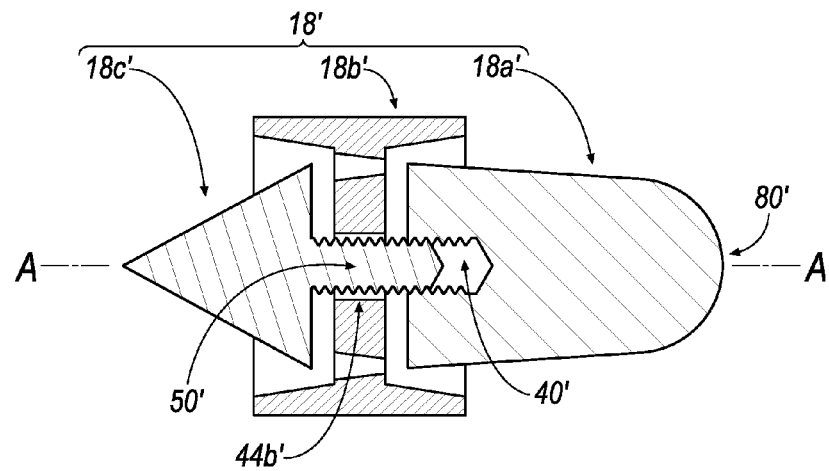

Referring to FIG. 19A, the bubble generator subassembly 18' is assembled by firstly arranging the nozzle array disk 18b' between the downstream-facing member 18a' and the upstream-facing member 18c' such that the threaded stem 50' of the upstream-facing member 18c' is axially aligned along the axis, A-A, with the second axial passage portion 44b' of the axial passage 44' of the nozzle array disk 18b' and the threaded passage 40' of the downstream-facing member 18a'. Then, as seen in FIG. 19B, the threaded stem 50' is extended through the second axial passage portion 44b' of the axial passage 44' of the nozzle array disk 18b' and into the threaded passage 40' of the downstream-facing member 18a'.

Figure 19C:
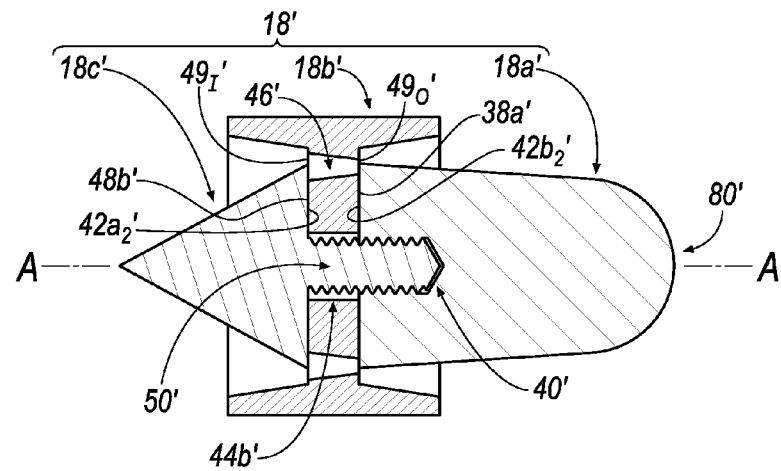

Referring to FIG. 19C, upon fully inserting the threaded stem 50' into the threaded passage 40' of the downstream-facing member 18a': (1) the downstream, proximal end surface 48b' of the upstream-facing member 18c' is disposed adjacent the second upstream, distal end surface portion $42a_2$' of the upstream, distal end surface 42a' of the nozzle array disk 18b', and (2) the upstream, distal end surface 38a' of the downstream-facing member 18a' is disposed adjacent the second downstream, proximal end surface portion $42b_2$' of the downstream, proximal end surface 42b' of the nozzle array disk 18b'.

Referring to FIGS. 19C and 19E-19F, when the bubble generator subassembly 18' is assembled as described above, the diameter, $D_{18a}$' (see, e.g., FIG. 19C), defined by the downstream, proximal end surface 48b' of the upstream-facing member 18c' partially obstructs/obscures approximately half of an inlet opening $49_1$' defined by each conical passage 46' of the circularly-arranged plurality of fluid-flow passages 46' of the nozzle array disk 18b'. Similarly, when the bubble generator subassembly 18' is assembled as described above, the diameter, $D_{18c}$' (see, e.g., FIG. 19C), defined by the upstream, distal end surface 38a' of the downstream-facing member 18a' partially obstructs/obscures approximately half of an outlet opening $49_O$' defined by each conical passage 46' of the circularly-arranged plurality of fluid-flow passages 46' of the nozzle array disk 18b'.

Referring to FIGS. 20A-20B, once the bubble generator subassembly 18' is assembled as described above, the threaded surface formed by the third inner passage surface portion $62d_3$' of the retaining member 24' is threadingly-attached to the threaded first outer surface portion 30a' of the tube-shaped cylindrical body 16' for securing the retaining member 24' about the upstream, distal end surface 16a' of the tube-shaped cylindrical body 16'. Then, as seen in FIGS. 20C-20D, the bubble generator subassembly 18' is inserted into the axial passage 64' of the retaining member 24' from the upstream, distal end surface 62a' of the retaining member 24' toward the downstream, proximal end surface 62b' of the retaining member 24' until, as seen in FIG. 20D, the first downstream, proximal end surface portion $42b_1$' of the downstream, proximal end surface 42b' of the nozzle array disk 18b' is disposed directly adjacent the upstream, distal end surface 16a' of the tube-shaped cylindrical body 16'.

As seen in FIG. 20D, the radially-inwardly facing surface portion $63_I$' of the second inner passage surface portion $62d_2$' of the axial passage 64' of the retaining member 24' is disposed directly adjacent the outer side surface 42c' of the nozzle array disk 18b' for axially centering the bubble generator subassembly 18' along the central axis, A-A, extending through the axial passage 26' of the tube-shaped cylindrical body 16'. By disposing the outer side surface 42c' of the nozzle array disk 18b' adjacent the radially-inwardly facing surface portion $63_I$' of the second inner passage surface portion $62d_2$' of the axial passage 64' of the retaining member 24', the bubble generator subassembly 18' may be friction-fit or wedged in place with respect to the retaining member 24' such that the bubble generator subassembly 18' is axially centered about the central axis, A-A, extending through the tube-shaped cylindrical body 16'.

When the bubble generator subassembly 18' is arranged relative to the tube-shaped cylindrical body 16' and the retaining member 24' as described above in FIG. 20D, a portion of the outer side surface 38c' of the downstream-facing member 18a' is arranged within the axial passage 26' of the tube-shaped cylindrical body 16'. For example, in an implementation, all of the second portion, $L_{18a-2}$', of the length, $L_{18a}$', of the downstream-facing member 18a' is arranged within the axial passage 26' of the tube-shaped cylindrical body 16' and some of the first portion, $L_{18a-1}$', of the length, $L_{18a}$', of the downstream-facing member 18a' extending away from the second portion, $L_{18a-2}$', of the length, $L_{18a}$', of the downstream-facing member 18a' is arranged within the axial passage 26' of the tube-shaped cylindrical body 16'.

As seen in FIG. 20D, the outer side surface 38c' of the downstream-facing member 18a' is arranged in a non-adjacent/spaced-apart relationship with respect to the third inner surface portion 45c' of the conical nozzle array disk 18b' and the cylindrical surface 32' of the tube-shaped cylindrical body 16' thereby creating: (1) a first downstream fluid-flow spacing 51a' between the third inner surface portion 45c' of the third axial passage portion 44c' of the axial passage 44' of the retaining member 24' and (2) a second downstream fluid-flow spacing 51b' between the cylindrical surface 32' of the second axial passage portion 26b' of the axial passage 26'. Further, because the non-constant diameter, $D_{18a}$', of the downstream-facing member 18a' slightly reduces along the length, $L_{18a}$', of the downstream-facing member 18a', the downstream fluid-flow spacings 51a', 51b' respectively increase in a direction referenced from the upstream, distal end surface 38a' of the downstream-facing member 18a' toward the downstream, proximal end surface 38b' of the downstream-facing member 18a'. The second downstream fluid-flow spacing 51b' is less than the first downstream fluid-flow spacing 51a'.

Further, when the bubble generator subassembly 18' is arranged relative to the tube-shaped cylindrical body 16' and the retaining member 24' as described above in FIG. 20D, the diameter, $D1_{26}$', of the axial passage 26' of the tube-shaped cylindrical body 16' may be approximately equal to but slightly less than the largest non-constant diameter, $D3_{44}$', defined by the third axial passage portion 44c' of the axial passage 44' of the conical nozzle array disk 18b'. As a result, a portion of the upstream, distal end surface 16a' of the tube-shaped cylindrical body 16' obstructs a portion of the third axial passage portion 44c' of the axial passage 44' of the conical nozzle array disk 18b'.

Figure 20E:
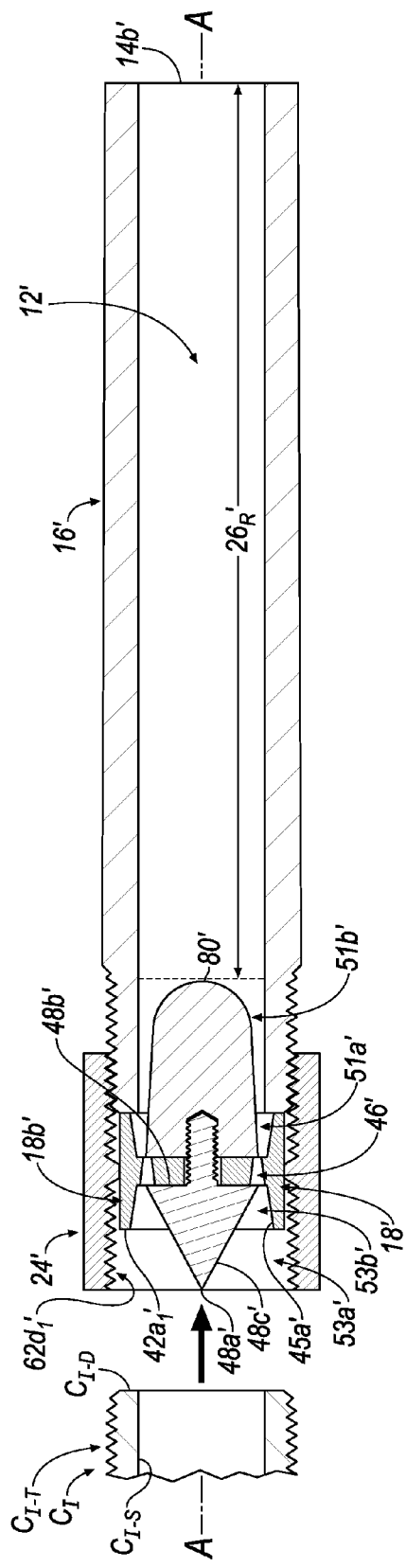
Figure 20F:
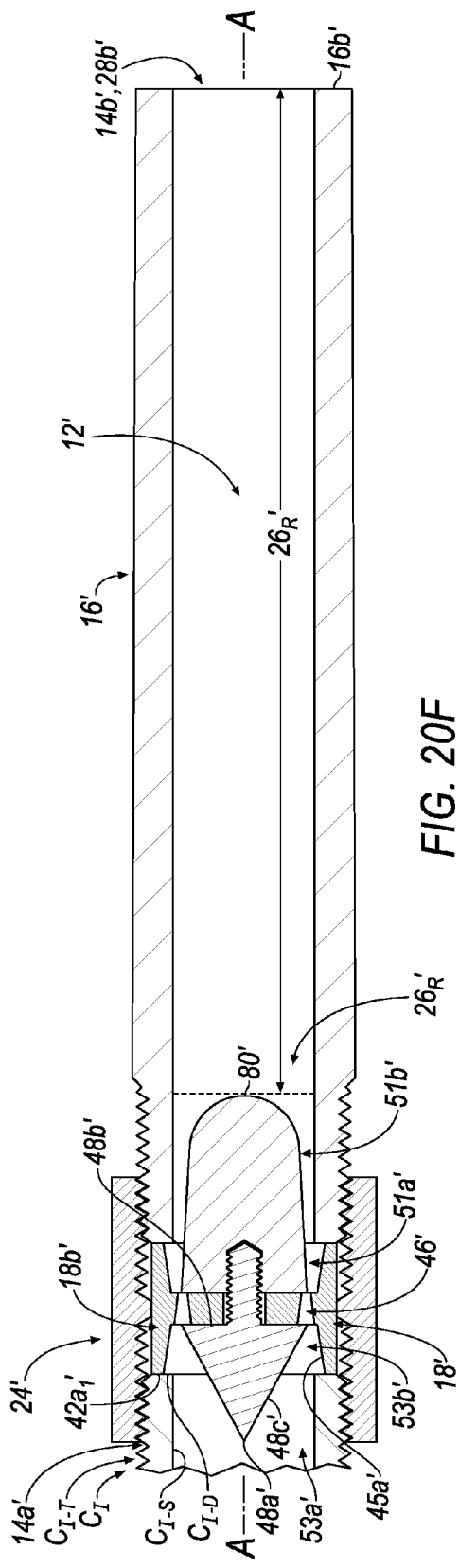

Next, as seen in FIGS. 20E-20F, the outer threaded surface portion, $C_{I-T}$, of the fluid inlet conduit, $C_I$, is threadingly attached to the threaded surface formed by first inner passage surface portion $62d_1$' of the inner passage surface 62d' of the retaining member 24' for securing the fluid inlet conduit, $C_I$, to the retaining member 24'. The outer threaded surface portion, $C_{I-T}$, of the fluid inlet conduit, $C_I$, is threadingly-inserted to the inner passage surface $62d'$ of the retaining member 24' until, as seen in FIG. 20F, the downstream, proximal end surface, $C_{I-D}$, of the fluid inlet conduit, $C_I$, is disposed directly adjacent the first upstream, distal end surface portion $42a_1$' of the upstream, distal end surface 42a' of the nozzle array disk 18b'. As seen in FIG. 20F, because (1) the first downstream, proximal end surface portion $42b_1$' of the downstream, proximal end surface 42b' of the nozzle array disk 18b' is disposed directly adjacent the upstream, distal end surface 16a' of the tube-shaped cylindrical body 16', and (2) the downstream, proximal end surface, $C_{I-D}$, of the fluid inlet conduit, $C_I$, is disposed directly adjacent the first upstream, distal end surface portion 42a₁' of the upstream, distal end surface 42a' of the nozzle array disk 18b', the bubble generator subassembly 18' is axially fixed in place between the fluid inlet conduit, $C_I$, and the tube-shaped cylindrical body 16'.

When the bubble generator subassembly 18' is axially fixed in place between the fluid inlet conduit, $C_I$, and the tube-shaped cylindrical body 16' as described above at FIG. 20F, the outer side surface 48c' of the upstream-facing member 18c' is arranged in a non-adjacent/spaced-apart relationship with respect to an inner surface, $C_{I-S}$, of the fluid inlet conduit, $C_I$, and the first inner surface portion 45a' of the conical nozzle array disk 18b' thereby creating: (1) a first upstream fluid-flow spacing 53a' between an inner surface, $C_{I-S}$, of the fluid inlet conduit, $C_I$, and (2) a second downstream fluid-flow spacing 53b' between the first inner surface portion 45a' of the conical nozzle array disk 18b'. Further, because the non-constant diameter, $D_{18c}'$, of the upstream-facing member 18c' slightly increases along the length, $L_{18c}'$, of the upstream-facing member 18c', the upstream fluid-flow spacings 53a', 53b' decrease in a direction referenced from upstream, distal end surface 48a' of the upstream-facing member 18c' toward the downstream, proximal end surface 48b' of the upstream-facing member 18c'. The second upstream fluid-flow spacing 53b' is less than the first upstream fluid-flow spacing 53a'.

Once the bubble implosion reactor cavitation device 10' is assembled and subsequently connected to the fluid inlet conduit, $C_I$, as described above, the bubble implosion reactor cavitation device 10' may be said to be connected to a fluid handling system, such as, for example the fluid handling system, S1/S2, described above. Once the bubble implosion reactor cavitation device 10' is connected to the fluid handling system, S1/S2, liquid, L, may enter the fluid-flow passage 12' of the bubble implosion reactor cavitation device 10' at the inlet opening 14a' of the bubble implosion reactor cavitation device 10', and, the liquid, L, may exit fluid-flow passage 12' of the bubble implosion reactor cavitation device 10' at the outlet opening 14b' of the bubble implosion reactor cavitation device 10'.

As described above, the structural arrangement and dimensions of components 16'-24' defines the geometry fluid-flow passage 12', which forms a plurality of processing zones I-IX (see FIG. 2B) along the length, $L_{10}$, of the bubble implosion reactor cavitation device 10'. Referring to FIG. 20F, from the upstream, distal end 10a' of the bubble implosion reactor cavitation device 10' to the downstream, proximal end 10b' of the bubble implosion reactor cavitation device 10', the fluid-flow passage 12' is defined by: (1) the first upstream fluid-flow spacing 53a', (2) the second upstream fluid-flow spacing 53b', (3) the plurality of conical fluid-flow passages 46' of the conical nozzle array disk 18b', (4) the first downstream fluid-flow spacing 51a', (5) the second downstream fluid-flow spacing 51b', and (6) a remainder 26_R' of the axial passage 26' of the tube-shaped cylindrical body 16' extending between a peak 80' defined by the hemispherical shape of the downstream, proximal end surface 38b' of the downstream-facing member 18a' of the bubble generator subassembly 18' and the outlet opening 28b' formed in the downstream, proximal end surface 16b' of the tube-shaped cylindrical body 16'.

Figure 22B:
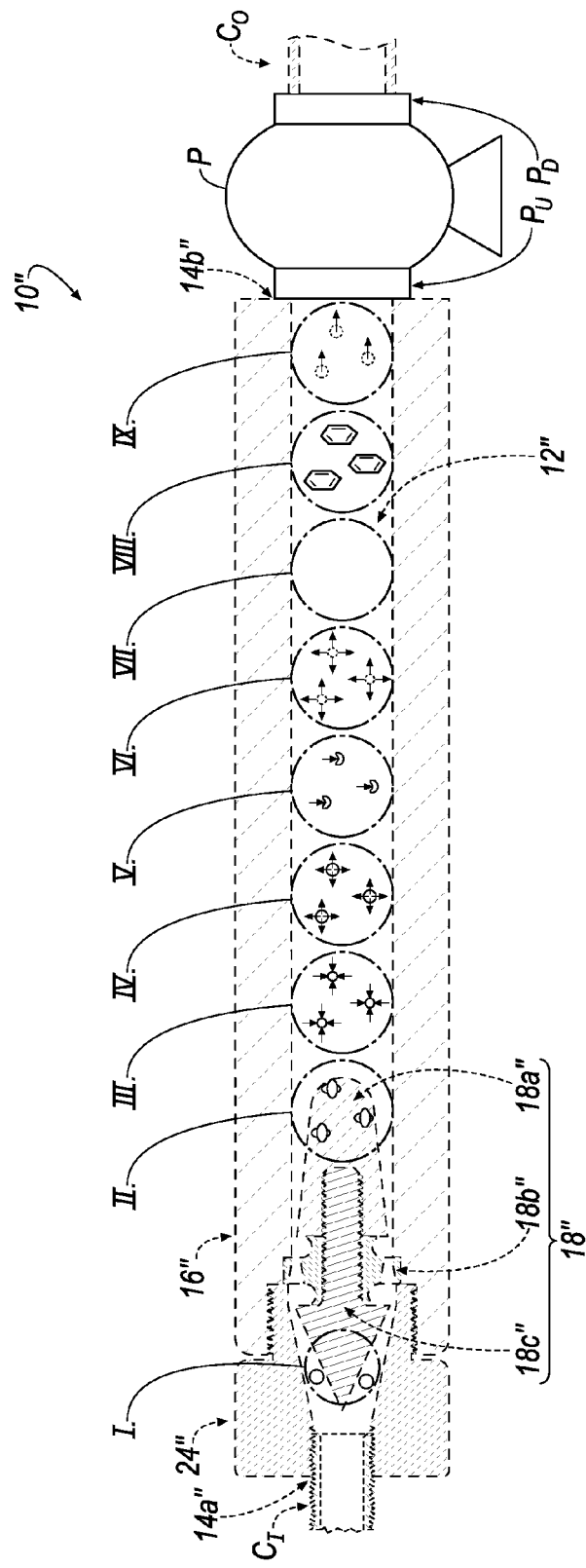
FIG. 22B is a phantom cross-sectional view of FIG. 22A showing plurality of fluid processing zones.

FIGS. 21-22B illustrate an exemplary implementation of a bubble implosion reactor cavitation device, which is shown generally at 10". A fluid is permitted to flow through a passage 12" (see, e.g., FIGS. 22A-22B) formed by the bubble implosion reactor cavitation device 10" such that the bubble implosion reactor cavitation device 10" may process the fluid. In some implementations, the fluid may be a gas or a liquid, L (see, e.g., FIG. 22A). Any desirable liquid, L, may be processed by the bubble implosion reactor cavitation device 10", such as, for example: water, waste-water, a chemical solution, a bio-medical solution, crude petroleum, a petroleum product, bio-fuel, bio-diesel, jet fuel (kerosene), blend jet fuel or the like. Although a liquid, L, is described being processed by the bubble implosion reactor cavitation device 10" in the following disclosure, the bubble implosion reactor cavitation device 10" is not limited to processing a liquid, L, and, as such, the bubble implosion reactor cavitation device 10" may be utilized to process any desirable fluid such as, for example, a gas or a blend media such as, for example, gas-liquid solutions, liquid-liquid solutions and liquid-solid particle solutions.

The liquid, L, enters the bubble implosion reactor cavitation device 10" at an inlet opening 14a" formed by an upstream, distal end 10a" of the bubble implosion reactor cavitation device 10". The liquid, L, exits the bubble implosion reactor cavitation device 10" at an outlet opening 14b" formed by a downstream, proximal end 10b" of the bubble implosion reactor cavitation device 10".

In an implementation, bubble implosion reactor cavitation device 10" is a component of a fluid handling system, an embodiment of which is shown generally at S1 in FIG. 30 or S2 in FIG. 31. The fluid handling system, S1/S2, includes a fluid-moving device, P (see also, e.g., FIGS. 21-22B), that "pulls" the liquid, L, through the fluid-flow passage 12" of the bubble implosion reactor cavitation device 10"; as a result, in an embodiment, there is very little if any positive pressure (with respect to atmospheric pressure) placed on the liquid, L, as the liquid, L, enters the fluid-flow passage 12" at the upstream, distal end 10a" of the bubble implosion reactor cavitation device 10". In some implementations, the fluid-moving device, P, may be, for example, an electrically operated pump. In some instances, the pump, P, may be referred to as a "cavitation-inducing pump."

As seen in FIGS. 21-22B and 30-31, the "pulling" of the liquid, L, through the bubble implosion reactor cavitation device 10" may be achieved by arranging the suction side of the cavitation-inducing pump, P, downstream of the outlet opening 14b" of the bubble implosion reactor cavitation device 10" such that the pump, P, is fluidly-connected to the fluid-flow passage 12". Therefore, in such an implementation, as the liquid, L, is drawn into the bubble implosion reactor cavitation device 10" at the inlet opening 14a", the liquid, L, is not moved through the bubble implosion reactor cavitation device 10" by being "pushed" through the inlet opening 14a", but, rather, the liquid, L, is "pulled" (or drawn) through the inlet opening 14a" as a result of the suction present at the distal end, $P_U$, of the cavitation-inducing pump, P, being arranged downstream of the outlet opening 14b". Although the top portion of the fuel tank, FT, is shown vented to atmosphere, it is contemplated that efficiencies in the operation of the bubble implosion reactor cavitation device 10" may be gained by maintaining the pressure within the fuel tank, FT, at less than atmospheric pressure.

Although the cavitation-inducing pump, P, is said to be arranged downstream of the outlet opening 14b", such an implementation is exemplary and is related to an embodiment of the invention shown at FIGS. 21-22B. Accordingly, the cavitation-inducing pump, P, may be alternatively arranged within, for example, the fluid-flow passage 12" but slightly upstream of the outlet opening 14b", or, alternatively, the cavitation-inducing pump, P, may be arranged within, for example, the outlet opening 14b".

As seen in FIGS. 21A-22B, a plurality of components 16"-24" forms the bubble implosion reactor cavitation device 10". In an implementation, the components 16"-24" forming the bubble implosion reactor cavitation device 10" may include, for example: a tube-shaped cylindrical body 16", a bubble generator subassembly 18" and a retaining member 24". The bubble generator subassembly 18" may include a downstream-facing member 18a", a nozzle array disk 18b" and an upstream-facing member 18c".

One aspect of the structural arrangement and dimensions of components 16"-24" provides a method for processing the liquid, L, that is pulled through the fluid handling system, S1/S2, by the cavitation-inducing pump, P, for the purpose of destroying macro-clusters and contamination within the liquid, L. Another aspect of the structural arrangement and dimensions of the components 16"-24" provides a method for processing the liquid, L, that is pulled through the fluid handling system, S1/S2, by the cavitation-inducing pump, P, for the purpose of activating physical processes and chemical reactions within the liquid, L.

The exemplary liquid processing methodologies described above are a result of a geometry fluid-flow passage 12" that is formed by the structural arrangement and dimensions of components 16"-24" of the bubble implosion reactor cavitation device 10". As seen in FIGS. 22A-22B, the geometry of the fluid-flow passage 12" changes along a length, $L_{10}"$ (see, e.g., FIG. 21), of the bubble implosion reactor cavitation device 10".

Referring to FIG. 22B, because the geometry of the fluid-flow passage 12" changes along the length, $L_{10}"$, of the bubble implosion reactor cavitation device 10", the fluid-flow passage 12" forms a plurality of fluid processing zones I.-IX. along the length, $L_{10}"$, of the bubble implosion reactor cavitation device 10". The plurality of fluid processing zones I.-IX. may include a fluid flow restriction zone, I., that is followed by a fluid vacuum zone, II., and then followed by a fluid micro-bubble generation zone, III. When the liquid, L, is advanced to the micro-bubble generation zone, III., the bubble implosion reactor cavitation device 10" generates a plurality of near-vacuum micro-bubbles, B, within the liquid, L. As the liquid, L, is pulled through the bubble implosion reactor cavitation device 10", the liquid, L, then enters an expansion zone, IV., then a compression zone, V., then an implosion zone, VI., where the plurality of near-vacuum micro-bubbles, B, are: expanded, compressed and collapsed under pressure. After the plurality of near-vacuum micro-bubbles, B, are collapsed thereby generating a plurality of spherical implosions within the liquid, L, the plurality of spherical implosions result in a gas at the center of each micro-bubble of the plurality of micro-bubbles, B, being heated to an extremely high temperature, which generates a cascade of sono-luminescence light pulses within the liquid, L. The liquid, L, then enters a destruction zone, VII., then a reaction zone, VIII., then a mixing zone, IX.

In an embodiment shown in FIG. 30, the fluid handling system, S1, may be generally referred to as a "closed-loop" fluid handling system including: a fluid inlet conduit, $C_I$ (see also, e.g., FIGS. 21-22B), the bubble implosion reactor cavitation device 10", the cavitation-inducing pump, P, a fluid outlet conduit, $C_O$ (see also, e.g., FIGS. 21-22B), and a fuel tank, FT. As seen in FIG. 30, the fluid inlet conduit, $C_I$, fluidly connects a first fluid outlet, $FT_{O1}$, of the fuel tank, FT, to the upstream, distal end 10a" of the bubble implosion reactor cavitation device 10" such that the inlet opening 14a" of the bubble implosion reactor cavitation device 10" receives liquid, L, from the first fluid outlet, $FT_{O1}$, of the fuel tank, FT. An upstream, distal end, $P_U$ (see also, e.g., FIGS. 21-22B), of the cavitation-inducing pump, P, is arranged downstream of and is fluidly-connected to the outlet opening 14b" of the bubble implosion reactor cavitation device 10" for pulling the liquid, L, through the bubble implosion reactor cavitation device 10" as described above. The fluid outlet conduit, $C_O$, fluidly connects a downstream, proximal end, $P_D$ (see also, e.g., FIGS. 21-22B), of the cavitation-inducing pump, P, to a fluid inlet, $FT_I$, of the fuel tank, FT, for depositing the liquid, L, processed by the bubble implosion reactor cavitation device 10" back into the fuel tank, FT.

As seen in FIG. 30, the fuel tank, FT, may include a second fluid outlet, $FT_{O2}$. The second fluid outlet, $FT_{O2}$, of the fuel tank, FT, is connected to a processed liquid conduit, $C_P$, for supplying liquid, L, processed by the bubble implosion reactor cavitation device 10" to a fuel injection system, IS, of an engine, E, such as, for example, a diesel engine. A fuel pump, FP, may be arranged within the processed liquid conduit, $C_P$, for metering the processed liquid, L, from the fuel tank, FT, to the fuel injection system, IS.

In an embodiment shown in FIG. 31, the fluid handling system, S2, may be generally referred to as a "linear" fluid handling system including: a fuel tank, FT, a fluid inlet conduit, $C_I$ (see also, e.g., FIGS. 21-22B), the bubble implosion reactor cavitation device 10", the cavitation-inducing pump, P, a fluid outlet conduit, $C_O$ (see also, e.g., FIGS. 21-22B), and a zero backpressure device/liquid holding reservoir, R. As seen in FIG. 31, the fluid inlet conduit, $C_I$, fluidly connects a fluid outlet, $FT_O$, of the fuel tank, FT, to the upstream, distal end 10a" of the bubble implosion reactor cavitation device 10" such that the inlet opening 14a" of the bubble implosion reactor cavitation device 10" receives liquid, L, from the fluid outlet, $FT_O$, of the fuel tank, FT. An upstream, distal end, $P_U$ (see also, e.g., FIGS. 21-22B), of the cavitation-inducing pump, P, is arranged downstream of and is fluidly-connected to the outlet opening 14b" of the bubble implosion reactor cavitation device 10" for pulling the liquid, L, through the bubble implosion reactor cavitation device 10" as described above. The fluid outlet conduit, $C_O$, fluidly connects a downstream, proximal end, $P_D$ (see also, e.g., FIGS. 21-22B), of the cavitation-inducing pump, P, to the zero backpressure device/processed liquid holding reservoir, R, for retaining the processed liquid, L, therein (i.e., unlike the "closed loop" fluid handling system, S1, the processed liquid, L, is not returned to the fuel tank, FT, but, rather, is deposited into the processed liquid holding reservoir, R).

As seen in FIG. 31, the processed liquid holding reservoir, R, is connected to a processed liquid conduit, $C_P$, for supplying liquid, L, processed by the bubble implosion reactor cavitation device 10" to a fuel injection system, IS, of an engine, E, such as, for example, a diesel engine. A fuel pump, FP, may be arranged within the processed liquid conduit, $C_P$, for metering the processed liquid, L, from the processed liquid holding reservoir, R, to the fuel injection system, IS.

In an implementation, the liquid, L, may be diesel fuel. The processed diesel fuel, L, therefore, may result in an increase in the number of destructed/cracked hydrocarbons during the combustion process to thereby increase one or more of fuel quality, fuel efficiency, engine horsepower and torque. The processed diesel fuel, L, therefore, may result in an increase in the fuel mileage of a vehicle and reduce vehicle maintenance costs and wear-and-tear on engine components. In some implementations, the processed diesel fuel, L, may increase the fuel mileage of a vehicle by approximately about 25%-45%. Further, in some implementations, the processed diesel fuel, L, may also result in reduced emission elements (e.g., $CO_x$, HC, $NO_x$, $SO_x$, Pb and PM (particulate matter)) from, for example, motor vehicles. Accordingly, in some implementations, the processed diesel fuel, L, may reduce emission elements by approximately 25-35%.

In an implementation, the liquid, L, may be any blend biodiesel (e.g., biodiesel ranging between approximately 5% to 50% and petroleum diesel fuel ranging between approximately 50% to 95%). The bubble implosion reactor cavitation device 10", therefore, may be utilized for processing the blend biodiesel, L, in a storage tank of a depot/fueling station and/or in-line on board of vehicle. The processed blend biodiesel, L, therefore, may result in an increase in the number of destructed/cracked hydrocarbons during the combustion process to thereby increase one or more of fuel quality, fuel efficiency, engine horsepower and maintenance costs and wear-and-tear on engine components. Further, in some implementations, the processed blend biodiesel, L, may also result in reduced emission elements (e.g., $CO_x$, HC, $NO_x$, $SO_x$, Pb and PM (particle matter)) which causes pollution coming from diesel engines.

In an implementation, the liquid, L, may be gasoline. The bubble implosion reactor cavitation device 10", therefore, may be utilized for processing the gasoline, L, in a storage tank of a depot/fueling station and/or in-line between a fuel tank and an engine. In a refinery industry application, the bubble implosion reactor cavitation device 10", therefore, may be utilized for processing the strain-run fraction of the gasoline, L. The processed gasoline, L, therefore, may result in an increase in the number of destructed/cracked hydrocarbons during the combustion process to thereby increase one or more of fuel quality, fuel efficiency, engine horsepower and octane, which may result in reduced vehicle maintenance costs and wear-and-tear on engine components. Further, in some implementations, the processed gasoline, L, may also result in reduced emission elements (e.g., $CO_x$, HC, $NO_x$, $SO_x$, Pb and PM (particle matter)), which causes pollution coming from motor vehicles. In some implementations, the bubble implosion reactor cavitation device 10" may increase the octane number of the strain-run fraction gasoline by approximately about 12%.

In an implementation, the liquid, L, may be jet fuel (kerosene). The bubble implosion reactor cavitation device 10", therefore, may be utilized for processing the jet fuel (kerosene), L, in a storage tank and/or in-line between a jet fuel tank and a jet engine. The processed jet fuel (kerosene), L, therefore, may result in an increase in the number of destructed/cracked hydrocarbons during the combustion process to thereby increase one or more of fuel quality, fuel efficiency, engine horsepower in order to reduce maintenance costs and wear-and-tear on engine components. Further, in some implementations, the processed blend jet fuel (kerosene), L, may also result in reduced emission elements (e.g., $CO_x$, HC, $NO_x$, $SO_x$, Pb and PM (particle matter)), which causes pollution coming from jet engines.

In an implementation, the liquid, L, may be blend jet fuel (e.g., approximately about 50% kerosene and approximately about 50% bio-fuel). The bubble implosion reactor cavitation device 10", therefore, may be utilized for processing the blend jet fuel, L, in a storage tank and/or in-line between a jet fuel tank and a jet engine. The processed blend jet fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. Further, in some implementations, the processed blend jet fuel, L, may also result in reduced emission elements (e.g., $CO_x$, HC, $NO_x$, $SO_x$, Pb and PM (particle matter)), which causes pollution coming from jet engines.

In an implementation, the liquid, L, may be any blend multi-fuel. A blend multi-fuel may include several components such as, for example: diesel fuel, gasoline, kerosene, alcohol, water or the like. The bubble implosion reactor cavitation device 10", therefore, may be utilized for processing the blend multi-fuel, L, in a storage tank and/or in-line on board of a vehicle. The processed blend multi-fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. Further, in some implementations, the processed blend multi-fuel, L, may also result in reduced emission elements (e.g., $CO_x$, HC, $NO_x$, $SO_x$, Pb and PM (particle matter)), which causes pollution coming from diesel engines.

In an implementation, the liquid, L, may be any blend emulsified fuel. A blend emulsified fuel may include several components such as, for example: 75%-95% diesel fuel and 5%-25% water. The bubble implosion reactor cavitation device 10", therefore, may be utilized for processing the blend emulsified fuel, L, in a storage tank and/or in-line on board of a vehicle. The processed blend emulsified fuel, L, therefore, may result in an increase in the number of destructed/cracked hydrocarbons during the combustion process to thereby increase one or more of fuel quality, fuel efficiency, and engine horsepower in order to reduce maintenance costs and wear-and-tear on engine components. In some implementations, a processed blend emulsified fuel, L, may include approximately about 85% petroleum fuel and approximately about 15% water in order to increase the fuel mileage of a vehicle, locomotive and ship in excess of 15%. Further, in some implementations, the processed blend emulsified fuel, L, may also result in reduced emission elements (e.g., $CO_x$, HC, $NO_x$, $SO_x$, Pb and PM (particle matter)), which causes pollution coming from diesel engines. In some implementations, the processed blend emulsified fuel, L, including approximately about 85% petroleum fuel and approximately about 15% water may reduce emissions in excess of 15%.

In some implementations, the fluid handling systems S1 or S2 may include an additive tank, AT, in fluid communication with the fluid inlet conduit, $C_I$. The additive tank, AT, may be connected to the fluid inlet conduit, $C_I$, in any desirable manner, such as, for example, by way of an injector nozzle, port or the like. The additive tank, AT, may contain an additive (e.g., water, methanol or the like) that permits emulsification of gas-to-liquid, liquid-to-liquid, or liquid-to solids based on application requirements. In a diesel application, for example, the additive tank, AT, may provide water and/or methanol upstream of the cavitation device 10, 10', 10" at the fluid inlet conduit, $C_I$, which may result in increased vehicle fuel mileage and/or reduced emissions. Other commercial applications may include, for example, permanent emulsions of fuel to water or other commercial applications in the water treatment industry, the pharmaceutical industry, the chemical industry and the food industry.

In some implementations, the fluid handling systems S1 or S2 may include a controller, CT, communicatively coupled with the injection system, IS, of the engine, E. The controller, CT, may adapt existing signals from a variety of outputs and optimize injection system, IS, of the engine, E, through either: signal conditioning, signal modulation or digital modification in order to change the frequency or quantity of injected material to the engine, E, within a prescribed formula resulting in a permanent emulsion or blend of, for example: gas-to-gas, gas-to-liquid or gas-to-solid combinations thereby generating improved efficiencies of settling in medications, fuels, water reclamation and food products. The controller, CT, may read inputs, and, through a control module, can monitor various system characteristics and deliver the prescribed formulation to read a desired result.

Figure 23:
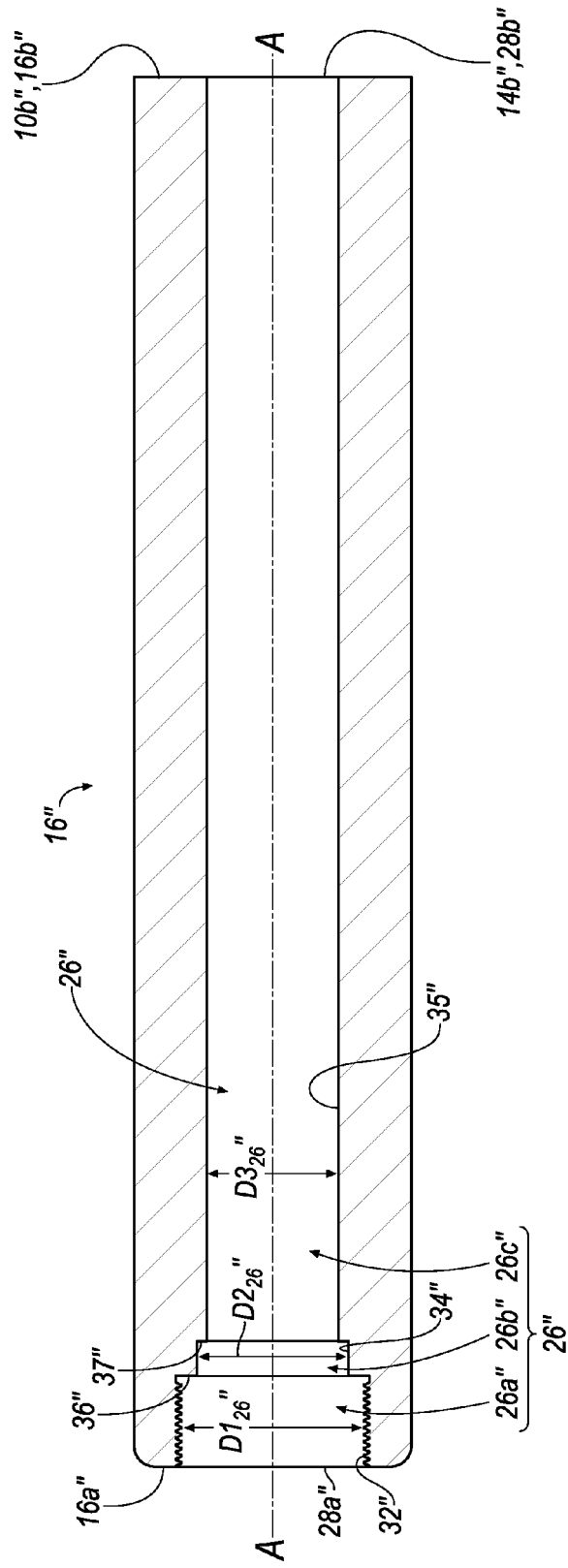
FIG. 23 is a cross-sectional view of an exemplary tube-shaped cylindrical body of the bubble implosion reactor cavitation device of FIG. 22A.

Referring to FIG. 23, an implementation of the tube-shaped cylindrical body 16" is described. The tube-shaped cylindrical body 16" includes an upstream, distal end surface 16a" and a downstream, proximal end surface 16b". An axial passage 26" extends through the tube-shaped cylindrical body 16" between the upstream, distal end surface 16a" and the downstream, proximal end surface 16b" along an axis, A-A, that extends through the tube-shaped cylindrical body 16".

Access to the axial passage 26" is permitted by an inlet opening 28a" formed in the upstream, distal end surface 16a" of the tube-shaped cylindrical body 16" and an outlet opening 28b" formed in the downstream, proximal end surface 16b" of the tube-shaped cylindrical body 16". The outlet opening 28b" formed by downstream, proximal end surface 16b" of the tube-shaped cylindrical body 16" may also define the outlet opening 14b" of the bubble implosion reactor cavitation device 10", and, the downstream, proximal end surface 16b" of the tube-shaped cylindrical body 16" may also define the downstream, proximal end 10b" of the bubble implosion reactor cavitation device 10".

The axial passage 26" that extends through the tube-shaped cylindrical body 16" may include a first axial passage portion 26a" defined by a first diameter, $D1_{26}$", a second axial passage portion 26b" defined by a second diameter, $D2_{26}$" and a third axial passage portion 26c" defined by a third diameter, $D3_{26}$". The first diameter, $D1_{26}$", is slightly greater than the second diameter, $D2_{26}$", and, the second diameter, $D2_{26}$" is slightly greater than the third diameter, $D3_{26}$". The first axial passage portion 26a" is defined by a first cylindrical surface 32". The second axial passage portion 26b" is defined by a second cylindrical surface 34". The third axial passage portion 26c" is defined by a third cylindrical surface 35". A first inner shoulder surface 36" connects the first cylindrical surface 32" to the second cylindrical surface 34" and demarcates the first axial passage portion 26a" from the second axial passage portion 26b". A second inner shoulder surface 37" connects the second axial passage portion 26b" to the third axial passage portion 26c".

The first cylindrical surface 32" may define a threaded surface. The threaded surface 32" may cooperate with an outer threaded surface $62c_3$" of the retaining member 24" for securing the retaining member 24" to the upstream, distal end surface 16a" of the tube-shaped cylindrical body 16".

Referring to FIGS. 24A-24D, an implementation of the downstream-facing member 18a" of the bubble generator subassembly 18" is described. The downstream-facing member 18a" of the bubble generator subassembly 18" may be defined by a length, $L_{18a}$" (see, e.g., FIGS. 24A and 24D), extending between an upstream, distal end surface 38a" and a downstream, proximal end surface 38b". An outer side surface 38c" connects the upstream, distal end surface 38a" to the downstream, proximal end surface 38b".

The outer side surface 38c" defines a first portion, $L_{18a-1}$", of the length, $L_{18a}$", of the downstream-facing member 18a". The outer side surface 38c" defines the downstream-facing member 18a" to include a substantially cylindrical shape defined by a non-constant diameter, $D_{18a}$" (see, e.g., FIG. 24A). In an implementation the non-constant diameter, $D_{18a}$", slightly reduces along the first portion, $L_{18a-1}$", of the length, $L_{18a}'$, of the downstream-facing member 18a" as the outer side surface 38c" extends from the upstream, distal end surface 38a" toward the downstream, proximal end surface 38b".

The downstream, proximal end surface 38b" defines a second portion, $L_{18a-2}$", of the length, $L_{18a}$", of the downstream-facing member 18a". The downstream, proximal end surface 38b" generally defines the downstream-facing member 18a" to include a hemispherical shape.

Unlike the hemispherical shape of the downstream, proximal end surface 38b", the upstream, distal end surface 38a" is generally defined by a planar shape. The planar shape of the upstream, distal end surface 38a" may be defined by a diameter that is equal to the largest diameter of the non-constant diameter, $D_{18a}$", defined by the outer side surface 38c" of the downstream-facing member 18a".

Figure 24A:
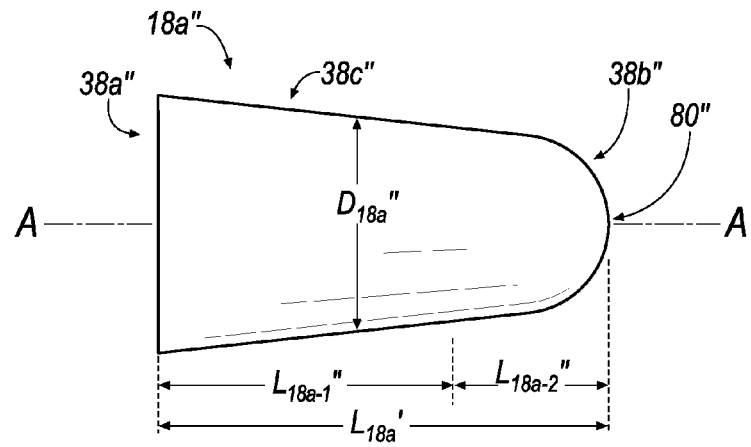
FIG. 24A is a side view of an exemplary downstream-facing member of a bubble generator subassembly of the bubble implosion reactor cavitation device of FIG. 21.
Figure 24B:
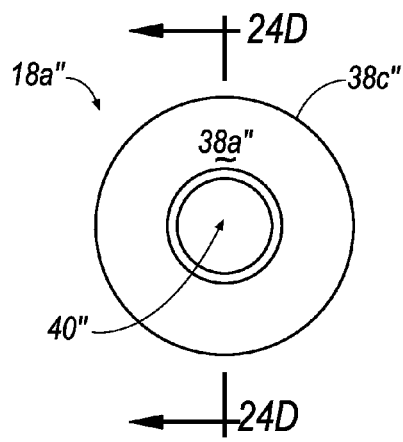
FIG. 24B is a front view of the downstream-facing member of the bubble generator subassembly of FIG. 24A.
Figure 24C:
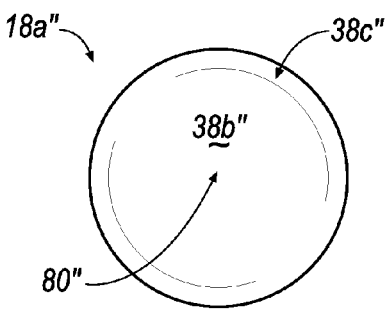
FIG. 24C is a rear view of the downstream-facing member of the bubble generator subassembly of FIG. 24A.
Figure 24D:
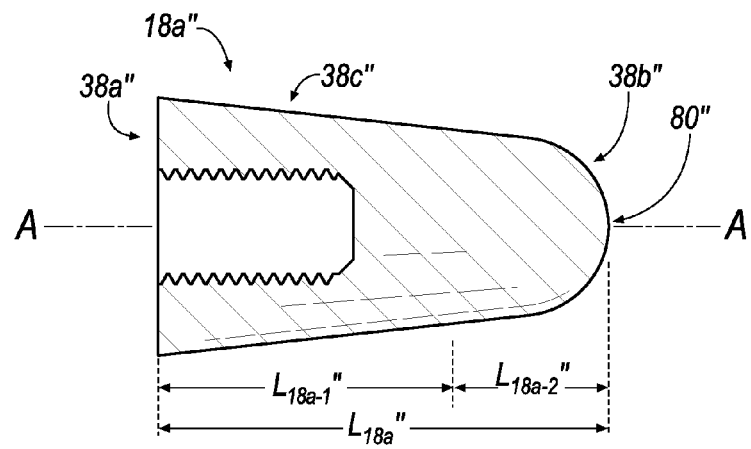
FIG. 24D is a cross-sectional view of the downstream-facing member of the bubble generator subassembly according to line 24D-24D of FIG. 24B.

Referring to FIGS. 24B and 24D, a threaded passage 40" extends partially into the first portion, $L_{18a-1}$", of the length, $L_{18a}$", of the downstream-facing member 18a" from the upstream, distal end surface 38a". The threaded passage 40" may be arranged along an axis, A-A, extending through an axial center of the downstream-facing member 18a".

Shown below is a table including four exemplary embodiments of the downstream-facing member 18a" including a variety of lengths, $L_{18a}$", and diameters, $D_{18a}$", described in inches.

TABLE 9

|  | Embodiment 1 | Embodiment 2 | Embodiment 3 | Embodiment 4 |
|---|---|---|---|---|
| $L_{18a}$" | 0.75" | 1.00" | 1.25" | 1.50" |
| $D_{18a}$" | 0.60" | 0.85" | 0.93" | 1.00" |

Referring to FIGS. 25A-25D, an implementation of the nozzle array disk 18b" of the bubble generator subassembly 18" is described. The nozzle array disk 18b" of the bubble generator subassembly 18" is defined by a length, $L_{18b}$" (see, e.g., FIGS. 25A and 25D), extending between an upstream, distal end surface 42a" and a downstream, proximal end surface 42b". An outer side surface 42c" connects the upstream, distal end surface 42a" to the downstream, proximal end surface 42b". The outer side surface 42c" defines the nozzle array disk 18b" to include a diameter, $D_{18b}$" (see, e.g., FIGS. 25A and 25D).

Figure 25A:
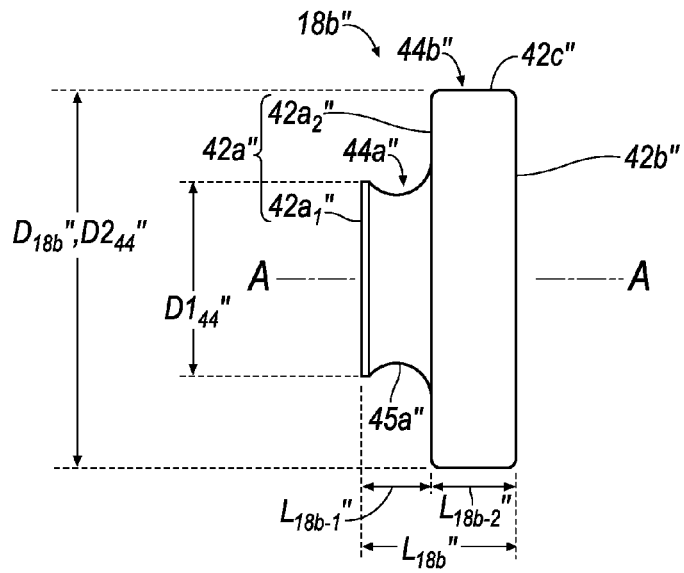
FIG. 25A is a side view of an exemplary nozzle array disk of a bubble generator subassembly of the bubble implosion reactor cavitation device of FIG. 21.
Figure 25B:
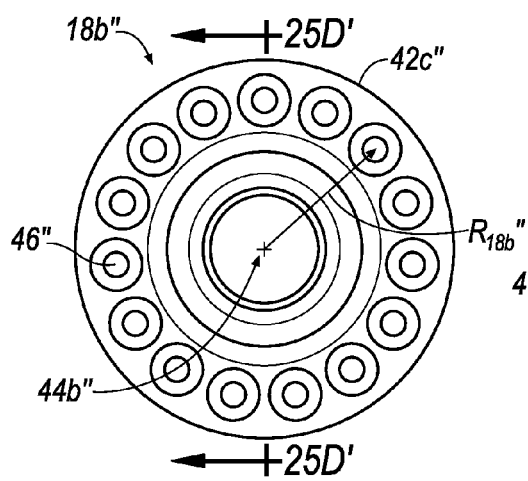
FIG. 25B is a front view of the nozzle array disk of the bubble generator subassembly of FIG. 25A.
Figure 25C:
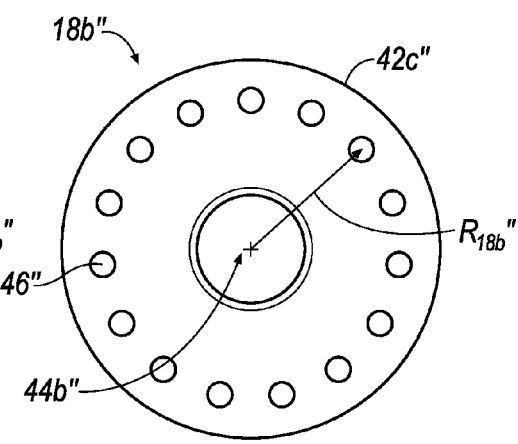
FIG. 25C is a rear view of the nozzle array disk of the bubble generator subassembly of FIG. 25A.
Figure 25D:
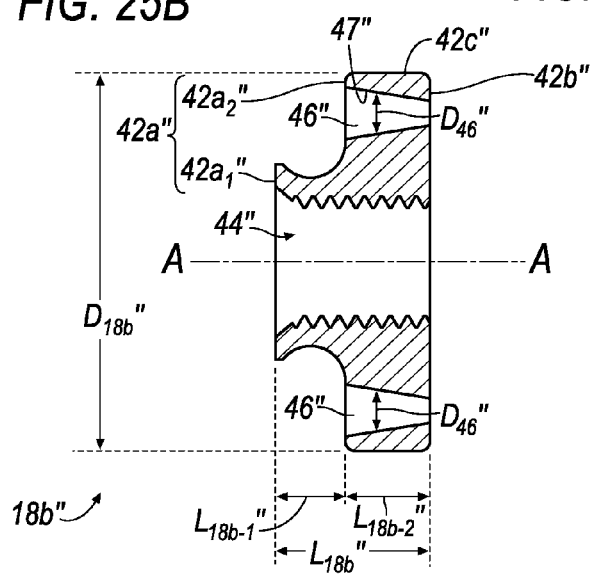
FIG. 25D is a cross-sectional view of the nozzle array disk of the bubble generator subassembly according to line 25D-25D of FIG. 25B.

Referring to FIG. 25D, a threaded axial passage 44" extends through the nozzle array disk 18b" between the upstream, distal end surface 42a" and the downstream, proximal end surface 42b". The threaded axial passage 44" is arranged along an axis, A-A, extending through an axial center of the nozzle array disk 18b" and permits passage of a threaded stem 50" extending away from the upstream-facing member 18c" to pass there through.

In an implementation, as seen in FIG. 25A, the nozzle array disk 18b" includes an upstream-facing projection 44a", an annular central portion 44b" and a downstream-facing projection 44c". The threaded axial passage 44" extends through each of the upstream-facing projection 44a", the annular central portion 44b" and the downstream-facing projection 44c".

As seen in FIG. 25A, the upstream-facing projection $44a''$ extends along a first length portion, $L_{18b-1}''$, of the length, $L_{18b}''$, of the nozzle array disk $18b''$. The annular central portion $44b''$ extends along a second length portion, $L_{18b-2}''$, of the length, $L_{18b}''$, of the nozzle array disk $18b''$. The downstream-facing projection $44c''$ extends along a third length portion, $L_{18b-3}''$, of the length, $L_{18b}''$, of the nozzle array disk $18b''$. The sum of the first, second and third length portions, $L_{18b-1}''$, $L_{18b-2}''$ $L_{18b-3}''$, equals the length, $L_{18b}''$, of the nozzle array disk $18b''$.

With continued reference to FIG. 25D, the upstream, distal end surface $42a''$ of the nozzle array disk $18b''$ may include a first upstream, distal end surface portion $42a_1''$ and a second upstream, distal end surface portion $42a_2''$. The second upstream, distal end surface portion $42a_2''$ is axially offset from the first upstream, distal end surface portion $42a_1''$ at a distance equal to the first length portion, $L_{18b-1}''$, of the length, $L_{18b}''$, of the nozzle array disk $18b''$. A circumferentially arcuate outer surface portion $45a''$ of the upstream-facing projection $44a''$ connects the first upstream, distal end surface portion $42a_1''$ to the second upstream, distal end surface portion $42a_2''$.

The downstream, proximal end surface $42b''$ of the nozzle array disk $18b''$ may include a first downstream, proximal end surface portion $42b_1''$ and a second downstream, proximal end surface portion $42b_2''$. The second downstream, proximal end surface portion $42b_2''$ is axially offset from the first downstream, proximal end surface portion $42b_1''$ at a distance equal to the third length portion, $L_{18b-3}''$, of the length, $L_{18b}''$, of the nozzle array disk $18b''$. A circumferentially arcuate outer surface portion $45b''$ of the downstream-facing projection $44c''$ connects the first downstream, proximal end surface portion $42b_1''$ to the second downstream, proximal end surface portion $42b_2''$.

The upstream-facing projection $44a''$ is defined by a first diameter, $D1_{44}''$. The annular central portion $44b''$ is defined by a second diameter, $D2_{44}''$. The downstream-facing projection $44c''$ is defined by a third diameter, $D3_{44}''$. The second diameter, $D2_{44}''$, is equal to the diameter, $D_{18b}''$ defined by the outer side surface $42c''$ of the nozzle array disk $18b''$. The third diameter, $D3_{44}''$, is less than the second diameter, $D2_{44}''$. The first diameter, $D1_{44}''$, is approximately equal to but slightly less than the third diameter, $D3_{44}''$.

In an implementation, the first diameter, $D1_{44}''$, is a non-constant diameter defined by the circumferentially arcuate outer surface portion $45a''$ of the upstream-facing projection $44a''$. The non-constant diameter, $D1_{44}''$, decreases or increases along the first length portion, $L_{18b-1}''$, of the length, $L_{18b}''$, of the nozzle array disk $18b''$ according to the pitch of the circumferentially arcuate outer surface portion $45a''$ of the upstream-facing projection $44a''$ In an implementation, the second diameter, $D2_{44}''$, is a constant diameter. Accordingly, the constant diameter, $D2_{44}''$, defined by the annular central portion $44b''$ is substantially the same along the second length portion, $L_{18b-2}''$, of the length, $L_{18b}''$, of the nozzle array disk $18b''$.

In an implementation, the third diameter, $D3_{44}''$, is a non-constant diameter defined by the circumferentially arcuate outer surface portion $45b''$ of the downstream-facing projection $44c''$. The non-constant diameter, $D3_{44}''$, defined by the circumferentially arcuate outer surface portion $45b''$ of the downstream-facing projection $44c''$ decreases or increases along the third length portion, $L_{18b-3}''$, of the length, $L_{18b}''$, of the nozzle array disk $18b''$ according to the pitch of the circumferentially arcuate outer surface portion $45b''$ of the downstream-facing projection $44c''$ Referring to FIGS. 25B-25D, the nozzle array disk $18b''$ includes a plurality of fluid-flow passages $46''$. An axial center of each fluid flow passage $46''$ of the plurality of fluid-flow passages $46''$ may be equally spaced from the axial center of the nozzle array disk $18b''$ at a radius, $R_{18b}''$ (see, e.g., FIGS. 25B-25C), to form a circular array/arrangement of fluid-flow passages $46''$.

Referring to FIG. 25D, each fluid flow passage $46''$ of the plurality of fluid-flow passages $46''$ is defined by a nozzle surface $47''$. The nozzle surface $47''$ defining each fluid flow passage $46''$ of the plurality of fluid-flow passages $46''$ extends along the second length portion, $L_{18b-2}''$, of the length, $L_{18b}''$, of the nozzle array disk $18b''$. Because the second length portion, $L_{18b-2}''$, of the length, $L_{18b}''$, of the nozzle array disk $18b''$ is arranged between the first length portion, $L_{18b-1}''$, and the third length portion, $L_{18b-3}''$, of the length, $L_{18b}''$, of the nozzle array disk $18b''$ as described above, the nozzle surface $47''$ defining each fluid flow passage $46''$ of the plurality of fluid-flow passages $46''$ connects the second upstream, distal end surface portion $42a_2''$ of the upstream, distal end surface $42a''$ to the second downstream, proximal end surface portion $42b_2''$ of the downstream, proximal end surface $42b''$.

As seen in FIG. 25D, the nozzle surface $47''$ defines each fluid flow passage $46''$ of the plurality of fluid-flow passages $46''$ to include a nozzle diameter, $D_{46}''$. In an implementation, the nozzle diameter, $D_{46}''$, of each fluid flow passage $46''$ of the plurality of fluid-flow passages $46''$ is a non-constant diameter. The non-constant nozzle diameter, $D_{46}''$, decreases along the second length portion, $L_{18b-2}''$, of the length, $L_{18b}''$, of the nozzle array disk $18b''$ as each fluid flow passage $46''$ of the plurality of fluid-flow passages $46''$ extends through the nozzle array disk $18b''$ in a direction referenced from the upstream, distal end surface $42a''$ toward the downstream, proximal end surface $42b''$; as a result, each fluid flow passage $46''$ of the plurality of fluid-flow passages $46''$ generally defines a conical passage that decreases in cross-section as each fluid flow passage $46''$ of the plurality of fluid-flow passages $46''$ extends through the nozzle array disk $18b''$ in a direction referenced from the upstream, distal end surface $42a''$ toward the downstream, proximal end surface $42b''$.

With continued reference to FIG. 25D, in an implementation, although the non-constant diameter, $D1_{44}''$, defined by the upstream-facing projection $44a''$ is approximately equal to but slightly less than the non-constant diameter, $D3_{44}''$, defined by the downstream-facing projection $44c''$, the non-constant diameter, $D1_{44}''$, defined by the upstream-facing projection $44a''$ may be said to be somewhat symmetrical to the non-constant diameter, $D3_{44}''$, defined by the downstream-facing projection $44c''$ (in reference to a line of symmetry, S-S, passing through the nozzle array disk $18b''$); therefore, the non-constant diameter, $D1_{44}''$, defined by the upstream-facing projection $44a''$ may be said to be somewhat symmetrically equal to the non-constant diameter, $D3_{44}''$, defined by the downstream-facing projection $44c''$. The largest diameter of the non-constant nozzle diameter, $D_{46}''$, of each conical fluid flow passage $46''$ is less than a smallest diameter of each of: (1) the non-constant diameter, $D1_{44}''$, defined by the upstream-facing projection $44a''$ and (2) the non-constant diameter, $D3_{44}''$, defined by the downstream-facing projection $44c''$.

Shown below is a table including an exemplary embodiment of dimensions of the conical nozzle array disk $18b'$ described in inches.

TABLE 10

| | Embodiment 1 |
|---|---|
| $L_{18b}$" | 0.85" |
| $L_{18b-1}$" | 0.30" |
| $L_{18b-2}$" | 0.25" |
| $L_{18b-3}$" | 0.30" |
| $D_{18b}$" | 1.14" |
| $D1_{44}$" | Between 0.96" and 1.04" |
| $D2_{44}$" | 1.14" |
| $D3_{44}$" | Between 0.96" and 1.04"" |
| $D_{46}$" | Between 0.08"" and 0.16" |
| $R_{18b}$" | 0.43" |

Referring to FIGS. 25A'-25D', an implementation of the nozzle array disk 18b" is described. The nozzle array disk 18b" of FIGS. 25A'-25D' is substantially similar to the nozzle array disk 18b" of FIGS. 25A-25D with the exception that the nozzle array disk 18b" of FIGS. 25A'-25D' does not include the downstream-facing projection 44c". Further, although the illustrated embodiment of the bubble generator subassembly 18" at, for example, FIGS. 22A-22B includes the nozzle array disk 18b" of FIGS. 25A-25D, the nozzle array disk 18b" could alternatively include the nozzle array disk 18b" of FIGS. 25A'-25D'.

Referring to FIGS. 25A"-25D", an implementation of the nozzle array disk 18b" is described. The nozzle array disk 18b" of FIGS. 25A"-25D" is substantially similar to the nozzle array disk 18b" of FIGS. 25A-25D with the exception that the nozzle array disk 18b" of FIGS. 25A"-25D" does not include the upstream-facing projection 44a". Further, although the illustrated embodiment of the bubble generator subassembly 18" at, for example, FIGS. 22A-22B includes the nozzle array disk 18b" of FIGS. 25A-25D, the nozzle array disk 18b" could alternatively include the nozzle array disk 18b" of FIGS. 25A"-25D".

As described above at FIGS. 25A'-25D' and 25A"-25D", the nozzle array disk 18b" may be modified to not include the upstream-facing projection 44a" or the downstream-facing projection 44c". Accordingly, it is also contemplated that some implementations of the nozzle array disk 18b" may also be design to not include both of the upstream-facing projection 44a" and the downstream-facing projection 44c". Accordingly, although the illustrated embodiment of the bubble generator subassembly 18" at, for example, FIGS. 22A-22B includes the nozzle array disk 18b" of FIGS. 25A-25D, the nozzle array disk 18b" could alternatively be designed to not include the upstream-facing projection 44a" and the downstream-facing projection 44c".

Referring to FIGS. 26A-26D, an implementation of the upstream-facing member 18c" of the bubble generator subassembly 18" is described. The upstream-facing member 18c" of the bubble generator subassembly 18" is defined by a length, $L_{18c}$" (see, e.g., FIGS. 26A and 26D), extending between an upstream, distal end surface 48a" and a downstream, proximal end surface 48b". An outer side surface 48c" connects the upstream, distal end surface 48a" to the downstream, proximal end surface 48b".

Figure 26A:
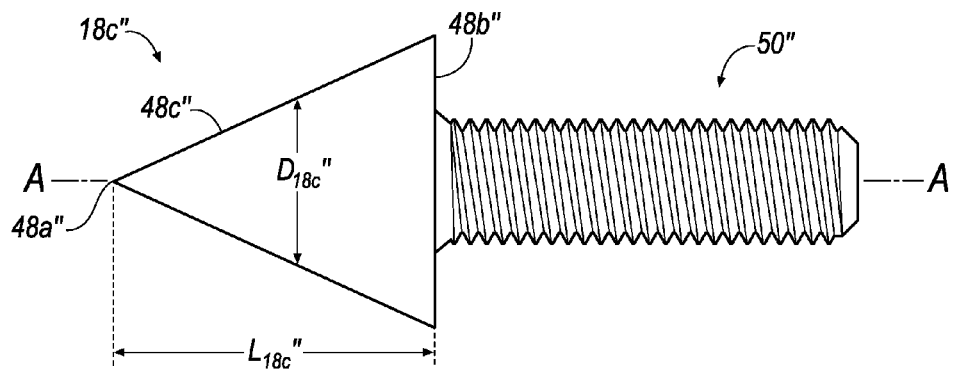
FIG. 26A is a side view of an exemplary upstream-facing member of a bubble generator subassembly of the bubble implosion reactor cavitation device of FIG. 21.
Figure 26B:
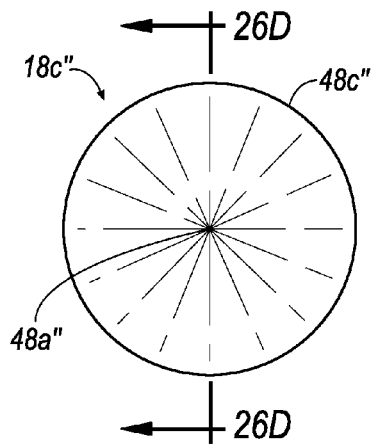
FIG. 26B is a front view of the upstream-facing member of the bubble generator subassembly of FIG. 26A.

The outer side surface 48c" defines the upstream-facing member 18c" to include a substantially conical shape defined by a non-constant diameter, $D_{18c}$" (see, e.g., FIG. 26A). In an implementation the non-constant diameter, $D_{18c}$", increases along the length, $L_{18c}$", of the upstream-facing member 18c" as the outer side surface 48c" extends from the upstream, distal end surface 48a" toward the downstream, proximal end surface 48b".

The upstream, distal end surface 48a" generally defined by a point. The downstream, proximal end surface 48b" is generally defined by a planar shape having a diameter, which is equal to the largest diameter of the non-constant diameter, $D_{18c}$", defined by the outer side surface 48c".

Figure 26C:
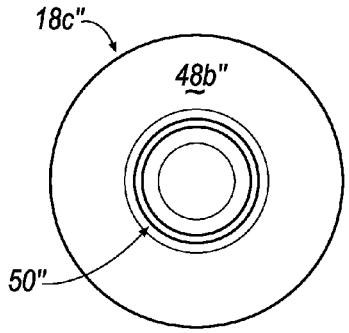
FIG. 26C is a rear view of the upstream-facing member of the bubble generator subassembly of FIG. 26A.
Figure 26D:
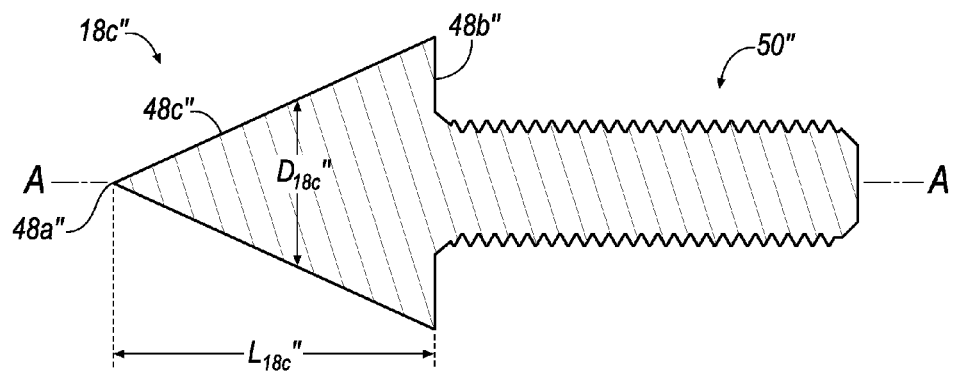
FIG. 26D is a cross-sectional view of the upstream-facing member of the bubble generator subassembly according to line 26D-26D of FIG. 26B.

Referring to FIGS. 26A and 26C-26D, a threaded stem 50" extends away from the downstream, proximal end surface 48b". The threaded stem 50" is arranged along an axis, A-A, extending through an axial center of the upstream-facing member 18c".

Shown below is a table including four exemplary embodiments of the upstream-facing member 18c" including a variety of lengths, $L_{18c}$", and diameters, $D_{18c}$", described in inches.

TABLE 11

| | Embodiment 1 | Embodiment 2 | Embodiment 3 | Embodiment 4 |
|---|---|---|---|---|
| $L_{18c}$" | 0.50" | 0.75" | 1.00" | 1.25" |
| $D_{18c}$" | 0.60" | 0.85" | 0.93" | 1.00" |

Referring to FIGS. 27A-27D, an implementation of the retaining member 24" is described. The retaining member 24" is generally defined by a tube-shaped member. The retaining member 24" may include a length, $L_{24}$" (see, e.g., FIGS. 27A and 27D), extending between an upstream, distal end surface 62a" and a downstream, proximal end surface 62b". Each of an outer side surface 62c" and an inner passage surface 62d" (see, e.g., FIG. 27D) connect the upstream, distal end surface 62a" to the downstream, proximal end surface 62b". The outer side surface 62c" defines the retaining member 24" to include a first diameter, $D1_{20}$", and a second diameter, $D2_{20}$" (see, e.g., FIGS. 27A and 27D).

The outer side surface 62c" is further defined to include a first outer side surface portion $62c_1$", a second outer side surface portion $62c_2$" and a third outer side surface portion $62c_3$". The second outer side surface portion $62c_2$" is arranged between the first outer side surface portion $62c_1$" and the third outer side surface portion $62c_3$"; the second outer side surface portion $62c_2$" generally defines a shoulder surface that connects the first outer side surface portion $62c_1$" to the third outer side surface portion $62c_3$" and demarcates the first diameter, $D1_{20}$", defined by the first outer side surface portion $62c_1$" from the second diameter, $D2_{20}$" defined by the third outer side surface portion $62c_3$".

The third outer side surface portion $62c_3$" defines a threaded surface. As seen in, e.g., FIGS. 29B-29C), the threaded surface formed by the third outer side surface portion $62c_3$" corresponds to and is threadingly-attachable to the threaded surface defined by the first cylindrical surface 32" of the first axial passage portion 26a" of the axial passage 26" of the tube-shaped cylindrical body 16" for securing the retaining member 24" to the upstream, distal end surface 16a" of the tube-shaped cylindrical body 16".

The inner passage surface 62d" defines an axial passage 64" that extends through the retaining member 24" between the upstream, distal end surface 62a" and the downstream, proximal end surface 62b" along an axis, A-A, that extends through the retaining member 24". The inner passage surface 62d" is further defined to include a first inner passage surface portion $62d_1$", a second inner passage surface portion $62d_2$" and a third inner passage surface portion $62d_3$". The second inner passage surface portion $62d_2$" is arranged between the first inner passage surface portion $62d_1$" and the third inner passage surface portion $62d_3$".

The first inner passage surface portion $62d_1$" defines a threaded surface. As will be described in the following disclosure, the threaded surface formed by first inner passage surface portion $62d_1''$ corresponds to and is threadingly attachable to an outer threaded surface portion, $C_{I\text{-}T}$ (see, e.g., FIGS. 29C-29D) of the fluid inlet conduit, $C_I$, for securing the retaining member 24" to the outer threaded surface portion, $C_{I\text{-}T}$, of the fluid inlet conduit, $C_I$.

The first inner passage surface portion $62d_1''$ defines the axial passage 64" to include a first passage diameter, $D1_{64}''$ (see, e.g., FIGS. 27B and 27D). The second inner passage surface portion $62d_2''$ defines the axial passage 64" to include a second passage diameter, $D2_{64}''$ (see, e.g., FIGS. 27C and 27D). The third inner passage surface portion $62d_3''$ defines the axial passage 64" to include a third passage diameter, $D3_{64}''$ (see, e.g., FIGS. 27C and 27D). Each of the first passage diameter, $D1_{64}''$, and the third passage diameter, $D3_{64}''$, define a constant diameter. The second passage diameter, $D2_{64}''$, defines a non-constant diameter that increases in cross-section at the retaining member 24" extends from the distal end surface 62a" of the retaining member 24" toward the downstream, proximal end surface 62b" of the retaining member 24". The first passage diameter, $D1_{64}''$, is equal to the smallest diameter of the non-constant diameter defined by the second passage diameter, $D2_{64}''$. The third passage diameter, $D3_{64}''$, is equal to the largest diameter of the non-constant diameter defined by the second passage diameter, $D2_{64}''$.

Access to the axial passage 64" is permitted by an inlet opening 66a" (see, e.g., FIGS. 27B, 27D) formed in the upstream, distal end surface 62a" of the retaining member 24" and an outlet opening 66b" (see, e.g., FIGS. 27C-27D) formed in the downstream, proximal end surface 62b" of the retaining member 24". Referring to FIGS. 27B, 27D and 29C, the inlet opening 66a" of the retaining member 24" may also define the inlet opening 14a" of the bubble implosion reactor cavitation device 10", and, the upstream, distal end surface 62a" of the retaining member 24" may also define the upstream, distal end 10a" of the bubble implosion reactor cavitation device 10".

An embodiment for assembling the bubble implosion reactor cavitation device 10" is described as follows. A first step in the process for assembling the bubble implosion reactor cavitation device 10" is assembling the bubble generator subassembly 18", which is shown at FIGS. 28A-28F.

Figure 28A:
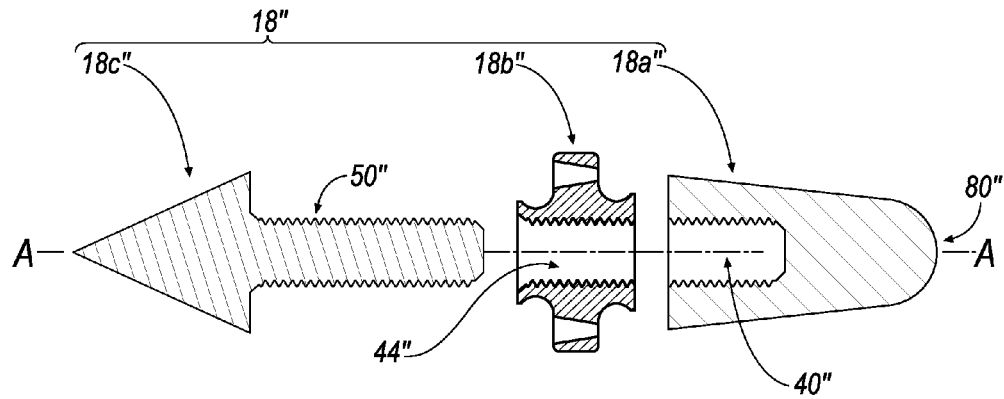
Figure 28B:
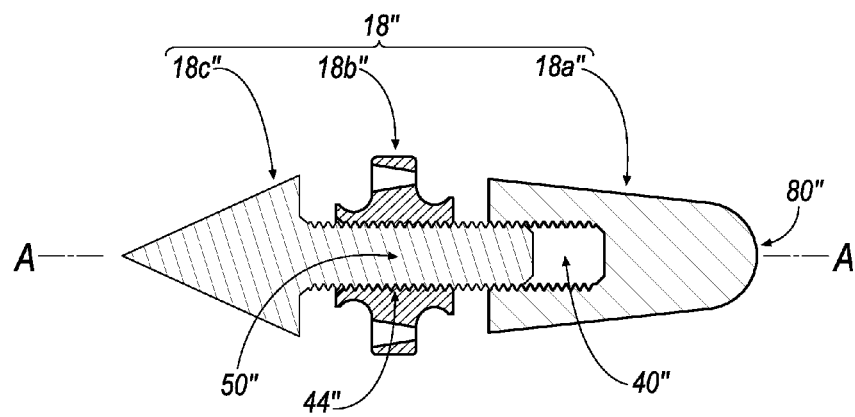

Referring to FIG. 28A, the bubble generator subassembly 18" is assembled by firstly arranging the nozzle array disk 18b" (i.e., the embodiment of, e.g., FIGS. 25A-25D) between the downstream-facing member 18a" and the upstream-facing member 18c" such that the threaded stem 50" of the upstream-facing member 18c" is axially aligned along the axis, A-A, with the axial passage 44" of the nozzle array disk 18b" and the threaded passage 40" of the downstream-facing member 18a". Then, as seen in FIG. 28B, the threaded stem 50" is extended through the axial passage 44" of the nozzle array disk 18b" and into the threaded passage 40" of the downstream-facing member 18a".

Figure 28C:
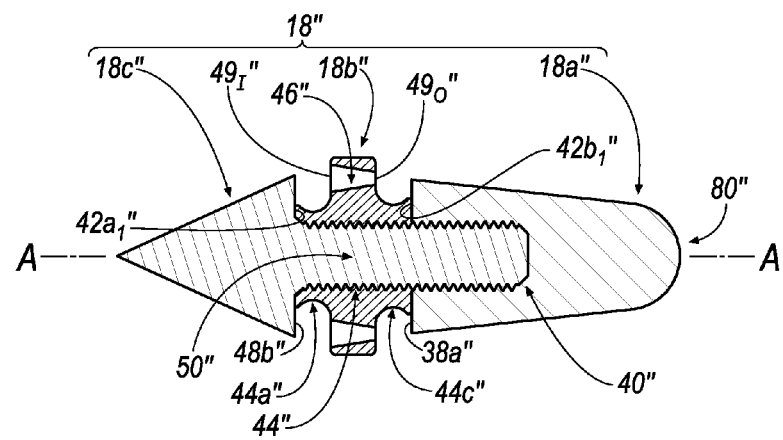

Referring to FIG. 28C, upon fully inserting the threaded stem 50" into the threaded passage 40" of the downstream-facing member 18a": (1) the downstream, proximal end surface 48b" of the upstream-facing member 18c" is disposed adjacent the first upstream, distal end surface portion $42a_1''$ of the upstream, distal end surface 42a" of the nozzle array disk 18b", and (2) the upstream, distal end surface 38a" of the downstream-facing member 18a" is disposed adjacent the first downstream, proximal end surface portion $42b_1''$ of the downstream, proximal end surface 42b" of the nozzle array disk 18b".

Referring to FIGS. 28C and 28E-28F, when the bubble generator subassembly 18" is assembled as described above, the downstream, proximal end surface 48b" of the upstream-facing member 18c" is arranged in a spaced-apart relationship with respect to and does not partially obstruct/obscure an inlet opening $49_I''$ defined by each conical passage 46" of the circularly-arranged plurality of fluid-flow passages 46" of the nozzle array disk 18b" as a result of the nozzle array disk 18b" including the upstream-facing projection 44a". Similarly, when the bubble generator subassembly 18" is assembled as described above, the upstream, distal end surface 38a" of the downstream-facing member 18a" is arranged in a spaced-apart relationship with respect to and does not partially obstruct/obscure approximately half of an outlet opening $49_O''$ defined by each conical passage 46" of the circularly-arranged plurality of fluid-flow passages 46" of the nozzle array disk 18b" as a result of the nozzle array disk 18b" including the downstream-facing projection 44c". If, however, the embodiment of the nozzle array disk 18b" shown at FIG. 25A'-25D' or 25A"-25D" were included in the design of the nozzle disk array 18", the lack of one or more of the upstream-facing projection 44a" and the downstream-facing projection 44c" would result in partial obstruction/obscuring of one or more of the inlet opening $49_I''$ and outlet opening $49_O''$ defined by each conical passage 46" of the circularly-arranged plurality of fluid-flow passages 46" by one or both of the downstream, proximal end surface 48b" of the upstream-facing member 18c" and the upstream, distal end surface 38a" of the downstream-facing member 18a".

Referring to FIG. 29A, once the bubble generator subassembly 18" is assembled as described above, the bubble generator subassembly 18" is inserted into the axial passage 26" of the tube-shaped cylindrical body 16" at the inlet opening 28a" formed in the upstream, distal end surface 16a" of the tube-shaped cylindrical body 16". The bubble generator subassembly 18" may be said to be fully inserted into the axial passage 26" of the tube-shaped cylindrical body 16" when the second downstream, proximal end surface portion $42b_2''$ of the nozzle array disk 18b" is disposed adjacent the second inner shoulder surface 37" defined by the axial passage 26" of the tube-shaped cylindrical body 16".

Referring to FIG. 29B, a largest diameter of the non-constant diameter, $D_{18a}''$ defined by the outer side surface 38c" of the downstream-facing member 18a" may be approximately equal to but slightly less than the third diameter, $D3_{26}''$, defined by the third axial passage portion 26c" of the axial passage 26" that extends through the tube-shaped cylindrical body 16"; accordingly, as the bubble generator subassembly 18" is inserted into the axial passage 26" of the tube-shaped cylindrical body 16" as described above, the outer side surface 38c" of the downstream-facing member 18a" may be arranged within the third axial passage portion 26c" of the axial passage 26" in spaced-apart relationship with respect to the third cylindrical surface 35" defined by the third axial passage portion 26c" of the axial passage 26".

Referring to FIG. 29B, a largest diameter of the non-constant third diameter, $D3_{44}''$ defined by the circumferentially arcuate outer surface portion 45b" of the downstream-facing projection 44c" of the nozzle array disk 18b" may be less than the third diameter, $D3_{26}''$, defined by the third axial passage portion 26c" of the axial passage 26" that extends through the tube-shaped cylindrical body 16"; accordingly, as the bubble generator subassembly 18" is inserted into the axial passage 26" of the tube-shaped cylindrical body 16" as described above, the circumferentially arcuate outer surface portion 45b" of the downstream-facing projection 44c" of the nozzle array disk 18b" may be arranged within the third axial passage portion 26c" of the axial passage 26" in spaced-apart relationship with respect to the third cylindrical surface 35" defined by the third axial passage portion 26c" of the axial passage 26".

Referring to FIG. 29B, the second diameter, $D2_{44}$", defined by the annular central portion 44b" of the nozzle array disk 18b" may be approximately equal to but slightly less than the second diameter, $D2_{26}$", defined by the second axial passage portion 26b" of the axial passage 26" that extends through the tube-shaped cylindrical body 16"; accordingly, as the bubble generator subassembly 18" is inserted into the axial passage 26" of the tube-shaped cylindrical body 16" as described above, the outer side surface 42c" of the annular central portion 44b" of the nozzle array disk 18b" may be arranged within the second axial passage portion 26b" of the axial passage 26" in adjacent relationship with respect to the second cylindrical surface 34" defined by the second axial passage portion 26b" of the axial passage 26" such that the bubble generator subassembly 18" is axially centered about the central axis, A-A, extending through the tube-shaped cylindrical body 16". In an embodiment, the adjacent relationship of the outer side surface 42c" of the annular central portion 44b" of the nozzle array disk 18b" and the second cylindrical surface 34" defined by the second axial passage portion 26b" may be a wedged or friction-fit connection.

Referring to FIG. 29B, a largest diameter of the non-constant first diameter, $D1_{44}$" defined by the circumferentially arcuate outer surface portion 45a" of the upstream-facing projection 44a" of the nozzle array disk 18b" may be less than the first diameter, $D1_{26}$", defined by the first axial passage portion 26a" of the axial passage 26" that extends through the tube-shaped cylindrical body 16"; accordingly, as the bubble generator subassembly 18" is inserted into the axial passage 26" of the tube-shaped cylindrical body 16" as described above, the circumferentially arcuate outer surface portion 45a" of the upstream-facing projection 44a" of the nozzle array disk 18b" may be arranged within the first axial passage portion 26a" of the axial passage 26" in spaced-apart relationship with respect to the first cylindrical surface 32" defined by the first axial passage portion 26a" of the axial passage 26".

Referring to FIG. 29B, a largest diameter of the non-constant diameter, $D_{18c}$" defined by the outer side surface 48c" of the upstream-facing member 18c" may be less than the first diameter, $D1_{26}$", defined by the first axial passage portion 26a" of the axial passage 26" that extends through the tube-shaped cylindrical body 16"; accordingly, as the bubble generator subassembly 18" is inserted into the axial passage 26" of the tube-shaped cylindrical body 16" as described above, the outer side surface 48c" of the upstream-facing member 18c" may be arranged within the first axial passage portion 26a" of the axial passage 26" in spaced-apart relationship with respect to the first cylindrical surface 32" defined by the first axial passage portion 26a" of the axial passage 26".

As seen in FIG. 29B, when the bubble generator subassembly 18" is arranged relative to the tube-shaped cylindrical body 16" as described above a plurality of fluid-flow spacings 51a", 51b", 53a", 53b" are created. For example, (1) a first downstream fluid-flow spacing 51a' is created as a result of the spaced-apart relationship between the circumferentially arcuate outer surface portion 45b" of the downstream-facing projection 44c" of the nozzle array disk 18b" and the third cylindrical surface 35" defined by the third axial passage portion 26c" of the axial passage 26", (2) a second downstream fluid-flow spacing 51b' is created as a result of the spaced-apart relationship between the outer side surface 38c" of the downstream-facing member 18a" and the third cylindrical surface 35" defined by the third axial passage portion 26c" of the axial passage 26", (3) a first upstream fluid-flow spacing 53a' is created as a result of the spaced-apart relationship between the outer side surface 48c" of the upstream-facing member 18c" and the first cylindrical surface 32" defined by the first axial passage portion 26a" of the axial passage 26" and (4) a second downstream fluid-flow spacing 53b' is created as a result of the spaced-apart relationship between the circumferentially arcuate outer surface portion 45a" of the upstream-facing projection 44a" of the nozzle array disk 18b" and the first cylindrical surface 32" defined by the first axial passage portion 26a" of the axial passage 26".

Referring to FIG. 29B, once the bubble generator subassembly 18" is fully inserted into the axial passage 26" of the tube-shaped cylindrical body 16" as described above, the threaded surface defined by the outer third outer side surface portion $62c_3$" of the side surface 62c" of the retaining member 24" is threadingly-attached to the threaded surface defined by the first cylindrical surface 32" of the first axial passage portion 26a" of the axial passage 26" of the tube-shaped cylindrical body 16" for securing the retaining member 24" about the upstream, distal end surface 16a' of the tube-shaped cylindrical body 16' as seen in FIG. 29C. The retaining member 24" may be said to be fully connected to the tube-shaped cylindrical body 16" when the downstream, proximal end surface 62b" of the retaining member 24" is disposed directly adjacent the upstream, distal end surface 16a" of the tube-shaped cylindrical body 16" Next, as seen in FIGS. 29C-29D, the outer threaded surface portion, $C_{I-T}$, of the fluid inlet conduit, $C_I$, is threadingly attached to the threaded surface formed by first inner passage surface portion $62d_1$" of the inner passage surface 62d" of the retaining member 24" for securing the fluid inlet conduit, $C_I$, to the retaining member 24".

Once the bubble implosion reactor cavitation device 10" is assembled and subsequently connected to the fluid inlet conduit, $C_I$, as described above, the bubble implosion reactor cavitation device 10" may be said to be connected to a fluid handling system, such as, for example the fluid handling system, S1/S2, described above. Once the bubble implosion reactor cavitation device 10" is connected to the fluid handling system, S1/S2, liquid, L, may enter the fluid-flow passage 12" of the bubble implosion reactor cavitation device 10" at the inlet opening 14a" of the bubble implosion reactor cavitation device 10", and, the liquid, L, may exit fluid-flow passage 12" of the bubble implosion reactor cavitation device 10" at the outlet opening 14b" of the bubble implosion reactor cavitation device 10".

As described above, the structural arrangement and dimensions of components 16"-24" defines the geometry fluid-flow passage 12", which forms a plurality of processing zones I-IX (see FIG. 2B) along the length, $L_{10}$, of the bubble implosion reactor cavitation device 10". Referring to FIG. 29D, from the upstream, distal end 10a" of the bubble implosion reactor cavitation device 10" to the downstream, proximal end 10b" of the bubble implosion reactor cavitation device 10", the fluid-flow passage 12" is defined by: (1) the first upstream fluid-flow spacing 53a", (2) the second upstream fluid-flow spacing 53b", (3) the plurality of conical fluid-flow passages 46" of the conical nozzle array disk 18b", (4) the first downstream fluid-flow spacing 51a", (5)

the second downstream fluid-flow spacing 51b", and (6) a remainder 26$_R$" of the axial passage 26" of the tube-shaped cylindrical body 16" extending between a peak 80" defined by the hemispherical shape of the downstream, proximal end surface 38b" of the downstream-facing member 18a" of the bubble generator subassembly 18' and the outlet opening 28b" formed in the downstream, proximal end surface 16b" of the tube-shaped cylindrical body 16".

Referring to FIG. 32, motion of the liquid, L, within an exemplary bubble implosion reactor cavitation device 10'" connected to a fluid handling system (such as, e.g., the fluid handling system, S1/S2 described above) is described according to an embodiment. The bubble implosion reactor cavitation device 10' includes a fluid inlet diameter, D1, and a fluid outlet diameter, D3. Arranged between the fluid inlet diameter, D1, and the fluid outlet diameter, D3, is a bubble generator subassembly 18' and tube-shaped cylindrical body 16', which may be substantially similar to the bubble generator subassembly 18, 18', 18" and tube-shaped cylindrical body 16, 16', 16" of the bubble implosion reactor cavitation devices 10, 10', 10" described above. A fluid inlet conduit, C$_I$, is shown connected to the fluid inlet diameter, D1, and a cavitation-inducing pump, P, is shown connected to the fluid outlet diameter, D3.

The bubble generator subassembly 18'" may generally define an intermediate diameter, D2. In an implementation, the intermediate diameter, D2, may be generally represented by a fluid flow passages formed by a combination of a downstream-facing member (in an embodiment, see, e.g., the downstream-facing member 18a, 18a', 18a" described above), a nozzle array disk (in an embodiment, see, e.g., the nozzle array disk 18b, 18b', 18b" described above) and an upstream-facing member (in an embodiment, see, e.g., the upstream-facing member 18c, 18c', 18c" described above) of the bubble generator subassembly 18'". The intermediate diameter, D2, is arranged between the fluid inlet diameter, D1, and the fluid outlet diameter, D3.

With continued reference to FIG. 32, first, second and third fluid flow average velocities within the bubble implosion reactor cavitation device 10'" are shown generally at $V_1$, $V_2$ and $V_3$. The first fluid flow velocity, $V_1$, is located upstream of the fluid inlet diameter, D1. The second fluid flow velocity, $V_2$, is located slightly downstream of the bubble generator subassembly 18'". The third fluid flow velocity, $V_3$, is located slightly upstream of the fluid outlet diameter, D3.

Further, first, second and third fluid flow pressure differences within the bubble implosion reactor cavitation device 10'" are shown generally at $P_1$, $P_2$ and $P_3$. The first fluid flow pressure difference, $P_1$, is located upstream of the fluid inlet diameter, D1. The second fluid flow pressure difference, $P_2$, is located slightly downstream of the fluid inlet diameter, D1, and slightly upstream of the bubble generator subassembly 18'". The third fluid flow pressure difference, $P_3$, is located slightly upstream of the fluid outlet diameter, D3.

In an implementation, the fluid inlet diameter, D1, may be approximately equal to the fluid outlet diameter, D3. The intermediate diameter, D2, may be less than each of the fluid inlet diameter, D1, and the fluid outlet diameter, D3. Accordingly, fluid, such as the liquid, L, that is fed from a large diameter (see, e.g., D1) into a smaller diameter (see, e.g., D2) and then into a larger diameter (see, e.g., D3) may demonstrate the Bernoulli's Principle. The fluid flow principles (i.e., a discussion of Bernoulli's Principle, Poiseuille's Law, etc.) described below with respect to the bubble implosion reactor cavitation device 10'" may also apply to the bubble implosion reactor cavitation devices 10, 10', 10" described above.

Because the liquid, L, is incompressible, a flow rate "Q" (see Equation 1 below) is constant at every part of the bubble implosion reactor cavitation device 10'". In Equation 1 below, "A" is represented by a cross-sectional area ($\Pi D^2/4$).

$$Q = AV \quad \quad \text{Equation 1}$$

The fluid flow rate, "Q", may be represented in gallons per minute (GPM). Assuming the fluid inlet diameter, D1, is equal to 12.25 mm and the intermediate diameter, D2, is equal to 1.7 mm, when the fluid flow rate, "Q" is equal to 1, the first fluid flow velocity, $V_1$, is equal to 0.54 m/s and the second fluid flow velocity, $V_2$, is equal to 13.9 m/s. In another implementation, assuming the fluid inlet diameter, D1, is equal to 12.25 mm and the intermediate diameter, D2, is equal to 1.7 mm, when the fluid flow rate, "Q" is equal to 2, the first fluid flow velocity, $V_1$, is equal to 1.07 m/s and the second fluid flow velocity, $V_2$, is equal to 27.8 m/s.

An estimate of fluid flow pressure difference upstream of the bubble generator subassembly 18'" is shown below in Equation 2 by using Bernoulli's Principle:

$$(P/\rho) + (V^2/2) = \text{Constant} \quad \quad \text{Equation 2}$$

The first and second fluid flow average velocities, $V_1$, $V_2$, and the first and second fluid flow pressure differences, $P_1$, $P_2$, are applied to Equation 2 as follows:

$$(P_1/\rho) + (V_1^2/2) = (P_2/\rho) + (V_2^2/2) \text{ and } P_1 - P_2 = \tfrac{1}{2}(V_2^2 - V_1^2)$$

In terms of fluid flow rate, "Q", Equation 2 can be recast in the form of:

$$P_1 - P_2 = \tfrac{1}{2}\rho(1 - (A2/A1)^2)(Q/A2)^2$$

Therefore, in an implementation, when "Q"=1 GPM:

$$P_1 - P_2 \approx 14 \text{ psi}$$

Therefore, in an implementation, when "Q"=2 GPM:

$$P_1 - P_2 \approx 56 \text{ psi}$$

The pressure drop between the bubble generator subassembly 18'" and the downstream-most-part of the tube-shaped cylindrical body 16'" is a little less because the pressure is decreased after passing through the bubble generator subassembly 18'" due to viscosity of the liquid, L. This effect can be estimated from Poiseuille's Law of the flow of a viscous liquid in a tube (see Equation 3 below)

$$P_1 - P_2 = (8\rho)(Q^2)[(\lambda L)/(\Pi^2 D^5)] \quad \quad \text{Equation 3}$$

where $\lambda$ is friction coefficient which for turbulent flow with Re<100000 is given by Prandtl equation:

$$\lambda^{-0.5} = 2 \log [Re \lambda^{0.5}/2.51]$$

As a result, liquid, L, within the bubble implosion reactor cavitation device 10'" is accelerated when entering the bubble generator subassembly 18'" and then sprays itself into a vacuum zone (i.e., the upstream part of the tube-shaped cylindrical body 16". By design, a high turbulence is created in the vacuum zone thereby creating bubbles that are heavily mixed with the liquid, L, which continues to flow with rapidly increasing ambient pressure. Rapid change in pressure is similar to the sonoluminescence phenomenon, where acoustically driven changes in pressure cause the bubbles in the liquid, L, to collapse and emit light pulses. The dynamics of the motion if the bubbles are characterized to a first approximation by the Rayleigh-Plesset equation.

Flow rates of 1 GPM to 35 GPM have been used to generate implosion reactions within any of the bubble implosion reactor cavitation devices 10, 10', 10", 10'", 10"" described above. Pump capacities of ⅜ horsepower to ¾ horsepower work well with the embodiments of the bubble implosion reactor cavitation devices 10, 10', 10", 10'", 10"" described above. Although pump capacities of ⅜ horsepower to ¾ horsepower are described above, other pump capacities may also be used.

Referring to FIG. 33, an exemplary bubble implosion reactor cavitation device 10"" connected to a fluid handling system (such as, e.g., the fluid handling system, S1/S2 described above) is described according to an embodiment. The bubble implosion reactor cavitation device 10"" is substantially similar to the bubble implosion reactor cavitation devices 10, 10', 10", 10'" described above and includes a bubble generator subassembly 18"" and tube-shaped cylindrical body 16""; however, the bubble implosion reactor cavitation device 10"" further comprises a valve, V, and a manometer, M, disposed between the outlet opening 14b"" formed by a downstream, proximal end 10b"" of the bubble implosion reactor cavitation device 10"" and the upstream, distal end, $P_U$, of the cavitation-inducing pump, P. The valve, V, may be automatically operated with a computer program, or, alternatively, manually by a user.

In the arrangement shown in FIG. 33, the manometer, M, is disposed downstream of the valve, V. The arrangement of the valve, V, and the manometer, M, may also be incorporated into the design of the bubble implosion reactor cavitation devices 10, 10', 10" by arranging the valve, V, and the manometer, M, between the outlet opening 14b"" formed by a downstream, proximal end 10b"" of the bubble implosion reactor cavitation device 10"" and the upstream, distal end, $P_U$, of the cavitation-inducing pump, P.

Referring to FIGS. 34a-34e, implementations of alternative downstream-facing members $18a_x$ are described. Accordingly, it is contemplated that the downstream-facing members 18a, 18a', 18a" of the bubble generator subassemblies 18, 18', 18" described above may be substituted with any downstream-facing member $18a_x$ shown in FIGS. 34a-34e.

Each downstream-facing member $18a_x$ may be defined by a length, $L_{18a\text{-}x}$, extending between an upstream, distal end surface $38a_x$ and a downstream, proximal end surface $38b_x$. An outer side surface $38c_x$ connects the upstream, distal end surface $38a_x$ to the downstream, proximal end surface $38b_x$.

The outer side surface $38c_x$ defines the downstream-facing member $18a_x$ to include a substantially cylindrical shape defined by a non-constant diameter, $D_{18a\text{-}x}$. In an implementation the non-constant diameter, $D_{18a\text{-}x}$, slightly reduces along the length, $L_{18a\text{-}x}$, of the downstream-facing member $18a_x$ as the outer side surface $38c_x$ extends from the upstream, distal end surface $38a_x$ toward the downstream, proximal end surface $38b_x$.

As seen above in FIGS. 4A, 15A and 24A, the outer side surface 38c, 38c' and 38c" of the downstream-facing members 18a, 18a', 18a" are generally defined by a smooth, uninterrupted surface. However, the outer side surface $38c_x$ of the alternative downstream-facing members $18a_x$ of FIGS. 34a-34e each include a non-smooth, interrupted surface such as, for example, a fluted, spiral surface.

The downstream, proximal end surface $38b_x$ defines generally defines the downstream-facing member $18a_x$ to include a hemispherical shape. Unlike the hemispherical shape of the downstream, proximal end surface $38b_x$, the upstream, distal end surface $38a_x$ is generally defined by a planar shape. The planar shape of the upstream, distal end surface $38a_x$ may be defined by a diameter that is equal to the largest diameter of the non-constant diameter, $D_{18a\text{-}x}$, defined by the outer side surface $38c_x$ of the downstream-facing member $18a_x$.

Although side views of the alternative downstream-facing members $18a_x$ are shown in FIGS. 34a-34e, the alternative downstream-facing members $18a_x$ also include a threaded passage (see, e.g., 40, 40', 40" of downstream-facing members 18a, 18a', 18a") that receives a threaded stem (see, e.g., 50, 50', 50" of upstream-facing members 18c, 18c', 18c") of a corresponding upstream-facing member. The threaded passage extends partially into the downstream-facing member $18a_x$ from the upstream, distal end surface $38a_x$. The threaded passage may be arranged along an axis, A-A, extending through an axial center of the downstream-facing member $18a_x$.

Shown below is a table directed to each embodiment of the downstream-facing member $18a_x$ shown at FIGS. 34a-34e including an exemplary length dimension, $L_{18a\text{-}x}$, and an exemplary diameter dimension, $D_{18a\text{-}x}$, described in inches. The exemplary length dimension, $L_{18a\text{-}x}$, and the exemplary diameter dimension, $D_{18a\text{-}x}$, for each downstream-facing member $18a_x$ may be expressed as a ratio (i.e., a length-to-diameter ratio such as, e.g., $L_{18a\text{-}x}:D_{18a\text{-}x}$).

TABLE 12

Figure 34A:
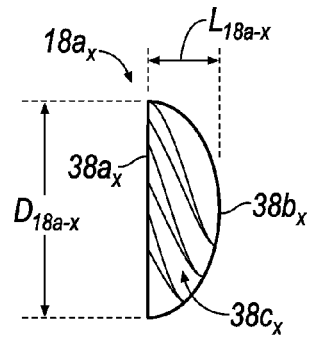
FIGS. 34a-34e illustrate side views of exemplary downstream-facing members of a bubble generator subassembly of a bubble implosion reactor cavitation device.
Figure 34B:
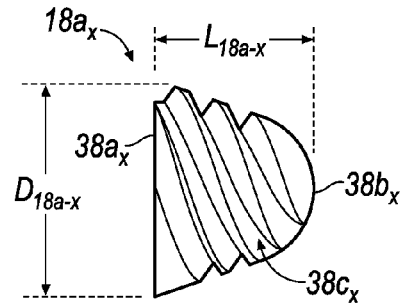
Figure 34C:
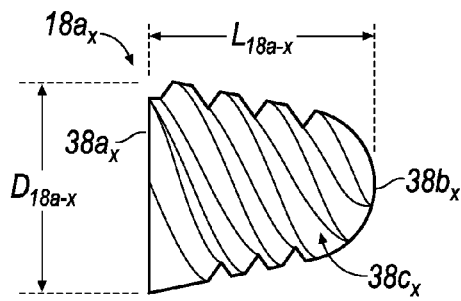
Figure 34D:
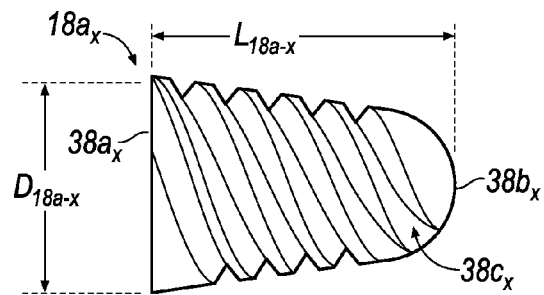
Figure 34E:
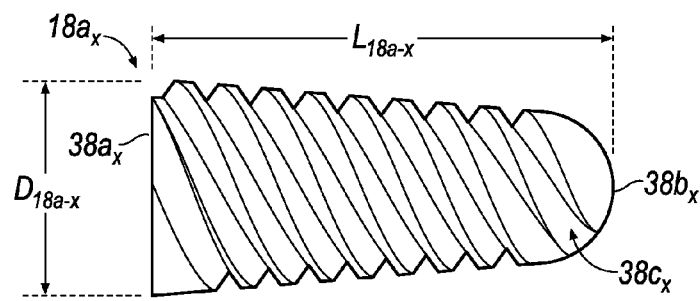
Figure 35A:
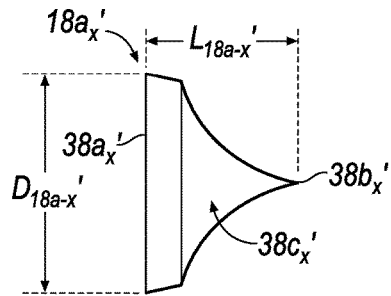
FIGS. 35a-35e illustrate side views of exemplary downstream-facing members of a bubble generator subassembly of a bubble implosion reactor cavitation device.
Figure 35B:
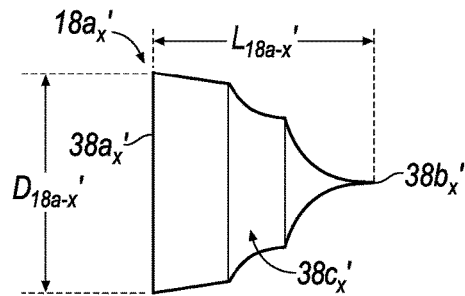
Figure 35C:
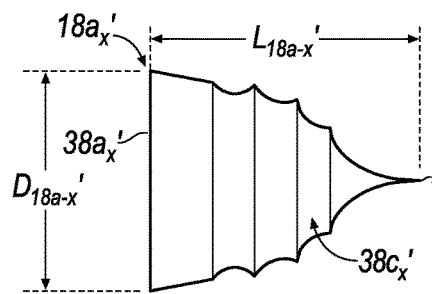
Figure 35D:
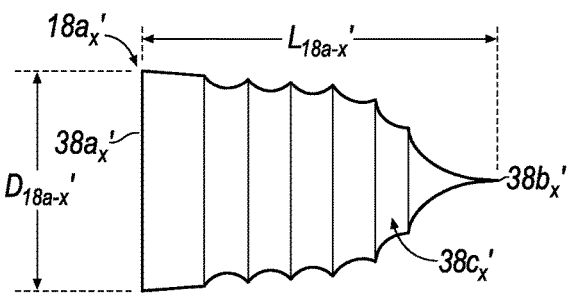
Figure 35E:
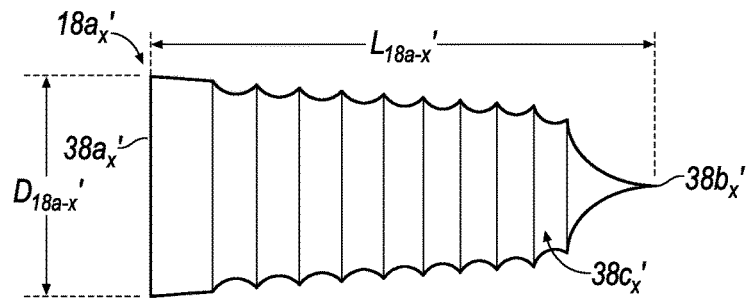

|  | FIG. 34a | FIG. 34b | FIG. 34c | FIG. 34d | FIG. 35e |
|---|---|---|---|---|---|
| $L_{18a\text{-}x}$ | 0.50" | 0.75" | 1.00" | 1.25" | 1.50" |
| $D_{18a\text{-}x}$ | 0.30" | 0.60" | 0.85" | 0.93" | 1.00" |

Referring to FIGS. 35a-35e, implementations of alternative downstream-facing members $18a_x'$ are described. Accordingly, it is contemplated that the downstream-facing members 18a, 18a', 18a" of the bubble generator subassemblies 18, 18', 18" described above may be substituted with any downstream-facing member $18a_x'$ shown in FIGS. 35a-35e.

Each downstream-facing member $18a_x'$ may be defined by a length, $L_{18a\text{-}x}'$, extending between an upstream, distal end surface $38a_x'$ and a downstream, proximal end surface $38b_x'$. An outer side surface $38c_x'$ connects the upstream, distal end surface $38a_x'$ to the downstream, proximal end surface $38b_x'$.

The outer side surface $38c_x'$ defines the downstream-facing member $18a_x'$ to include a substantially cylindrical shape defined by a non-constant diameter, $D_{18a\text{-}x}'$. In an implementation the non-constant diameter, $D_{18a\text{-}x}'$, slightly reduces along the length, $L_{18a\text{-}x}'$, of the downstream-facing member $18a_x'$ as the outer side surface $38c_x'$ extends from the upstream, distal end surface $38a_x'$ toward the downstream, proximal end surface $38b_x'$.

As seen above in FIGS. 4A, 15A and 24A, the outer side surface 38c, 38c' and 38c" of the downstream-facing members 18a, 18a', 18a" are generally defined by a smooth, uninterrupted surface. However, the outer side surface $38c_x'$ of the alternative downstream-facing members $18a_x'$ of FIGS. 35a-35e each include a non-smooth, interrupted surface such as, for example, a stepped surface; each stepped surface may be defined by a circumferentially arcuate outer surface portion.

The downstream, proximal end surface $38b_x'$ defines generally defines the downstream-facing member $18a_x'$ to include a point. Unlike the point of the downstream, proximal end surface $38b_x'$, the upstream, distal end surface $38a_x'$ is generally defined by a planar shape. The planar shape of the upstream, distal end surface $38a_x'$ may be defined by a diameter that is equal to the largest diameter of the non-constant diameter, $D_{18a-x}'$, defined by the outer side surface $38c_x'$ of the downstream-facing member $18a_x'$.

Although side views of the alternative downstream-facing members $18a_x'$ are shown in FIGS. 35a-35e, the alternative downstream-facing members $18a_x'$ also include a threaded passage (see, e.g., 40, 40', 40" of downstream-facing members 18a, 18a', 18a") that receives a threaded stem (see, e.g., 50, 50', 50" of upstream-facing members 18c, 18c', 18c") of a corresponding upstream-facing member. The threaded passage extends partially into the downstream-facing member $18a_x'$ from the upstream, distal end surface $38a_x'$. The threaded passage may be arranged along an axis, A-A, extending through an axial center of the downstream-facing member $18a_x'$.

Shown below is a table directed to each embodiment of the downstream-facing member $18a_x'$ shown at FIGS. 35a-35e including an exemplary length dimension, $L_{18a-x}'$, and an exemplary diameter dimension, $D_{18a-x}'$, described in inches. The exemplary length dimension, $L_{18a-x}'$, and the exemplary diameter dimension, $D_{18a-x}'$, for each downstream-facing member $18a_x'$ may be expressed as a ratio (i.e., a length-to-diameter ratio such as, e.g., $L_{18a-x}':D_{18a-x}'$).

TABLE 13

|  | FIG. 35a | FIG. 35b | FIG. 35c | FIG. 35d | FIG. 35e |
|---|---|---|---|---|---|
| $L_{18a-x}'$ | 0.75" | 1.00" | 1.25" | 1.50" | 1.75" |
| $D_{18a-x}'$ | 0.60" | 0.85" | 0.93" | 1.00" | 1.25" |

Referring to FIGS. 36a-36e, implementations of alternative downstream-facing members $18a_x''$ are described. Accordingly, it is contemplated that the downstream-facing members 18a, 18a', 18a" of the bubble generator subassemblies 18, 18', 18" described above may be substituted with any downstream-facing member $18a_x''$ shown in FIGS. 36a-36e.

Each downstream-facing member $18a_x''$ may be defined by a length, $L_{18a-x}''$, extending between an upstream, distal end surface $38a_x''$ and a downstream, proximal end surface $38b_x''$. An outer side surface $38c_x''$ connects the upstream, distal end surface $38a_x''$ to the downstream, proximal end surface $38b_x''$.

The outer side surface $38c_x''$ defines the downstream-facing member $18a_x''$ to include a substantially cylindrical shape defined by a non-constant diameter, $D_{18a-x}''$. In an implementation the non-constant diameter, $D_{18a-x}''$, slightly reduces along the length, $L_{18a-x}''$, of the downstream-facing member $18a_x''$ as the outer side surface $38c_x''$ extends from the upstream, distal end surface $38a_x''$ toward the downstream, proximal end surface $38b_x''$.

As seen above in FIGS. 4A, 15A and 24A, the outer side surface 38c, 38c' and 38c" of the downstream-facing members 18a, 18a', 18a" are generally defined by a smooth, uninterrupted surface. The outer side surface $38c_x''$ of the alternative downstream-facing members $18a_x'$ of FIGS. 35a-35e may each also include a smooth, uninterrupted surface.

The downstream, proximal end surface $38b_x''$ generally defines the downstream-facing member $18a_x''$ to include a hemispherical depression. Unlike the hemispherical depression of the downstream, proximal end surface $38b_x''$, the upstream, distal end surface $38a_x''$ is generally defined by a planar shape. The planar shape of the upstream, distal end surface $38a_x''$ may be defined by a diameter that is equal to the largest diameter of the non-constant diameter, $D_{18a-x}''$, defined by the outer side surface $38c_x''$ of the downstream-facing member $18a_x''$.

Although side views of the alternative downstream-facing members $18a_x''$ are shown in FIGS. 36a-36e, the alternative downstream-facing members $18a_x''$ also include a threaded passage (see, e.g., 40, 40', 40" of downstream-facing members 18a, 18a', 18a") that receives a threaded stem (see, e.g., 50, 50', 50" of upstream-facing members 18c, 18c', 18c") of a corresponding upstream-facing member. The threaded passage extends partially into the downstream-facing member $18a_x''$ from the upstream, distal end surface $38a_x''$. The threaded passage may be arranged along an axis, A-A, extending through an axial center of the downstream-facing member $18a_x''$.

Shown below is a table directed to each embodiment of the downstream-facing member $18a_x''$ shown at FIGS. 36a-36e including an exemplary length dimension, $L_{18a-x}''$, and an exemplary diameter dimension, $D_{18a-x}''$, described in inches. The exemplary length dimension, $L_{18a-x}''$, and the exemplary diameter dimension, $D_{18a-x}''$, for each downstream-facing member $18a_x''$ may be expressed as a ratio (i.e., a length-to-diameter ratio such as, e.g., $L_{18a-x}'':D_{18a-x}''$).

TABLE 14

Figure 36A:
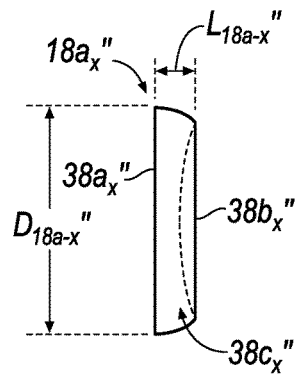
FIGS. 36a-36e illustrate side views of exemplary downstream-facing members of a bubble generator subassembly of a bubble implosion reactor cavitation device.
Figure 36B:
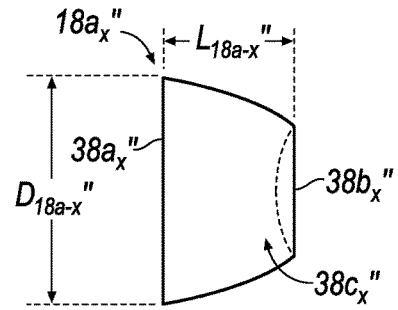
Figure 36C:
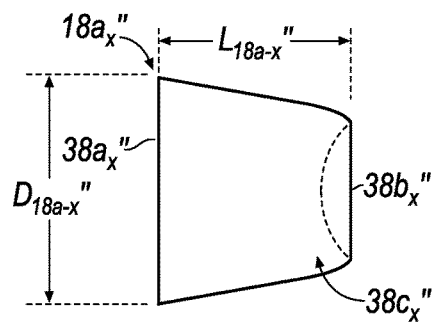
Figure 36D:
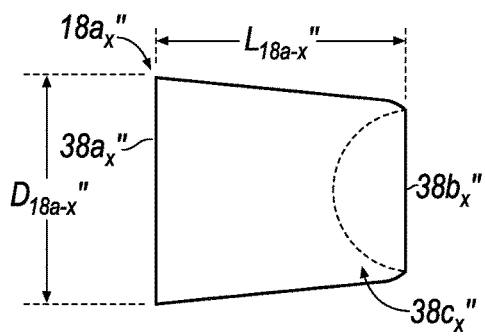
Figure 36E:
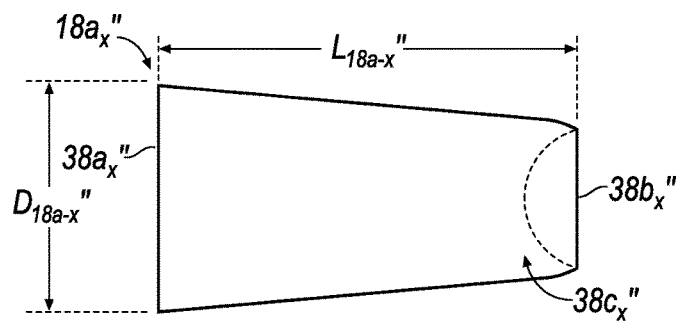

|  | FIG. 36a | FIG. 36b | FIG. 36c | FIG. 36d | FIG. 36e |
|---|---|---|---|---|---|
| $L_{18a-x}''$ | 0.50" | 0.75" | 1.00" | 1.25" | 1.50" |
| $D_{18a-x}''$ | 0.30" | 0.60" | 0.85" | 1.00" | 1.25" |

Referring to FIGS. 37a-37e, implementations of alternative upstream-facing members $18c_x$ are described. Accordingly, it is contemplated that the upstream-facing members 18c, 18c', 18c" of the bubble generator subassemblies 18, 18', 18" described above may be substituted with any upstream-facing member $18c_x$ shown in FIGS. 37a-37e.

Each upstream-facing member $18c_x$ is defined by a length, $L_{18c-x}$, extending between an upstream, distal end surface $48a_x$ and a downstream, proximal end surface $48b_x$. An outer side surface $48c_x$ connects the upstream, distal end surface $48a_x$ to the downstream, proximal end surface $48b_x$.

The outer side surface $48c_x$ defines the upstream-facing member $18c_x$ to include a substantially conical shape defined by a non-constant diameter, $D_{18c-x}$. In an implementation the non-constant diameter, $D_{18c-x}$, increases along the length, $L_{18c-x}$, of the upstream-facing member $18c_x$ as the outer side surface $48c_x$ extends from the upstream, distal end surface $48a_x$ toward the downstream, proximal end surface $48b_x$.

As seen above in FIGS. 6A, 17A and 26A, the outer side surface 48c, 48c' and 48c" of the upstream-facing members 18c, 18c', 18c" are generally defined by a smooth, uninterrupted surface. However, the outer side surface $48c_x$ of the alternative upstream-facing members $18c_x$ of FIGS. 37a-37e each include a non-smooth, interrupted surface such as, for example, a fluted, spiral surface.

The upstream, distal end surface $48a_x$ generally defined by a point. The downstream, proximal end surface $48b_x$ is generally defined by a planar shape having a diameter, which is equal to the largest diameter of the non-constant diameter, $D_{18c-x}$, defined by the outer side surface $48c_x$.

A threaded stem $50_x$ extends away from the downstream, proximal end surface $48b_x$. The threaded stem $50_x$ is arranged along an axis, A-A, extending through an axial center of the upstream-facing member $18c_x$.

Shown below is a table directed to each embodiment of the upstream-facing member $18c_x$ shown at FIGS. 37a-37e including an exemplary length dimension, $L_{18c-x}$', and an exemplary diameter dimension, $D_{18c-x}$', described in inches. The exemplary length dimension, $L_{18c-x}$, and the exemplary diameter dimension, $D_{18c-x}$, for each upstream-facing member $18c_x$ may be expressed as a ratio (i.e., a length-to-diameter ratio such as, e.g., $L_{18c-x}:D_{18c-x}$).

TABLE 15

Figure 37A:
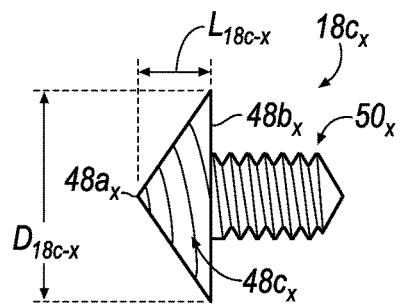
FIGS. 37a-37e illustrate side views of exemplary upstream-facing members of a bubble generator subassembly of a bubble implosion reactor cavitation device.
Figure 37B:
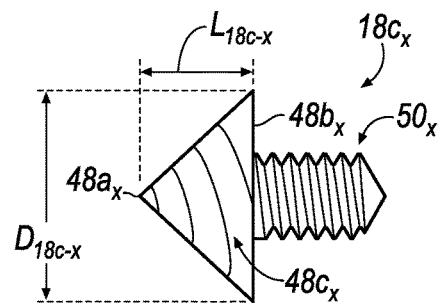
Figure 37C:
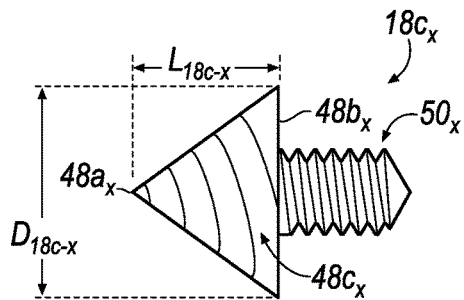
Figure 37D:
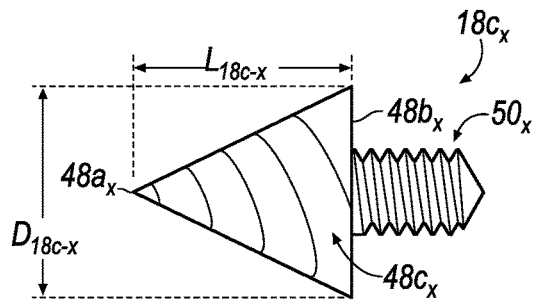
Figure 37E:
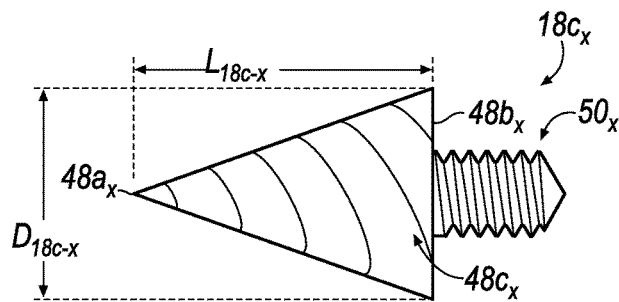

|  | FIG. 37a | FIG. 37b | FIG. 37c | FIG. 37d | FIG. 37e |
|---|---|---|---|---|---|
| $L_{18c-x}$ | 0.50" | 0.75" | 1.00" | 1.25" | 1.75" |
| $D_{18c-x}$ | 0.30" | 0.60" | 0.85" | 0.93" | 1.00" |

Referring to FIGS. 38a-38e, implementations of alternative upstream-facing members $18c_x$' are described. Accordingly, it is contemplated that the upstream-facing members $18c$, $18c'$, $18c''$ of the bubble generator subassemblies 18, 18', 18" described above may be substituted with any upstream-facing member $18c_x$' shown in FIGS. 38a-38e.

Each upstream-facing member $18c_x$' is defined by a length, $L_{18c-x}$', extending between an upstream, distal end surface $48a_x$' and a downstream, proximal end surface $48b_x$'. An outer side surface $48c_x$' connects the upstream, distal end surface $48a_x$' to the downstream, proximal end surface $48b_x$'.

The outer side surface $48c'$ defines the upstream-facing member $18c_x$' to include a substantially conical shape defined by a non-constant diameter, $D_{18c-x}$'. In an implementation the non-constant diameter, $D_{18c-x}$', increases along the length, $L_{18c-x}$', of the upstream-facing member $18c_x$' as the outer side surface $48c_x$' extends from the upstream, distal end surface $48a_x$' toward the downstream, proximal end surface $48b_x$'.

As seen above in FIGS. 6A, 17A and 26A, the outer side surface $48c$, $48c'$ and $48c''$ of the upstream-facing members $18c$, $18c'$, $18c''$ are generally defined by a smooth, uninterrupted surface. However, the outer side surface $48c_x$' of the alternative upstream-facing members $18c_x$' of FIGS. 38a-38e each include a non-smooth, interrupted surface such as, for example, a stepped surface; each stepped surface may be defined by a circumferentially arcuate outer surface portion.

The upstream, distal end surface $48a_x$' generally defined by a point. The downstream, proximal end surface $48b_x$' is generally defined by a planar shape having a diameter, which is equal to the largest diameter of the non-constant diameter, $D_{18c-x}$', defined by the outer side surface $48c_x$'.

A threaded stem $50_x$' extends away from the downstream, proximal end surface $48b_x$'. The threaded stem $50_x$' is arranged along an axis, A-A, extending through an axial center of the upstream-facing member $18c_x$'.

Shown below is a table directed to each embodiment of the upstream-facing member $18c$; shown at FIGS. 38a-38e including an exemplary length dimension, $L_{18c-x}$', and an exemplary diameter dimension, $D_{18c-x}$', described in inches. The exemplary length dimension, $L_{18c-x}$', and the exemplary diameter dimension, $D_{18c-x}$', for each upstream-facing member $18c_x$' may be expressed as a ratio (i.e., a length-to-diameter ratio such as, e.g., $L_{18c-x}':D_{18c-x}'$).

TABLE 16

|  | FIG. 38a | FIG. 38b | FIG. 38c | FIG. 38d | FIG. 38e |
|---|---|---|---|---|---|
| $L_{18c-x}$' | 0.50" | 0.75" | 1.00" | 1.25" | 1.50" |
| $D_{18c-x}$' | 0.30" | 0.60" | 0.85" | 0.93" | 1.00" |

Referring to FIGS. 39a-39e, implementations of alternative upstream-facing members $18c_x$'' are described. Accordingly, it is contemplated that the upstream-facing members $18c$, $18c'$, $18c''$ of the bubble generator subassemblies 18, 18', 18" described above may be substituted with any upstream-facing member $18c_x$'' shown in FIGS. 39a-39e.

Each upstream-facing member $18c_x$'' is defined by a length, $L_{18c-x}$'', extending between an upstream, distal end surface $48a_x$'' and a downstream, proximal end surface $48b_x$''. An outer side surface $48c_x$'' connects the upstream, distal end surface $48a_x$'' to the downstream, proximal end surface $48b_x$''.

The outer side surface $48c_x$'' defines the upstream-facing member $18c_x$'' to include a substantially conical shape defined by a non-constant diameter, $D_{18c-x}$''. In an implementation the non-constant diameter, $D_{18c-x}$'', increases along the length, $L_{18c-x}$'', of the upstream-facing member $18c_x$'' as the outer side surface $48c_x$'' extends from the upstream, distal end surface $48a_x$'' toward the downstream, proximal end surface $48b_x$''.

As seen above in FIGS. 6A, 17A and 26A, the outer side surface $48c$, $48c'$ and $48c''$ of the upstream-facing members $18c$, $18c'$, $18c''$ are generally defined by a smooth, uninterrupted surface. The outer side surface $48c_x$'' of the alternative upstream-facing members $18c_x$'' of FIGS. 39a-39e may each also include a smooth, uninterrupted surface.

The upstream, distal end surface $48a_x$'' generally defined by a point. The downstream, proximal end surface $48b_x$'' is generally defined by a planar shape having a diameter, which is equal to the largest diameter of the non-constant diameter, $D_{18c-x}$'', defined by the outer side surface $48c_x$''.

A threaded stem $50_x$'' extends away from the downstream, proximal end surface $48b_x$''. The threaded stem $50_x$'' is arranged along an axis, A-A, extending through an axial center of the upstream-facing member $18c_x$''.

Shown below is a table directed to each embodiment of the upstream-facing member $18c_x$'' shown at FIGS. 39a-39e including an exemplary length dimension, $L_{18c-x}$'', and an exemplary diameter dimension, $D_{18c-x}$'', described in inches. The exemplary length dimension, $L_{18c-x}$'', and the exemplary diameter dimension, $D_{18c-x}$'', for each upstream-facing member $18c_x$'' may be expressed as a ratio (i.e., a length-to-diameter ratio such as, e.g., $L_{18c-x}'':D_{18c-x}''$).

TABLE 17

Figure 39A:
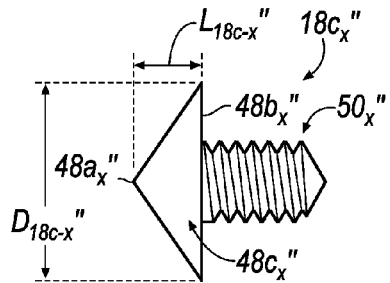
FIGS. 39a-39e illustrate side views of exemplary upstream-facing members of a bubble generator subassembly of a bubble implosion reactor cavitation device.
Figure 39B:
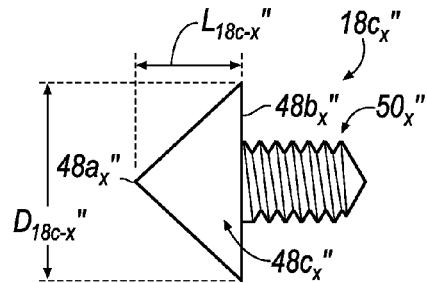
Figure 39C:
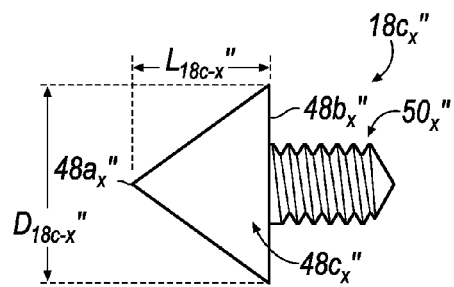
Figure 39D:
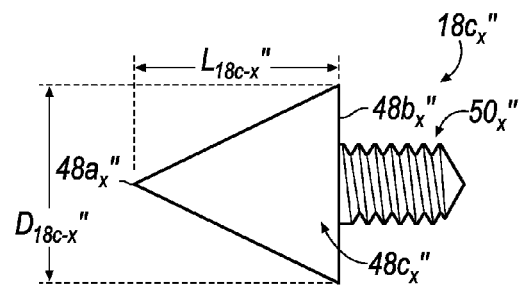
Figure 39E:
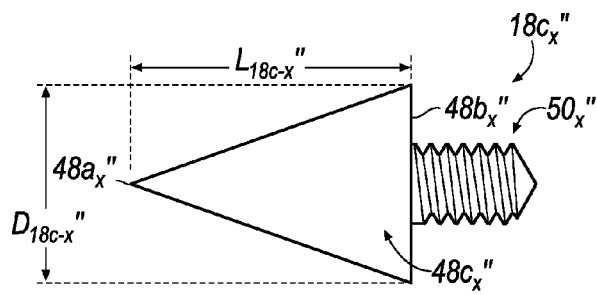

|  | FIG. 39a | FIG. 39b | FIG. 39c | FIG. 39d | FIG. 39e |
|---|---|---|---|---|---|
| $L_{18c-x}$'' | 0.50" | 0.75" | 1.00" | 1.25" | 1.50" |
| $D_{18c-x}$'' | 0.30" | 0.60" | 0.85" | 0.93" | 1.00" |

As described above in FIGS. 34a-39e, the downstream-facing members $18a_x$, $18a_x$', $18a_x$'' and the upstream-facing members $18c_x$, $18c_x$', $18c_x$'' are generally defined to include different lengths $L_{18a-x}$, $L_{18a-x}$', $L_{18a-x}$'', $L_{18c-x}$, $L_{18c-x}$', $L_{18c-x}$''. A shorter length $L_{18a-x}$, $L_{18a-x}$', $L_{18a-x}$'', $L_{18c-x}$, $L_{18c-x}$', $L_{18c-x}$'' (see, e.g., FIGS. 34a, 35a, 36a, 37a, 38a, 39a) may be utilized when a fluid, L, to be processed is characterized as having a "thicker body" (i.e., the fluid, L, has a higher degree of viscosity such as, for example, honey) whereas a longer length $L_{18a-x}$, $L_{18a-x}$', $L_{18a-x}$'', $L_{18c-x}$, $L_{18c-x}$', $L_{18c-x}$''

(see, e.g., FIGS. 34e, 35e, 36e, 37e, 38e, 39e) may be utilized when a fluid, L, to be processed is characterized as having a "thinner body" (i.e., the fluid, L, has a lower degree of viscosity such as, for example, water).

As described above in FIGS. 34a-39e, the downstream-facing members $18a_x$, $18a_x'$, $18a_x''$ and the upstream-facing members $18c_x$, $18c_x'$, $18c_x''$ are generally defined to include a diameter $D_{18a-x}$, $D_{18a-x}'$, $D_{18a-x}''$, $D_{18c-x}$, $D_{18c-x}'$, $D_{18c-x}''$. The diameter $D_{18a-x}$, $D_{18a-x}'$, $D_{18a-x}''$, $D_{18c-x}$, $D_{18c-x}'$, $D_{18c-x}''$ that is selected in the design of the downstream-facing members $18a_x$, $18a_x'$, $18a_x''$ and the upstream-facing members $18c_x$, $18c_x'$, $18c_x''$ may be approximately twice the radius (see, e.g., $R_{18b}$, $R_{18b}'$, $R_{18b}''$) that forms a circular array/arrangement of fluid-flow passages (see, e.g., 46, 46', 46") of the nozzle array disk (see, e.g., 18b, 18b', 18b") such that each of the downstream, proximal end surface $48b_x$, $48b_x'$, $48b_x''$ of the upstream-facing member $18c_x$, $18c_x'$, $18c_x''$ and the upstream, distal end surface $38a_x$, $38a_x'$, $38a_x''$ of the downstream-facing member $18a_x$, $18a_x'$, $18a_x''$ obstructs/obscures approximately half of the each passage (see, e.g., 46, 46', 46") of the circularly-arranged plurality of fluid-flow passages (see, e.g., 46, 46', 46") of the nozzle array disk (see, e.g., 18b, 18b', 18b").

Referring to FIGS. 40A-40B, an implementation of an alternative fluid-flow passage $46_1$ is described. Accordingly, it is contemplated that one, several or all of the fluid-flow passages 46, 46', 46" of the nozzle array disk 18b, 18b', 18b" described above may be substituted with the fluid-flow passage $46_1$ shown in FIGS. 40A-40B.

The fluid flow passage $46_1$ is defined by a nozzle surface $47_1$. The nozzle surface $47_1$ extends between and connects an upstream, distal end surface $42a_1$ of a nozzle array disk $18b_1$ to a downstream, proximal end surface $42b_1$ of the nozzle array disk $18b_1$.

As seen in FIG. 40A, the nozzle surface $47_1$ defines the fluid flow passage $46_1$ to include a nozzle diameter, $D1_{46-1}$. In an implementation, the nozzle diameter, $D1_{46-1}$, is a non-constant diameter. The non-constant nozzle diameter, $D1_{46-1}$, decreases along the length of the nozzle array disk $18b_1$ as the fluid flow passage $46_1$ extends through the nozzle array disk $18b_1$ in a direction referenced from the upstream, distal end surface $42a_1$ toward the downstream, proximal end surface $42b_1$; as a result, the fluid flow passage $46_1$ generally defines a conical passage that decreases in cross-section as the fluid flow passage $46_1$ extends through the nozzle array disk $18b_1$ in a direction referenced from the upstream, distal end surface $42a_1$ toward the downstream, proximal end surface $42b_1$.

Shown below is a table including an exemplary embodiment of a dimension of the fluid flow passage $46_1$ described in inches.

TABLE 18

| | Fluid Flow Passage $46_1$ |
|---|---|
| $D1_{46-1}$ | Between 0.16" and 0.08" |

Referring to FIGS. 41A-41B, an implementation of an alternative fluid-flow passage $46_2$ is described. Accordingly, it is contemplated that one, several or all of the fluid-flow passages 46, 46', 46" of the nozzle array disk 18b, 18b', 18b" described above may be substituted with the fluid-flow passage $46_2$ shown in FIGS. 41A-41B.

The fluid flow passage $46_2$ is defined by a nozzle surface $47_2$. The nozzle surface $47_2$ extends between and connects an upstream, distal end surface $42a_2$ of a nozzle array disk $18b_2$ to a downstream, proximal end surface $42b_2$ of the nozzle array disk $18b_2$.

As seen in FIG. 41A, the nozzle surface $47_2$ includes a first surface portion $47_{2A}$ and a second surface portion $47_{2B}$. The first surface portion $47_{2A}$ defines the fluid flow passage $46_2$ to include a first nozzle diameter, $D1_{46-2}$; in an implementation, the first nozzle diameter, $D1_{46-2}$, is a non-constant diameter. The second surface portion $47_{2B}$ defines the fluid flow passage $46_2$ to include a second nozzle diameter, $D2_{46-2}$; in an implementation, the second nozzle diameter, $D2_{46-2}$, is a non-constant diameter.

The first non-constant nozzle diameter, $D1_{46-2}$, decreases along the length of the nozzle array disk $18b_2$ as the fluid flow passage $46_2$ extends through the nozzle array disk $18b_2$ in a direction referenced from the upstream, distal end surface $42a_2$ toward the downstream, proximal end surface $42b_2$. As a result, the first non-constant nozzle diameter, $D1_{46-2}$, of the fluid flow passage $46_2$ generally defines a first conical passage portion that decreases in cross-section as the fluid flow passage $46_2$ extends through the nozzle array disk $18b_2$ in a direction referenced from the upstream, distal end surface $42a_2$ toward the downstream, proximal end surface $42b_2$.

The second non-constant nozzle diameter, $D2_{46-2}$, decreases along the length of the nozzle array disk $18b_2$ as the fluid flow passage $46_2$ extends through the nozzle array disk $18b_2$ in a direction referenced from the upstream, distal end surface $42a_2$ toward the downstream, proximal end surface $42b_2$; as a result, the second non-constant nozzle diameter, $D2_{46-2}$, of the fluid flow passage $46_2$ generally defines a second conical passage portion that decreases in cross-section as the fluid flow passage $46_2$ extends through the nozzle array disk $18b_2$ in a direction referenced from the upstream, distal end surface $42a_2$ toward the downstream, proximal end surface $42b_2$.

Shown below is a table including an exemplary embodiment of dimensions of the fluid flow passage $46_2$ described in inches.

TABLE 19

| | Fluid Flow Passage $46_2$ |
|---|---|
| $D1_{46-2}$ | Between 0.16" and 0.12" |
| $D2_{46-2}$ | Between 0.12" and 0.06" |

Referring to FIGS. 42A-42B, an implementation of an alternative fluid-flow passage $46_3$ is described. Accordingly, it is contemplated that one, several or all of the fluid-flow passages 46, 46', 46" of the nozzle array disk 18b, 18b', 18b" described above may be substituted with the fluid-flow passage $46_3$ shown in FIGS. 42A-42B.

The fluid flow passage $46_3$ is defined by a nozzle surface $47_3$. The nozzle surface $47_3$ extends between and connects an upstream, distal end surface $42a_3$ of a nozzle array disk $18b_3$ to a downstream, proximal end surface $42b_3$ of the nozzle array disk $18b_3$.

As seen in FIG. 42A, the nozzle surface $47_3$ includes a first surface portion $47_{3A}$ and a second surface portion $47_{3B}$. The first surface portion $47_{3A}$ defines the fluid flow passage $46_3$ to include a first nozzle diameter, $D1_{46-3}$; in an implementation, the first nozzle diameter, $D1_{46-3}$, is a non-constant diameter. The second surface portion $47_{3B}$ defines the fluid flow passage $46_3$ to include a second nozzle diameter, $D2_{46-3}$; in an implementation, the second nozzle diameter, $D2_{46-3}$, is a constant diameter.

The non-constant nozzle diameter, $D1_{46-3}$, decreases along the length of the nozzle array disk $18b_3$ as the fluid flow passage $46_3$ extends through the nozzle array disk $18b_3$ in a direction referenced from the upstream, distal end surface $42a_3$ toward the downstream, proximal end surface $42b_3$. As a result, the non-constant nozzle diameter, $D1_{46-3}$, of the fluid flow passage $46_3$ generally defines a conical passage portion that decreases in cross-section as the fluid flow passage $46_3$ extends through the nozzle array disk $18b_3$ in a direction referenced from the upstream, distal end surface $42a_3$ toward the downstream, proximal end surface $42b_3$.

The constant nozzle diameter, $D2_{46-3}$, remains the same along the length of the nozzle array disk $18b_3$ as the fluid flow passage $46_3$ extends through the nozzle array disk $18b_3$ in a direction referenced from the upstream, distal end surface $42a_3$ toward the downstream, proximal end surface $42b_3$; as a result, the constant nozzle diameter, $D2_{46-3}$, of the fluid flow passage $46_3$ generally defines a cylindrical passage portion that remains the same in cross-section as the fluid flow passage $46_3$ extends through the nozzle array disk $18b_3$ in a direction referenced from the upstream, distal end surface $42a_3$ toward the downstream, proximal end surface $42b_3$.

Shown below is a table including an exemplary embodiment of dimensions of the fluid flow passage $46_3$ described in inches.

TABLE 20

| | Fluid Flow Passage $46_3$ |
|---|---|
| $D1_{46-3}$ | Between 0.16" and 0.06" |
| $D2_{46-3}$ | 0.06" |

Referring to FIGS. 43A-43B, an implementation of an alternative fluid-flow passage $46_4$ is described. Accordingly, it is contemplated that one, several or all of the fluid-flow passages 46, 46', 46" of the nozzle array disk $18b$, $18b'$, $18b''$ described above may be substituted with the fluid-flow passage $46_4$ shown in FIGS. 43A-43B.

The fluid flow passage $46_4$ is defined by a nozzle surface $47_4$. The nozzle surface $47_4$ extends between and connects an upstream, distal end surface $42a_4$ of a nozzle array disk $18b_4$ to a downstream, proximal end surface $42b_4$ of the nozzle array disk $18b_4$.

As seen in FIG. 43A, the nozzle surface $47_4$ includes a first surface portion $47_{4A}$, a second surface portion $47_{4B}$ and a third surface portion $47_{4C}$. The first surface portion $47_{4A}$ defines the fluid flow passage $46_4$ to include a first nozzle diameter, $D1_{46-4}$; in an implementation, the first nozzle diameter, $D1_{46-4}$, is a first non-constant diameter. The second surface portion $47_{4B}$ defines the fluid flow passage $46_4$ to include a second nozzle diameter, $D2_{46-4}$; in an implementation, the second nozzle diameter, $D2_{46-4}$, is a constant diameter. The third surface portion $47_{4C}$ defines the fluid flow passage $46_4$ to include a third nozzle diameter, $D3_{46-4}$; in an implementation, the third nozzle diameter, $D3_{46-4}$, is a second non-constant diameter.

The first non-constant nozzle diameter, $D1_{46-4}$, decreases along the length of the nozzle array disk $18b_4$ as the fluid flow passage $46_4$ extends through the nozzle array disk $18b_4$ in a direction referenced from the upstream, distal end surface $42a_4$ toward the downstream, proximal end surface $42b_4$. As a result, the first non-constant nozzle diameter, $D1_{46-4}$, of the fluid flow passage $46_4$ generally defines a first conical passage portion that decreases in cross-section as the fluid flow passage $46_4$ extends through the nozzle array disk $18b_4$ in a direction referenced from the upstream, distal end surface $42a_4$ toward the downstream, proximal end surface $42b_4$.

The constant nozzle diameter, $D2_{46-4}$, remains the same along the length of the nozzle array disk $18b_4$ as the fluid flow passage $46_4$ extends through the nozzle array disk $18b_4$ in a direction referenced from the upstream, distal end surface $42a_4$ toward the downstream, proximal end surface $42b_4$; as a result, the constant nozzle diameter, $D2_{46-4}$, of the fluid flow passage $46_4$ generally defines a cylindrical passage portion that remains the same in cross-section as the fluid flow passage $46_4$ extends through the nozzle array disk $18b_4$ in a direction referenced from the upstream, distal end surface $42a_4$ toward the downstream, proximal end surface $42b_4$.

The second non-constant nozzle diameter, $D3_{46-4}$, increases along the length of the nozzle array disk $18b_4$ as the fluid flow passage $46_4$ extends through the nozzle array disk $18b_4$ in a direction referenced from the upstream, distal end surface $42a_4$ toward the downstream, proximal end surface $42b_4$. As a result, the second non-constant nozzle diameter, $D3_{46-4}$, of the fluid flow passage $46_4$ generally defines a second conical passage portion that increases in cross-section as the fluid flow passage $46_4$ extends through the nozzle array disk $18b_4$ in a direction referenced from the upstream, distal end surface $42a_4$ toward the downstream, proximal end surface $42b_4$.

Shown below is a table including an exemplary embodiment of dimensions of the fluid flow passage $46_4$ described in inches.

TABLE 21

| | Fluid Flow Passage $46_4$ |
|---|---|
| $D1_{46-4}$ | Between 0.16" and 0.06" |
| $D2_{46-4}$ | 0.06" |
| $D3_{46-4}$ | Between 0.06" and 0.12" |

Figure 44A:
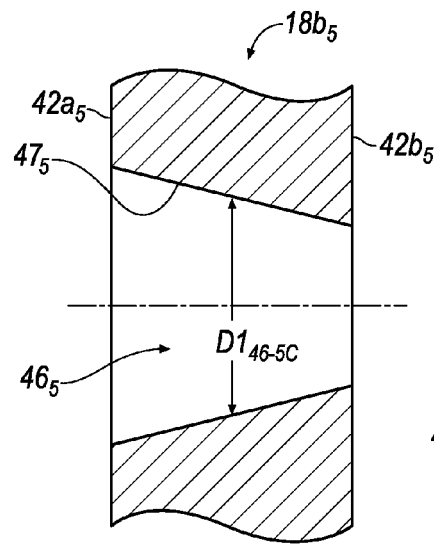
FIG. 44A illustrates a front view of an exemplary fluid-flow passage of a nozzle array disk.
Figure 44B:
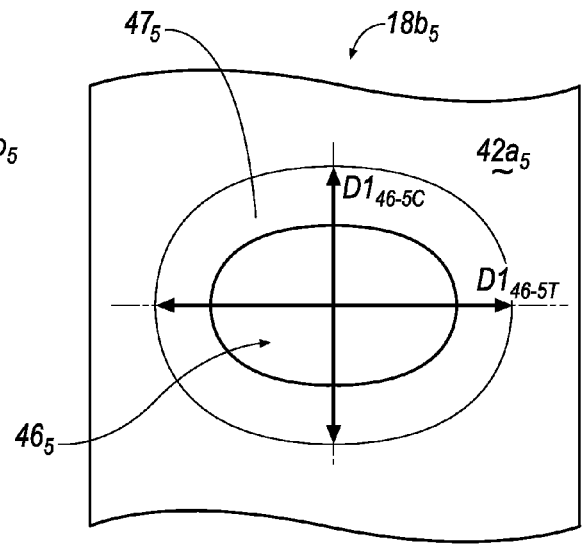
FIG. 44B illustrates a cross-sectional view of the fluid-flow passage of the nozzle array disk of FIG. 44A.

Referring to FIGS. 44A-44B, an implementation of an alternative fluid-flow passage $46_5$ is described. Accordingly, it is contemplated that one, several or all of the fluid-flow passages 46, 46', 46" of the nozzle array disk $18b$, $18b'$, $18b''$ described above may be substituted with the fluid-flow passage $46_5$ shown in FIGS. 44A-44B.

The fluid flow passage $46_5$ is defined by a nozzle surface $47_5$. The nozzle surface $47_5$ extends between and connects an upstream, distal end surface $42a_5$ of a nozzle array disk $18b_5$ to a downstream, proximal end surface $42b_5$ of the nozzle array disk $18b_5$.

As seen in FIG. 44A, the nozzle surface $47_5$ defines the fluid flow passage $46_5$ to have an elliptical dimension defined by a conjugate nozzle diameter, $D1_{46-5C}$ (see FIGS. 44A and 44B), and a transverse nozzle diameter, $D1_{46-5T}$ (see FIG. 44B). In an implementation, both of the conjugate nozzle diameter, $D1_{46-5C}$, and transverse nozzle diameter, $D1_{46-5T}$, are non-constant diameters. The non-constant conjugate nozzle diameter, $D1_{46-5C}$, and transverse nozzle diameter, $D1_{46-5T}$, decrease along the length of the nozzle array disk $18b_5$ as the fluid flow passage $46_5$ extends through the nozzle array disk $18b_5$ in a direction referenced from the upstream, distal end surface $42a_5$ toward the downstream, proximal end surface $42b_5$; as a result, the fluid flow passage $46_5$ generally defines a conical passage that decreases in cross-section as the fluid flow passage $46_5$ extends through the nozzle array disk $18b_5$ in a direction referenced from the upstream, distal end surface $42a_5$ toward the downstream, proximal end surface $42b_5$.

Shown below is a table including an exemplary embodiment of a dimension of the fluid flow passage $46_5$ described in inches.

TABLE 22

| | Fluid Flow Passage $46_5$ |
|---|---|
| $D1_{46-5C}$ | Between 0.16" and 0.08" |
| $D1_{46-5T}$ | Between 0.32" and 0.24" |

Figure 45A:
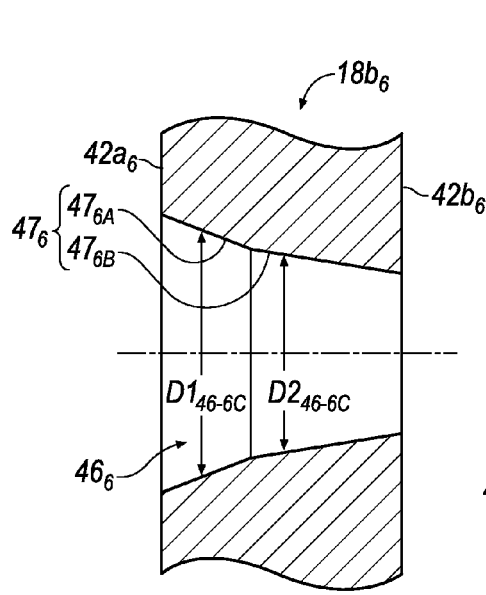
FIG. 45A illustrates a front view of an exemplary fluid-flow passage of a nozzle array disk.
Figure 45B:
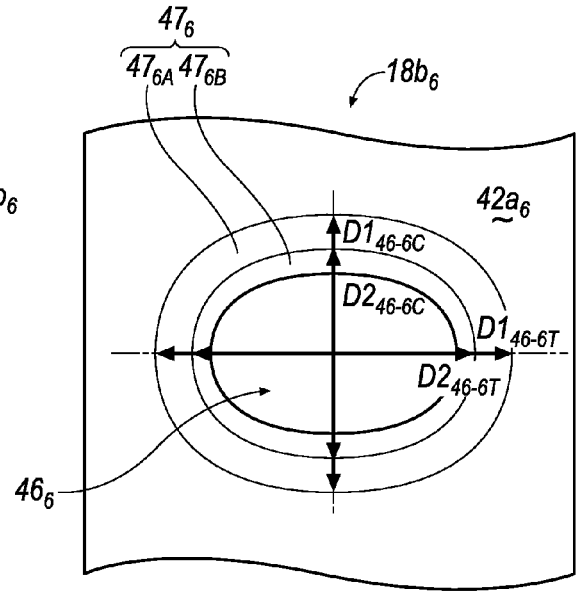
FIG. 45B illustrates a cross-sectional view of the fluid-flow passage of the nozzle array disk of FIG. 45A.

Referring to FIGS. 45A-45B, an implementation of an alternative fluid-flow passage $46_6$ is described. Accordingly, it is contemplated that one, several or all of the fluid-flow passages 46, 46', 46" of the nozzle array disk $18b$, $18b'$, $18b''$ described above may be substituted with the fluid-flow passage $46_6$ shown in FIGS. 45A-45B.

The fluid flow passage $46_6$ is defined by a nozzle surface $47_6$. The nozzle surface $47_6$ extends between and connects an upstream, distal end surface $42a_6$ of a nozzle array disk $18b_6$ to a downstream, proximal end surface $42b_6$ of the nozzle array disk $18b_6$.

As seen in FIG. 45A, the nozzle surface $47_6$ includes a first surface portion $47_{6A}$ and a second surface portion $47_{6B}$. The first surface portion $47_{6A}$ defines the fluid flow passage $46_6$ to include a first nozzle dimension, $D1_{46-6C}$ and $D1_{46-6T}$; in an implementation, the first nozzle dimension, $D1_{46-6C}$ and $D1_{46-6T}$, is a non-constant dimension. The second surface portion $47_{6B}$ defines the fluid flow passage $46_6$ to include a second nozzle dimension, $D2_{46-6C}$ and $D2_{46-6T}$; in an implementation, the second nozzle dimension, $D2_{46-6C}$ and $D2_{46-6T}$, is a non-constant dimension.

The non-constant nozzle dimension, $D1_{46-6C}$ and $D1_{46-6T}$, defined by the first surface portion $47_{6A}$ of the fluid flow passage $46_6$ is an elliptical dimension defined by a conjugate nozzle diameter, $D1_{46-6C}$ (see FIGS. 45A and 45B), and a transverse nozzle diameter, $D1_{46-6T}$ (see FIG. 45B). In an implementation, both of the conjugate nozzle diameter, $D1_{46-6C}$, and transverse nozzle diameter, $D1_{46-6T}$, are non-constant diameters. The non-constant conjugate nozzle diameter, $D1_{46-6C}$, and transverse nozzle diameter, $D1_{46-6T}$, decrease along the length of the nozzle array disk $18b_6$ as the fluid flow passage $46_6$ extends through the nozzle array disk $18b_6$ in a direction referenced from the upstream, distal end surface $42a_6$ toward the downstream, proximal end surface $42b_6$; as a result, the fluid flow passage $46_6$ generally defines a first conical passage portion that decreases in cross-section as the fluid flow passage $46_6$ extends through the nozzle array disk $18b_6$ in a direction referenced from the upstream, distal end surface $42a_6$ toward the downstream, proximal end surface $42b_6$.

The non-constant nozzle dimension, $D2_{46-6C}$ and $D2_{46-6T}$, defined by the second surface portion $47_{6B}$ of the fluid flow passage $46_6$ is an elliptical dimension defined by a conjugate nozzle diameter, $D2_{46-6C}$ (see FIGS. 45A and 45B), and a transverse nozzle diameter, $D2_{46-6T}$ (see FIG. 45B). In an implementation, both of the conjugate nozzle diameter, $D2_{46-6C}$, and transverse nozzle diameter, $D2_{46-6T}$, are non-constant diameters. The non-constant conjugate nozzle diameter, $D2_{46-6C}$, and transverse nozzle diameter, $D2_{46-6T}$, decrease along the length of the nozzle array disk $18b_6$ as the fluid flow passage $46_6$ extends through the nozzle array disk $18b_6$ in a direction referenced from the upstream, distal end surface $42a_6$ toward the downstream, proximal end surface $42b_6$; as a result, the fluid flow passage $46_6$ generally defines a second conical passage portion that decreases in cross-section as the fluid flow passage $46_6$ extends through the nozzle array disk $18b_6$ in a direction referenced from the upstream, distal end surface $42a_6$ toward the downstream, proximal end surface $42b_6$.

Shown below is a table including an exemplary embodiment of a dimension of the fluid flow passage $46_6$ described in inches.

TABLE 23

| | Fluid Flow Passage $46_6$ |
|---|---|
| $D1_{46-6C}$ | Between 0.16" and 0.12" |
| $D1_{46-6T}$ | Between 0.32" and 0.24" |
| $D2_{46-6C}$ | Between 0.12" and 0.08" |
| $D2_{46-6T}$ | Between 0.28" and 0.24" |

Referring to FIGS. 46A-46B, an implementation of an alternative fluid-flow passage $46_7$ is described. Accordingly, it is contemplated that one, several or all of the fluid-flow passages 46, 46', 46" of the nozzle array disk $18b$, $18b'$, $18b''$ described above may be substituted with the fluid-flow passage $46_7$ shown in FIGS. 46A-46B.

The fluid flow passage $46_7$ is defined by a nozzle surface $47_7$. The nozzle surface $47_7$ extends between and connects an upstream, distal end surface $42a_7$ of a nozzle array disk $18b_7$ to a downstream, proximal end surface $42b_7$ of the nozzle array disk $18b_7$.

As seen in FIG. 46A, the nozzle surface $47_7$ includes a first surface portion $47_{7A}$ and a second surface portion $47_{7B}$. The first surface portion $47_{7A}$ defines the fluid flow passage $46_7$ to include a first nozzle dimension, $D1_{46-7C}$ and $D1_{46-7T}$; in an implementation, the first nozzle dimension, $D1_{46-7C}$ and $D1_{46-7T}$, is a non-constant dimension. The second surface portion $47_{7B}$ defines the fluid flow passage $46_7$ to include a second nozzle dimension, $D2_{46-7C}$ and $D2_{46-7T}$; in an implementation, the second nozzle dimension, $D2_{46-7C}$ and $D2_{46-7T}$, is a constant dimension.

The non-constant nozzle dimension, $D1_{46-7C}$ and $D1_{46-7T}$, defined by the first surface portion $47_{7A}$ of the fluid flow passage $46_7$ is an elliptical dimension defined by a conjugate nozzle diameter, $D1_{46-7C}$ (see FIGS. 46A and 46B), and a transverse nozzle diameter, $D1_{46-7T}$ (see FIG. 46B). In an implementation, both of the conjugate nozzle diameter, $D1_{46-7C}$, and transverse nozzle diameter, $D1_{46-7T}$, are non-constant diameters. The non-constant conjugate nozzle diameter, $D1_{46-7C}$, and transverse nozzle diameter, $D1_{46-7T}$, decrease along the length of the nozzle array disk $18b_7$ as the fluid flow passage $46_7$ extends through the nozzle array disk $18b_7$ in a direction referenced from the upstream, distal end surface $42a_7$ toward the downstream, proximal end surface $42b_7$; as a result, the fluid flow passage $46_7$ generally defines a conical passage portion that decreases in cross-section as the fluid flow passage $46_7$ extends through the nozzle array disk $18b_7$ in a direction referenced from the upstream, distal end surface $42a_7$ toward the downstream, proximal end surface $42b_7$.

The constant nozzle dimension, $D2_{46-7C}$ and $D2_{46-7T}$, defined by the second surface portion $47_{7B}$ of the fluid flow passage $46_7$ is an elliptical dimension defined by a conjugate nozzle diameter, $D2_{46-7C}$ (see FIGS. 46A and 46B), and a transverse nozzle diameter, $D2_{46-7T}$ (see FIG. 46B). Both of the conjugate nozzle diameter, $D2_{46-7C}$, and the transverse nozzle diameter, $D2_{46-7T}$, remain the same along the length of the nozzle array disk $18b_7$ as the fluid flow passage $46_7$ extends through the nozzle array disk $18b_7$ in a direction referenced from the upstream, distal end surface $42a_7$ toward the downstream, proximal end surface $42b_7$; as a result, the fluid flow passage $46_7$ generally defines a cylindrical passage portion that remains the same in cross-section as the fluid flow passage $46_7$ extends through the nozzle array disk $18b_7$ in a direction referenced from the upstream, distal end surface $42a_7$ toward the downstream, proximal end surface $42b_7$.

Shown below is a table including an exemplary embodiment of a dimension of the fluid flow passage $46_7$ described in inches.

TABLE 24

|  | Fluid Flow Passage $46_7$ |
| --- | --- |
| $D1_{46\text{-}7C}$ | Between 0.16" and 0.08" |
| $D1_{46\text{-}7T}$ | Between 0.32" and 0.16" |
| $D2_{46\text{-}7C}$ | 0.08" |
| $D2_{46\text{-}7T}$ | 0.16" |

Referring to FIGS. 47A-47B, an implementation of an alternative fluid-flow passage $46_8$ is described. Accordingly, it is contemplated that one, several or all of the fluid-flow passages $46$, $46'$, $46''$ of the nozzle array disk $18b$, $18b'$, $18b''$ described above may be substituted with the fluid-flow passage $46_8$ shown in FIGS. 47A-47B.

The fluid flow passage $46_8$ is defined by a nozzle surface $47_8$. The nozzle surface $47_8$ extends between and connects an upstream, distal end surface $42a_8$ of a nozzle array disk $18b_8$ to a downstream, proximal end surface $42b_8$ of the nozzle array disk $18b_8$.

As seen in FIG. 47A, the nozzle surface $47_8$ includes a first surface portion $47_{8A}$, a second surface portion $47_{8B}$ and a third surface portion $47_{8C}$. The first surface portion $47_{8A}$ defines the fluid flow passage $46_8$ to include a first nozzle dimension, $D1_{46\text{-}8C}$ and $D1_{46\text{-}8T}$; in an implementation, the first nozzle dimension, $D1_{46\text{-}8C}$ and $D1_{46\text{-}8T}$, is a first non-constant dimension. The second surface portion $47_{8B}$ defines the fluid flow passage $46_8$ to include a second nozzle dimension, $D2_{46\text{-}8C}$ and $D2_{46\text{-}8T}$; in an implementation, the second nozzle dimension, $D2_{46\text{-}8C}$ and $D2_{46\text{-}8T}$, is a constant dimension. The third surface portion $47_{8C}$ defines the fluid flow passage $46_8$ to include a third nozzle dimension, $D3_{46\text{-}8C}$ and $D3_{46\text{-}8T}$; in an implementation, the third nozzle dimension, $D3_{46\text{-}8C}$ and $D3_{46\text{-}8T}$, is a second non-constant dimension.

The first non-constant nozzle dimension, $D1_{46\text{-}8C}$ and $D1_{46\text{-}8T}$, defined by the first surface portion $47_{8A}$ of the fluid flow passage $46_8$ is a first elliptical dimension defined by a first conjugate nozzle diameter, $D1_{46\text{-}8C}$ (see FIGS. 47A and 47B), and a first transverse nozzle diameter, $D1_{46\text{-}8T}$ (see FIG. 47B). In an implementation, both of the first conjugate nozzle diameter, $D1_{46\text{-}8C}$, and first transverse nozzle diameter, $D1_{46\text{-}8T}$, are non-constant diameters. The first non-constant conjugate nozzle diameter, $D1_{46\text{-}8C}$, and first transverse nozzle diameter, $D1_{46\text{-}8T}$, decrease along the length of the nozzle array disk $18b_8$ as the fluid flow passage $46_8$ extends through the nozzle array disk $18b_8$ in a direction referenced from the upstream, distal end surface $42a_8$ toward the downstream, proximal end surface $42b_8$; as a result, the fluid flow passage $46_8$ generally defines a first conical passage portion that decreases in cross-section as the fluid flow passage $46_8$ extends through the nozzle array disk $18b_8$ in a direction referenced from the upstream, distal end surface $42a_8$ toward the downstream, proximal end surface $42b_8$.

The constant nozzle dimension, $D2_{46\text{-}8C}$ and $D2_{46\text{-}8T}$, defined by the second surface portion $47_{8B}$ of the fluid flow passage $46_8$ is an elliptical dimension defined by a conjugate nozzle diameter, $D2_{46\text{-}8C}$ (see FIGS. 47A and 47B), and a transverse nozzle diameter, $D2_{46\text{-}8T}$ (see FIG. 47B). Both of the conjugate nozzle diameter, $D2_{46\text{-}8C}$, and the transverse nozzle diameter, $D2_{46\text{-}8T}$, remain the same along the length of the nozzle array disk $18b_8$ as the fluid flow passage $46_8$ extends through the nozzle array disk $18b_8$ in a direction referenced from the upstream, distal end surface $42a_8$ toward the downstream, proximal end surface $42b_8$; as a result, the fluid flow passage $46_8$ generally defines a cylindrical passage portion that remains the same in cross-section as the fluid flow passage $46_8$ extends through the nozzle array disk $18b_8$ in a direction referenced from the upstream, distal end surface $42a_8$ toward the downstream, proximal end surface $42b_8$.

The second non-constant nozzle dimension, $D3_{46\text{-}8C}$ and $D3_{46\text{-}8T}$, defined by the third surface portion $47_{8C}$ of the fluid flow passage $46_8$ is a second elliptical dimension defined by a second conjugate nozzle diameter, $D3_{46\text{-}8C}$ (see FIGS. 47A and 47B), and a second transverse nozzle diameter, $D3_{46\text{-}8T}$ (see FIG. 47B). In an implementation, both of the second conjugate nozzle diameter, $D3_{46\text{-}8C}$, and second transverse nozzle diameter, $D3_{46\text{-}8T}$, are non-constant diameters. The second non-constant conjugate nozzle diameter, $D3_{46\text{-}8C}$, and second transverse nozzle diameter, $D3_{46\text{-}8T}$, increase along the length of the nozzle array disk $18b_8$ as the fluid flow passage $46_8$ extends through the nozzle array disk $18b_8$ in a direction referenced from the upstream, distal end surface $42a_8$ toward the downstream, proximal end surface $42b_8$; as a result, the fluid flow passage $46_8$ generally defines a second conical passage portion that increases in cross-section as the fluid flow passage $46_8$ extends through the nozzle array disk $18b_8$ in a direction referenced from the upstream, distal end surface $42a_8$ toward the downstream, proximal end surface $42b_8$.

Shown below is a table including an exemplary embodiment of a dimension of the fluid flow passage $46_8$ described in inches.

TABLE 25

|  | Fluid Flow Passage $46_8$ |
| --- | --- |
| $D1_{46\text{-}8C}$ | Between 0.16" and 0.08" |
| $D1_{46\text{-}8T}$ | Between 0.32" and 0.24" |
| $D2_{46\text{-}8C}$ | 0.08" |
| $D2_{46\text{-}8T}$ | 0.24" |
| $D3_{46\text{-}8C}$ | Between 0.08" and 0.12" |
| $D3_{46\text{-}8T}$ | Between 0.24" and 0.28" |

Figure 48A:
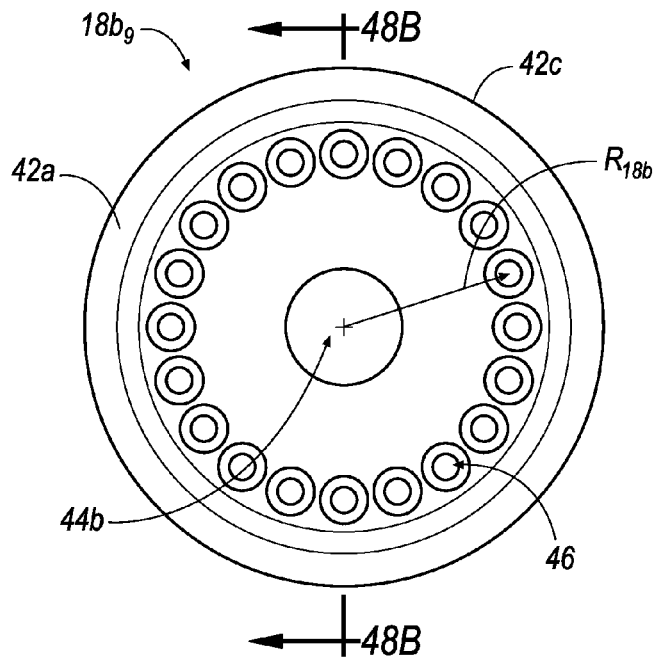
FIG. 48A is a front view of an exemplary nozzle array disk.
Figure 48B:
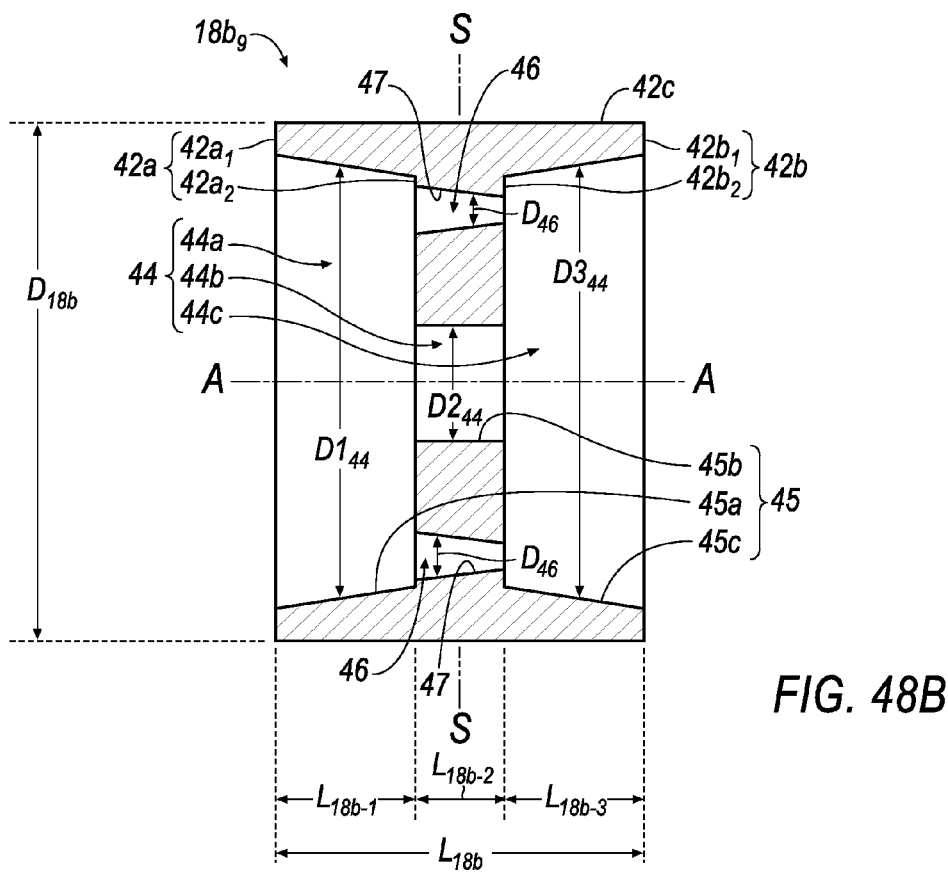
FIG. 48B is a cross-sectional view of the nozzle array disk according to line 48B-48B of FIG. 48A.

Referring to FIGS. 48A-48B, an implementation of a nozzle array disk $18b_9$ is described. Accordingly, it is contemplated that any of the nozzle array disks $18b$, $18b'$, $18b''$ described above may be substituted with the nozzle array disk $18b_9$ shown in FIGS. 48A-48B.

The nozzle array disk $18b_9$ is defined by a length, $L_{18b}$ (see, e.g., FIG. 48B), extending between an upstream, distal end surface $42a$ and a downstream, proximal end surface $42b$. An outer side surface $42c$ connects the upstream, distal end surface $42a$ to the downstream, proximal end surface $42b$. The outer side surface $42c$ defines the nozzle array disk $18b_9$ to include a diameter, $D_{18b}$ (see, e.g., FIG. 48B).

Referring to FIG. 48B, an axial passage $44$ extends through the nozzle array disk $18b_9$ between the upstream, distal end surface $42a$ and the downstream, proximal end surface $42b$. The axial passage $44$ is arranged along an axis, A-A, extending through an axial center of the nozzle array disk $18b_9$. The axial passage 44 is defined by an inner surface 45 of the of nozzle array disk $18b_9$.

In an implementation, the axial passage 44 is defined by a first axial passage portion 44a, a second axial passage portion 44b and a third axial passage portion 44c. The inner surface 45 of the nozzle array disk 18b includes a first inner surface portion 45a, a second inner surface portion 45b and a third inner surface portion 45c.

As seen in FIG. 48B, the first inner surface portion 45a defines the first axial passage portion 44a and extends along a first length portion, $L_{18b\text{-}1}$, of the length, $L_{18b}$, of the nozzle array disk $18b_9$. The second inner surface portion 45b defines the second axial passage portion 44b and extends along a second length portion, $L_{18b\text{-}2}$, of the length, $L_{18b}$, of the nozzle array disk $18b_9$. The third inner surface portion 45c defines the third axial passage portion 44c and extends along a third length portion, $L_{18b\text{-}3}$, of the length, $L_{18b}$, of the nozzle array disk $18b_9$. The sum of the first, second and third length portions, $L_{18b\text{-}1}$, $L_{18b\text{-}2}$, $L_{18b\text{-}3}$, equals the length, $L_{18b}$, of the nozzle array disk $18b_9$.

With continued reference to FIG. 48B, the upstream, distal end surface 42a of the nozzle array disk $18b_9$ may include a first upstream, distal end surface portion $42a_1$ and a second upstream, distal end surface portion $42a_2$. The second upstream, distal end surface portion $42a_2$ is axially offset from the first upstream, distal end surface portion $42a_1$ at a distance equal to the first length portion, $L_{18b\text{-}1}$, of the length, $L_{18b}$, of the nozzle array disk 18b. The first inner surface portion 45a defining the first axial passage portion 44a connects the first upstream, distal end surface portion $42a_1$ to the second upstream, distal end surface portion $42a_2$.

The downstream, proximal end surface 42b of the nozzle array disk $18b_9$ may include a first downstream, proximal end surface portion $42b_1$ and a second downstream, proximal end surface portion $42b_2$. The second downstream, proximal end surface portion $42b_2$ is axially offset from the first downstream, proximal end surface portion $42b_1$ at a distance equal to the third length portion, $L_{18b\text{-}3}$, of the length, $L_{18b}$, of the nozzle array disk $18b_9$. The third inner surface portion 45c defining the third axial passage portion 44c connects the first downstream, proximal end surface portion $42b_1$ to the second downstream, proximal end surface portion $42b_2$.

As described above, the second inner surface portion 45b extends along the second length portion, $L_{18b\text{-}2}$, of the length, $L_{18b}$, of the nozzle array disk $18b_9$. The second length portion, $L_{18b\text{-}2}$, of the length, $L_{18b}$, of the nozzle array disk 18b is arranged between the first length portion, $L_{18b\text{-}1}$, and the third length portion, $L_{18b\text{-}3}$, of the length, $L_{18b}$, of the nozzle array disk $18b_9$; as a result, the second inner surface portion 45b connects the second upstream, distal end surface portion $42a_2$ of the upstream, distal end surface 42a to the second downstream, proximal end surface portion $42b_2$ of the downstream, proximal end surface 42b.

The first inner surface portion 45a defines the first axial passage portion 44a to include a first diameter, $D1_{44}$. The second inner surface portion 45b defines the second axial passage portion 44b to include a second diameter, $D2_{44}$. The third inner surface portion 45c defines the third axial passage portion 44c to include a third diameter, $D3_{44}$.

In an implementation, the first diameter, $D1_{44}$, is a non-constant diameter. The non-constant diameter, $D1_{44}$, defined by the first axial passage portion 44a decreases along the first length portion, $L_{18b\text{-}1}$, of the length, $L_{18b}$, of the nozzle array disk $18b_9$ as the first axial passage portion 44a extends through the nozzle array disk $18b_9$ in a direction referenced from the upstream, distal end surface 42a toward the downstream, proximal end surface 42b; as a result, the first axial passage portion 44a generally defines a conical passage that decreases in cross-section as the first axial passage portion 44a extends through the nozzle array disk $18b_9$ in a direction referenced from the upstream, distal end surface 42a toward the downstream, proximal end surface 42b.

In an implementation, the second diameter, $D2_{44}$, is a constant diameter. Accordingly, the constant diameter, $D2_{44}$, defined by the second axial passage portion 44b is substantially the same along the second length portion, $L_{18b\text{-}2}$, of the length, $L_{18b}$, of the nozzle array disk $18b_9$ as the second axial passage portion 44b extends through the nozzle array disk $18b_9$ in a direction referenced from the upstream, distal end surface 42a toward the downstream, proximal end surface 42b.

In an implementation, the third diameter, $D3_{44}$, is a non-constant diameter. The non-constant diameter, $D3_{44}$, defined by the third axial passage portion 44c increases along the third length portion, $L_{18b\text{-}3}$, of the length, $L_{18b}$, of the nozzle array disk $18b_9$ as the third axial passage portion 44c extends through the nozzle array disk $18b_9$ in a direction referenced from the upstream, distal end surface 42a toward the downstream, proximal end surface 42b; as a result, the third axial passage portion 44c generally defines a conical passage that increases in cross-section as the third axial passage portion 44c extends through the nozzle array disk $18b_9$ in a direction referenced from the upstream, distal end surface 42a toward the downstream, proximal end surface 42b.

The nozzle array disk $18b_9$ includes a plurality of fluid-flow passages 46. An axial center of each fluid flow passage 46 of the plurality of fluid-flow passages 46 may be equally spaced from the axial center of the nozzle array disk $18b_9$ at a radius, $R_{18b}$ (see, e.g., FIG. 48A), to form a circular array/arrangement of fluid-flow passages 46.

Referring to FIG. 48B, each fluid flow passage 46 of the plurality of fluid-flow passages 46 is defined by a nozzle surface 47. The nozzle surface 47 defining each fluid flow passage 46 of the plurality of fluid-flow passages 46 extends along the second length portion, $L_{18b\text{-}2}$, of the length, $L_{18b}$, of the nozzle array disk $18b_9$. Because the second length portion, $L_{18b\text{-}2}$, of the length, $L_{18b}$, of the nozzle array disk $18b_9$ is arranged between the first length portion, $L_{18b\text{-}1}$, and the third length portion, $L_{18b\text{-}3}$, of the length, $L_{18b}$, of the nozzle array disk $18b_9$ as described above, the nozzle surface 47 defining each fluid flow passage 46 of the plurality of fluid-flow passages 46 connects the second upstream, distal end surface portion $42a_2$ of the upstream, distal end surface 42a to the second downstream, proximal end surface portion $42b_2$ of the downstream, proximal end surface 42b.

As seen in FIG. 48B, the nozzle surface 47 defines each fluid flow passage 46 of the plurality of fluid-flow passages 46 to include a nozzle diameter, $D_{46}$. In an implementation, the nozzle diameter, $D_{46}$, of each fluid flow passage 46 of the plurality of fluid-flow passages 46 is a non-constant diameter. The non-constant nozzle diameter, $D_{46}$, decreases along the second length portion, $L_{18b\text{-}2}$, of the length, $L_{18b}$, of the nozzle array disk $18b_9$ as each fluid flow passage 46 of the plurality of fluid-flow passages 46 extends through the nozzle array disk $18b_9$ in a direction referenced from the upstream, distal end surface 42a toward the downstream, proximal end surface 42b; as a result, each fluid flow passage 46 of the plurality of fluid-flow passages 46 generally defines a conical passage that decreases in cross-section as each fluid flow passage 46 of the plurality of fluid-flow passages 46 extends through the nozzle array disk $18b_9$ in a direction referenced from the upstream, distal end surface 42a toward the downstream, proximal end surface 42b.

With continued reference to FIG. 48B, in an implementation, the non-constant diameter, $D1_{44}$, defined by the conical first axial passage portion 44a may be symmetrical to the non-constant diameter, $D3_{44}$, defined by the conical third axial passage portion 44c (in reference to a line of symmetry, S-S, passing through the nozzle array disk $18b_9$); therefore, the non-constant diameter, $D1_{44}$, defined by the conical first axial passage portion 44a may be said to be symmetrically equal to the non-constant diameter, $D3_{44}$, defined by the conical third axial passage portion 44c. The largest diameter of the non-constant nozzle diameter, $D_{46}$, of each conical fluid flow passage 46 is less than a smallest diameter of each of: (1) the non-constant diameter, $D1_{44}$, defined by the conical first axial passage portion 44a and (2) the non-constant diameter, $D3_{44}$, defined by the conical third axial passage portion 44c. In an implementation, the non-constant nozzle diameter, $D_{46}$, may be proportional to the non-constant diameter, $D1_{44}$; therefore, proportionally, the non-constant nozzle diameter, $D_{46}$, of each conical fluid flow passage 46 of the plurality of conical fluid-flow passages 46 may range be approximately about one-sixteenth (1/16) to one-tenth (1/10) of non-constant diameter, $D1_{44}$, defined by the conical first axial passage portion 44a.

The plurality of conical fluid flow passages 46 fluidly connects the conical first axial passage portion 44a to the conical third axial passage portion 44c. Therefore, as the liquid, L, flows through the nozzle array disk $18b_9$ in a direction referenced from the upstream, distal end surface 42a toward the downstream, proximal end surface 42b, the liquid, L, is permitted to travel: (1) firstly through a first conical passage (i.e., the conical first axial passage portion 44a that decreases in cross-section in a direction referenced from the upstream, distal end surface 42a toward the downstream, proximal end surface 42b, then (2) secondly through a circular array of conical nozzle passages (i.e., the plurality of conical fluid flow passages 46) that decrease in cross-section in a direction referenced from the upstream, distal end surface 42a toward the downstream, proximal end surface 42b, and then (3) thirdly through a second conical passage (i.e., the conical third axial passage portion 44c) that increases in cross-section in a direction referenced from the upstream, distal end surface 42a toward the downstream, proximal end surface 42b. The liquid, L, does not flow through the second axial passage portion 44b due to the second axial passage portion 44b being utilized for permitting a threaded stem (see, e.g., 50, 50', 50" described above) of the upstream-facing member (see, e.g., 18c, 18c', 18c" described above) to pass therethrough for connecting the threaded stem of the upstream-facing member to a threaded passage (see, e.g., 40, 40', 40" described above) of a downstream-facing member (see, e.g., 18a, 18a', 18a" described above).

Shown below is a table including an exemplary embodiment of dimensions of the conical nozzle array disk $18b_9$ described in inches.

TABLE 26

| | Embodiment 1 |
|---|---|
| $L_{18b}$ | 0.85" |
| $L_{18b-1}$ | 0.30" |
| $L_{18b-2}$ | 0.25" |
| $L_{18b-3}$ | 0.30" |
| $D_{18b}$ | 1.14" |

TABLE 26-continued

| | Embodiment 1 |
|---|---|
| $D1_{44}$ | Between 0.96" and 1.04" |
| $D2_{44}$ | 0.15" |
| $D3_{44}$ | Between 0.96" and 1.04" |
| $D_{46}$ | Between 0.06" and 0.16" |
| $R_{18b}$ | 0.43" |

Figure 49A:
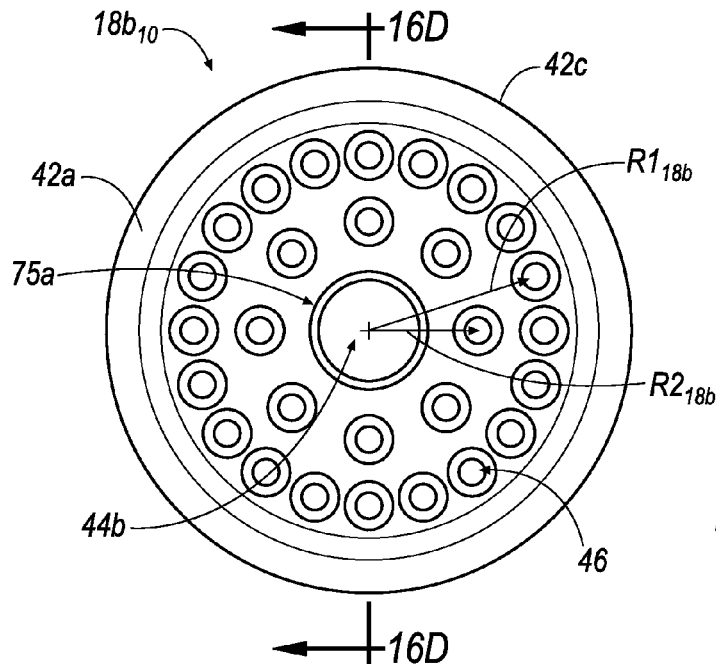
FIG. 49A is a front view of an exemplary nozzle array disk.
Figure 49B:
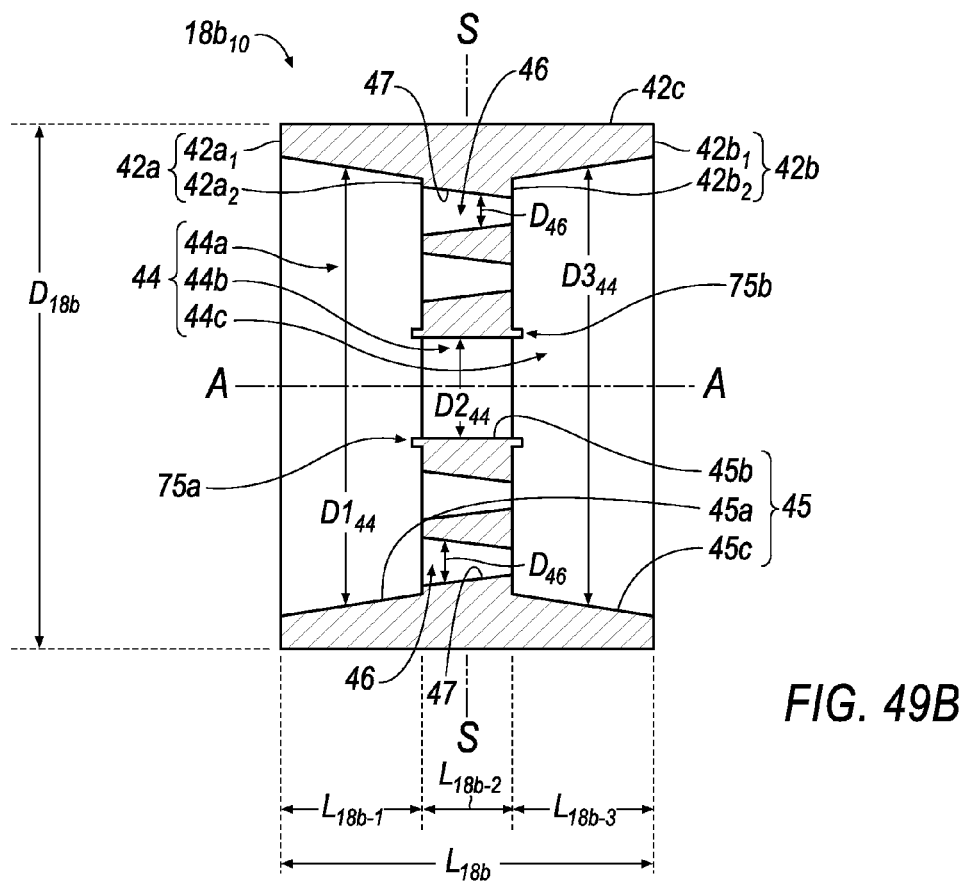
FIG. 49B is a cross-sectional view of the nozzle array disk according to line 49B-49B of FIG. 49A.

Referring to FIGS. 49A-49B, an implementation of a nozzle array disk $18b_{10}$ is described. Accordingly, it is contemplated that any of the nozzle array disks 18b, 18b', 18b" described above may be substituted with the nozzle array disk $18b_{10}$ shown in FIGS. 49A-49B.

The nozzle array disk $18b_{10}$ is defined by a length, $L_{18b}$ (see, e.g., FIG. 49B), extending between an upstream, distal end surface 42a and a downstream, proximal end surface 42b. An outer side surface 42c connects the upstream, distal end surface 42a to the downstream, proximal end surface 42b. The outer side surface 42c defines the nozzle array disk $18b_{10}$ to include a diameter, $D_{18b}$ (see, e.g., FIG. 49B).

Referring to FIG. 49B, an axial passage 44 extends through the nozzle array disk $18b_{10}$ between the upstream, distal end surface 42a and the downstream, proximal end surface 42b. The axial passage 44 is arranged along an axis, A-A, extending through an axial center of the nozzle array disk $18b_{10}$. The axial passage 44 is defined by an inner surface 45 of the of nozzle array disk $18b_{10}$.

In an implementation, the axial passage 44 is defined by a first axial passage portion 44a, a second axial passage portion 44b and a third axial passage portion 44c. The inner surface 45 of the nozzle array disk 18b includes a first inner surface portion 45a, a second inner surface portion 45b and a third inner surface portion 45c.

As seen in FIG. 49B, the first inner surface portion 45a defines the first axial passage portion 44a and extends along a first length portion, $L_{18b-1}$, of the length, $L_{18b}$, of the nozzle array disk $18b_{10}$. The second inner surface portion 45b defines the second axial passage portion 44b and extends along a second length portion, $L_{18b-2}$, of the length, $L_{18b}$, of the nozzle array disk $18b_{10}$. The third inner surface portion 45c defines the third axial passage portion 44c and extends along a third length portion, $L_{18b-3}$, of the length, $L_{18b}$, of the nozzle array disk $18b_{10}$. The sum of the first, second and third length portions, $L_{18b-1}$, $L_{18b-2}$, $L_{18b-3}$, equals the length, $L_{18b}$, of the nozzle array disk $18b_{10}$.

With continued reference to FIG. 49B, the upstream, distal end surface 42a of the nozzle array disk $18b_{10}$ may include a first upstream, distal end surface portion $42a_1$ and a second upstream, distal end surface portion $42a_2$. The second upstream, distal end surface portion $42a_2$ is axially offset from the first upstream, distal end surface portion $42a_1$ at a distance equal to the first length portion, $L_{18b-1}$, of the length, $L_{18b}$, of the nozzle array disk 18b. The first inner surface portion 45a defining the first axial passage portion 44a connects the first upstream, distal end surface portion $42a_1$ to the second upstream, distal end surface portion $42a_2$.

The downstream, proximal end surface 42b of the nozzle array disk $18b_{10}$ may include a first downstream, proximal end surface portion $42b_1$ and a second downstream, proximal end surface portion $42b_2$. The second downstream, proximal end surface portion $42b_2$ is axially offset from the first downstream, proximal end surface portion $42b_1$ at a distance equal to the third length portion, $L_{18b-3}$, of the length, $L_{18b}$, of the nozzle array disk $18b_{10}$. The third inner surface portion 45c defining the third axial passage portion 44c connects the first downstream, proximal end surface portion 42$b_1$ to the second downstream, proximal end surface portion 42$b_2$.

As described above, the second inner surface portion 45b extends along the second length portion, $L_{18b-2}$, of the length, $L_{18b}$, of the nozzle array disk 18$b_{10}$. The second length portion, $L_{18b-2}$, of the length, $L_{18b}$, of the nozzle array disk 18b is arranged between the first length portion, $L_{18b-1}$, and the third length portion, $L_{18b-3}$, of the length, $L_{18b}$, of the nozzle array disk 18$b_{10}$; as a result, the second inner surface portion 45b connects the second upstream, distal end surface portion 42$a_2$ of the upstream, distal end surface 42a to the second downstream, proximal end surface portion 42$b_2$ of the downstream, proximal end surface 42b.

The first inner surface portion 45a defines the first axial passage portion 44a to include a first diameter, $D1_{44}$. The second inner surface portion 45b defines the second axial passage portion 44b to include a second diameter, $D2_{44}$. The third inner surface portion 45c defines the third axial passage portion 44c to include a third diameter, $D3_{44}$.

In an implementation, the first diameter, $D1_{44}$, is a non-constant diameter. The non-constant diameter, $D1_{44}$, defined by the first axial passage portion 44a decreases along the first length portion, $L_{18b-1}$, of the length, $L_{18b}$, of the nozzle array disk 18$b_{10}$ as the first axial passage portion 44a extends through the nozzle array disk 18$b_{10}$ in a direction referenced from the upstream, distal end surface 42a toward the downstream, proximal end surface 42b; as a result, the first axial passage portion 44a generally defines a conical passage that decreases in cross-section as the first axial passage portion 44a extends through the nozzle array disk 18$b_{10}$ in a direction referenced from the upstream, distal end surface 42a toward the downstream, proximal end surface 42b.

In an implementation, the second diameter, $D2_{44}$, is a constant diameter. Accordingly, the constant diameter, $D2_{44}$, defined by the second axial passage portion 44b is substantially the same along the second length portion, $L_{18b-2}$, of the length, $L_{18b}$, of the nozzle array disk 18$b_{10}$ as the second axial passage portion 44b extends through the nozzle array disk 18$b_{10}$ in a direction referenced from the upstream, distal end surface 42a toward the downstream, proximal end surface 42b.

In an implementation, the third diameter, $D3_{44}$, is a non-constant diameter. The non-constant diameter, $D3_{44}$, defined by the third axial passage portion 44c increases along the third length portion, $L_{18b-3}$, of the length, $L_{18b}$, of the nozzle array disk 18$b_{10}$ as the third axial passage portion 44c extends through the nozzle array disk 18$b_{10}$ in a direction referenced from the upstream, distal end surface 42a toward the downstream, proximal end surface 42b; as a result, the third axial passage portion 44c generally defines a conical passage that increases in cross-section as the third axial passage portion 44c extends through the nozzle array disk 18$b_{10}$ in a direction referenced from the upstream, distal end surface 42a toward the downstream, proximal end surface 42b.

The nozzle array disk 18$b_{10}$ includes a plurality of fluid-flow passages 46. Unlike the nozzle array disk 18$b_1$ of FIGS. 48A-48B described above, which includes one circular array/arrangement of fluid-flow passages 46, the nozzle array disk 18$b_{10}$ includes a first circular array/arrangement of fluid-flow passages 46 and a second circular array/arrangement of fluid-flow passages 46. Regarding the first circular array/arrangement of fluid-flow passages 46, an axial center of each fluid flow passage 46 of the plurality of fluid-flow passages 46 may be equally spaced from the axial center of the nozzle array disk 18$b_{10}$ at a first radius, $R1_{18b}$ (see, e.g., FIG. 49A), to form a circular array/arrangement of fluid-flow passages 46. Regarding the second circular array/arrangement of fluid-flow passages 46, an axial center of each fluid flow passage 46 of the plurality of fluid-flow passages 46 may be equally spaced from the axial center of the nozzle array disk 18$b_{10}$ at a second radius, $R2_{18b}$ (see, e.g., FIG. 49A), to form a circular array/arrangement of fluid-flow passages 46.

Referring to FIG. 49B, each fluid flow passage 46 of the plurality of fluid-flow passages 46 is defined by a nozzle surface 47. The nozzle surface 47 defining each fluid flow passage 46 of the plurality of fluid-flow passages 46 extends along the second length portion, $L_{18b-2}$, of the length, $L_{18b}$, of the nozzle array disk 18$b_{10}$. Because the second length portion, $L_{18b-2}$, of the length, $L_{18b}$, of the nozzle array disk 18$b_{10}$ is arranged between the first length portion, $L_{18b-1}$, and the third length portion, $L_{18b-3}$, of the length, $L_{18b}$, of the nozzle array disk 18$b_{10}$ as described above, the nozzle surface 47 defining each fluid flow passage 46 of the plurality of fluid-flow passages 46 connects the second upstream, distal end surface portion 42$a_2$ of the upstream, distal end surface 42a to the second downstream, proximal end surface portion 42$b_2$ of the downstream, proximal end surface 42b.

As seen in FIG. 49B, the nozzle surface 47 defines each fluid flow passage 46 of the plurality of fluid-flow passages 46 to include a nozzle diameter, $D_{46}$. In an implementation, the nozzle diameter, $D_{46}$, of each fluid flow passage 46 of the plurality of fluid-flow passages 46 is a non-constant diameter. The non-constant nozzle diameter, $D_{46}$, decreases along the second length portion, $L_{18b-2}$, of the length, $L_{18b}$, of the nozzle array disk 18$b_{10}$ as each fluid flow passage 46 of the plurality of fluid-flow passages 46 extends through the nozzle array disk 18$b_{10}$ in a direction referenced from the upstream, distal end surface 42a toward the downstream, proximal end surface 42b; as a result, each fluid flow passage 46 of the plurality of fluid-flow passages 46 generally defines a conical passage that decreases in cross-section as each fluid flow passage 46 of the plurality of fluid-flow passages 46 extends through the nozzle array disk 18$b_{10}$ in a direction referenced from the upstream, distal end surface 42a toward the downstream, proximal end surface 42b.

With continued reference to FIG. 49B, in an implementation, the non-constant diameter, $D1_{44}$, defined by the conical first axial passage portion 44a may be symmetrical to the non-constant diameter, $D3_{44}$, defined by the conical third axial passage portion 44c (in reference to a line of symmetry, S-S, passing through the nozzle array disk 18$b_{10}$); therefore, the non-constant diameter, $D1_{44}$, defined by the conical first axial passage portion 44a may be said to be symmetrically equal to the non-constant diameter, $D3_{44}$, defined by the conical third axial passage portion 44c. The largest diameter of the non-constant nozzle diameter, $D_{46}$, of each conical fluid flow passage 46 is less than a smallest diameter of each of: (1) the non-constant diameter, $D1_{44}$, defined by the conical first axial passage portion 44a and (2) the non-constant diameter, $D3_{44}$, defined by the conical third axial passage portion 44c. In an implementation, the non-constant nozzle diameter, $D_{46}$, may be proportional to the non-constant diameter, $D1_{44}$; therefore, proportionally, the non-constant nozzle diameter, $D_{46}$, of each conical fluid flow passage 46 of the plurality of conical fluid-flow passages 46 may range be approximately about one-sixteenth ($\frac{1}{16}$) to one-tenth ($\frac{1}{10}$) of non-constant diameter, $D1_{44}$, defined by the conical first axial passage portion 44a.

The plurality of conical fluid flow passages 46 fluidly connects the conical first axial passage portion 44a to the conical third axial passage portion 44c. Therefore, as the liquid, L, flows through the nozzle array disk $18b_{10}$ in a direction referenced from the upstream, distal end surface 42a toward the downstream, proximal end surface 42b, the liquid, L, is permitted to travel: (1) firstly through a first conical passage (i.e., the conical first axial passage portion 44a that decreases in cross-section in a direction referenced from the upstream, distal end surface 42a toward the downstream, proximal end surface 42b, then (2) secondly through a circular array of conical nozzle passages (i.e., the plurality of conical fluid flow passages 46) that decrease in cross-section in a direction referenced from the upstream, distal end surface 42a toward the downstream, proximal end surface 42b, and then (3) thirdly through a second conical passage (i.e., the conical third axial passage portion 44c) that increases in cross-section in a direction referenced from the upstream, distal end surface 42a toward the downstream, proximal end surface 42b. The liquid, L, does not flow through the second axial passage portion 44b due to the second axial passage portion 44b being utilized for permitting a threaded stem (see, e.g., 50, 50', 50" described above) of the upstream-facing member (see, e.g., 18c, 18c', 18c" described above) to pass therethrough for connecting the threaded stem of the upstream-facing member to a threaded passage (see, e.g., 40, 40', 40" described above) of a downstream-facing member (see, e.g., 18a, 18a', 18a" described above).

The nozzle array disk $18b_{10}$ may also include an upstream-facing ring 75a and a downstream-facing ring 75b. The upstream-facing ring 75a extends from the second upstream, distal end surface portion $42a_2$ of the upstream, distal end surface 42a. The downstream-facing ring 75b extends from the second downstream, proximal end surface portion $42b_2$ of the downstream, proximal end surface 42b.

Functionally, the upstream-facing ring 75a prevents the upstream-facing member (see, e.g., 18c, 18c', 18c") from being disposed directly adjacent the second upstream, distal end surface portion $42a_2$ of the upstream, distal end surface 42a. Should the upstream-facing member (see, e.g., 18c, 18c', 18c") otherwise be disposed directly adjacent the second upstream, distal end surface portion $42a_2$ of the upstream, distal end surface 42a, the upstream-facing member (see, e.g., 18c, 18c', 18c") would fluidly-seal the plurality of fluid-flow passages 46 that are spaced from the axial center of the nozzle array disk $18b_{10}$ at the second radius, $R2_{18b}$. Functionally, the downstream-facing ring 75b prevents the downstream-facing member (see, e.g., 18a, 18a', 18a") from being disposed directly adjacent the second downstream, proximal end surface portion $42b_2$ of the downstream, proximal end surface 42b. Should the downstream-facing member (see, e.g., 18a, 18a', 18a") otherwise be disposed directly adjacent the second downstream, proximal end surface portion $42a_2$ of the downstream, proximal end surface 42b, the downstream-facing member (see, e.g., 18a, 18a', 18a") would fluidly-seal the plurality of fluid-flow passages 46 that are spaced from the axial center of the nozzle array disk $18b_{10}$ at the second radius, $R2_{18b}$. Accordingly, the upstream-facing ring 75a and the downstream-facing ring 75b permits the fluid, L, to flow through the plurality of fluid-flow passages 46 that are spaced from the axial center of the nozzle array disk $18b_{10}$ at the second radius, $R2_{18b}$.

Shown below is a table including an exemplary embodiment of dimensions of the conical nozzle array disk $18b_{10}$ described in inches.

TABLE 27

| | Embodiment 1 |
|---|---|
| $L_{18b}$ | 0.85" |
| $L_{18b-1}$ | 0.30" |
| $L_{18b-2}$ | 0.25" |
| $L_{18b-3}$ | 0.30" |
| $D_{18b}$ | 1.14" |
| $D1_{44}$ | Between 0.96" and 1.04" |
| $D2_{44}$ | 0.15" |
| $D3_{44}$ | Between 0.96" and 1.04" |
| $D_{46}$ | Between 0.06" and 0.12" |
| $R1_{18b}$ | 0.40" |
| $R2_{18b}$ | 0.27" |

Figure 50A:
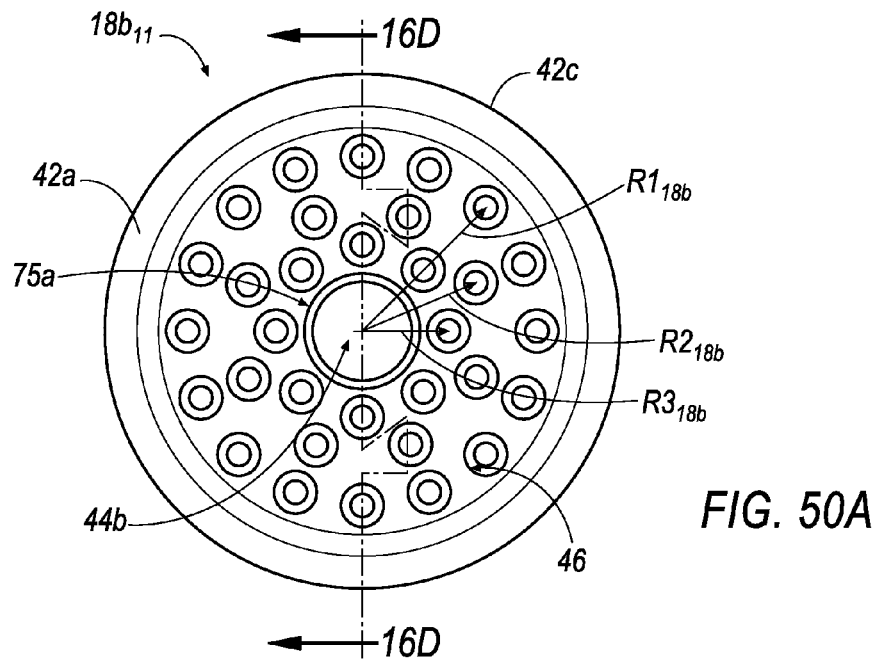
FIG. 50A is a front view of an exemplary nozzle array disk.
Figure 50B:
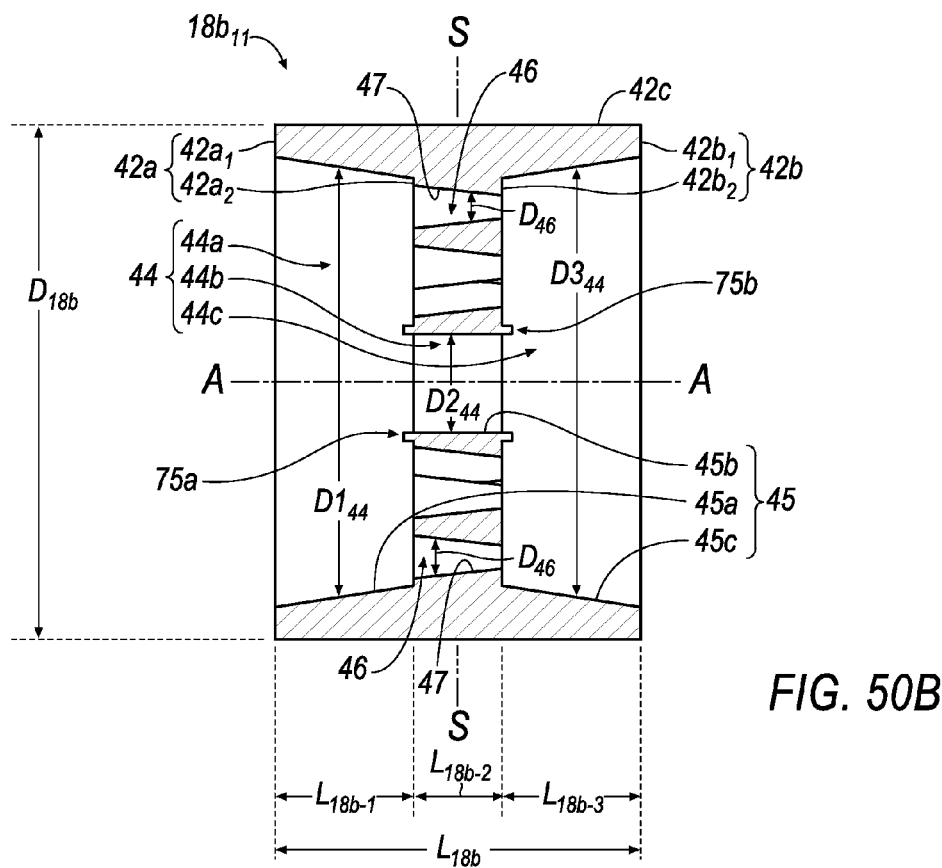
FIG. 50B is a cross-sectional view of the nozzle array disk according to line 50B-50B of FIG. 50A.

Referring to FIGS. 50A-50B, an implementation of a nozzle array disk $18b_{11}$ is described. Accordingly, it is contemplated that any of the nozzle array disks 18b, 18b', 18b" described above may be substituted with the nozzle array disk $18b_{11}$ shown in FIGS. 50A-50B.

The nozzle array disk $18b_{11}$ is defined by a length, $L_{18b}$ (see, e.g., FIG. 50B), extending between an upstream, distal end surface 42a and a downstream, proximal end surface 42b. An outer side surface 42c connects the upstream, distal end surface 42a to the downstream, proximal end surface 42b. The outer side surface 42c defines the nozzle array disk $18b_{11}$ to include a diameter, $D_{18b}$ (see, e.g., FIG. 50B).

Referring to FIG. 50B, an axial passage 44 extends through the nozzle array disk $18b_{11}$ between the upstream, distal end surface 42a and the downstream, proximal end surface 42b. The axial passage 44 is arranged along an axis, A-A, extending through an axial center of the nozzle array disk $18b_{11}$. The axial passage 44 is defined by an inner surface 45 of the of nozzle array disk $18b_{11}$.

In an implementation, the axial passage 44 is defined by a first axial passage portion 44a, a second axial passage portion 44b and a third axial passage portion 44c. The inner surface 45 of the nozzle array disk 18b includes a first inner surface portion 45a, a second inner surface portion 45b and a third inner surface portion 45c.

As seen in FIG. 50B, the first inner surface portion 45a defines the first axial passage portion 44a and extends along a first length portion, $L_{18b-1}$, of the length, $L_{18b}$, of the nozzle array disk $18b_{11}$. The second inner surface portion 45b defines the second axial passage portion 44b and extends along a second length portion, $L_{18b-2}$, of the length, $L_{18b}$, of the nozzle array disk $18b_{11}$. The third inner surface portion 45c defines the third axial passage portion 44c and extends along a third length portion, $L_{18b-3}$, of the length, $L_{18b}$, of the nozzle array disk $18b_{11}$. The sum of the first, second and third length portions, $L_{18b-1}$, $L_{18b-2}$, $L_{18b-3}$, equals the length, $L_{18b}$, of the nozzle array disk $18b_{11}$.

With continued reference to FIG. 50B, the upstream, distal end surface 42a of the nozzle array disk $18b_{11}$ may include a first upstream, distal end surface portion $42a_1$ and a second upstream, distal end surface portion $42a_2$. The second upstream, distal end surface portion $42a_2$ is axially offset from the first upstream, distal end surface portion $42a_1$ at a distance equal to the first length portion, $L_{18b-1}$, of the length, $L_{18b}$, of the nozzle array disk 18b. The first inner surface portion 45a defining the first axial passage portion 44a connects the first upstream, distal end surface portion $42a_1$ to the second upstream, distal end surface portion $42a_2$.

The downstream, proximal end surface 42b of the nozzle array disk $18b_{11}$ may include a first downstream, proximal end surface portion $42b_1$ and a second downstream, proximal end surface portion $42b_2$. The second downstream, proximal end surface portion $42b_2$ is axially offset from the first downstream, proximal end surface portion $42b_1$ at a distance equal to the third length portion, $L_{18b-3}$, of the length, $L_{18b}$, of the nozzle array disk $18b_{11}$. The third inner surface portion $45c$ defining the third axial passage portion $44c$ connects the first downstream, proximal end surface portion $42b_1$ to the second downstream, proximal end surface portion $42b_2$.

As described above, the second inner surface portion $45b$ extends along the second length portion, $L_{18b-2}$, of the length, $L_{18b}$, of the nozzle array disk $18b_{11}$. The second length portion, $L_{18b-2}$, of the length, $L_{18b}$, of the nozzle array disk $18b$ is arranged between the first length portion, $L_{18b-1}$, and the third length portion, $L_{18b-3}$, of the length, $L_{18b}$, of the nozzle array disk $18b_{11}$; as a result, the second inner surface portion $45b$ connects the second upstream, distal end surface portion $42a_2$ of the upstream, distal end surface $42a$ to the second downstream, proximal end surface portion $42b_2$ of the downstream, proximal end surface $42b$.

The first inner surface portion $45a$ defines the first axial passage portion $44a$ to include a first diameter, $D1_{44}$. The second inner surface portion $45b$ defines the second axial passage portion $44b$ to include a second diameter, $D2_{44}$. The third inner surface portion $45c$ defines the third axial passage portion $44c$ to include a third diameter, $D3_{44}$.

In an implementation, the first diameter, $D1_{44}$, is a non-constant diameter. The non-constant diameter, $D1_{44}$, defined by the first axial passage portion $44a$ decreases along the first length portion, $L_{18b-1}$, of the length, $L_{18b}$, of the nozzle array disk $18b_{11}$ as the first axial passage portion $44a$ extends through the nozzle array disk $18b_{11}$ in a direction referenced from the upstream, distal end surface $42a$ toward the downstream, proximal end surface $42b$; as a result, the first axial passage portion $44a$ generally defines a conical passage that decreases in cross-section as the first axial passage portion $44a$ extends through the nozzle array disk $18b_{11}$ in a direction referenced from the upstream, distal end surface $42a$ toward the downstream, proximal end surface $42b$.

In an implementation, the second diameter, $D2_{44}$, is a constant diameter. Accordingly, the constant diameter, $D2_{44}$, defined by the second axial passage portion $44b$ is substantially the same along the second length portion, $L_{18b-2}$, of the length, $L_{18b}$, of the nozzle array disk $18b_{11}$ as the second axial passage portion $44b$ extends through the nozzle array disk $18b_{11}$ in a direction referenced from the upstream, distal end surface $42a$ toward the downstream, proximal end surface $42b$.

In an implementation, the third diameter, $D3_{44}$, is a non-constant diameter. The non-constant diameter, $D3_{44}$, defined by the third axial passage portion $44c$ increases along the third length portion, $L_{18b-3}$, of the length, $L_{18b}$, of the nozzle array disk $18b_{11}$ as the third axial passage portion $44c$ extends through the nozzle array disk $18b_{11}$ in a direction referenced from the upstream, distal end surface $42a$ toward the downstream, proximal end surface $42b$; as a result, the third axial passage portion $44c$ generally defines a conical passage that increases in cross-section as the third axial passage portion $44c$ extends through the nozzle array disk $18b_{11}$ in a direction referenced from the upstream, distal end surface $42a$ toward the downstream, proximal end surface $42b$.

The nozzle array disk $18b_{11}$ includes a plurality of fluid-flow passages $46$. Unlike the nozzle array disk $18b_1$ of FIGS. 48A-48B described above, which includes one circular array/arrangement of fluid-flow passages $46$, the nozzle array disk $18b_{11}$ includes a first circular array/arrangement of fluid-flow passages $46$, a second circular array/arrangement of fluid-flow passages $46$ and a third circular array/arrangement of fluid-flow passages $46$. Regarding the first circular array/arrangement of fluid-flow passages $46$, an axial center of each fluid flow passage $46$ of the plurality of fluid-flow passages $46$ may be equally spaced from the axial center of the nozzle array disk $18b_{11}$ at a first radius, $R1_{18b}$ (see, e.g., FIG. 50A), to form a circular array/arrangement of fluid-flow passages $46$. Regarding the second circular array/arrangement of fluid-flow passages $46$, an axial center of each fluid flow passage $46$ of the plurality of fluid-flow passages $46$ may be equally spaced from the axial center of the nozzle array disk $18b_{11}$ at a second radius, $R2_{18b}$ (see, e.g., FIG. 50A), to form a circular array/arrangement of fluid-flow passages $46$. Regarding the third circular array/arrangement of fluid-flow passages $46$, an axial center of each fluid flow passage $46$ of the plurality of fluid-flow passages $46$ may be equally spaced from the axial center of the nozzle array disk $18b_{11}$ at a third radius, $R3_{18b}$ (see, e.g., FIG. 50A), to form a circular array/arrangement of fluid-flow passages $46$.

Referring to FIG. 50B, each fluid flow passage $46$ of the plurality of fluid-flow passages $46$ is defined by a nozzle surface $47$. The nozzle surface $47$ defining each fluid flow passage $46$ of the plurality of fluid-flow passages $46$ extends along the second length portion, $L_{18b-2}$, of the length, $L_{18b}$, of the nozzle array disk $18b_{11}$. Because the second length portion, $L_{18b-2}$, of the length, $L_{18b}$, of the nozzle array disk $18b_{11}$ is arranged between the first length portion, $L_{18b-1}$, and the third length portion, $L_{18b-3}$, of the length, $L_{18b}$, of the nozzle array disk $18b_{11}$ as described above, the nozzle surface $47$ defining each fluid flow passage $46$ of the plurality of fluid-flow passages $46$ connects the second upstream, distal end surface portion $42a_2$ of the upstream, distal end surface $42a$ to the second downstream, proximal end surface portion $42b_2$ of the downstream, proximal end surface $42b$.

As seen in FIG. 50B, the nozzle surface $47$ defines each fluid flow passage $46$ of the plurality of fluid-flow passages $46$ to include a nozzle diameter, $D_{46}$. In an implementation, the nozzle diameter, $D_{46}$, of each fluid flow passage $46$ of the plurality of fluid-flow passages $46$ is a non-constant diameter. The non-constant nozzle diameter, $D_{46}$, decreases along the second length portion, $L_{18b-2}$, of the length, $L_{18b}$, of the nozzle array disk $18b_{11}$ as each fluid flow passage $46$ of the plurality of fluid-flow passages $46$ extends through the nozzle array disk $18b_{11}$ in a direction referenced from the upstream, distal end surface $42a$ toward the downstream, proximal end surface $42b$; as a result, each fluid flow passage $46$ of the plurality of fluid-flow passages $46$ generally defines a conical passage that decreases in cross-section as each fluid flow passage $46$ of the plurality of fluid-flow passages $46$ extends through the nozzle array disk $18b_{11}$ in a direction referenced from the upstream, distal end surface $42a$ toward the downstream, proximal end surface $42b$.

With continued reference to FIG. 50B, in an implementation, the non-constant diameter, $D1_{44}$, defined by the conical first axial passage portion $44a$ may be symmetrical to the non-constant diameter, $D3_{44}$, defined by the conical third axial passage portion $44c$ (in reference to a line of symmetry, S-S, passing through the nozzle array disk $18b_{11}$); therefore, the non-constant diameter, $D1_{44}$, defined by the conical first axial passage portion $44a$ may be said to be symmetrically equal to the non-constant diameter, $D3_{44}$, defined by the conical third axial passage portion $44c$. The largest diameter of the non-constant nozzle diameter, $D_{46}$, of each conical fluid flow passage $46$ is less than a smallest diameter of each of: (1) the non-constant diameter, $D1_{44}$, defined by the conical first axial passage portion 44a and (2) the non-constant diameter, $D3_{44}$, defined by the conical third axial passage portion 44c. In an implementation, the non-constant nozzle diameter, $D_{46}$, may be proportional to the non-constant diameter, $D1_{44}$; therefore, proportionally, the non-constant nozzle diameter, $D_{46}$, of each conical fluid flow passage 46 of the plurality of conical fluid-flow passages 46 may range be approximately about one-sixteenth (1/16) to one-tenth (1/10) of non-constant diameter, $D1_{44}$, defined by the conical first axial passage portion 44a.

The plurality of conical fluid flow passages 46 fluidly connects the conical first axial passage portion 44a to the conical third axial passage portion 44c. Therefore, as the liquid, L, flows through the nozzle array disk $18b_{11}$ in a direction referenced from the upstream, distal end surface 42a toward the downstream, proximal end surface 42b, the liquid, L, is permitted to travel: (1) firstly through a first conical passage (i.e., the conical first axial passage portion 44a that decreases in cross-section in a direction referenced from the upstream, distal end surface 42a toward the downstream, proximal end surface 42b, then (2) secondly through a circular array of conical nozzle passages (i.e., the plurality of conical fluid flow passages 46) that decrease in cross-section in a direction referenced from the upstream, distal end surface 42a toward the downstream, proximal end surface 42b, and then (3) thirdly through a second conical passage (i.e., the conical third axial passage portion 44c) that increases in cross-section in a direction referenced from the upstream, distal end surface 42a toward the downstream, proximal end surface 42b. The liquid, L, does not flow through the second axial passage portion 44b due to the second axial passage portion 44b being utilized for permitting a threaded stem (see, e.g., 50, 50', 50" described above) of the upstream-facing member (see, e.g., 18c, 18c', 18c" described above) to pass therethrough for connecting the threaded stem of the upstream-facing member to a threaded passage (see, e.g., 40, 40', 40" described above) of a downstream-facing member (see, e.g., 18a, 18a', 18a" described above).

The nozzle array disk $18b_{11}$ may also include an upstream-facing ring 75a and a downstream-facing ring 75b. The upstream-facing ring 75a extends from the second upstream, distal end surface portion $42a_2$ of the upstream, distal end surface 42a. The downstream-facing ring 75b extends from the second downstream, proximal end surface portion $42b_2$ of the downstream, proximal end surface 42b.

Functionally, the upstream-facing ring 75a prevents the upstream-facing member (see, e.g., 18c, 18c', 18c") from being disposed directly adjacent the second upstream, distal end surface portion $42a_2$ of the upstream, distal end surface 42a. Should the upstream-facing member (see, e.g., 18c, 18c', 18c") otherwise be disposed directly adjacent the second upstream, distal end surface portion $42a_2$ of the upstream, distal end surface 42a, the upstream-facing member (see, e.g., 18c, 18c', 18c") would fluidly-seal the plurality of fluid-flow passages 46 that are spaced from the axial center of the nozzle array disk $18b_{10}$ at the second radius, $R2_{18b}$ and the third radius, $R3_{18b}$. Functionally, the downstream-facing ring 75b prevents the downstream-facing member (see, e.g., 18a, 18a', 18a") from being disposed directly adjacent the second downstream, proximal end surface portion $42b_2$ of the downstream, proximal end surface 42b. Should the downstream-facing member (see, e.g., 18a, 18a', 18a") otherwise be disposed directly adjacent the second downstream, proximal end surface portion $42a_2$ of the downstream, proximal end surface 42b, the downstream-facing member (see, e.g., 18a, 18a', 18a") would fluidly-seal the plurality of fluid-flow passages 46 that are spaced from the axial center of the nozzle array disk $18b_{10}$ at the second radius, $R2_{18b}$ and the third radius, $R3_{18b}$. Accordingly, the upstream-facing ring 75a and the downstream-facing ring 75b permits the fluid, L, to flow through the plurality of fluid-flow passages 46 that are spaced from the axial center of the nozzle array disk $18b_{10}$ at the second radius, $R2_{18b}$ and the third radius, $R3_{18b}$.

Shown below is a table including an exemplary embodiment of dimensions of the conical nozzle array disk $18b_{11}$ described in inches.

TABLE 28

| | Embodiment 1 |
|---|---|
| $L_{18b}$ | 0.85" |
| $L_{18b-1}$ | 0.30" |
| $L_{18b-2}$ | 0.25" |
| $L_{18b-3}$ | 0.30" |
| $D_{18b}$ | 1.14" |
| $D1_{44}$ | Between 0.96" and 1.04" |
| $D2_{44}$ | 0.15" |
| $D3_{44}$ | Between 0.96" and 1.04" |
| $D_{46}$ | Between 0.06" and 0.12" |
| $R1_{18b}$ | 0.41" |
| $R2_{18b}$ | 0.28" |
| $R3_{18b}$ | 0.15" |

Referring to FIGS. 51A-51C, an implementation of a nozzle array disk $18b_{12}$ is described. Accordingly, it is contemplated that any of the nozzle array disks 18b, 18b', 18b" described above may be substituted with the nozzle array disk $18b_{12}$ shown in FIGS. 51A-51B.

The nozzle array disk $18b_{12}$ is defined by a length, $L_{18b}$ (see, e.g., FIG. 51B), extending between an upstream, distal end surface 42a and a downstream, proximal end surface 42b. An outer side surface 42c connects the upstream, distal end surface 42a to the downstream, proximal end surface 42b. The outer side surface 42c defines the nozzle array disk $18b_{12}$ to include a diameter, $D_{18b}$ (see, e.g., FIG. 51B).

Referring to FIG. 51B, an axial passage 44 extends through the nozzle array disk $18b_{12}$ between the upstream, distal end surface 42a and the downstream, proximal end surface 42b. The axial passage 44 is arranged along an axis, A-A, extending through an axial center of the nozzle array disk $18b_{12}$. The axial passage 44 is defined by an inner surface 45 of the of nozzle array disk $18b_{12}$.

In an implementation, the axial passage 44 is defined by a first axial passage portion 44a, a second axial passage portion 44b and a third axial passage portion 44c. The inner surface 45 of the nozzle array disk 18b includes a first inner surface portion 45a, a second inner surface portion 45b and a third inner surface portion 45c.

As seen in FIG. 51B, the first inner surface portion 45a defines the first axial passage portion 44a and extends along a first length portion, $L_{18b-1}$, of the length, $L_{18b}$, of the nozzle array disk $18b_{12}$. The second inner surface portion 45b defines the second axial passage portion 44b and extends along a second length portion, $L_{18b-2}$, of the length, $L_{18b}$, of the nozzle array disk $18b_{12}$. The third inner surface portion 45c defines the third axial passage portion 44c and extends along a third length portion, $L_{18b-3}$, of the length, $L_{18b}$, of the nozzle array disk $18b_{12}$. The sum of the first, second and third length portions, $L_{18b-1}$, $L_{18b-2}$, $L_{18b-3}$, equals the length, $L_{18b}$, of the nozzle array disk $18b_{12}$.

With continued reference to FIG. 51B, the upstream, distal end surface 42a of the nozzle array disk $18b_{12}$ may include a first upstream, distal end surface portion $42a_1$ and a second upstream, distal end surface portion $42a_2$. The second upstream, distal end surface portion $42a_2$ is axially offset from the first upstream, distal end surface portion $42a_1$ at a distance equal to the first length portion, $L_{18b\text{-}1}$, of the length, $L_{18b}$, of the nozzle array disk $18b$. The first inner surface portion $45a$ defining the first axial passage portion $44a$ connects the first upstream, distal end surface portion $42a_1$ to the second upstream, distal end surface portion $42a_2$.

The downstream, proximal end surface $42b$ of the nozzle array disk $18b_{12}$ may include a first downstream, proximal end surface portion $42b_1$ and a second downstream, proximal end surface portion $42b_2$. The second downstream, proximal end surface portion $42b_2$ is axially offset from the first downstream, proximal end surface portion $42b_1$ at a distance equal to the third length portion, $L_{18b\text{-}3}$, of the length, $L_{18b}$, of the nozzle array disk $18b_{12}$. The third inner surface portion $45c$ defining the third axial passage portion $44c$ connects the first downstream, proximal end surface portion $42b_1$ to the second downstream, proximal end surface portion $42b_2$.

As described above, the second inner surface portion $45b$ extends along the second length portion, $L_{18b\text{-}2}$, of the length, $L_{18b}$, of the nozzle array disk $18b_{12}$. The second length portion, $L_{18b\text{-}2}$, of the length, $L_{18b}$, of the nozzle array disk $18b$ is arranged between the first length portion, $L_{18b\text{-}1}$, and the third length portion, $L_{18b\text{-}3}$, of the length, $L_{18b}$, of the nozzle array disk $18b_{12}$; as a result, the second inner surface portion $45b$ connects the second upstream, distal end surface portion $42a_2$ of the upstream, distal end surface $42a$ to the second downstream, proximal end surface portion $42b_2$ of the downstream, proximal end surface $42b$.

The first inner surface portion $45a$ defines the first axial passage portion $44a$ to include a first diameter, $D1_{44}$. The second inner surface portion $45b$ defines the second axial passage portion $44b$ to include a second diameter, $D2_{44}$. The third inner surface portion $45c$ defines the third axial passage portion $44c$ to include a third diameter, $D3_{44}$.

In an implementation, the first diameter, $D1_{44}$, is a non-constant diameter. The non-constant diameter, $D1_{44}$, defined by the first axial passage portion $44a$ decreases along the first length portion, $L_{18b\text{-}1}$, of the length, $L_{18b}$, of the nozzle array disk $18b_{12}$ as the first axial passage portion $44a$ extends through the nozzle array disk $18b_{12}$ in a direction referenced from the upstream, distal end surface $42a$ toward the downstream, proximal end surface $42b$; as a result, the first axial passage portion $44a$ generally defines a conical passage that decreases in cross-section as the first axial passage portion $44a$ extends through the nozzle array disk $18b_{12}$ in a direction referenced from the upstream, distal end surface $42a$ toward the downstream, proximal end surface $42b$.

In an implementation, the second diameter, $D2_{44}$, is a constant diameter. Accordingly, the constant diameter, $D2_{44}$, defined by the second axial passage portion $44b$ is substantially the same along the second length portion, $L_{18b\text{-}2}$, of the length, $L_{18b}$, of the nozzle array disk $18b_{12}$ as the second axial passage portion $44b$ extends through the nozzle array disk $18b_{12}$ in a direction referenced from the upstream, distal end surface $42a$ toward the downstream, proximal end surface $42b$.

In an implementation, the third diameter, $D3_{44}$, is a non-constant diameter. The non-constant diameter, $D3_{44}$, defined by the third axial passage portion $44c$ increases along the third length portion, $L_{18b\text{-}3}$, of the length, $L_{18b}$, of the nozzle array disk $18b_{12}$ as the third axial passage portion $44c$ extends through the nozzle array disk $18b_{12}$ in a direction referenced from the upstream, distal end surface $42a$ toward the downstream, proximal end surface $42b$; as a result, the third axial passage portion $44c$ generally defines a conical passage that increases in cross-section as the third axial passage portion $44c$ extends through the nozzle array disk $18b_{12}$ in a direction referenced from the upstream, distal end surface $42a$ toward the downstream, proximal end surface $42b$.

The nozzle array disk $18b_{12}$ includes a plurality of fluid-flow passages 46. An axial center of each fluid flow passage 46 of the plurality of fluid-flow passages 46 may be equally spaced from the axial center of the nozzle array disk $18b_{12}$ at a radius, $R_{18b}$ (see, e.g., FIG. 51A), to form a circular array/arrangement of fluid-flow passages 46.

Referring to FIG. 51B, each fluid flow passage 46 of the plurality of fluid-flow passages 46 is defined by a nozzle surface 47. The nozzle surface 47 defining each fluid flow passage 46 of the plurality of fluid-flow passages 46 extends along the second length portion, $L_{18b\text{-}2}$, of the length, $L_{18b}$, of the nozzle array disk $18b_{12}$. Because the second length portion, $L_{18b\text{-}2}$, of the length, $L_{18b}$, of the nozzle array disk $18b_{12}$ is arranged between the first length portion, $L_{18b\text{-}1}$, and the third length portion, $L_{18b\text{-}3}$, of the length, $L_{18b}$, of the nozzle array disk $18b_{12}$ as described above, the nozzle surface 47 defining each fluid flow passage 46 of the plurality of fluid-flow passages 46 connects the second upstream, distal end surface portion $42a_2$ of the upstream, distal end surface $42a$ to the second downstream, proximal end surface portion $42b_2$ of the downstream, proximal end surface $42b$.

As seen in FIG. 51B, the nozzle surface 47 defines each fluid flow passage 46 of the plurality of fluid-flow passages 46 to include a nozzle dimension, $D_{46}$; the dimension may be, for example, an arcuate dimension. In the illustrated embodiment, the plurality of fluid-flow passages 46 may be defined by four fluid flow passages.

In an implementation, the arcuate nozzle dimension, $D_{46}$, of each fluid flow passage 46 of the plurality of fluid-flow passages 46 is a non-constant dimension. The non-constant arcuate nozzle dimension, $D_{46}$, decreases along the second length portion, $L_{18b\text{-}2}$, of the length, $L_{18b}$, of the nozzle array disk $18b_{12}$ as each fluid flow passage 46 of the plurality of fluid-flow passages 46 extends through the nozzle array disk $18b_{12}$ in a direction referenced from the upstream, distal end surface $42a$ toward the downstream, proximal end surface $42b$; as a result, each fluid flow passage 46 of the plurality of fluid-flow passages 46 generally defines an arcuate passage that decreases in cross-section as each fluid flow passage 46 of the plurality of fluid-flow passages 46 extends through the nozzle array disk $18b_{12}$ in a direction referenced from the upstream, distal end surface $42a$ toward the downstream, proximal end surface $42b$.

Referring to FIG. 51C, neighboring arcuate fluid-flow passages 46 may be separated by a watershed web of material 55. Each watershed web of material 55 extends away from the second upstream, distal end surface portion $42a_2$ of the upstream, distal end surface $42a$. Each watershed web of material 55 may assist in directing fluid, L, into the neighboring arcuate fluid-flow passages 46.

With continued reference to FIG. 51B, in an implementation, the non-constant diameter, $D1_{44}$, defined by the conical first axial passage portion $44a$ may be symmetrical to the non-constant diameter, $D3_{44}$, defined by the conical third axial passage portion $44c$ (in reference to a line of symmetry, S-S, passing through the nozzle array disk $18b_{12}$); therefore, the non-constant diameter, $D1_{44}$, defined by the conical first axial passage portion $44a$ may be said to be symmetrically equal to the non-constant diameter, $D3_{44}$, defined by the conical third axial passage portion 44c. The largest dimension of the non-constant arcuate nozzle dimension, $D_{46}$, of each arcuate fluid flow passage 46 is less than a smallest diameter of each of: (1) the non-constant diameter, $D1_{44}$, defined by the conical first axial passage portion 44a and (2) the non-constant diameter, $D3_{44}$, defined by the conical third axial passage portion 44c.

The plurality of arcuate fluid flow passages 46 fluidly connects the conical first axial passage portion 44a to the conical third axial passage portion 44c. Therefore, as the liquid, L, flows through the nozzle array disk $18b_{12}$ in a direction referenced from the upstream, distal end surface 42a toward the downstream, proximal end surface 42b, the liquid, L, is permitted to travel: (1) firstly through a first conical passage (i.e., the conical first axial passage portion 44a that decreases in cross-section in a direction referenced from the upstream, distal end surface 42a toward the downstream, proximal end surface 42b, then (2) secondly through a circular array of arcuate nozzle passages (i.e., the plurality of arcuate fluid flow passages 46) that decrease in cross-section in a direction referenced from the upstream, distal end surface 42a toward the downstream, proximal end surface 42b, and then (3) thirdly through a second conical passage (i.e., the conical third axial passage portion 44c) that increases in cross-section in a direction referenced from the upstream, distal end surface 42a toward the downstream, proximal end surface 42b. The liquid, L, does not flow through the second axial passage portion 44b due to the second axial passage portion 44b being utilized for permitting a threaded stem (see, e.g., 50, 50', 50" described above) of the upstream-facing member (see, e.g., 18c, 18c', 18c" described above) to pass therethrough for connecting the threaded stem of the upstream-facing member to a threaded passage (see, e.g., 40, 40', 40" described above) of a downstream-facing member (see, e.g., 18a, 18a', 18a" described above).

Shown below is a table including an exemplary embodiment of dimensions of the arcuate nozzle array disk $18b_{12}$ described in inches.

TABLE 29

|  | Embodiment 1 |
| --- | --- |
| $L_{18b}$ | 0.85" |
| $L_{18b-1}$ | 0.30" |
| $L_{18b-2}$ | 0.25" |
| $L_{18b-3}$ | 0.30" |
| $D_{18b}$ | 1.14" |
| $D1_{44}$ | Between 0.96" and 1.04" |
| $D2_{44}$ | 0.15" |
| $D3_{44}$ | Between 0.96" and 1.04" |
| $D_{46}$ | Between 0.16" and 0.06" |
| $R_{18b}$ | 0.43" |

Referring to FIGS. 52A-52C, an implementation of a nozzle array disk $18b_{13}$ is described. Accordingly, it is contemplated that any of the nozzle array disks 18b, 18b', 18b" described above may be substituted with the nozzle array disk $18b_{13}$ shown in FIGS. 52A-52B.

The nozzle array disk $18b_{13}$ is defined by a length, $L_{18b}$ (see, e.g., FIG. 52B), extending between an upstream, distal end surface 42a and a downstream, proximal end surface 42b. An outer side surface 42c connects the upstream, distal end surface 42a to the downstream, proximal end surface 42b. The outer side surface 42c defines the nozzle array disk $18b_{13}$ to include a diameter, $D_{18b}$ (see, e.g., FIG. 52B).

Referring to FIG. 52B, an axial passage 44 extends through the nozzle array disk $18b_{13}$ between the upstream, distal end surface 42a and the downstream, proximal end surface 42b. The axial passage 44 is arranged along an axis, A-A, extending through an axial center of the nozzle array disk $18b_{13}$. The axial passage 44 is defined by an inner surface 45 of the of nozzle array disk $18b_{13}$.

In an implementation, the axial passage 44 is defined by a first axial passage portion 44a, a second axial passage portion 44b and a third axial passage portion 44c. The inner surface 45 of the nozzle array disk 18b includes a first inner surface portion 45a, a second inner surface portion 45b and a third inner surface portion 45c.

As seen in FIG. 52B, the first inner surface portion 45a defines the first axial passage portion 44a and extends along a first length portion, $L_{18b-1}$, of the length, $L_{18b}$, of the nozzle array disk $18b_{13}$. The second inner surface portion 45b defines the second axial passage portion 44b and extends along a second length portion, $L_{18b-2}$, of the length, $L_{18b}$, of the nozzle array disk $18b_{13}$. The third inner surface portion 45c defines the third axial passage portion 44c and extends along a third length portion, $L_{18b-3}$, of the length, $L_{18b}$, of the nozzle array disk $18b_{13}$. The sum of the first, second and third length portions, $L_{18b-1}$, $L_{18b-2}$, $L_{18b-3}$, equals the length, $L_{18b}$, of the nozzle array disk $18b_{13}$.

With continued reference to FIG. 52B, the upstream, distal end surface 42a of the nozzle array disk $18b_{13}$ may include a first upstream, distal end surface portion $42a_1$ and a second upstream, distal end surface portion $42a_2$. The second upstream, distal end surface portion $42a_2$ is axially offset from the first upstream, distal end surface portion $42a_1$ at a distance equal to the first length portion, $L_{18b-1}$, of the length, $L_{18b}$, of the nozzle array disk 18b. The first inner surface portion 45a defining the first axial passage portion 44a connects the first upstream, distal end surface portion $42a_1$ to the second upstream, distal end surface portion $42a_2$.

The downstream, proximal end surface 42b of the nozzle array disk $18b_{13}$ may include a first downstream, proximal end surface portion $42b_1$ and a second downstream, proximal end surface portion $42b_2$. The second downstream, proximal end surface portion $42b_2$ is axially offset from the first downstream, proximal end surface portion $42b_1$ at a distance equal to the third length portion, $L_{18b-3}$, of the length, $L_{18b}$, of the nozzle array disk $18b_{13}$. The third inner surface portion 45c defining the third axial passage portion 44c connects the first downstream, proximal end surface portion $42b_1$ to the second downstream, proximal end surface portion $42b_2$.

As described above, the second inner surface portion 45b extends along the second length portion, $L_{18b-2}$, of the length, $L_{18b}$, of the nozzle array disk $18b_{13}$. The second length portion, $L_{18b-2}$, of the length, $L_{18b}$, of the nozzle array disk 18b is arranged between the first length portion, $L_{18b-1}$, and the third length portion, $L_{18b-3}$, of the length, $L_{18b}$, of the nozzle array disk $18b_{13}$; as a result, the second inner surface portion 45b connects the second upstream, distal end surface portion $42a_2$ of the upstream, distal end surface 42a to the second downstream, proximal end surface portion $42b_2$ of the downstream, proximal end surface 42b.

The first inner surface portion 45a defines the first axial passage portion 44a to include a first diameter, $D1_{44}$. The second inner surface portion 45b defines the second axial passage portion 44b to include a second diameter, $D2_{44}$. The third inner surface portion 45c defines the third axial passage portion 44c to include a third diameter, $D3_{44}$.

In an implementation, the first diameter, $D1_{44}$, is a non-constant diameter. The non-constant diameter, $D1_{44}$, defined by the first axial passage portion 44a decreases along the first length portion, $L_{18b-1}$, of the length, $L_{18b}$, of the nozzle array disk $18b_{13}$ as the first axial passage portion $44a$ extends through the nozzle array disk $18b_{13}$ in a direction referenced from the upstream, distal end surface $42a$ toward the downstream, proximal end surface $42b$; as a result, the first axial passage portion $44a$ generally defines a conical passage that decreases in cross-section as the first axial passage portion $44a$ extends through the nozzle array disk $18b_{13}$ in a direction referenced from the upstream, distal end surface $42a$ toward the downstream, proximal end surface $42b$.

In an implementation, the second diameter, $D2_{44}$, is a constant diameter. Accordingly, the constant diameter, $D2_{44}$, defined by the second axial passage portion $44b$ is substantially the same along the second length portion, $L_{18b-2}$, of the length, $L_{18b}$, of the nozzle array disk $18b_{13}$ as the second axial passage portion $44b$ extends through the nozzle array disk $18b_{13}$ in a direction referenced from the upstream, distal end surface $42a$ toward the downstream, proximal end surface $42b$.

In an implementation, the third diameter, $D3_{44}$, is a non-constant diameter. The non-constant diameter, $D3_{44}$, defined by the third axial passage portion $44c$ increases along the third length portion, $L_{18b-3}$, of the length, $L_{18b}$, of the nozzle array disk $18b_{13}$ as the third axial passage portion $44c$ extends through the nozzle array disk $18b_{13}$ in a direction referenced from the upstream, distal end surface $42a$ toward the downstream, proximal end surface $42b$; as a result, the third axial passage portion $44c$ generally defines a conical passage that increases in cross-section as the third axial passage portion $44c$ extends through the nozzle array disk $18b_{13}$ in a direction referenced from the upstream, distal end surface $42a$ toward the downstream, proximal end surface $42b$.

The nozzle array disk $18b_{13}$ includes a plurality of fluid-flow passages $46$. An axial center of each fluid flow passage $46$ of the plurality of fluid-flow passages $46$ may be equally spaced from the axial center of the nozzle array disk $18b_{13}$ at a radius, $R_{18b}$ (see, e.g., FIG. 52A), to form a circular array/arrangement of fluid-flow passages $46$.

Referring to FIG. 52B, each fluid flow passage $46$ of the plurality of fluid-flow passages $46$ is defined by a nozzle surface $47$. The nozzle surface $47$ defining each fluid flow passage $46$ of the plurality of fluid-flow passages $46$ extends along the second length portion, $L_{18b-2}$, of the length, $L_{18b}$, of the nozzle array disk $18b_{13}$. Because the second length portion, $L_{18b-2}$, of the length, $L_{18b}$, of the nozzle array disk $18b_{13}$ is arranged between the first length portion, $L_{18b-1}$, and the third length portion, $L_{18b-3}$, of the length, $L_{18b}$, of the nozzle array disk $18b_{13}$ as described above, the nozzle surface $47$ defining each fluid flow passage $46$ of the plurality of fluid-flow passages $46$ connects the second upstream, distal end surface portion $42a_2$ of the upstream, distal end surface $42a$ to the second downstream, proximal end surface portion $42b_2$ of the downstream, proximal end surface $42b$.

As seen in FIG. 52B, the nozzle surface $47$ defines each fluid flow passage $46$ of the plurality of fluid-flow passages $46$ to include a nozzle dimension, $D_{46}$; the dimension may be, for example, an arcuate dimension. In the illustrated embodiment, the plurality of fluid-flow passages $46$ may be defined by eight fluid flow passages.

In an implementation, the arcuate nozzle dimension, $D_{46}$, of each fluid flow passage $46$ of the plurality of fluid-flow passages $46$ is a non-constant dimension. The non-constant arcuate nozzle dimension, $D_{46}$, decreases along the second length portion, $L_{18b-2}$, of the length, $L_{18b}$, of the nozzle array disk $18b_{13}$ as each fluid flow passage $46$ of the plurality of fluid-flow passages $46$ extends through the nozzle array disk $18b_{13}$ in a direction referenced from the upstream, distal end surface $42a$ toward the downstream, proximal end surface $42b$; as a result, each fluid flow passage $46$ of the plurality of fluid-flow passages $46$ generally defines an arcuate passage that decreases in cross-section as each fluid flow passage $46$ of the plurality of fluid-flow passages $46$ extends through the nozzle array disk $18b_{13}$ in a direction referenced from the upstream, distal end surface $42a$ toward the downstream, proximal end surface $42b$.

Referring to FIG. 52C, neighboring arcuate fluid-flow passages $46$ may be separated by a watershed web of material $55$. Each watershed web of material $55$ extends away from the second upstream, distal end surface portion $42a_2$ of the upstream, distal end surface $42a$. Each watershed web of material $55$ may assist in directing fluid, L, into the neighboring arcuate fluid-flow passages $46$.

With continued reference to FIG. 52B, in an implementation, the non-constant diameter, $D1_{44}$, defined by the conical first axial passage portion $44a$ may be symmetrical to the non-constant diameter, $D3_{44}$, defined by the conical third axial passage portion $44c$ (in reference to a line of symmetry, S-S, passing through the nozzle array disk $18b_{13}$); therefore, the non-constant diameter, $D1_{44}$, defined by the conical first axial passage portion $44a$ may be said to be symmetrically equal to the non-constant diameter, $D3_{44}$, defined by the conical third axial passage portion $44c$. The largest dimension of the non-constant arcuate nozzle dimension, $D_{46}$, of each arcuate fluid flow passage $46$ is less than a smallest diameter of each of: (1) the non-constant diameter, $D1_{44}$, defined by the conical first axial passage portion $44a$ and (2) the non-constant diameter, $D3_{44}$, defined by the conical third axial passage portion $44c$.

The plurality of arcuate fluid flow passages $46$ fluidly connects the conical first axial passage portion $44a$ to the conical third axial passage portion $44c$. Therefore, as the liquid, L, flows through the nozzle array disk $18b_{13}$ in a direction referenced from the upstream, distal end surface $42a$ toward the downstream, proximal end surface $42b$, the liquid, L, is permitted to travel: (1) firstly through a first conical passage (i.e., the conical first axial passage portion $44a$ that decreases in cross-section in a direction referenced from the upstream, distal end surface $42a$ toward the downstream, proximal end surface $42b$, then (2) secondly through a circular array of arcuate nozzle passages (i.e., the plurality of arcuate fluid flow passages $46$) that decrease in cross-section in a direction referenced from the upstream, distal end surface $42a$ toward the downstream, proximal end surface $42b$, and then (3) thirdly through a second conical passage (i.e., the conical third axial passage portion $44c$) that increases in cross-section in a direction referenced from the upstream, distal end surface $42a$ toward the downstream, proximal end surface $42b$. The liquid, L, does not flow through the second axial passage portion $44b$ due to the second axial passage portion $44b$ being utilized for permitting a threaded stem (see, e.g., $50$, $50'$, $50''$ described above) of the upstream-facing member (see, e.g., $18c$, $18c'$, $18c''$ described above) to pass therethrough for connecting the threaded stem of the upstream-facing member to a threaded passage (see, e.g., $40$, $40'$, $40''$ described above) of a downstream-facing member (see, e.g., $18a$, $18a'$, $18a''$ described above).

Shown below is a table including an exemplary embodiment of dimensions of the arcuate nozzle array disk $18b_{13}$ described in inches.

TABLE 30

| | Embodiment 1 |
|---|---|
| $L_{18b}$ | 0.85" |
| $L_{18b-1}$ | 0.30" |
| $L_{18b-2}$ | 0.25" |
| $L_{18b-3}$ | 0.30" |
| $D_{18b}$ | 1.14" |
| $D1_{44}$ | Between 0.96" and 1.04" |
| $D2_{44}$ | 0.15" |
| $D3_{44}$ | Between 0.96" and 1.04" |
| $D_{46}$ | Between 0.06" and 0.16" |
| $R_{18b}$ | 0.43" |

Figure 53A:
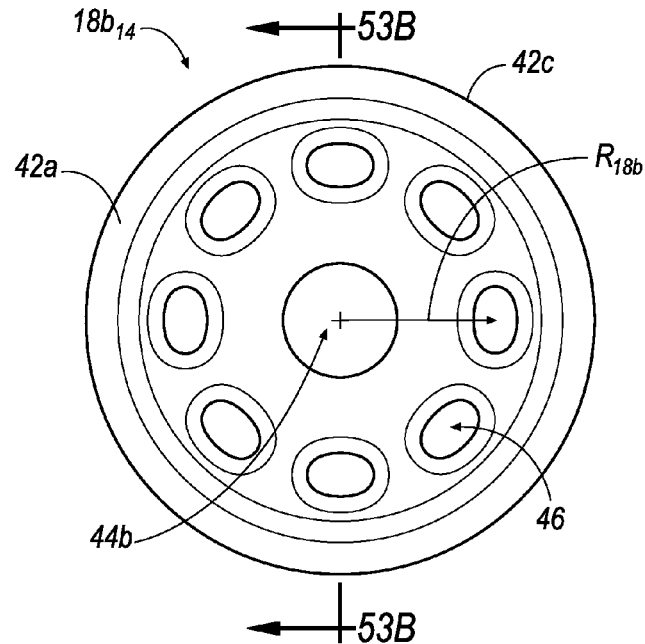
Figure 53B:
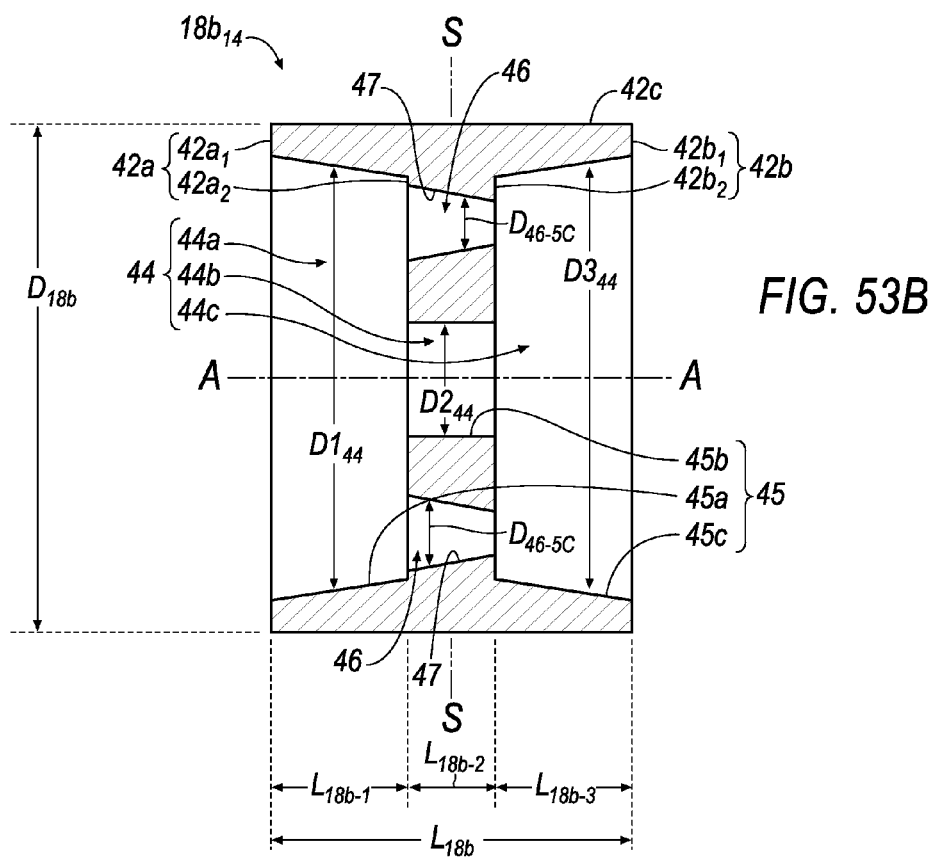

Referring to FIGS. 53A-53B, an implementation of a nozzle array disk $18b_{14}$ is described. Accordingly, it is contemplated that any of the nozzle array disks $18b$, $18b'$, $18b''$ described above may be substituted with the nozzle array disk $18b_{14}$ shown in FIGS. 53A-53B.

The nozzle array disk $18b_{14}$ is defined by a length, $L_{18b}$ (see, e.g., FIG. 53B), extending between an upstream, distal end surface 42a and a downstream, proximal end surface 42b. An outer side surface 42c connects the upstream, distal end surface 42a to the downstream, proximal end surface 42b. The outer side surface 42c defines the nozzle array disk $18b_{14}$ to include a diameter, $D_{18b}$ (see, e.g., FIG. 53B).

Referring to FIG. 53B, an axial passage 44 extends through the nozzle array disk $18b_{14}$ between the upstream, distal end surface 42a and the downstream, proximal end surface 42b. The axial passage 44 is arranged along an axis, A-A, extending through an axial center of the nozzle array disk $18b_{14}$. The axial passage 44 is defined by an inner surface 45 of the of nozzle array disk $18b_{14}$.

In an implementation, the axial passage 44 is defined by a first axial passage portion 44a, a second axial passage portion 44b and a third axial passage portion 44c. The inner surface 45 of the nozzle array disk 18b includes a first inner surface portion 45a, a second inner surface portion 45b and a third inner surface portion 45c.

As seen in FIG. 53B, the first inner surface portion 45a defines the first axial passage portion 44a and extends along a first length portion, $L_{18b-1}$, of the length, $L_{18b}$, of the nozzle array disk $18b_{14}$. The second inner surface portion 45b defines the second axial passage portion 44b and extends along a second length portion, $L_{18b-2}$, of the length, $L_{18b}$, of the nozzle array disk $18b_{14}$. The third inner surface portion 45c defines the third axial passage portion 44c and extends along a third length portion, $L_{18b-3}$, of the length, $L_{18b}$, of the nozzle array disk $18b_{14}$. The sum of the first, second and third length portions, $L_{18b-1}$, $L_{18b-2}$, $L_{18b-3}$, equals the length, $L_{18b}$, of the nozzle array disk $18b_{14}$.

With continued reference to FIG. 53B, the upstream, distal end surface 42a of the nozzle array disk $18b_{14}$ may include a first upstream, distal end surface portion $42a_1$ and a second upstream, distal end surface portion $42a_2$. The second upstream, distal end surface portion $42a_2$ is axially offset from the first upstream, distal end surface portion $42a_1$ at a distance equal to the first length portion, $L_{18b-1}$, of the length, $L_{18b}$, of the nozzle array disk 18b. The first inner surface portion 45a defining the first axial passage portion 44a connects the first upstream, distal end surface portion $42a_1$ to the second upstream, distal end surface portion $42a_2$.

The downstream, proximal end surface 42b of the nozzle array disk $18b_{14}$ may include a first downstream, proximal end surface portion $42b_1$ and a second downstream, proximal end surface portion $42b_2$. The second downstream, proximal end surface portion $42b_2$ is axially offset from the first downstream, proximal end surface portion $42b_1$ at a distance equal to the third length portion, $L_{18b-3}$, of the length, $L_{18b}$, of the nozzle array disk $18b_{14}$. The third inner surface portion 45c defining the third axial passage portion 44c connects the first downstream, proximal end surface portion $42b_1$ to the second downstream, proximal end surface portion $42b_2$.

As described above, the second inner surface portion 45b extends along the second length portion, $L_{18b-2}$, of the length, $L_{18b}$, of the nozzle array disk $18b_{14}$. The second length portion, $L_{18b-2}$, of the length, $L_{18b}$, of the nozzle array disk 18b is arranged between the first length portion, $L_{18b-1}$, and the third length portion, $L_{18b-3}$, of the length, $L_{18b}$, of the nozzle array disk $18b_{14}$; as a result, the second inner surface portion 45b connects the second upstream, distal end surface portion $42a_2$ of the upstream, distal end surface 42a to the second downstream, proximal end surface portion $42b_2$ of the downstream, proximal end surface 42b.

The first inner surface portion 45a defines the first axial passage portion 44a to include a first diameter, $D1_{44}$. The second inner surface portion 45b defines the second axial passage portion 44b to include a second diameter, $D2_{44}$. The third inner surface portion 45c defines the third axial passage portion 44c to include a third diameter, $D3_{44}$.

In an implementation, the first diameter, $D1_{44}$, is a non-constant diameter. The non-constant diameter, $D1_{44}$, defined by the first axial passage portion 44a decreases along the first length portion, $L_{18b-1}$, of the length, $L_{18b}$, of the nozzle array disk $18b_{14}$ as the first axial passage portion 44a extends through the nozzle array disk $18b_{14}$ in a direction referenced from the upstream, distal end surface 42a toward the downstream, proximal end surface 42b; as a result, the first axial passage portion 44a generally defines a conical passage that decreases in cross-section as the first axial passage portion 44a extends through the nozzle array disk $18b_{14}$ in a direction referenced from the upstream, distal end surface 42a toward the downstream, proximal end surface 42b.

In an implementation, the second diameter, $D2_{44}$, is a constant diameter. Accordingly, the constant diameter, $D2_{44}$, defined by the second axial passage portion 44b is substantially the same along the second length portion, $L_{18b-2}$, of the length, $L_{18b}$, of the nozzle array disk $18b_{14}$ as the second axial passage portion 44b extends through the nozzle array disk $18b_{14}$ in a direction referenced from the upstream, distal end surface 42a toward the downstream, proximal end surface 42b.

In an implementation, the third diameter, $D3_{44}$, is a non-constant diameter. The non-constant diameter, $D3_{44}$, defined by the third axial passage portion 44c increases along the third length portion, $L_{18b-3}$, of the length, $L_{18b}$, of the nozzle array disk $18b_{14}$ as the third axial passage portion 44c extends through the nozzle array disk $18b_{14}$ in a direction referenced from the upstream, distal end surface 42a toward the downstream, proximal end surface 42b; as a result, the third axial passage portion 44c generally defines a conical passage that increases in cross-section as the third axial passage portion 44c extends through the nozzle array disk $18b_{14}$ in a direction referenced from the upstream, distal end surface 42a toward the downstream, proximal end surface 42b.

The nozzle array disk $18b_{14}$ includes a plurality of fluid-flow passages 46, which are substantially similar to the fluid-flow passages $46_5$ shown in FIGS. 44A-44B. An axial center of each fluid flow passage 46 of the plurality of fluid-flow passages 46 may be equally spaced from the axial center of the nozzle array disk $18b_{14}$ at a radius, $R_{18b}$ (see, e.g., FIG. 53A), to form a circular array/arrangement of fluid-flow passages 46.

Referring to FIG. 53B, each fluid flow passage 46 of the plurality of fluid-flow passages 46 is defined by a nozzle surface 47. The nozzle surface 47 defining each fluid flow passage 46 of the plurality of fluid-flow passages 46 extends along the second length portion, $L_{18b-2}$, of the length, $L_{18b}$, of the nozzle array disk $18b_{14}$. Because the second length portion, $L_{18b-2}$, of the length, $L_{18b}$, of the nozzle array disk $18b_{14}$ is arranged between the first length portion, $L_{18b-1}$, and the third length portion, $L_{18b-3}$, of the length, $L_{18b}$, of the nozzle array disk $18b_{14}$ as described above, the nozzle surface 47 defining each fluid flow passage 46 of the plurality of fluid-flow passages 46 connects the second upstream, distal end surface portion $42a_2$ of the upstream, distal end surface 42a to the second downstream, proximal end surface portion $42b_2$ of the downstream, proximal end surface 42b.

As seen in FIG. 53B, the nozzle surface 47 defines each fluid flow passage 46 to have an elliptical dimension defined by a conjugate nozzle diameter, $D1_{46-5C}$ (see FIGS. 44A, 44B and 53B), and a transverse nozzle diameter, $D1_{46-5T}$ (see FIG. 44B). In an implementation, both of the conjugate nozzle diameter, $D1_{46-5C}$, and transverse nozzle diameter, $D1_{46-5T}$, are non-constant diameters. The non-constant conjugate nozzle diameter, $D1_{46-5C}$, and transverse nozzle diameter, $D1_{46-5T}$, decrease along the length of the nozzle array disk $18b_{14}$ as the fluid flow passage 46 extends through the nozzle array disk $18b_{14}$ in a direction referenced from the upstream, distal end surface 42a toward the downstream, proximal end surface 42b; as a result, the fluid flow passage 46 generally defines a conical passage that decreases in cross-section as the fluid flow passage 46 extends through the nozzle array disk $18b_{14}$ in a direction referenced from the upstream, distal end surface 42a toward the downstream, proximal end surface 42b.

With continued reference to FIG. 53B, in an implementation, the non-constant diameter, $D1_{44}$, defined by the conical first axial passage portion 44a may be symmetrical to the non-constant diameter, $D3_{44}$, defined by the conical third axial passage portion 44c (in reference to a line of symmetry, S-S, passing through the nozzle array disk $18b_{14}$); therefore, the non-constant diameter, $D1_{44}$, defined by the conical first axial passage portion 44a may be said to be symmetrically equal to the non-constant diameter, $D3_{44}$, defined by the conical third axial passage portion 44c. The largest diameter of the non-constant nozzle diameter, $D_{46}$, of each conical fluid flow passage 46 is less than a smallest diameter of each of: (1) the non-constant diameter, $D1_{44}$, defined by the conical first axial passage portion 44a and (2) the non-constant diameter, $D3_{44}$, defined by the conical third axial passage portion 44c. In an implementation, the non-constant nozzle diameter, $D_{46}$, may be proportional to the non-constant diameter, $D1_{44}$; therefore, proportionally, the non-constant nozzle diameter, $D_{46}$, of each conical fluid flow passage 46 of the plurality of conical fluid-flow passages 46 may range be approximately about one-sixteenth (1/16) to one-tenth (1/10) of non-constant diameter, $D1_{44}$, defined by the conical first axial passage portion 44a.

The plurality of conical fluid flow passages 46 fluidly connects the conical first axial passage portion 44a to the conical third axial passage portion 44c. Therefore, as the liquid, L, flows through the nozzle array disk $18b_{14}$ in a direction referenced from the upstream, distal end surface 42a toward the downstream, proximal end surface 42b, the liquid, L, is permitted to travel: (1) firstly through a first conical passage (i.e., the conical first axial passage portion 44a that decreases in cross-section in a direction referenced from the upstream, distal end surface 42a toward the downstream, proximal end surface 42b, then (2) secondly through a circular array of conical nozzle passages (i.e., the plurality of conical fluid flow passages 46) that decrease in cross-section in a direction referenced from the upstream, distal end surface 42a toward the downstream, proximal end surface 42b, and then (3) thirdly through a second conical passage (i.e., the conical third axial passage portion 44c) that increases in cross-section in a direction referenced from the upstream, distal end surface 42a toward the downstream, proximal end surface 42b. The liquid, L, does not flow through the second axial passage portion 44b due to the second axial passage portion 44b being utilized for permitting a threaded stem (see, e.g., 50, 50', 50" described above) of the upstream-facing member (see, e.g., 18c, 18c', 18c" described above) to pass therethrough for connecting the threaded stem of the upstream-facing member to a threaded passage (see, e.g., 40, 40', 40" described above) of a downstream-facing member (see, e.g., 18a, 18a', 18a" described above).

Shown below is a table including an exemplary embodiment of dimensions of the conical nozzle array disk $18b_{14}$ described in inches.

TABLE 31

| | Embodiment 1 |
|---|---|
| $L_{18b}$ | 0.85" |
| $L_{18b-1}$ | 0.30" |
| $L_{18b-2}$ | 0.25" |
| $L_{18b-3}$ | 0.30" |
| $D_{18b}$ | 1.14" |
| $D1_{44}$ | Between 0.96" and 1.04" |
| $D2_{44}$ | 0.15" |
| $D3_{44}$ | Between 0.96" and 1.04" |
| $D_{46}$ | Between 0.06" and 0.16" |
| $R_{18b}$ | 0.43" |

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A fluid handling system that handles a fluid, comprising:
    a bubble implosion reactor cavitation device forming a fluid-flow passage, wherein the bubble implosion reactor cavitation device includes:
        an inlet opening formed by an upstream, distal end of the bubble implosion reactor cavitation device that permits the fluid to enter the fluid-flow passage, and
        an outlet opening formed by a downstream, proximal end of the bubble implosion reactor cavitation device that permits the fluid to exit the fluid-flow passage; and
    a cavitation-inducing pump connected to the outlet opening formed by a downstream, proximal end of the bubble implosion reactor cavitation device for pulling the fluid through the fluid-flow passage such that very little if any positive pressure with respect to atmospheric pressure is placed on the fluid as the fluid enters the fluid-flow passage, wherein the bubble implosion reaction includes a nozzle array disk defining
an axial passage that extends through the nozzle array disk between the upstream, distal end surface and the downstream, proximal end surface of the nozzle array disk, wherein
a stem extending away from a downstream, proximal end surface of the upstream-facing member extends through the axial passage that extends through the nozzle array disk and into
a stem-receiving passage formed in an upstream, distal end surface of the downstream-facing member for connecting the upstream-facing member to the downstream-facing member while retaining the nozzle array disk therebetween.

2. The fluid handling system of claim 1, further comprising:
a fluid inlet conduit connected to the inlet opening formed by the upstream, distal end of the bubble implosion reactor cavitation device; and
a fluid outlet conduit connected to a downstream, proximal end of the cavitation-inducing pump.

3. The fluid handling system of claim 2, further comprising:
a fuel tank connected to the fluid inlet conduit for supplying the fluid from the fuel tank to the bubble implosion reactor cavitation device, wherein the fluid is fuel.

4. The fluid handling system of claim 3, further comprising:
a fuel injection system of an engine connected to the fluid outlet conduit for supplying the fuel from the bubble implosion reactor cavitation device to the fuel injection system of the engine.

5. A method for operating a fluid handling system that handles a fluid, comprising:
providing a bubble implosion reactor cavitation device including a nozzle array disk that at least partially forms a fluid-flow passage, wherein the nozzle array disk includes:
an axial passage that extends through the nozzle array disk between the upstream, distal end surface and the downstream, proximal end surface of the nozzle array disk, wherein
a stem extending away from a downstream, proximal end surface of the upstream-facing member extends through the axial passage that extends through the nozzle array disk and into
a stem-receiving passage formed in an upstream, distal end surface of the downstream-facing member for connecting the upstream-facing member to the downstream-facing member while retaining the nozzle array disk therebetween, wherein the bubble implosion reactor cavitation device includes:
an inlet opening formed by an upstream, distal end of the bubble implosion reactor cavitation device that permits the fluid to enter the fluid-flow passage, and
an outlet opening formed by a downstream, proximal end of the bubble implosion reactor cavitation device that permits the fluid to exit the fluid-flow passage; and
connecting a cavitation-inducing pump to the outlet opening formed by a downstream, proximal end of the bubble implosion reactor cavitation device for pulling the fluid through the fluid-flow passage such that very little if any positive pressure with respect to atmospheric pressure is placed on the fluid as the fluid enters the fluid-flow passage.

6. The method of claim 5, further comprising:
connecting a fluid inlet conduit to the inlet opening formed by the upstream, distal end of the bubble implosion reactor cavitation device; and
connecting a fluid outlet conduit to a downstream, proximal end of the cavitation-inducing pump.

7. The method of claim 6, further comprising:
connecting a fuel tank to the fluid inlet conduit for supplying the fluid from the fuel tank to the bubble implosion reactor cavitation device, wherein the fluid is fuel.

8. The method of claim 7, further comprising:
connecting a fuel injection system of an engine to the fluid outlet conduit for supplying the fuel from the bubble implosion reactor cavitation device to the fuel injection system of the engine.

9. The method of claim 8, further comprising:
connecting an additive tank to the fluid inlet conduit for supplying an additive from the additive tank to the bubble implosion reactor cavitation device for permitting emulsification of the liquid.

10. The method of claim 8, further comprising
a controller communicatively coupled with the fuel injection system of the engine.

11. The method of claim 8, wherein the bubble implosion reactor cavitation device conducts the step of:
processing the fuel for increasing an amount of cracked hydrocarbons of the fuel prior to combustion of the fuel by the engine to thereby increase one or more of fuel quality, fuel efficiency and engine horsepower.

12. The method of claim 8, wherein the fuel includes crude petroleum and derivatives of crude petroleum, wherein the bubble implosion reactor cavitation device conducts the step of:
processing the crude petroleum and derivatives of crude petroleum in a refinery for increasing an amount of cracked hydrocarbons of the crude petroleum and derivatives of crude petroleum prior to production of an end product including: gasoline, jet fuel, diesel fuel or heating fuel.

13. The method of claim 11, wherein the fuel includes one of: diesel fuel, jet fuel, gasoline, heating fuel and heavy bottom fuel.

14. The method of claim 11, wherein the fuel includes one of a blended fuel, wherein the blended fuel includes one or more of blended biodiesel, blended jet fuel, blended gasoline, blended heating fuel, and blended heavy bottom fuel.

15. The method of claim 5, wherein the fluid includes water, wherein the bubble implosion reactor cavitation device conducts the step of:
processing the water for destroying chemical compounds and pollutants in the water for purifying the water to increase quality of the water.

16. The method of claim 15, wherein the water includes one of natural water, drinking water, grey water, storm water, ballast water, agricultural water, waste water and industrial waste water.

17. The method of claim 5, wherein the fluid includes a chemical solution contained by an industrial reaction vessel, wherein the bubble implosion reactor cavitation device conducts the step of:
processing the chemical solution for activation of main chemical reactions in a chemical vessel.

18. The method of claim 5, wherein fluid is a multi-blend fluid that includes one of a liquid-liquid multi-blend fluid, a liquid-gas multi-blend fluid, and a liquid-solid particle solution, wherein the liquid-solid particle solution includes one of water with oils, water with ozone, and distilled water with nano-scale drug particles.

19. The method of claim 18, wherein the bubble implosion reactor cavitation device conducts the step of:
   processing the multi-blend fluid for formulating normally insoluble liquid-liquid, liquid-gas-liquid, liquid-gas solutions or gas-liquid-gas solutions in chemistry or bio-medicine.

20. The method of claim 18, wherein the bubble implosion reactor cavitation device conducts the step of:
   processing the multi-blend fluid for formulating normally non-emulsified liquid-solid particle solutions or liquid-gas-solid particle solutions in chemistry or bio-medicine and cosmetology.

21. The method of claim 18, wherein the bubble implosion reactor cavitation device conducts the step of:
   processing the multi-blend fluid for formulating normally non-emulsified liquid-solid particle solutions in nano-pharmacy for formulating nano-scale drugs.

22. The method of claim 18, wherein the bubble implosion reactor cavitation device conducts the step of:
   processing the multi-blend fluid for formulating normally non-emulsified liquid-solid particle solutions or liquid-gas-solid particle solutions for homogenization and preservation of food.

\* \* \* \* \*